United States Patent
Allen et al.

(10) Patent No.: US 11,937,020 B2
(45) Date of Patent: *Mar. 19, 2024

(54) OBJECT INSPECTION SYSTEM AND METHOD FOR INSPECTING AN OBJECT

(71) Applicant: Inovision Software Solutions, Inc., Chesterfield, MI (US)

(72) Inventors: Jacob Nathaniel Allen, Shelby Township, MI (US); Zhipeng Liang, Sterling Heights, MI (US); Brandon David See, West Bloomfield, MI (US); Frank Damacio Luna, Henderson, NV (US)

(73) Assignee: Inovision Software Solutions, Inc., Chesterfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,268

(22) Filed: Mar. 16, 2022

(65) Prior Publication Data
US 2022/0264057 A1    Aug. 18, 2022

Related U.S. Application Data

(63) Continuation of application No. 16/866,110, filed on May 4, 2020, now Pat. No. 11,310,467, which is a
(Continued)

(51) Int. Cl.
*H04N 7/18* (2006.01)
*G01N 21/88* (2006.01)
(Continued)

(52) U.S. Cl.
CPC ......... *H04N 7/181* (2013.01); *G01N 21/8851* (2013.01); *G01N 21/89* (2013.01);
(Continued)

(58) Field of Classification Search
USPC ... 348/61, 86, 89, 91–92, 94, 125, 142, 180, 348/184
See application file for complete search history.

(56) References Cited

U.S. PATENT DOCUMENTS

| | | |
|---|---|---|
| 3,416,340 A | 12/1968 | Reesor |
| 4,476,981 A | 10/1984 | Yoshida |
| (Continued) | | |

FOREIGN PATENT DOCUMENTS

| | | |
|---|---|---|
| CA | 2684365 A1 | 10/2008 |
| DE | 4123916 A1 | 1/1992 |
| (Continued) | | |

OTHER PUBLICATIONS

Instituto De Diseno Y Fabricacion Automocion 2013—Spain (A Brochure) and a website including the attached pages labelled "Ford Project" Authored By the Institute of Design and Manufacturing in 2013 and providing the brochure referenced above and located at www.institutoidf.com.
(Continued)

*Primary Examiner* — Hung Q Dang
(74) *Attorney, Agent, or Firm* — Jacob M. Ward; Ward Law Office LLC

(57) ABSTRACT

An object inspection system and a method for detecting defects which utilizes a plurality of cameras and lights to capture images of a portion of an object and which uses the captured images to determine the presence of a defect upon a surface, such as surface, of the object and which may communicated the location of the identified defect to an automated defect repair assembly.

20 Claims, 117 Drawing Sheets

Related U.S. Application Data continuation of application No. 15/932,865, filed on May 9, 2018, now abandoned.

(60) Provisional application No. 62/511,404, filed on May 26, 2017, provisional application No. 62/504,534, filed on May 11, 2017, provisional application No. 62/504,538, filed on May 11, 2017.

(51) Int. Cl.
| | | |
|---|---|---|
| G01N 21/89 | (2006.01) | |
| G06T 7/00 | (2017.01) | |
| G06T 7/73 | (2017.01) | |
| H04N 17/00 | (2006.01) | |
| H04N 23/56 | (2023.01) | |
| H04N 23/90 | (2023.01) | |

(52) U.S. Cl.
CPC .......... *G06T 7/0004* (2013.01); *G06T 7/0008* (2013.01); *G06T 7/001* (2013.01); *G06T 7/73* (2017.01); *H04N 7/188* (2013.01); *H04N 17/002* (2013.01); *H04N 23/56* (2023.01); *H04N 23/90* (2023.01); *G06T 2207/10152* (2013.01); *G06T 2207/30156* (2013.01)

(56) References Cited

U.S. PATENT DOCUMENTS

| | | | |
|---|---|---|---|
| 4,675,730 A | 6/1987 | Adomaitis et al. | |
| 4,678,920 A | 7/1987 | Iadipaolo et al. | |
| 5,087,822 A | 2/1992 | Fairlie et al. | |
| 5,090,804 A | 2/1992 | Wong et al. | |
| 5,216,481 A | 6/1993 | Minato | |
| 5,408,104 A | 4/1995 | Gorria et al. | |
| 5,642,198 A | 6/1997 | Long | |
| 5,726,705 A | 3/1998 | Imanishi et al. | |
| 5,734,742 A | 3/1998 | Asaeda et al. | |
| 5,844,801 A | 12/1998 | Kodama et al. | |
| 5,926,268 A | 7/1999 | Bonewitz et al. | |
| 6,239,436 B1 | 5/2001 | Parker et al. | |
| 6,266,138 B1 | 7/2001 | Keshavmurthy | |
| 6,278,517 B1 | 8/2001 | Willing | |
| 6,320,654 B1 | 11/2001 | Alders et al. | |
| 6,359,686 B1 | 3/2002 | Ariglio et al. | |
| 6,398,870 B1 | 6/2002 | Kaya et al. | |
| 6,462,813 B1 | 10/2002 | Haven et al. | |
| 6,496,219 B1 | 12/2002 | Porret et al. | |
| 6,509,964 B2 | 1/2003 | Wiles et al. | |
| 6,532,006 B1 | 3/2003 | Takekawa et al. | |
| 6,532,066 B1 | 3/2003 | Filev et al. | |
| 6,661,911 B1 | 12/2003 | Ishikura et al. | |
| 6,714,831 B2 | 3/2004 | Matthews et al. | |
| 6,804,386 B1 | 10/2004 | Nakayama et al. | |
| 7,019,826 B2 | 3/2006 | Vook et al. | |
| 7,020,781 B2 | 3/2006 | Peters et al. | |
| 7,105,848 B2 | 9/2006 | Guha et al. | |
| 7,171,037 B2 | 1/2007 | Mahon et al. | |
| 7,206,442 B1 | 4/2007 | Herod et al. | |
| 7,420,671 B2 | 9/2008 | Sonda | |
| 7,796,248 B2 | 9/2010 | Sonda | |
| 8,365,580 B2 | 2/2013 | Stumpf | |
| 8,922,641 B2 | 12/2014 | Bertin et al. | |
| 9,116,071 B2 | 8/2015 | Hatcher, Jr. et al. | |
| 9,438,864 B2 | 9/2016 | Swinford | |
| 9,709,463 B2 | 7/2017 | DeAscanis et al. | |
| 9,747,680 B2 | 8/2017 | Tai et al. | |
| 9,874,516 B2 | 1/2018 | Mann et al. | |
| 9,964,401 B2 | 5/2018 | Deschenes et al. | |
| 9,970,887 B2 | 5/2018 | Matsumoto | |
| 10,007,981 B2 | 6/2018 | Gangitano et al. | |
| 10,036,712 B2 | 7/2018 | Kuai et al. | |
| 10,063,758 B2 | 8/2018 | Scheich | |
| 10,082,470 B2 | 9/2018 | Shortt et al. | |
| 10,176,588 B2 | 1/2019 | Trenholm et al. | |
| 10,261,028 B2 | 4/2019 | Cilip et al. | |
| 10,281,029 B2 | 5/2019 | Pfeifer | |
| 10,401,303 B1 | 9/2019 | Baran-Harper et al. | |
| 10,462,444 B2 | 10/2019 | Wolke et al. | |
| 10,482,347 B2 | 11/2019 | Uffenkamp et al. | |
| 10,508,994 B2 | 12/2019 | Ando | |
| 10,508,995 B2 | 12/2019 | Mayumi | |
| 10,511,827 B2 | 12/2019 | Peeters et al. | |
| 10,520,449 B2 | 12/2019 | Piana | |
| 10,556,261 B2 | 2/2020 | Winchip et al. | |
| 10,560,634 B2 | 2/2020 | Ando | |
| 10,591,285 B2 | 3/2020 | Ando | |
| 10,596,754 B2 | 3/2020 | Williams et al. | |
| 10,666,927 B2 | 5/2020 | Bendall | |
| 10,934,023 B2 | 3/2021 | Li | |
| 2002/0024659 A1 | 2/2002 | Tanaka | |
| 2002/0101583 A1 | 8/2002 | Ariga | |
| 2002/0109112 A1 | 8/2002 | Guha et al. | |
| 2002/0110269 A1 | 8/2002 | Floeder et al. | |
| 2002/0118873 A1* | 8/2002 | Tran | G06T 7/44 382/143 |
| 2002/0141632 A1 | 10/2002 | Engelbart et al. | |
| 2003/0139836 A1 | 7/2003 | Matthews et al. | |
| 2006/0226380 A1 | 10/2006 | Koike et al. | |
| 2007/0115464 A1 | 5/2007 | Harding et al. | |
| 2008/0164316 A1 | 7/2008 | Patel et al. | |
| 2008/0310701 A1 | 12/2008 | Caroli et al. | |
| 2009/0245616 A1* | 10/2009 | De La Ballina | A21C 9/08 382/141 |
| 2010/0128965 A1 | 5/2010 | Blair | |
| 2010/0182433 A1 | 7/2010 | Shimbo et al. | |
| 2011/0052082 A1 | 3/2011 | Parkov et al. | |
| 2011/0228052 A1 | 9/2011 | Ohnishi et al. | |
| 2012/0131766 A1 | 5/2012 | van Glabbeek et al. | |
| 2012/0262566 A1 | 10/2012 | Grzegorczyk et al. | |
| 2012/0327217 A1 | 12/2012 | Anayama et al. | |
| 2013/0057678 A1 | 3/2013 | Prior Carrillo et al. | |
| 2013/0215239 A1* | 8/2013 | Wang | G06T 7/579 348/E13.074 |
| 2013/0343632 A1 | 12/2013 | Urano et al. | |
| 2014/0021260 A1 | 1/2014 | Cherry et al. | |
| 2014/0055604 A1 | 2/2014 | Delaney | |
| 2014/0193065 A1 | 7/2014 | Chu et al. | |
| 2014/0210997 A1 | 7/2014 | Blanchard et al. | |
| 2014/0341462 A1 | 11/2014 | Sezginer et al. | |
| 2014/0347446 A1 | 11/2014 | Frandsen, Jr. et al. | |
| 2015/0071523 A1 | 3/2015 | Herrmann et al. | |
| 2015/0116543 A1 | 4/2015 | Mitarai | |
| 2016/0110858 A1 | 4/2016 | Liu et al. | |
| 2016/0267647 A1 | 9/2016 | Higo | |
| 2017/0277979 A1 | 9/2017 | Allen et al. | |
| 2017/0346996 A1 | 11/2017 | Kida | |
| 2018/0281311 A1 | 10/2018 | Herrmann et al. | |
| 2018/0322623 A1 | 11/2018 | Memo et al. | |
| 2018/0326591 A1 | 11/2018 | Hausler | |

FOREIGN PATENT DOCUMENTS

| | | | | |
|---|---|---|---|---|
| DE | 102017114081 A1 * | 12/2018 | ......... | G01N 21/9036 |
| EP | 0983853 A1 | 3/2000 | | |
| EP | 0997201 B1 | 12/2005 | | |
| GB | 2282444 B | 6/1997 | | |
| JP | 59-90035 A | 5/1984 | | |
| JP | 61-149814 A | 7/1986 | | |
| JP | 7-209199 A | 8/1995 | | |
| JP | 4583514 B2 | 11/2010 | | |
| WO | 2008125702 A1 | 10/2008 | | |
| WO | 2011144964 A1 | 11/2011 | | |
| WO | 2020044178 A1 | 3/2020 | | |

OTHER PUBLICATIONS

Nirbhar Neogi et al—Review Of Vision-Based Steel Surface Inspection Systems—Article—Journal Of Image And Video Processing 2014, 2014:50 (http://jivp.eurasipjournals.com/contenU2014/1/50)—published in the Eurasip Journal On Image And Video Processing in 2014.

(56) References Cited

OTHER PUBLICATIONS

Muehlemann—Standardizing Defect Detection For The Surface Inspection Of Large Web Steel—Article published by Illumination Technologies in 2000.
Leopoldo Armesto et al , Inspection System Based On Artificial Vision For Paint Defects On Car Bodies, IEEE International Conference On Robotics And Automation (ICRA), May of 2011, and found on www.ieeexplore.ieee.org.
Leopoldo Armesto, Quality Control Of Car-Bodies Based On Artificial Vision, European Automotive Congress, Jun. 2011.
Icemi S.L., Training Manual—Automated Inspection System (AIS) Dirt In Paint (DIP)—Training Manual—May 2013 and given to and used by Ford Motor Company, for example, in the Ford Kentucky Plant.
Andreas Hahn et al, Defect Classification On Specular Surfaces Using Wavelets, Article, 2013, Springer-Verlag Berlin, Heidelberg, 2013.
Tan-Toan Le, Mathias Ziebarth, Thomas Greiner, Michael Heizmann, Inspecton of Specular Surfaces Using Optimized M-Channel Wavelets, Article, International Conference on Acoustics, Speech, and Signal Processing, May 26-31, 2013 ICASSP 2013.
Soren Kammel and Fernando Puente Leon, Deflectometric Measurement of Specular Surfaces, 2008, Article, IEEE Transactions on Instrumentation and Measurement, vol. 57, No. 4. Apr. 2008.
Th. Laengle, D. Paul, M. Hartrumpf, and G. Struck, Image Fusion for Automatic Inspection of Moving Surfaces, Article, 2006, IEEE International Conference on MUL Tisensor Fusion and Integration for Intelligent Systems, Sep. 3-6, Heidelberg, Germany 2006.
David H. Eberly—"3D Game Engine Design—A Practical Approach to Real-Time Computer Graphics" second edition—Book—Morgan Kaufmann Publishers—500 Sansome Street—Suite 400—San Francisco, California 94111. Section 3.4.3 Clipping, pp. 93-99 and Section 3.7.2 Clipping a Triangle Mesh, pp. 133-137.
Frank D. Luna—"Introduction To 3D Game Programming With DirectX &11", book, Mercury Learning And Information, LLC, 22841 Quicksilver Drive, Dulles, VA 20166, 2012—ISBN 978-1-9364202-2-3.—Library of Congress Control No. 20122931119. Section 21.3 Projective Texture Coordinates, pp. 669-673, and Chapter 10 Stenciling, pp. 371-397.
International Search Report and Written Opinion of the International Search Authority dated Sep. 30, 2021.

* cited by examiner

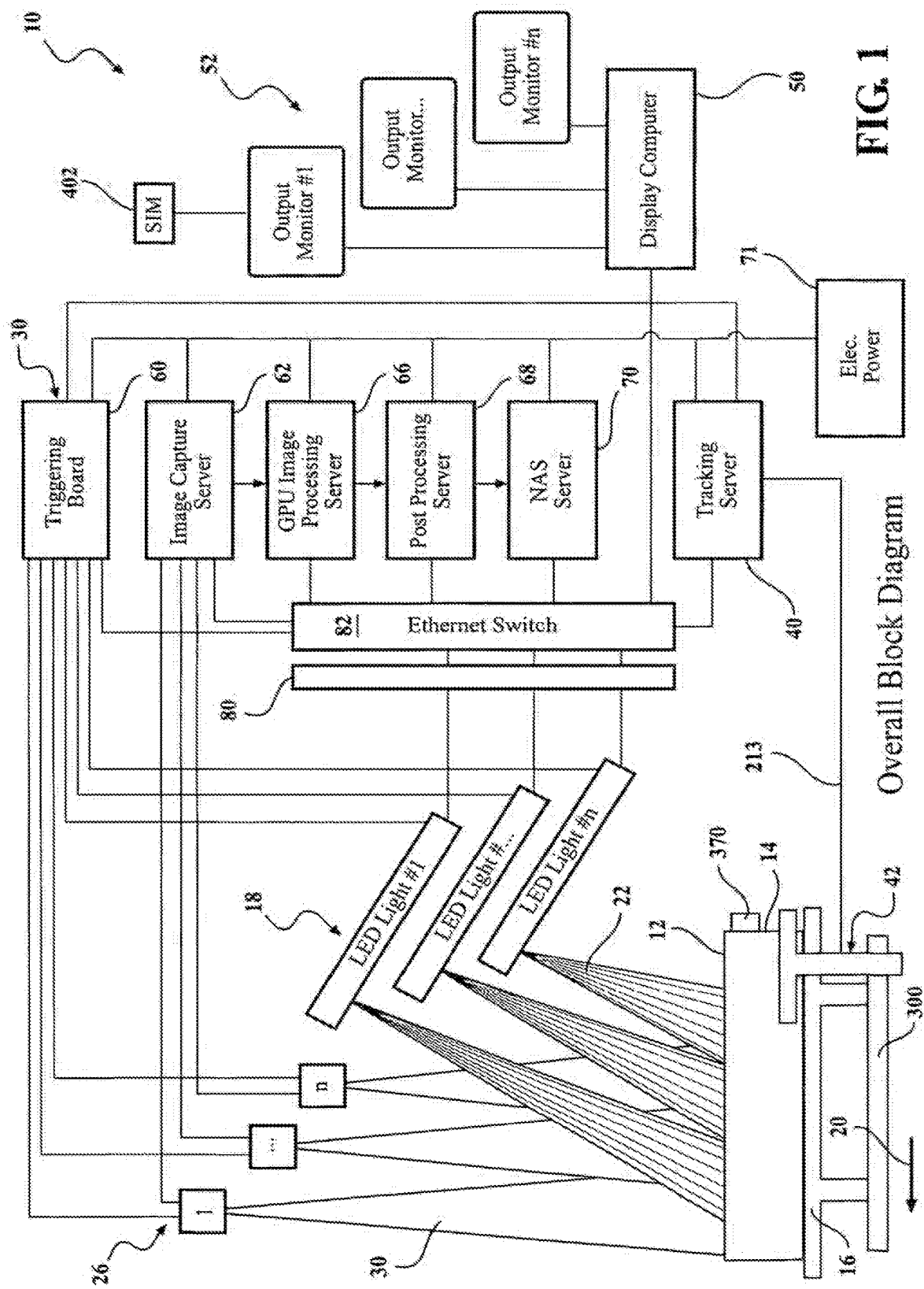

Dark Spot Defect Region of Interest

Dark Spot Defect in Spot Cluster A, Frame Id 470

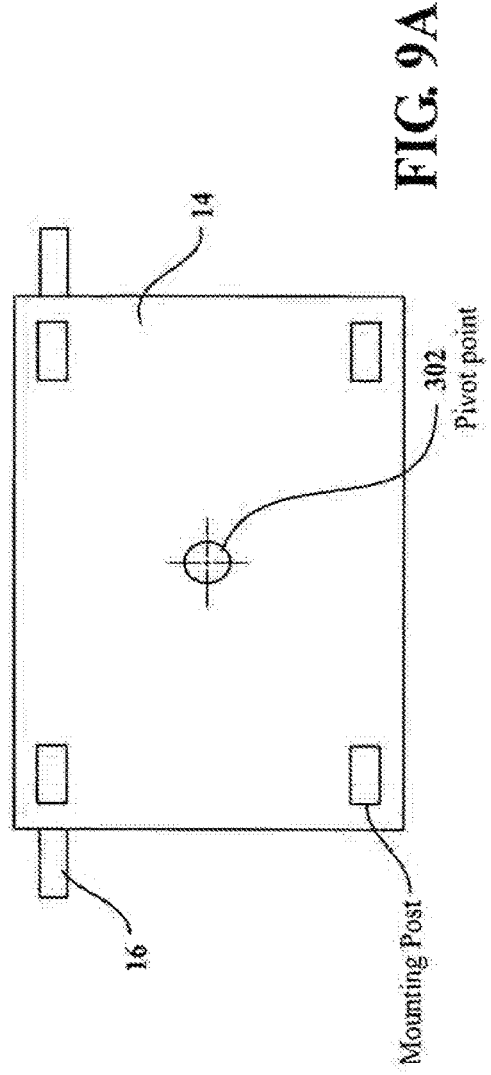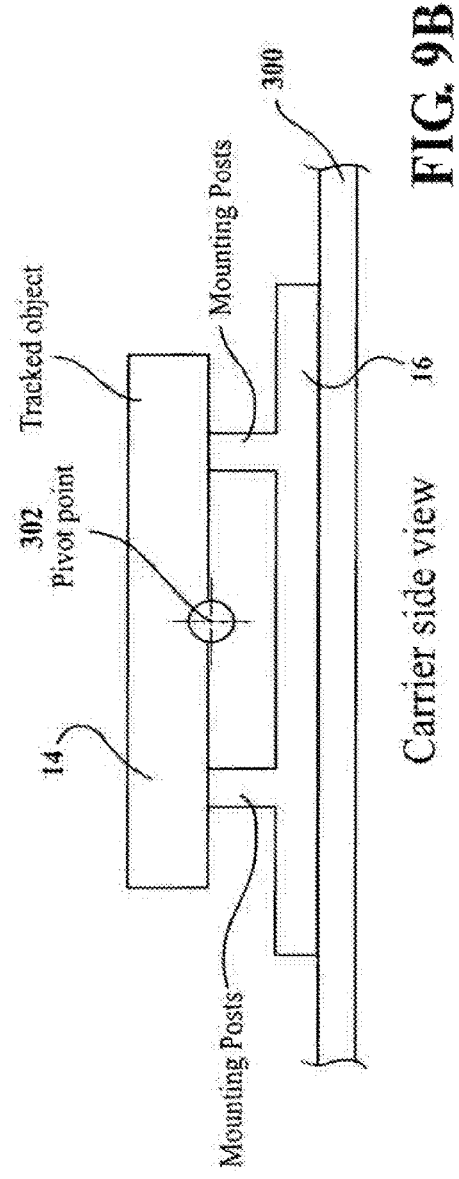

Jargon – Mesh, Surface, Vertex
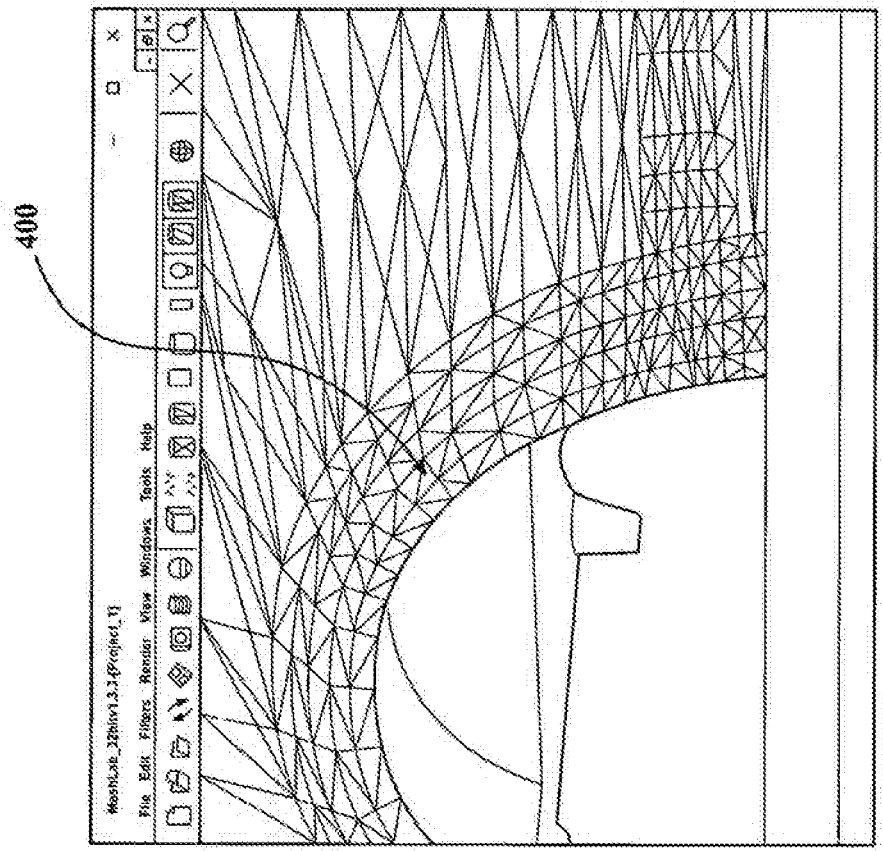
- 3D vehicle model is made from triangular surfaces
- Each surface has 3 vertexes
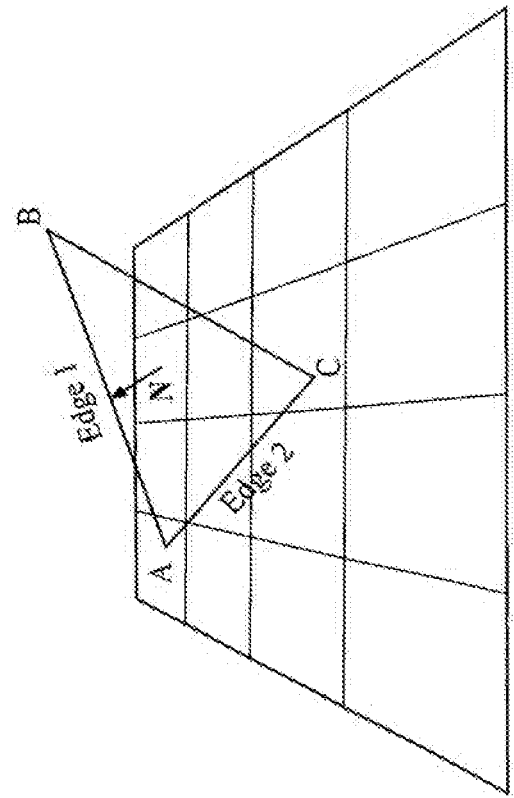
FIG. 15

Camera Calibration
- We can learn exact orientation in 3D space using calibration plate
- Camera matrix used to simulate camera
- http://docs.opencv.org
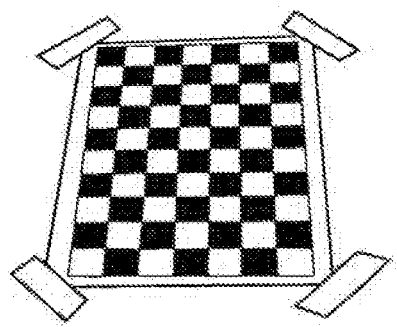
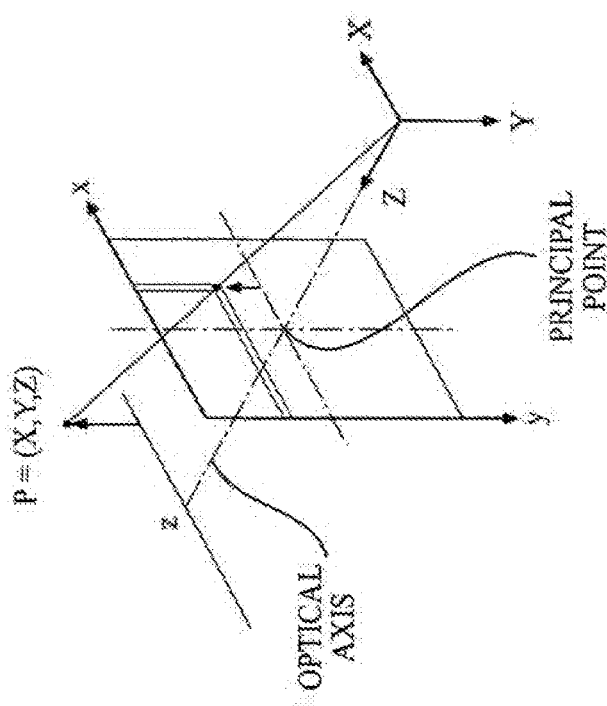
FIG. 16

Scratch Defect Regions Of Interest - 13060
Bright Spot regions of interest - 13061
Dark Spot Regions of interest - 13062

Defect Clusters

Defect Clusters

Zoomed in defect clusters

Light reflection bar

Camera Swaths and inspection swaths

Light source Options

Camera Regions Of Interest

1999

Example Region of Interest

- Important to minimize number of bits processed per camera snap
  - Reduce bandwidth of data from camera to computer
  - Reduce number of pixels processed
- Regions of interest limit pixels sent from camera to computer
  - Regions calculated by simulator for each camera frame index Example Haar Wavelet patters of defect region of interest correlated with not noise...

(a) bright spot defect region of interest, (b) bright spot defect region of interest historgram image (a) dark spot defect region of interest, (b) dark spot defect region of interest histogram image and (c) dark spot defect Haar wavelet 4 pixel approximation rotated so sum of two bottom pixels is minimum (c) Translate the centroid back to $C_B$ (b) Solve for rotation about origin.

(a) Translate centroids to origin.

| Width of Light | 1.2 cm | | |
|---|---|---|---|
| Camera Pixels X | 2464 pixels | | |
| Camera Pixels Y | 2056 pixels | | |
| Cycle Time | 40 seconds | | |
| Scan Time | 28 seconds | | |
| Car Length | 523 cm | | |
| Car Height | 193 cm | | |
| Car Width | 157 cm | | |
| Car Clearance | 10 cm | | |
| Defect Size | .7mm | | |
| Pixels Per Defect | 6 pixels | 1 mm | |
| Pixels Per Width Of Light | 102.8571429 | pixels per light beam width | |
| Camera Light Beam Percent | 0.050027793 | percent of pixels of camera covered by light | |
| Width of Pixel | 0.011666667 | cm | |
| Width of Camera View | 23.98666667 | cm | |
| Height of Camera View | 28.74666667 | cm | |
| Camera Overlap Factor Height | 0.8 | percent of camera not overlapping | |
| Camera Overlap Height | 22.99733333 | non overlapping camera height in cm | |
| Side Planes | 8.392277365 | used 100% | 1 | 8.392277365 |
| Hood Planes | 8.826878479 | used 30% | 0.3 | 2.648063544 |
| Roof Planes | 8.826878479 | used 30% | 0.3 | 2.648063544 |
| Back Planes | 4.413439239 | used 30% | 0.3 | 1.324031772 |
| Extra Cameras | 3 | | 1 | 3 |
| Pillar Cameras | 4.196138683 | used 60% | 0.6 | 2.51768321 |
| Total Camera planes | 37 | Effective camera | | 20 |
| Vehicle Motion per Second | 18.67857143 | cm/sec | | |

FIG. 57A

| | | |
|---|---|---|
| Camera Utilization Factor | 0.540540541 | |
| Camera Overlap Factor Width | 0.333 | percent of scan line not overlapping |
| Camera Overlap Width | 0.3996 | cm - non overlapping scan width |
| Frames Per Vehicle Length | 1308.808809 | frames |
| Frames Per Second Per Camera | 46.74317174 | frames/second |
| Frames Per Vehicle Length All | 26176.17618 | |
| Frames Per Second All | 934.8634349 | |
| Frames Percent Buffer | 0.25 | |
| Framer Percent Of Camera View | 0.300027793 | percent |
| Pixels Per Frame | 1519936 | pixels |
| Pixels Per Frame | 1.519936 | mega pixels |
| Pixels Per Second Per Camera | 71.04662949 | mega pixels/second |
| Pixels Per Second All | 1420.93259 | mega pixels/second |
| Total Pixels Scanned | 39786.11251 | mega pixels |
| Total Pixels Scanned | 39.78611251 | giga pixels |
| Processing Time Per Pixel | 1.00538E-09 | seconds |
| Processing Time Per Frame | 0.001528107 | seconds |
| Mask Filter Percent | 0.166743863 | |
| Pixels Per Frame Filtered | 0.25344 | mega pixels |
| Total Pixels Scanned Per Camera Filtered | 331.7045045 | mega pixels |
| Total Pixels Scanned Filtered | 6634.09009 | mega pixels |
| Total Pixels Scanned Filtered | 6.63409009 | giga pixels |
| Processing Time Per Masked Pixel | 6.02946E-09 | seconds/pixel |

| | | |
|---|---|---|
| Processing Time Per Masked Frame All | 0.001528107 | |
| Target Processing Time Per Frame | 15 | CPU* seconds/frame |
| Needed CPUs | 9816.066066 | |
| | | |
| Cost Per Camera Light | 300 | $ |
| Cost Per Camera Lens | 1000 | $ |
| Cost Per Camera Installation | 1000 | $ |
| Cost Per Camera Camera | 800 | $ |
| Cost Per Camera Fixtures | 500 | $ |
| Cost Per Camera | 3600 | $ |
| | | |
| Camera Costs | 133200 | $ |
| Servers | 25000 | $ |
| Total | 158200 | $ |
| | | |
| Shutter Speed | 0.00023 | s |
| Shutter Frequency | 4347.826087 | Hz |
| Width of Pixel | 0.000116667 | m |
| Maximum Pixel Smear Per Snap | 0.5 | pixels |
| Maximum Motion Per Snap | 5.83333E-05 | m |
| Maximum Velocity | 0.253623188 | m/s |
| Vehicle Velocity | 0.186785714 | m/s |
| Maximum vehicle lurch from top conveyor speed | 0.066837474 | m/s |
| Maximum lurch acceleration from top speed during snap | 290.5977136 | m/s^2 |
| Maximum lurch from zero | 0.253623188 | m/s |
| Maximum lurch acceleration from zero during snap | 1102.709515 | m/s^2 |
| Tracking Frequency Update | 93.48634349 | Hz |
| Tracking Period | 0.01069675 | s |
| Camera Frequency Update | 46.74317174 | Hz |
| Camera Period | 0.021393499 | s |

| | | |
|---|---|---|
| X Motion Between Camera Snaps | 0.004 | m |
| Motion velocity | 0.186972687 | m/s |
| Line velocity | 0.186785714 | m/s |
| Allowable error in X Motion | 0.0014 | m |
| Maximum Lurch Velocity | 0.06544044 | m/s |
| Maximum Velocity | 0.252226155 | m/s |
| Maximum Lurch Acceleration | 3.058893746 | m/s^2 |
| Drop Dead Tracking Error | 0.008 | m |
| Drop Dead Lurch Velocity | 0.373945374 | m/s |
| Drop Dead Lurch Acceleration | 17.47939284 | m/s^2 |
| Vertical Scan Numbers | | |
| Light Bar Width | 1.2 | cm |
| Camera Frame Width | 23.98666667 | cm |
| Overlap Factor | 3 | |
| Number of Frames Per Camera Width | 59.96666667 | Frames |
| Line Velocity | 0.186785714 | m/s |
| Vehicle X Travel per Cmaera Frame | 5 | cm |
| Vehicle Travel Seconds for Camera Frame | 0.267686424 | seconds |
| Frames per Second | 224.0183333 | fps |
| Camera ROI Width Percent | 0.3 | |
| Bytes per Frame | 1519795.2 | Bytes |
| Bytes per Frame | 1.5197952 | MB |
| Bytes per Scan | 91137052.16 | Bytes |
| Bytes per Scan | 91.13705216 | MB |

FIG. 57D

| | | | | |
|---|---|---|---|---|
| Width of Light | 1.2 | cm | | |
| Camera Pixels X | 2464 | Pixels | | |
| Camera Pixels Y | 2056 | Pixels | | |
| Cycle Time | 40 | seconds | | |
| Scan Time | =B6*0.7 | seconds | | |
| Car Length | 523 | cm | | |
| Car Height | 193 | cm | | |
| Car Width | 157 | cm | | |
| Car Clearance | 10 | cm | | |
| Defect Size | 0.7 | mm | 1mm | |
| Pixels Per Defect | 6 | Pixels | | |
| Pixles Per Width Of Light | =B13*B2*10/B12 | pixels per light beam width | | |
| Camera Light Beam Percent | =B16/B5 | percent of pixels of camera covered | | |
| Width of Pixel | =B2/B16 | cm | | |
| Width of Camera View | =B18*B5 | cm | | |
| Height of Camera View | =B4*B18 | cm | | |
| Camera Overlap Factor Height | 0.8 | percent of camera not overlapping | | |
| Camera Overlap Height | =B22*B20 | non overlapping camera height in cm | | |
| Side Planes | =(B9*0.5/B23)*2 | used 100% | 1 | =D24*B24 |
| Hood Planes | =B10/B23+2 | used 30% | 0.3 | =D25*B25 |
| Roof Planes | =B25 | used 30% | 0.3 | =D26*B26 |
| Back Planes | =B25*0.5 | used 30% | 0.3 | =D27*B27 |
| Extra Cameras | 3 | | 1 | =D28*B28 |
| Pillar Cameras | =B24*0.5 | used 60% | 0.6 | =D29*B29 |
| Total Camera planes | =INT(SUM(B24:B29)) | Effective camera | | INT(SUM(E24:E29)) |

FIG. 58A

| | | |
|---|---|---|
| Vehicle Motion per Second | =B8/B7 | cm/sec |
| Camera Utilization Factor | =E30/B30 | |
| Camera Overlap Factor Width | 0.333 | percent of scan line not overlapping |
| Camera Overlap Width | =B36*B2 | cm - non overlapping scan width |
| Frames Per Vehicle Length | B8/B37 | frames |
| Frames Per Second Per Camera | =B39/B7 | frames/second |
| Frames Per Vehicle Length All | =B39*E30 | |
| Frames Per Second All | =B40*E30 | |
| Frames Percent Buffer | 0.25 | |
| Framer Percent Of Camera View | =B45+B17 | percent |
| Pixels Per Frame | =B4*B5*B46 | pixels |
| Pixels Per Frame | =B47/1000000 | mega pixels |
| Pixels Per Second Per Camera | =B48*B40 | mega pixels/second |
| Pixels Per Second All | =B48*B43 | mega pixels/second |
| Total Pixels Scanned | =B48*E30*B39 | mega pixels |
| Total Pixels Scanned | =B53/1000 | giga pixels |
| Processing Time Per Pixel | =B6/(B53*1000000) | seconds |
| Processing Time Per Frame | =B56*B47 | seconds |
| Mask Filter Percent | =B17/B46 | |
| Pixels Per Frame Filtered | =B48*B59 | mega pixels |
| Total Pixels Scanned Per Camera Filtered | =B61*B39 | mega pixels |

FIG. 58B

| | | |
|---|---|---|
| Total Pixels Scanned Filtered | =B53*B59 | mega pixels |
| Total Pixels Scanned Filtered | =B54*B59 | giga pixels |
| Processing Time Per Masked Pixel | =B6/(B63*1000000) | seconds/pixel |
| Processing Time Per Masked Frame All | =B66*B61*1000000 | |
| Target Processing Time Per Frame | 15 | CPU* seconds/frame |
| Needed CPUs | =B68/B67 | |
| | | |
| Cost Per Camera Light | 300 | $ |
| Cost Per Camera Lens | 1000 | $ |
| Cost Per Camera Installation | 1000 | $ |
| Cost Per Camera Camera | 800 | $ |
| Cost Per Camera Fixtures | 500 | $ |
| Cost Per Camera | =SUM(B71:B75) | $ |
| | | |
| Camera Costs | =B76*B30 | $ |
| Servers | 25000 | $ |
| Total | =SUM(B78:B79) | $ |
| | | |
| Shutter Speed | 0.00023 | s |
| Shutter Frequency | =1/B82 | Hz |
| Width of Pixel | =B18/100 | m |
| Maximum Pixel Smear Per Snap | 0.5 | pixels |
| Maximum Motion Per Snap | =B84*B85 | m |
| Maximum Velocity | =B86/B82 | m/s |
| Vehicle Velocity | =B32/100 | m/s |
| Maximum vehicle lurch from top conveyor speed | =B87-B88 | m/s |
| Maximum lurch acceleration from top speed during snap | =B89/B82 | m/s^2 |
| Maximum lurch from zereo | B87 | m/s |

FIG. 58C

| | | |
|---|---|---|
| Maximum lurch acceleration from zero druing snap | B91/B82 | m/s^2 |
| Tracking Frequency Update | =B98*2 | Hz |
| Tracking Period | =1/B95 | s |
| Camera Frequency Update | =B40 | Hz |
| Camera Period | =1/B98 | s |
| X Motion Between Camera Snaps | =B2/100/3 | m |
| X Motion velocity | =B100/B99 | m/s |
| Line velocity | =B32/100 | m/s |
| Allowable error in X Motion | =B100*3*0.45-B100 | m |
| Maximum Lurch Velocity | =B103/B99 | m/s |
| Maximum Velocity | =B104+B102 | m/s |
| Maximum Lurch Acceleration | =B104/(B99) | m/s^2 |
| Drop Dead Tracking Error | B100*2 | m |
| Drop Dead Lurch Velocity | =B107/B99 | m/s |
| Drop Dead Lurch Acceleration | =B108/(B99) | m/s^2 |
| Vertical Scan Numbers | | |
| Light Bar Width | =B2 | cm |
| Camera Frame Width | =B19 | cm |
| Overlap Factor | 3 | |
| Number of Frames Per Camera Width | =B113/B112*B114 | Frames |
| Line Velocity | =B102 | m/s |
| Vehicle X Travel per Cmaera Frame | 5 | cm |
| Vehicle Travel Seconds for Camera Frame | =1/B116*B117/100 | seconds |
| Frames per Second | =B115/B118 | fps |
| Camera ROI Width Percent | 0.3 | |
| Bytes per Frame | =B120*B4*B5 | Bytes |
| Bytes per Frame | =B121/1000000 | MB |
| Bytes per Scan | =B121*B115 | Bytes |
| Bytes per Scan | =B123/1000000 | MB |

FIG. 58D original_image light_field_image dilated_bright_field_image

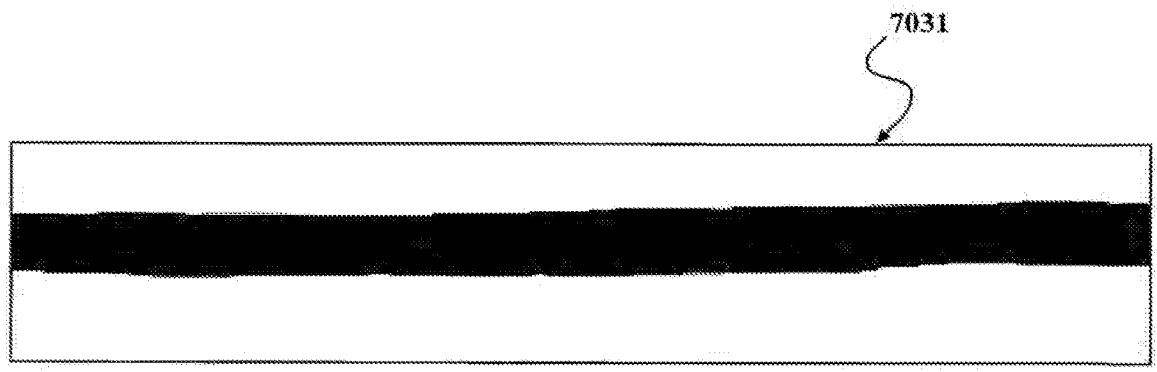
FIG. 62　　eroded_bright_field_image
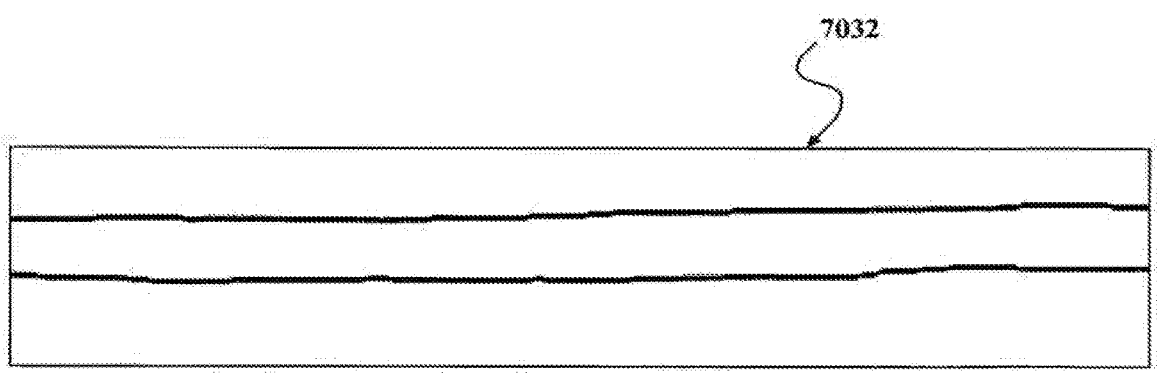
FIG. 63　　small_edge_mask_image
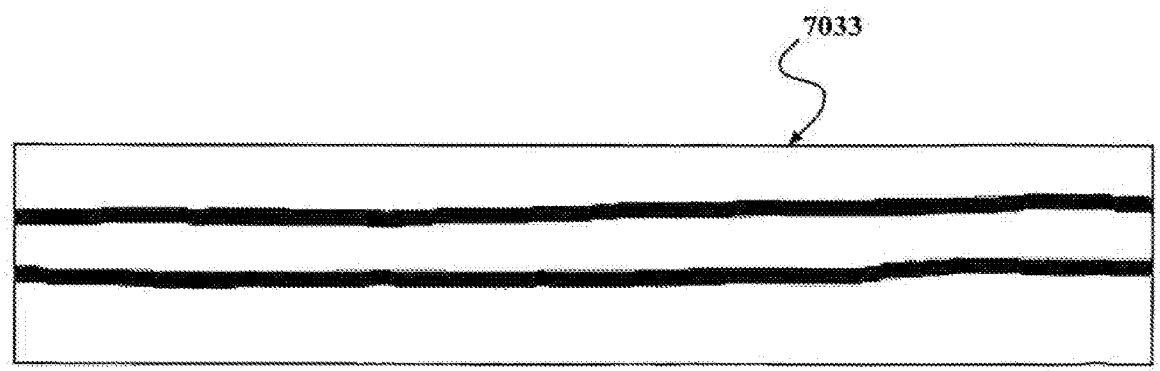
FIG. 64　　final_edge_mask_image

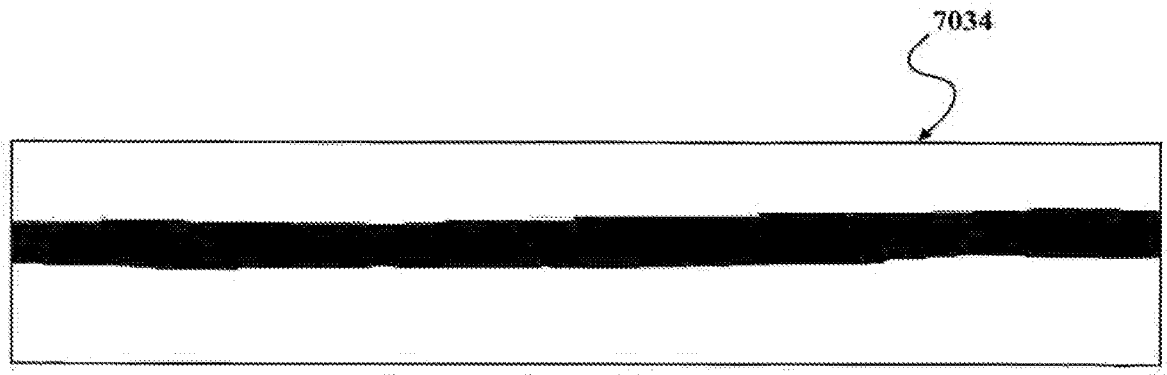
FIG. 65    bright_mask_image
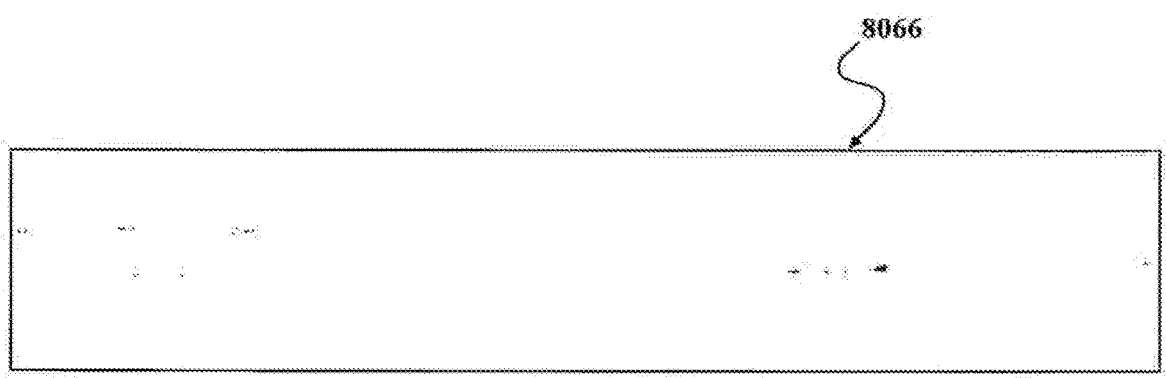
FIG. 66    holes_image
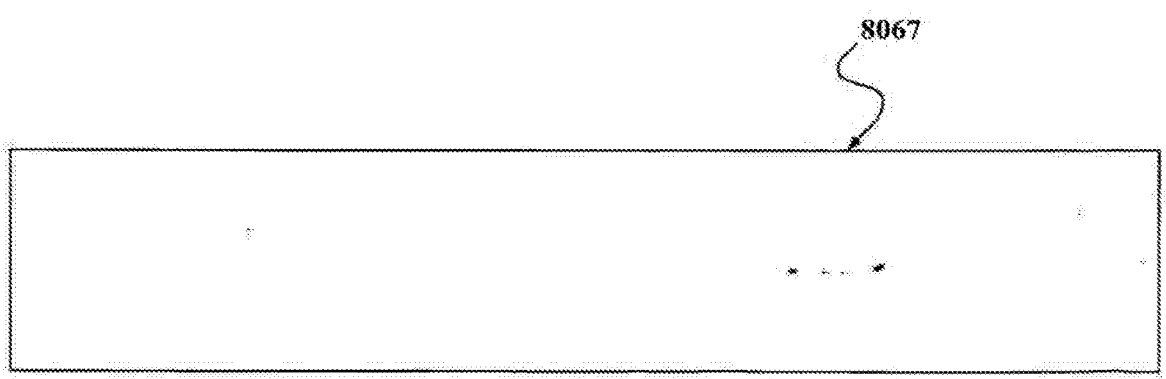
FIG. 67    holes_eroded_dilated_image

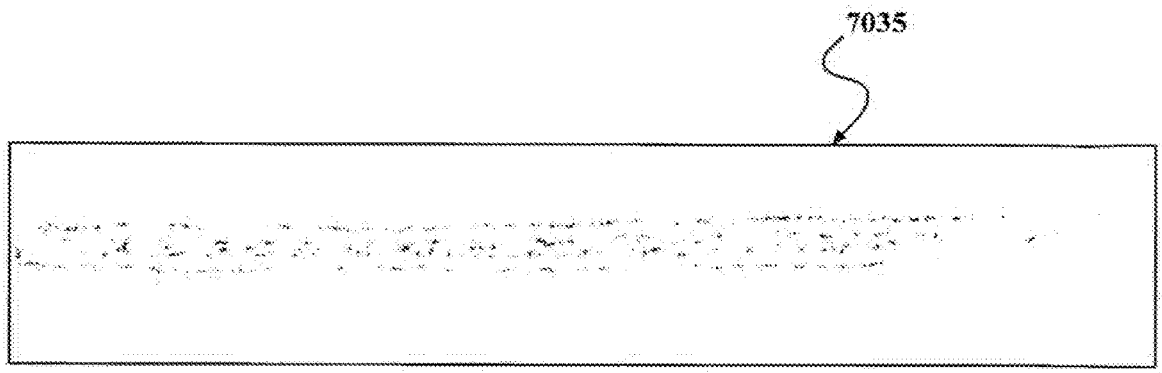
FIG. 68  edge_distance_bright_field_image
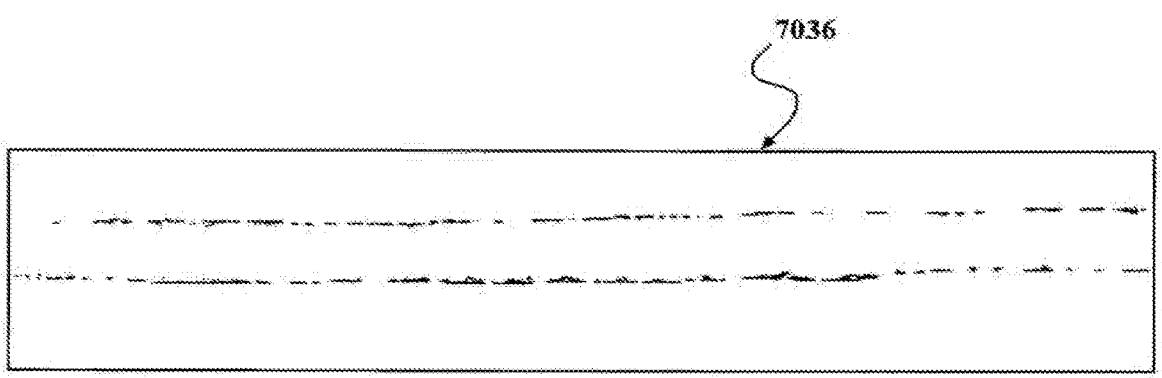
FIG. 69  regional_difference_image
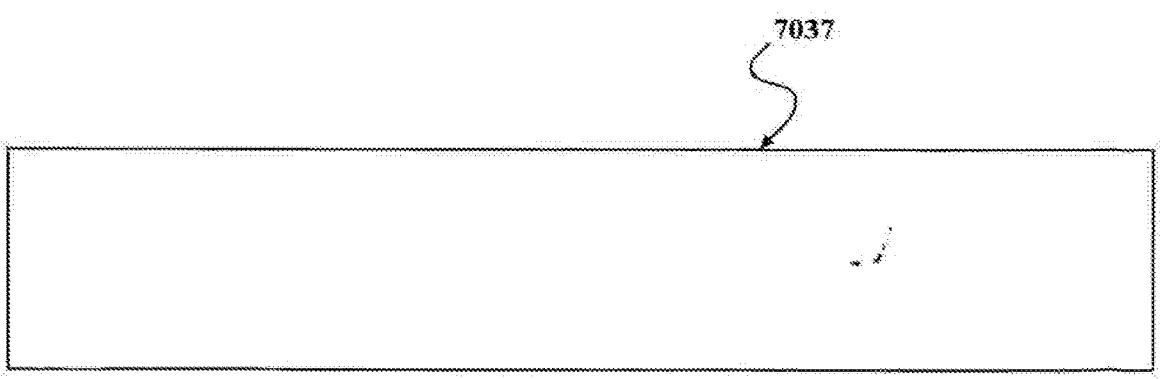
FIG. 70  dark_holes_image

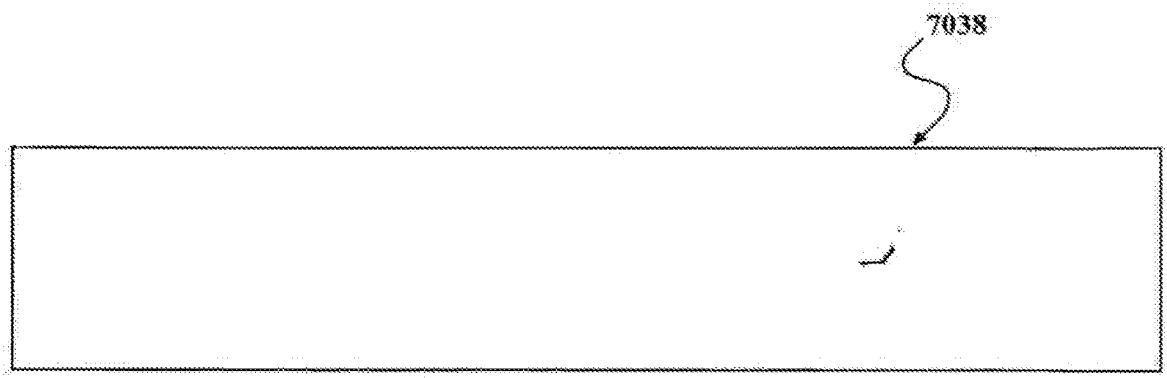
FIG. 71  dark_holes_eroded_dilated_image
FIG. 72  inverse_bright_field_image
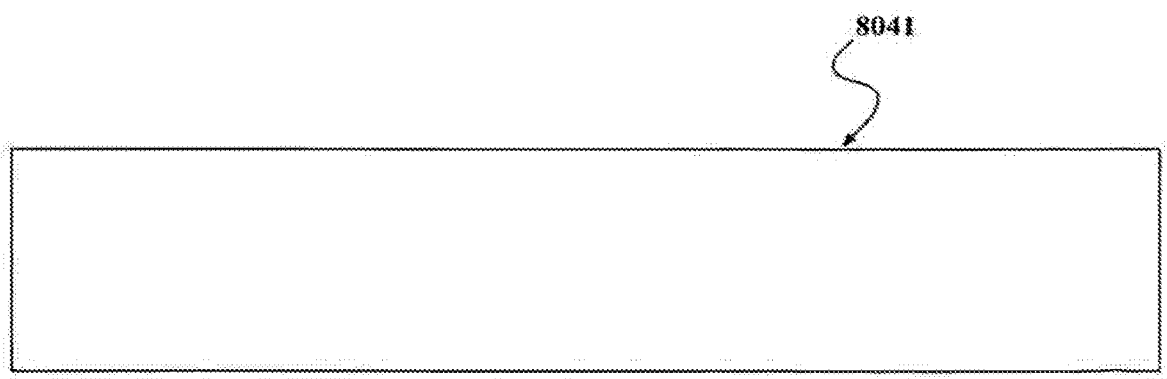
FIG. 73  dark_field_image

FIG. 74  binary_dark_field_image
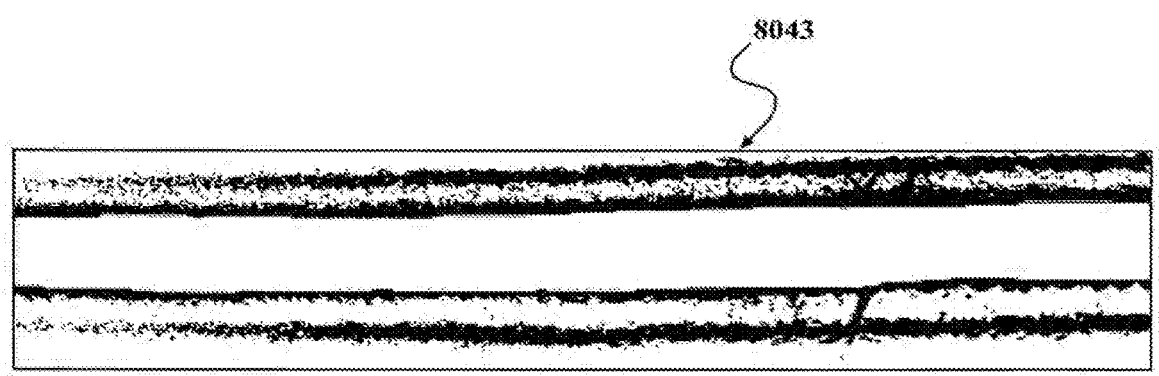
FIG. 75  dilate_eroded_binary_image
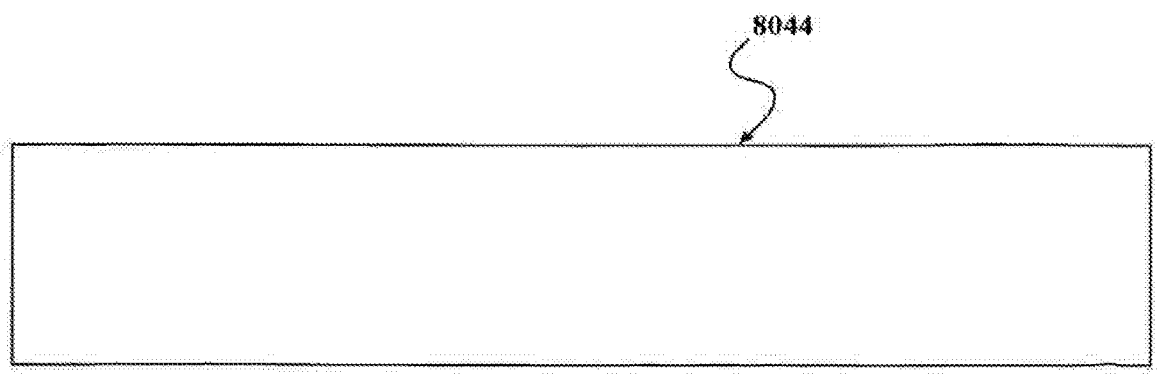
FIG. 76  original_dilated_eroded_binary_image

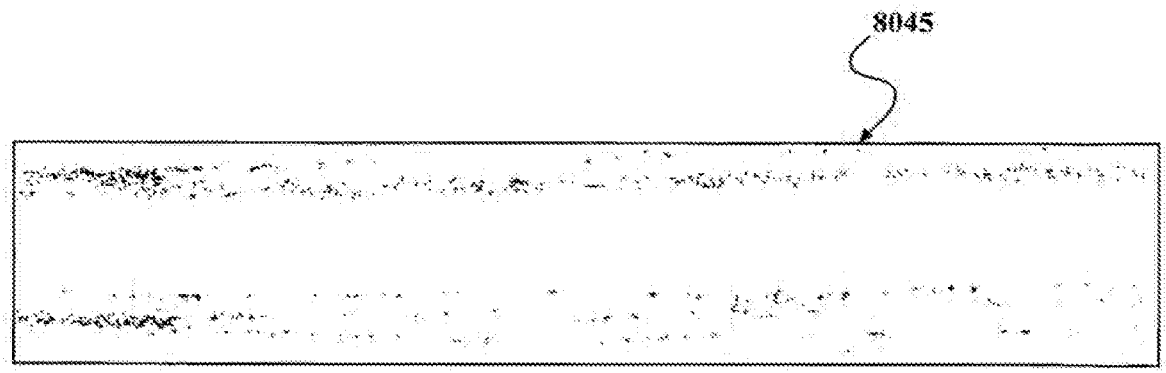
FIG. 77 bright_spots_image
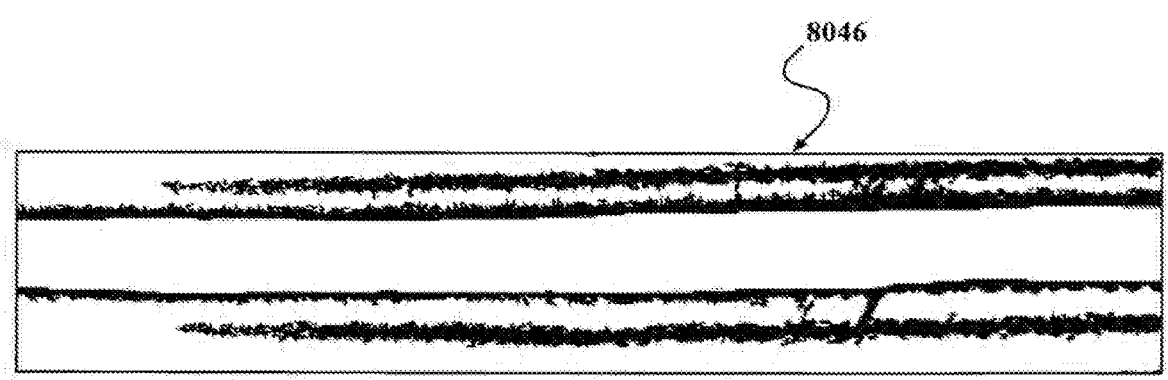
FIG. 78 dark_edge_region_image
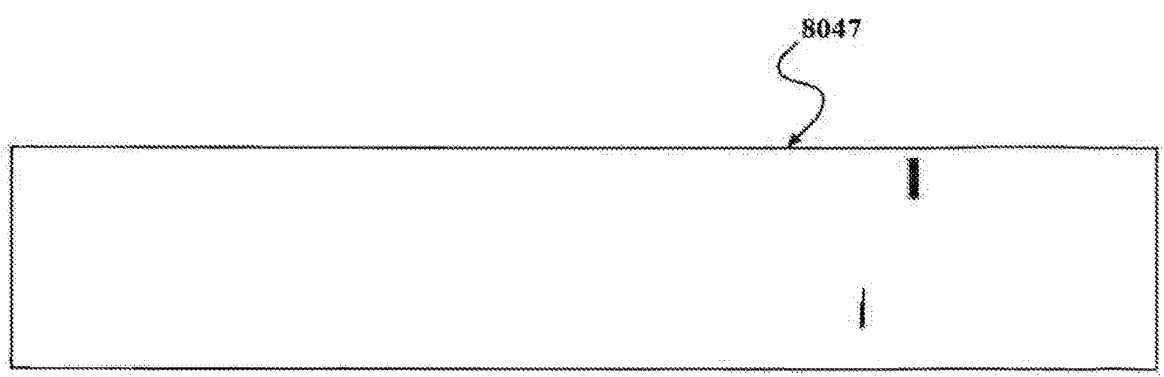
FIG. 79 dark_edge_region_eroded_image

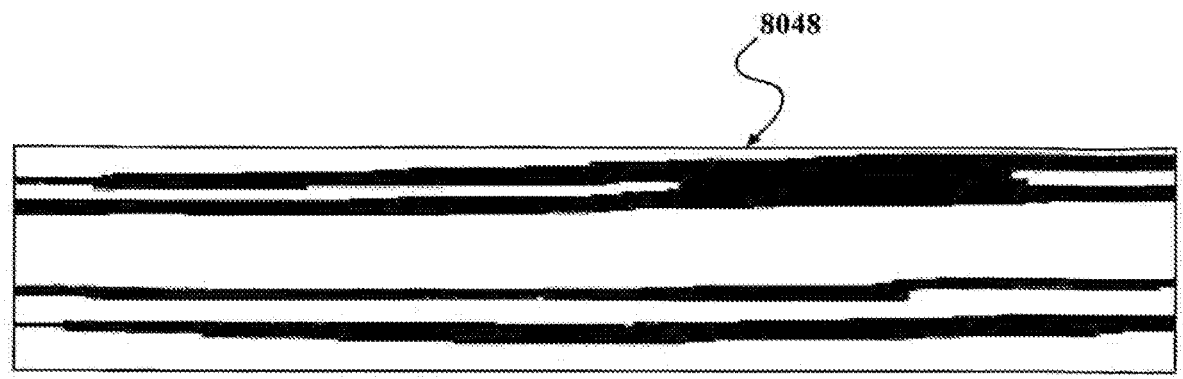
FIG. 80  rough_edge_binary_image
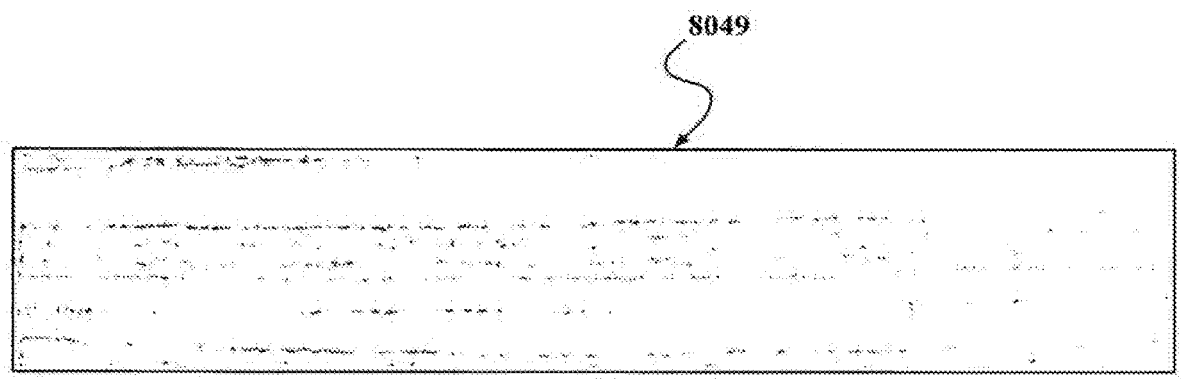
FIG. 81  edge_distance_dark_field_image
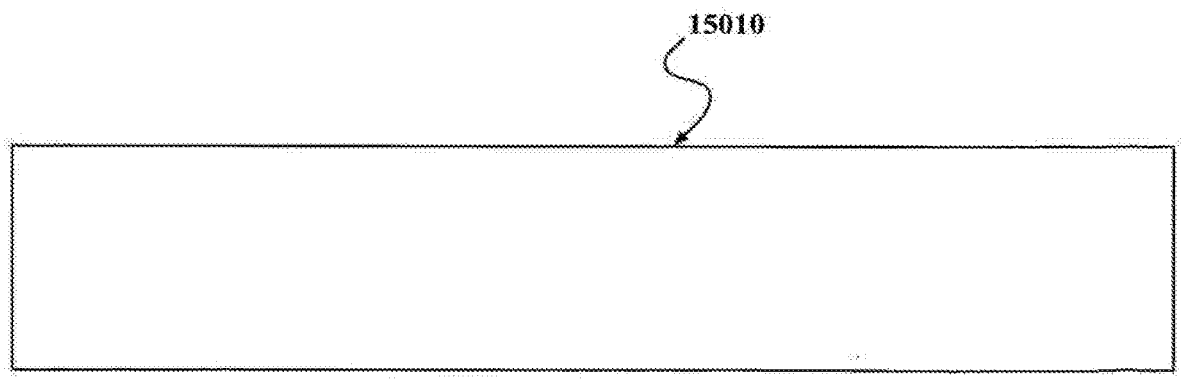
FIG. 82  bright_spots

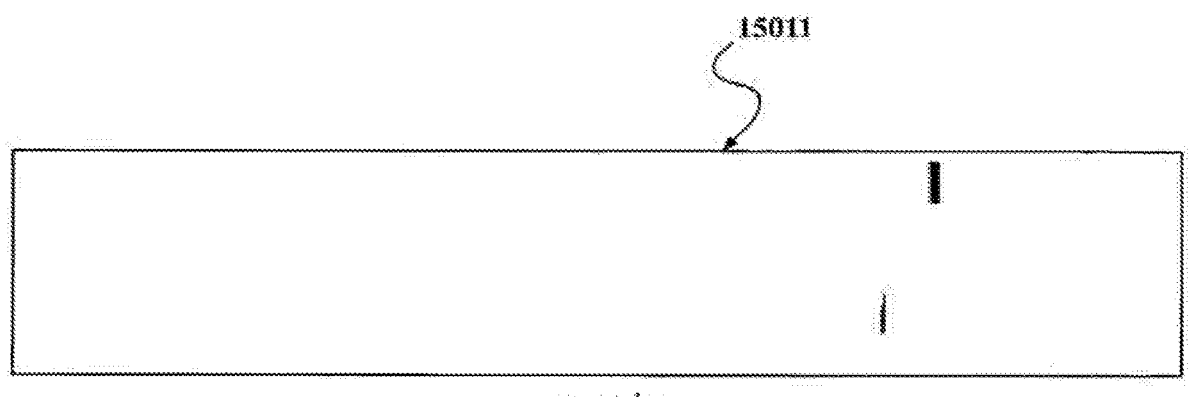
FIG. 83    scratches light_bar_image showing mild orange peel on edges outer_edge_image inner_edge_image dual_edge_image dual_edges_eroded_image top_edge_image light_bar_image having very little orange peel on edges dual_edges_eroded for 115

| Normalization Parameters | | | |
|---|---|---|---|
| | LowLevel | 10 | Targeted Low Light Intensity Level for darkfield |
| | HighLevel | 230 | Targeted High Light Itensity for light bar |
| | LightThresholdPercentage | 0.4 | Take the difference between High level and Low Level.., any pixel with a value below LowLevel + (HighLevel -LowLevel) * LightThreshold Percentage is considered dark field while finding solid light bar |
| | LevelLightBrightPercentile | 0.97 | |
| | LevelLightDarkThreshold | 60 | |
| | RemoveDarkBackgroundNoiseEdge | 13 | |
| | RemoveDarkBackgroundNoiseEdgePixels | | |
| | PixelsPerSection | 200 | Not Used |
| | MinimumPixelWidth | 200 | When Normalizing a Region, this is the width of a region in pixels |
| | MinimumBrightMassLength | 45 | To be considered part of the bright field, the length of the light bar must be at least this length in the vertical direction |
| | BrightfieldScanColumns | 5 | Number of equal distance scans vertically through the image in atempt to find lightbar |
| Dark Spot Signal Filtering | | | |
| | EdgeFilterHaarIterations | | Only Used for Haar Edge filter |
| | EdgeMovingAverageWindow | 50 | Window length to use for moving average filter on top and bottom edge |
| | EdgeDiscontinuityMargin | 50 | No edge filter is applied to pixels within this distance from the left or right edge of the image |
| | EdgeDiscontinuityThreshold | 20 | Whenever the edge has a change in value greater than this amount, then the edge filter will be applied to pixels on the either side of the discontinuity |

FIG. 130A

| Regional Thresholding | | | |
|---|---|---|---|
| | CenterImagePercentage | 0.5 | The regional threshold values will be calculated using a region mask. The region mask for calculating the threshold is going to use this percentage of pixels at the center of the light bar |
| Dark Spot Edge Region | | | |
| | EdgeLengthBlur | 5 | When measuring the length of the edge in the otsu image, this is the number of pixels that can be zero between non-zero pixels, after this number of zeroed out pixels, the edge is reached |
| | EdgeLengthMovingAverageWindow | 18 | Window length for moving average filter of the edge length |
| | OutOfEdgeThreshold | 19 | Region is considered part of edge until pixels are regularly less than this threshold (regularly means for a span with length of EdgeMaximumGap) |
| | EdgeDerivativeThresholdParameter | 50 | If an edge region transitions rapidly by more than this amount in intensity when moving in towards the light bar then edge region is stopped because this transition probably indicates a defect is present |
| | EdgeMaskMaximumGap | 20 | If a vertical length of pixels is below the OutOfEdgeThreshold for this many pixels then the edge mask will be stopped in this column |
| | HorizontalEdgeMaskLength | 20 | Mask so that no defects can be found within this many pixels of a horizontal left or right edge of the bright field |
| Dark Spot | | | |
| | DarkSpotThreshold | 20 | Spot must be more than this number of pixels higher than regional average to be considered a defect |

FIG. 130B

| | | | |
|---|---|---|---|
| | DarkSpotDilatePixels | 15 | |
| | DarkSpotErodePixels | 16 | |
| | DarkSpotMinimumMass | 0 | |
| | DarkSpotMaximumMass | 600 | |
| Bright Spot | | | |
| | percentileBlurRadius | 6 | impacts coverage of blurred edges |
| | percentileBlurSigma | 2 | impacts coverage of blurred edges |
| | darkFieldEdgeBlurGap | 6 | number of pixels below the threshold until out of edge region |
| | darkFieldPercentileThreshold | 5 | threshold for above blur gap |
| | finalBrightSpotPercentileThreshold | 0.85 | pixel must be above this percentile |
| | lineSearchDilatePixelsHorizontal | 10 | heavy removal of lines |
| | brightRegionMinimumSpotSize | 5 | Required pixels in bright region |
| | brighRegionMaximumSpotSize | 200 | maximum pixels in bright region |

FIG. 130C

OBJECT INSPECTION SYSTEM AND METHOD FOR INSPECTING AN OBJECT

CROSS REFERENCE TO RELATED APPLICATIONS

This application is a continuation of U.S. patent application Ser. No. 16/866,110, which was filed on May 4, 2020, which in turn is a continuation of U.S. patent application Ser. No. 15/932,865, which was filed on May 9, 2018, which in turn claims the benefit of U.S. Provisional Application Ser. No. 62/504,534, which was filed on May 11, 2017, U.S. Provisional Application Ser. No. 62/504,538, which was filed on May 11, 2017, and U.S. Provisional Application Ser. No. 62/511,404, which was filed on May 26, 2017. The entire disclosures of the above applications are incorporated herein by reference.

FIELD

The present invention generally relates to an object inspection system and to a method for inspecting an object and, more particularly, to an object inspection system and method which reliably detects the presence of defects or unwanted features upon the surface of an object.

BACKGROUND

Historically, manufactured objects were typically visually inspected by personnel in order to detect flaws, imperfections, or unwanted features on their respective surfaces. These inspections were important to the manufacturer of such objects in order to increase the probability of producing aesthetically pleasing objects to consumers thereby gaining a reputation as a "high quality" producer and reducing subsequent repair or replacement costs.

While these visual inspections did detect some defects, they were costly (e.g., requiring personnel to be paid to visually inspect the produced objects) and were not reliable since the detection rate was based upon the various dissimilar visual abilities of the inspectors to detect such surface defects.

To address these afore-described drawbacks, systems have been implemented which utilized cameras, lights, and computers to capture images of the produced items and analysis which utilized these images to detect such defects or unwanted surface features.

While these systems did reduce or eliminate inspection personnel, they too had several drawbacks. For example and without limitation, such prior computer based systems required at lease on "extra step" in the manufacturing process and required the object to be stopped or remain stationary while the lights moved along the object. This approach not only reduced the overall efficiency of the manufacturing process but also created a potential safety hazard as the lights were moving. These prior camera and computer based systems also had a rather large "footprint" which required a relatively large amount of manufacturing space to be sacrificed to the inspection effort and had to be recalibrated due to changes in ambient light and due to the use of various dissimilar colors of paint on the manufactured object. These prior systems also were highly susceptible to the generation of "false positives", thereby further reducing the overall efficiency of the manufacturing process and increasing overall manufacturing costs. Such false positives were also caused by the prior image capture techniques which were utilized.

The present inventions overcome these and other drawbacks associated with prior techniques and strategies in a new and novel manner.

SUMMARY

In concordance with the instant disclosure, a method for manufacturing an organic fertilizer with a high ammonia content that is usable by plants and crops has been surprisingly discovered.

It is a first non-limiting object of the various inventions to provide an object inspection system and a method for inspecting an object which overcomes the various previously delineated drawbacks of prior strategies and techniques in a new and novel manner.

It is a second non-limiting object of the various inventions to provide an object inspection system and a method for inspecting an object which overcomes the various previously delineated drawbacks of prior strategies and techniques and which, by way of example and without limitation, provides the inspection to occur in an "in line" manner without requiring the object to be or remain stationary and with minimal impact to the overall manufacturing process.

It is a third non-limiting object of the present invention to provide an object inspection system and a method for inspecting an object which overcomes the various previously delineated drawbacks of prior strategies and techniques and which, by way of example and without limitation, reliably detects defects or unwanted features upon the surface of an object and does so with a relatively small overall footprint.

It is a fourth non-limiting object of the present invention to provide an object inspection system and a method for inspecting an object which overcomes the various previously delineated drawbacks of prior strategies and techniques and which, by way of example and without limitation, does not require recalibration when objects of different colors are inspected and still provides reliable detection of defects and unwanted surface features even when the ambient light changes.

According to one non-limiting aspect of the present invention, an object inspection system is provided which includes at least one light which has a fixed position; at least one camera which is in communication with the at least one light and which has a second fixed position; and a processing assembly which detects the location of the object, which selectively activates the light, which captures an image of at least a portion of the object from the camera as the object is moving, and which utilizes the captured image to detect the presence of a defect upon the surface of the object.

According to a second non-limiting aspect of the present invention, a method for detecting the presence of a defect upon the surface of an object is provided and includes the steps of acquiring an image of at least a portion of the object as the object is moving; and using the acquired image to determine the presence of a defect upon the surface of the object.

According to a third non-limiting method for detecting and correcting a defect upon the surface of an object comprising the steps of acquiring at least one image of an object; using the acquired image of the object to determine the location of a defect upon the surface of the object; communicating the presence of the identified defect to automated defect correction assembly; and correcting the defect by use of the automated defect correction assembly.

These and other features, aspects, and advantages of the various inventions will become apparent from a reading of the detailed description of the preferred embodiment of the invention, including the subjoined claims, and be reference to the following drawings.

DRAWINGS

FIGS. 9A-9B are respectively a top view and a side view of an object to be inspected in combination with a carrier and a conveyor assembly.

FIG. 15 is an image of an exemplary three dimensional object mesh including respective surfaces and vertices.

FIG. 16 is an illustration of an exemplary calibration plate checkerboard and camera simulation equation using both intrinsic and extrinsic matrices from calibration.

Figure 27:
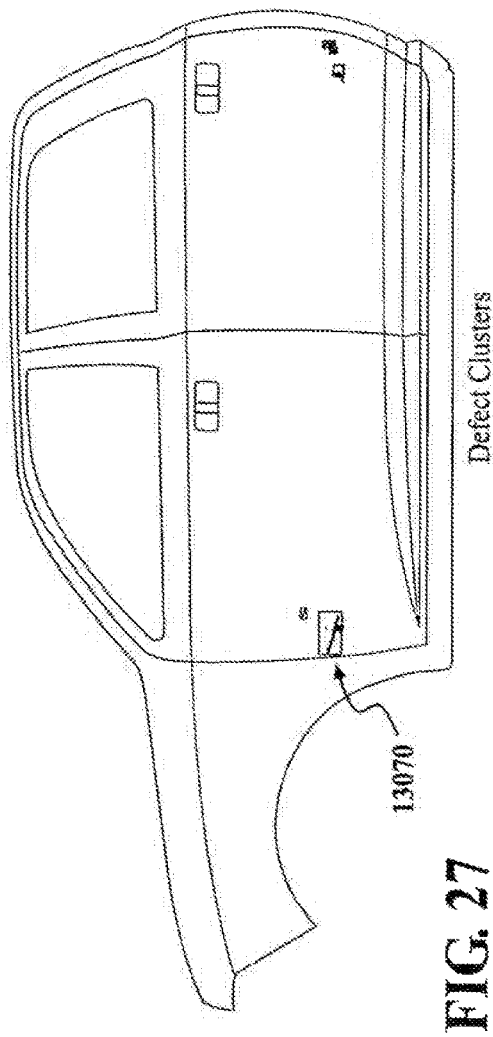

FIG. 27 an image of a side view of an object to be inspected and further showing clustered defect regions of interest which are projected onto the object image.

Figure 28:
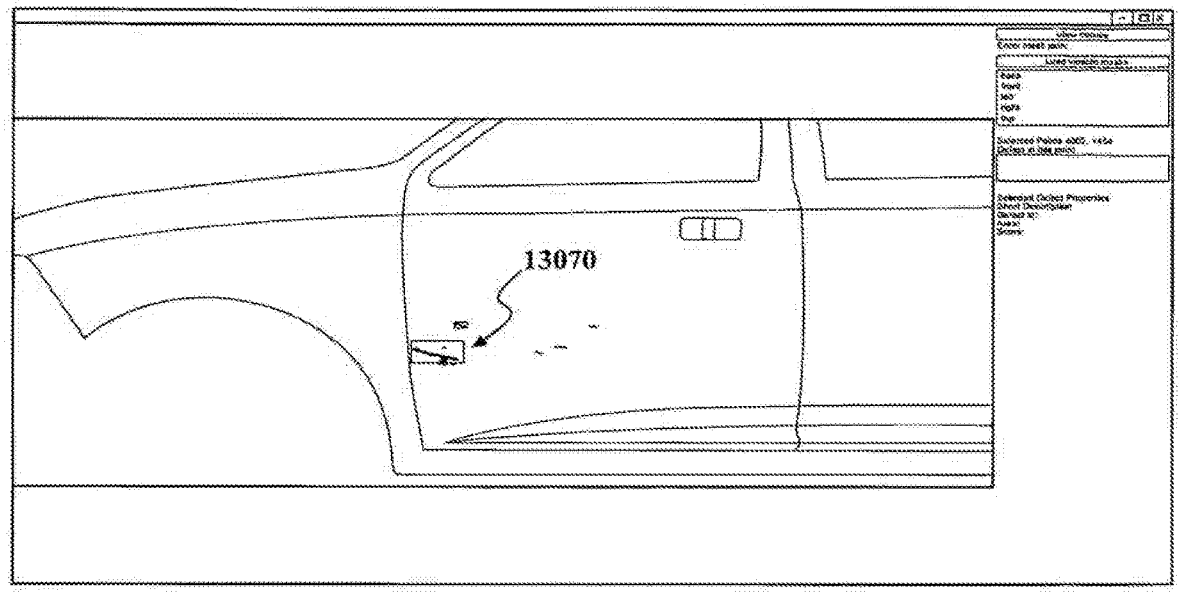

FIG. 28 a view which is similar to that which is shown in FIG. 27 but in which the cluster defect image is shown in close up form.

Figure 29:
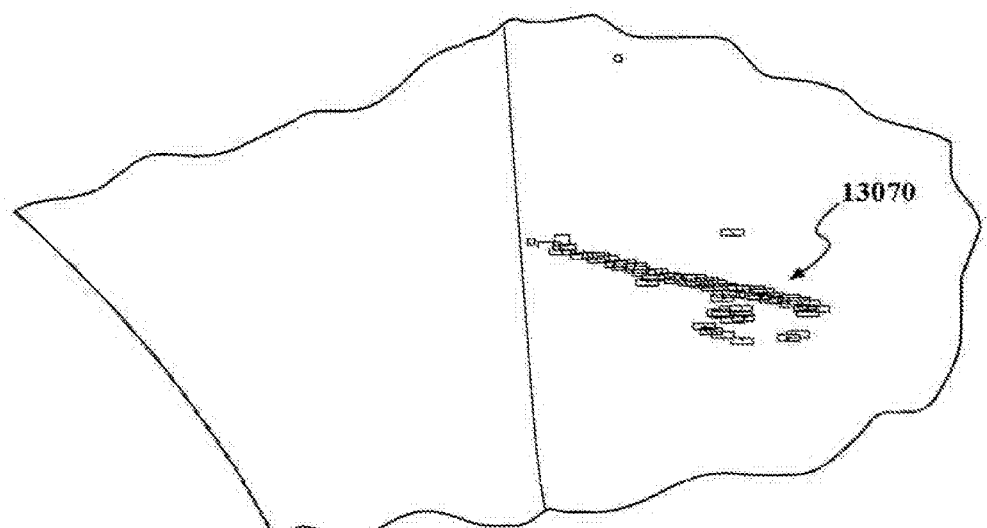

FIG. 29 a view which is similar to that which is shown in FIGS. 27 and 28 but in which the cluster defect image is shown in great zoom or close up detail.

Figure 30:
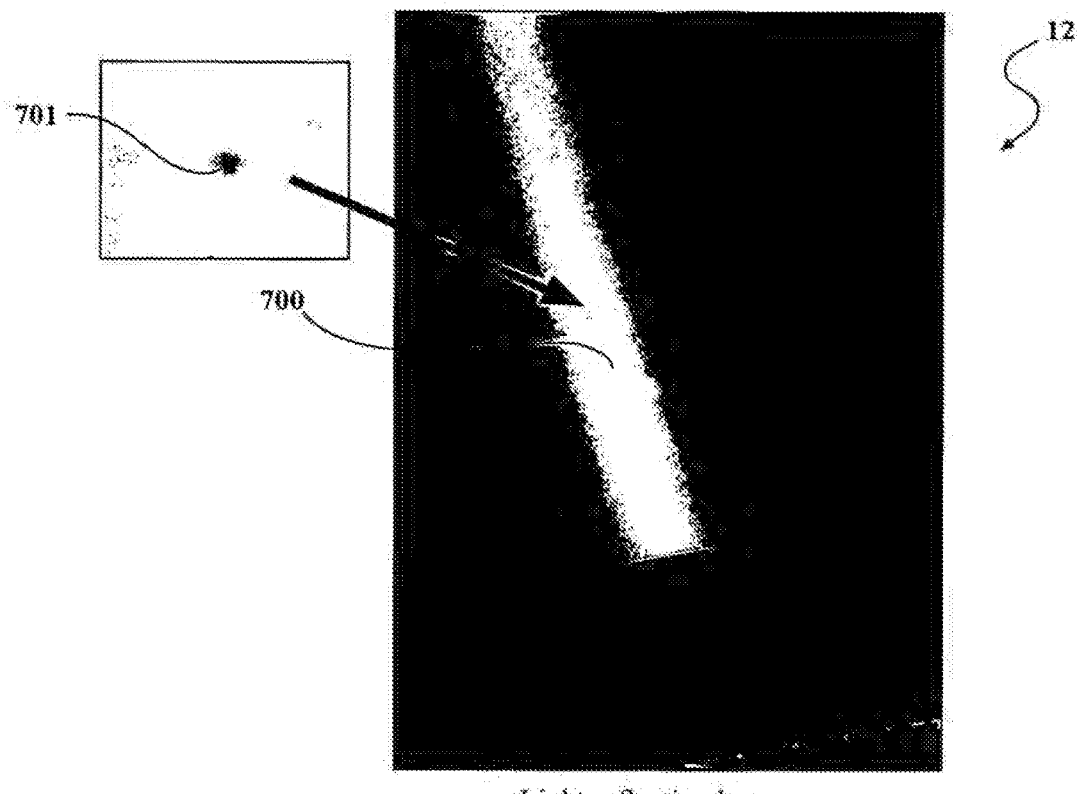

FIG. 30 is an exemplary image showing a light reflection bar and a dark spot defect.

Figure 31:
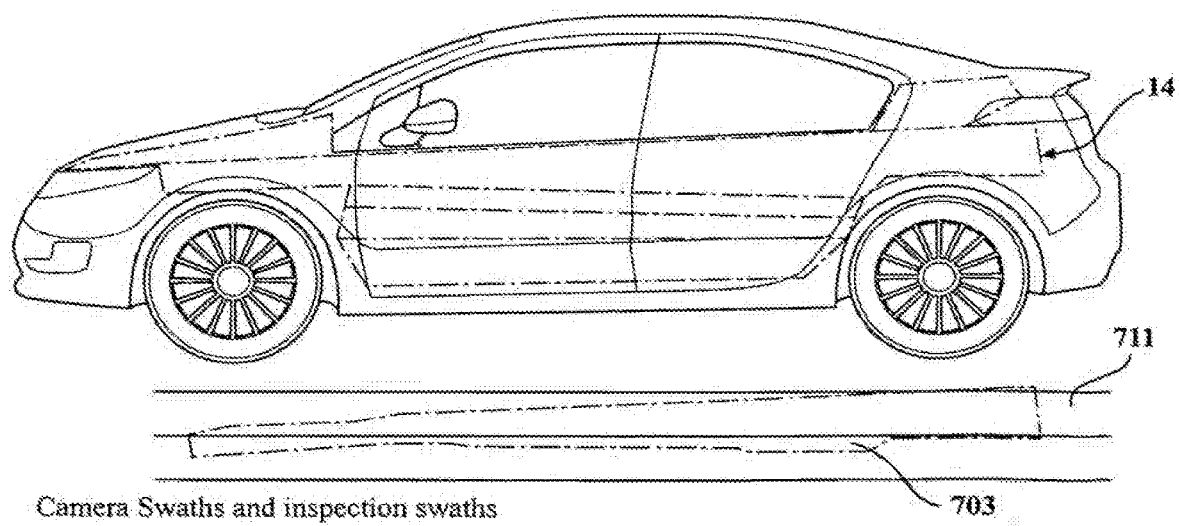

FIG. 31 is an image of a side view of a vehicle to be inspected and further showing a plurality of possible camera swaths and inspection swaths selected to target various surface normal of the inspected object surface.

Figure 32:
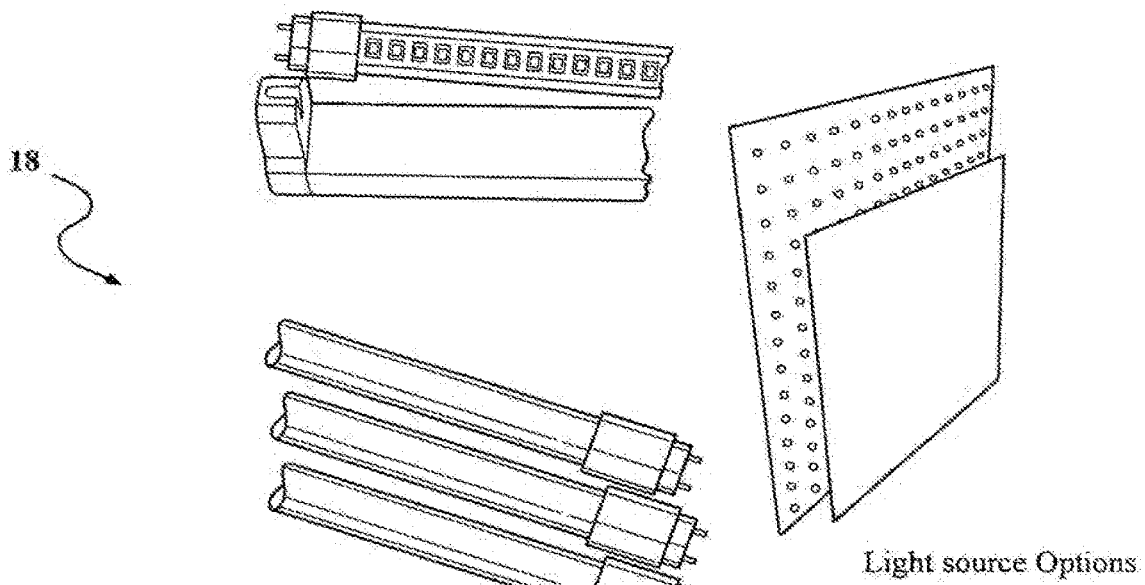

FIG. 32 are images of an exemplary Light Emitting Diode (LED) type light source configuration and which includes LED sources and diffusers.

Figure 33:
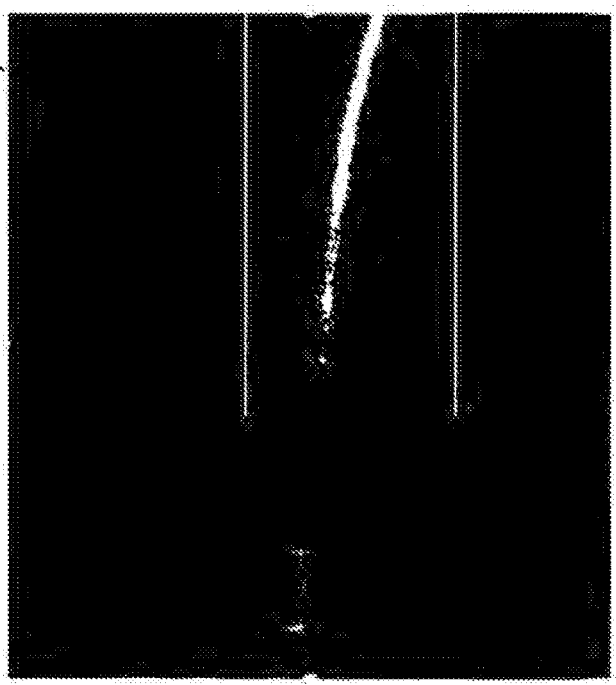

FIG. 33 is an image of a camera region of interest enclosing a light reflection bar in an inspection swath.

Figure 34:
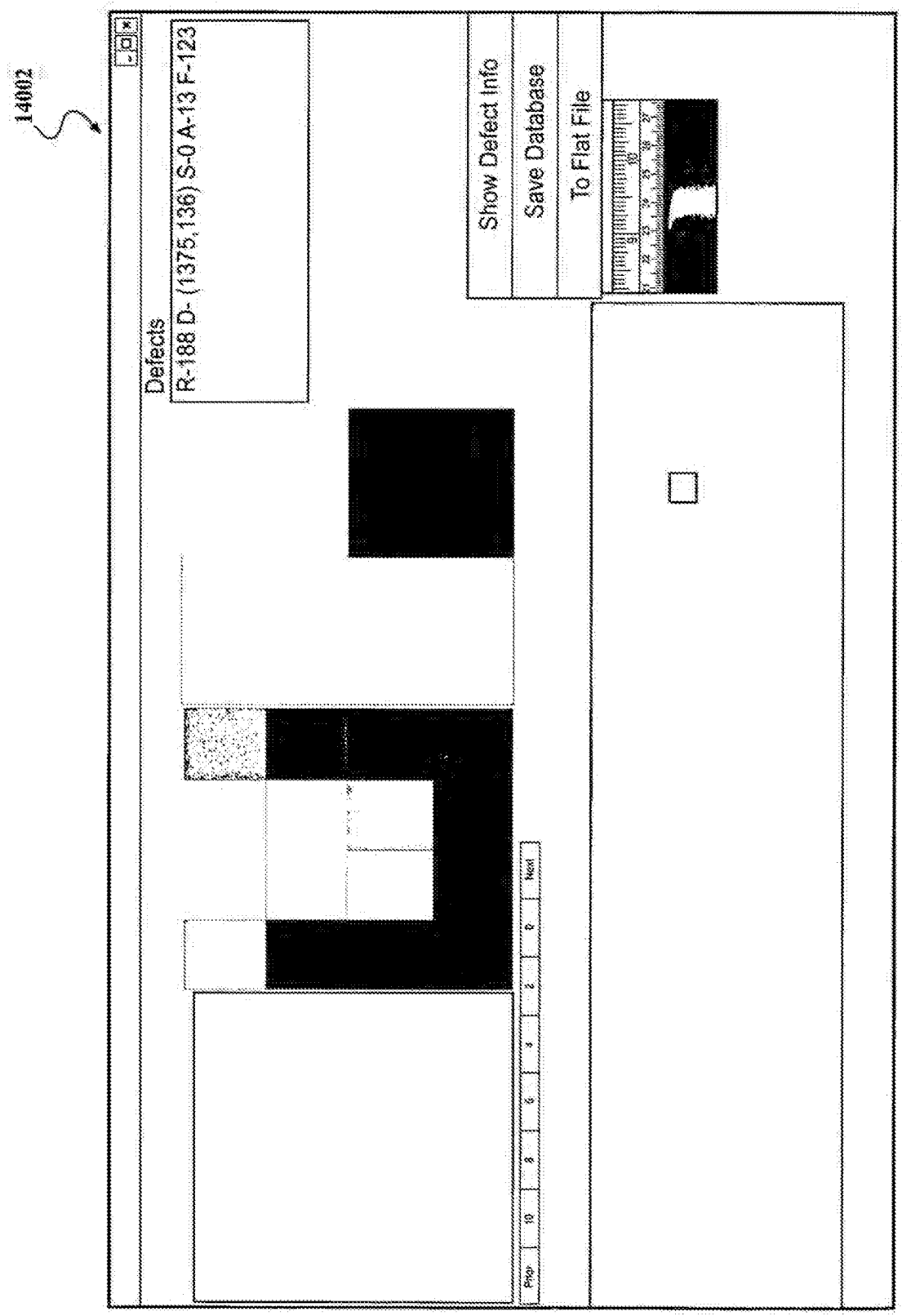

FIG. 34 is a histogram image showing an example of a dark spot region of interest and associated Haar wavelet 4 pixel transform image for a "true defect".

Figure 35:
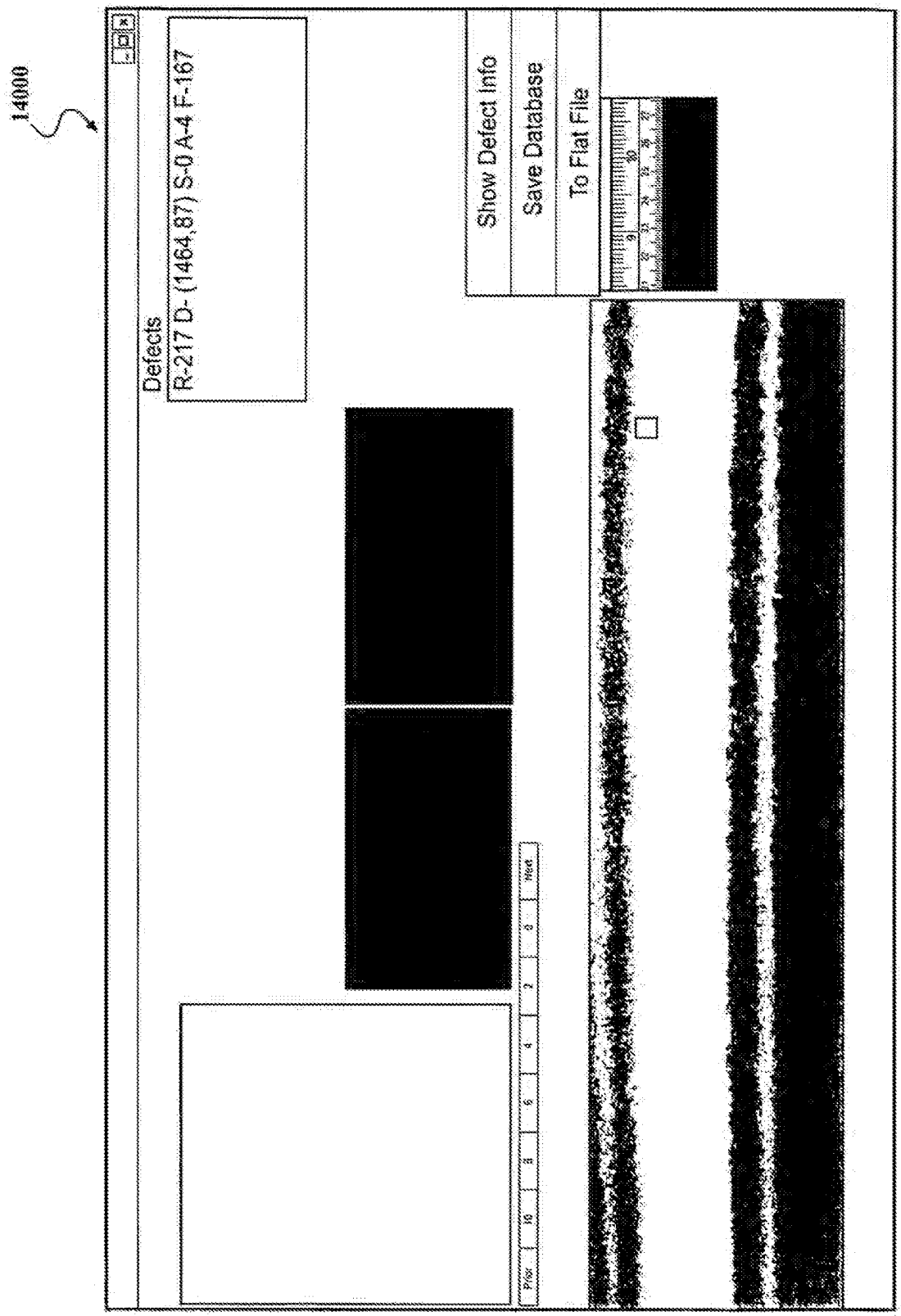

FIG. 35 is a histogram image showing an example of a dark spot region of interest and associated Haar wavelet 4 pixel transform image for "noise" and showing 2 white pixels on top and 2 "black" pixels on bottom.

Figure 36:
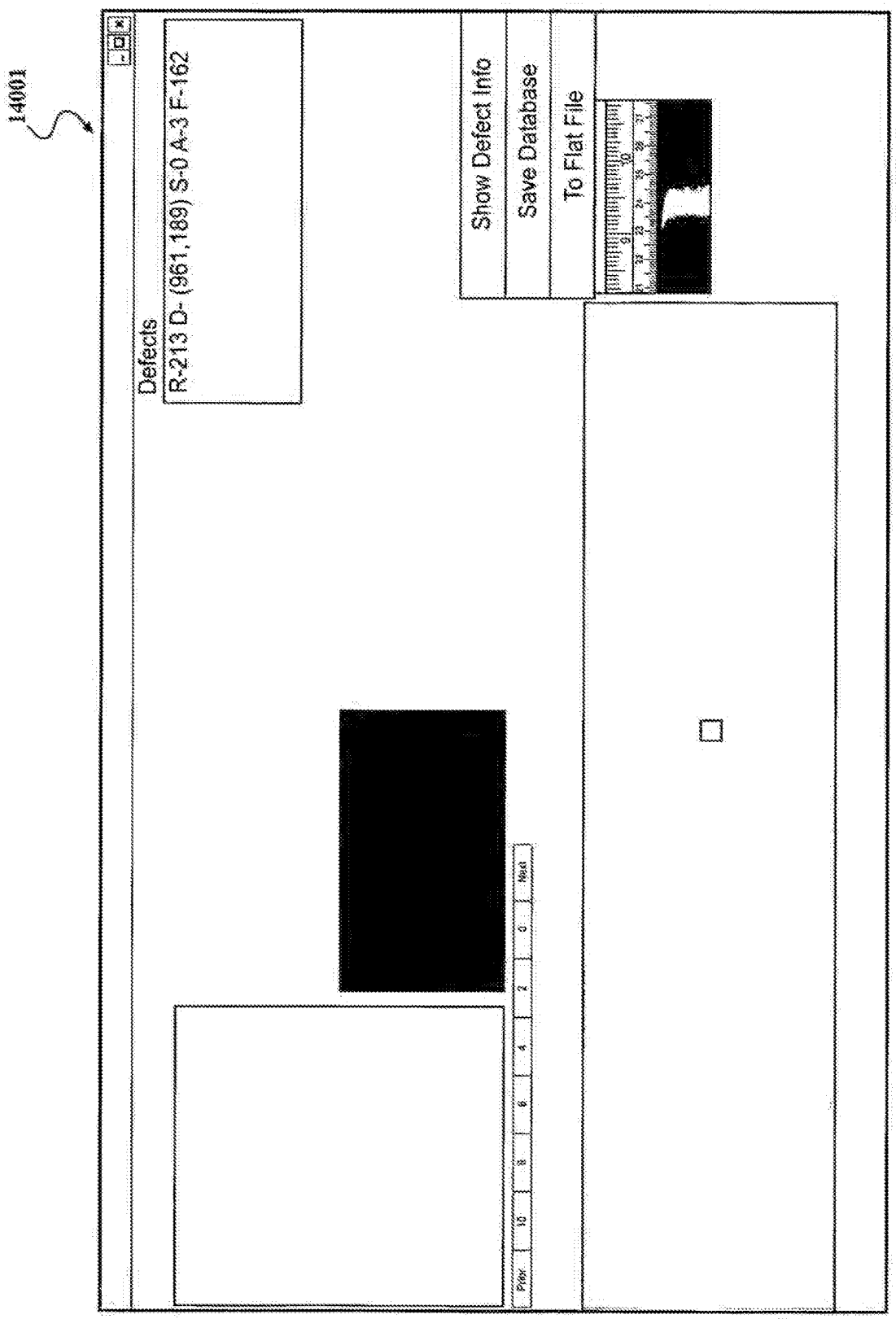

FIG. 36 is a histogram image showing an example of a dark spot region of interest and associated Haar wavelet 4 pixel transform image for "noise" and showing 4 white pixels.

Figure 37:
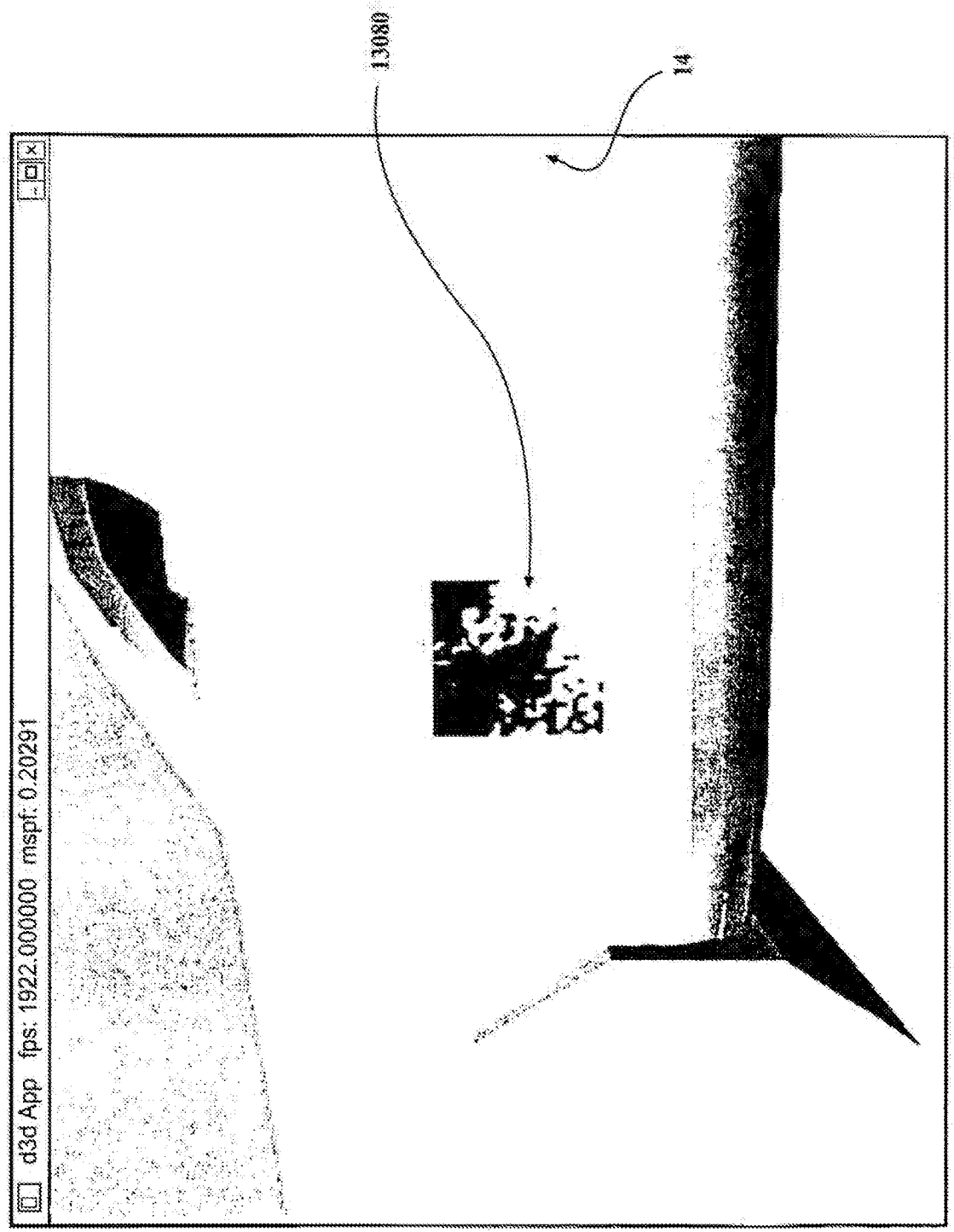

FIG. 37 is an image of an object to be inspected upon which defect regions from a spot cluster are projected in order to create a contextual image of the object.

Figure 38:
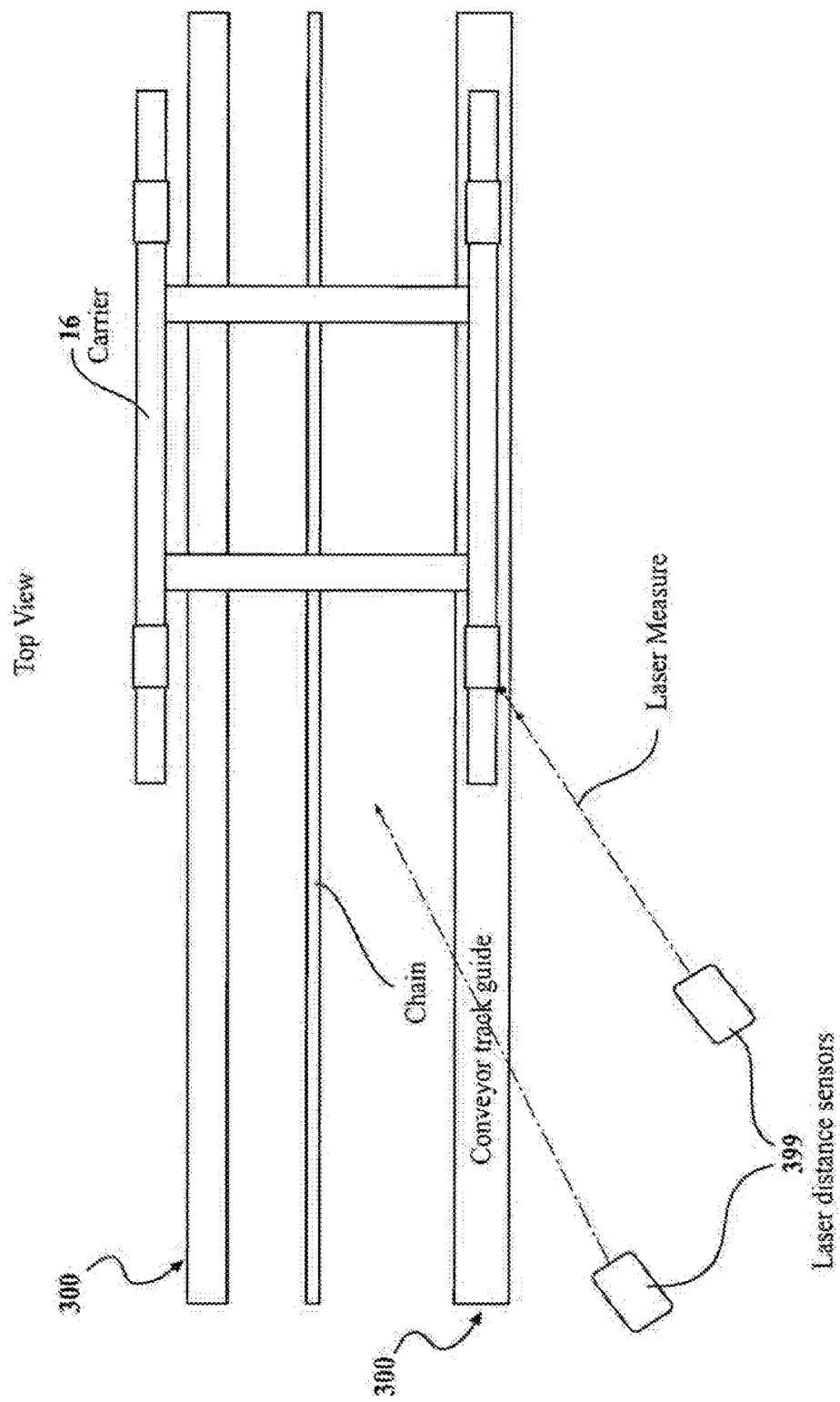

FIG. 38 is a block diagram of an exemplary arrangement of overlapping laser distance sensors to triangulate and track object positions to provide higher frequency inspected object position measurements.

Figure 39:
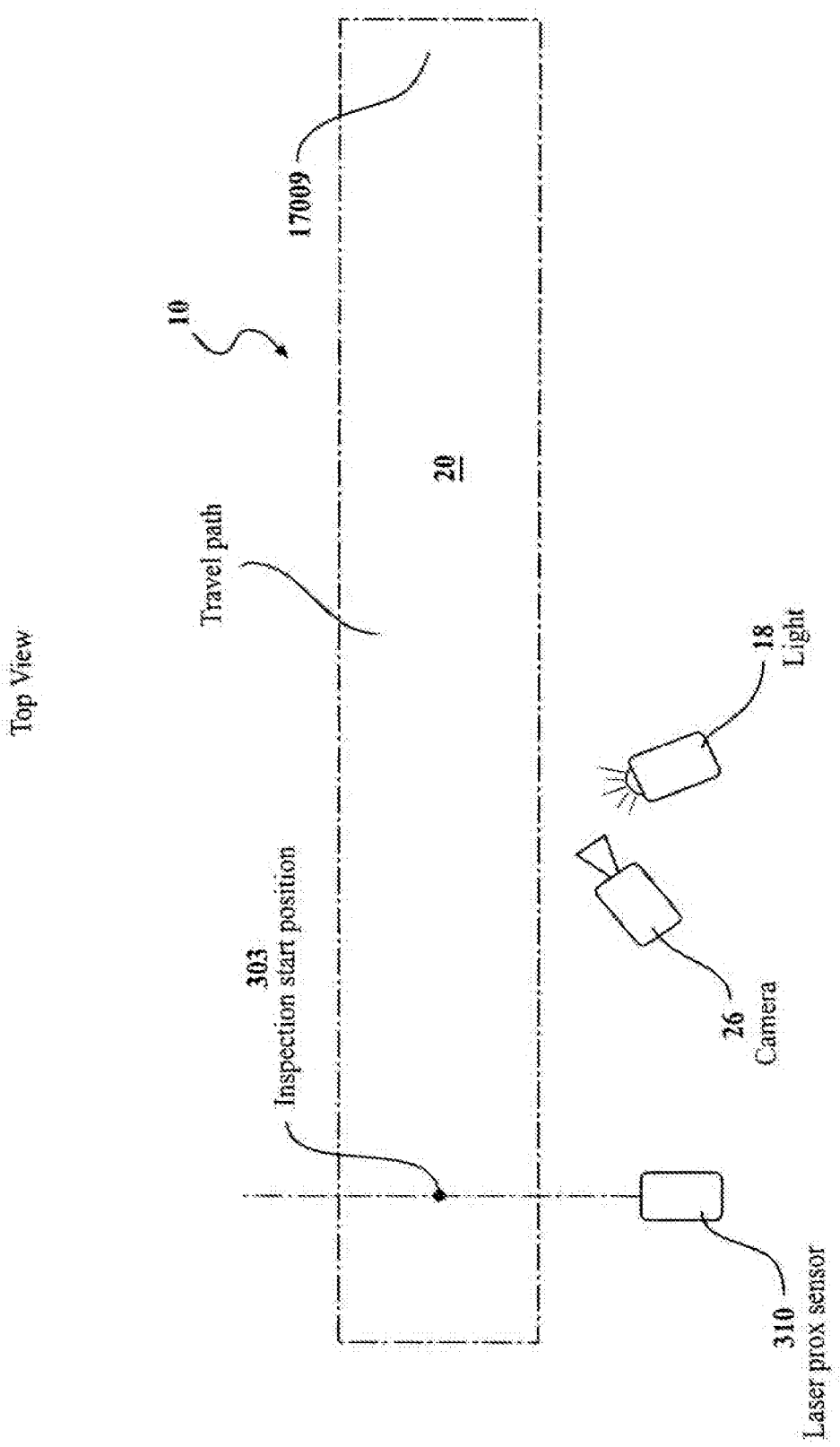

FIG. 39 is a block diagram of a sensor and an exemplary arrangement used to detect when an inspected object reaches an inspected object start position using a laser distance sensor or some other type of proximity sensor.

Figure 40:
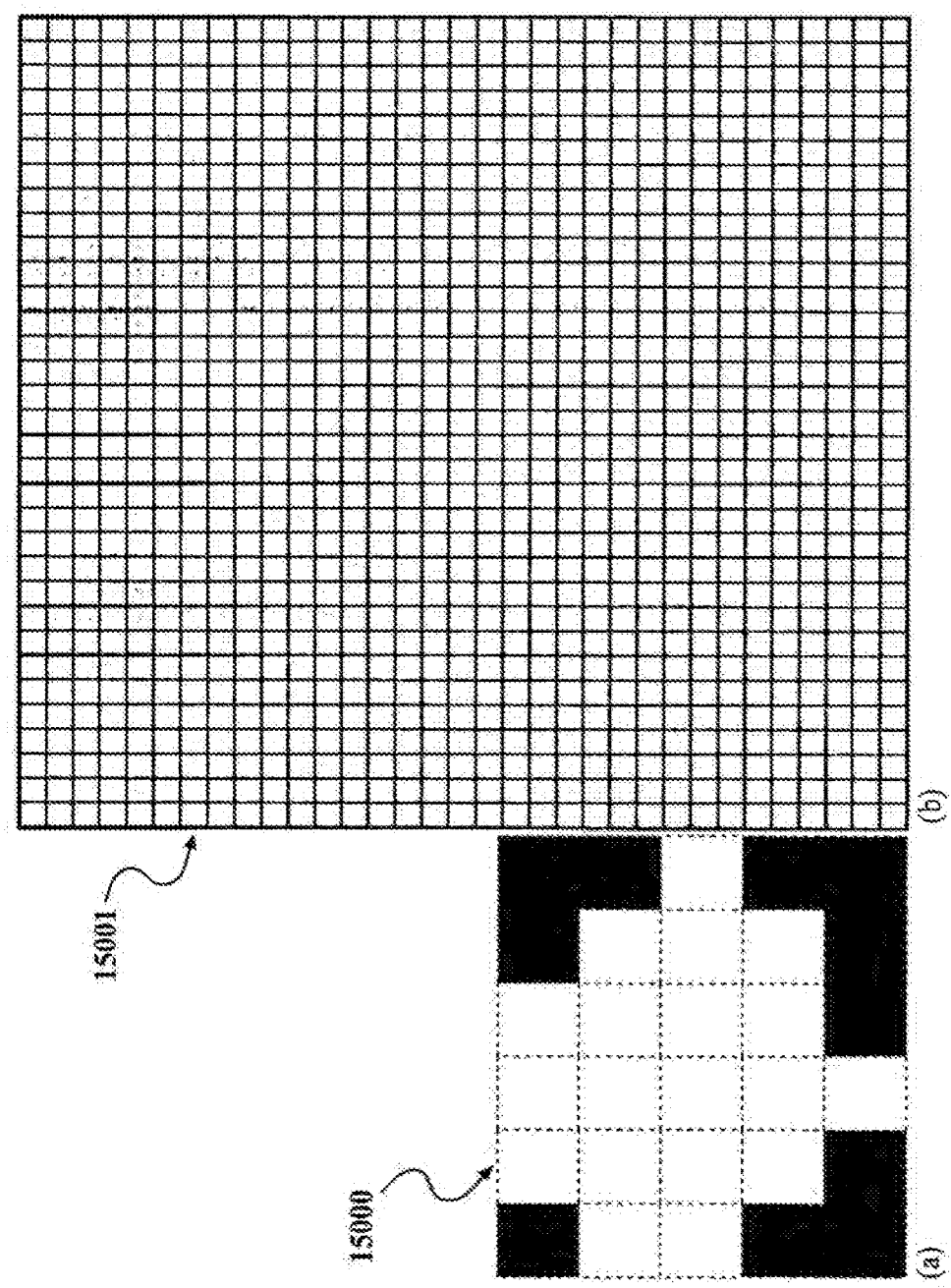

FIG. 40 is an exemplary histogram image having a bright spot defect region of interest and an associated bright spot region of interest.

Figure 41:
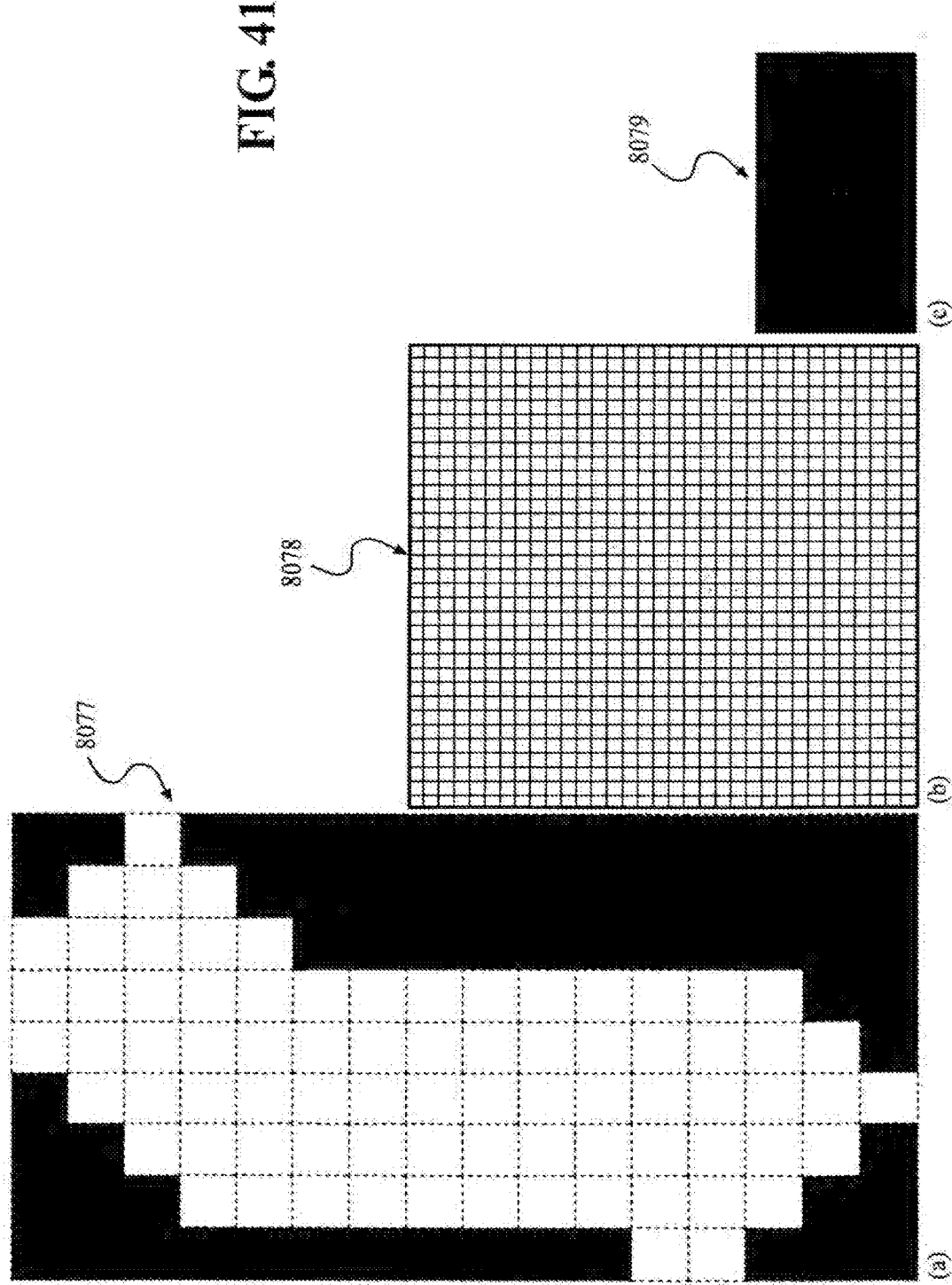

FIG. 41 is a histogram image having dark spot defect region of interest and an associated dark spot region of interest and an associated 4 pixel Haar wavelet image.

Figure 42:
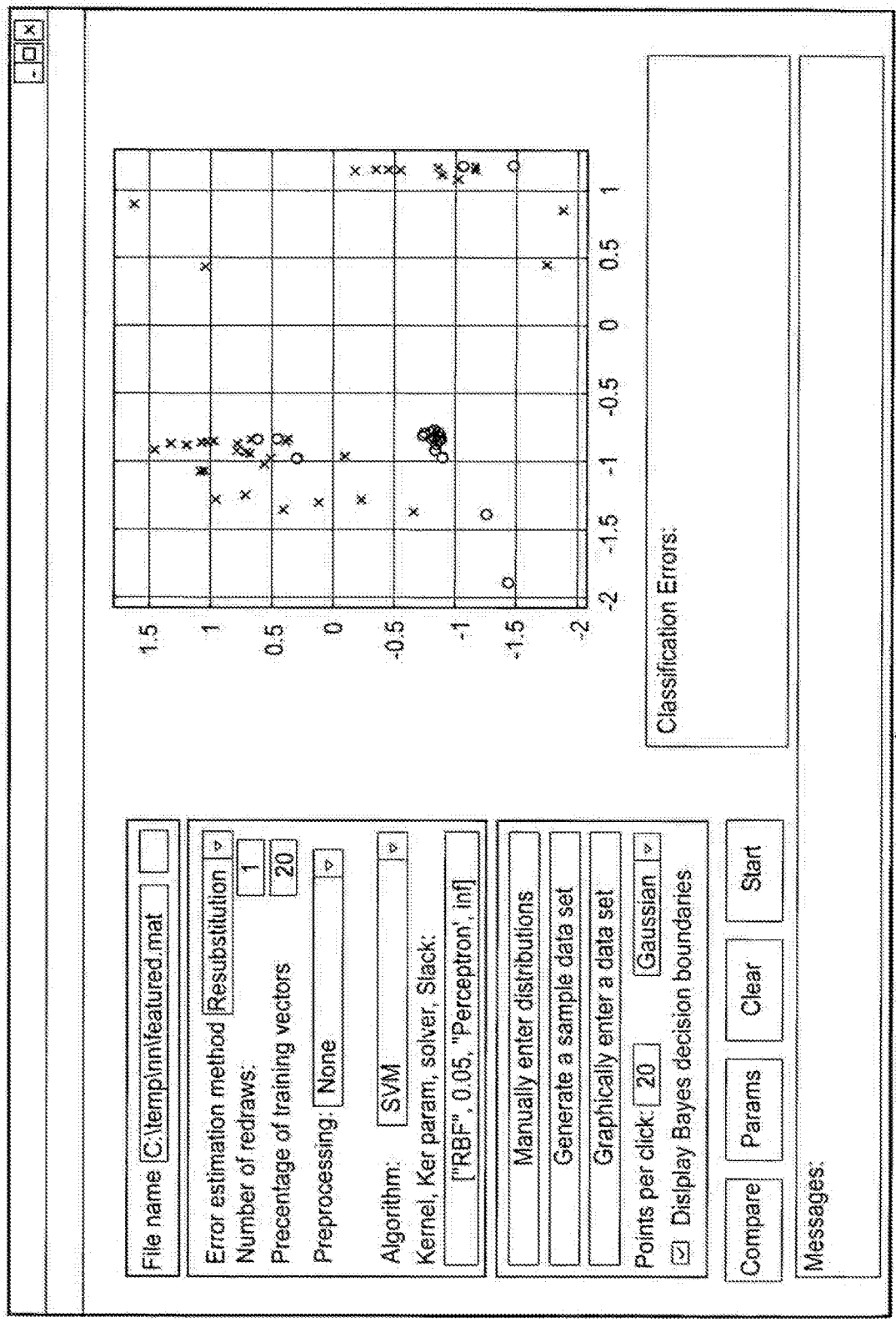

FIG. 42 is a data plot which illustrates how a Matlab® Pattern Classification Toolbox by Duda can be used in combination with a training set to learn to classify dark spot defect regions of interest as "true defects" or "noise" for a specific vector of interest.

Figure 43:
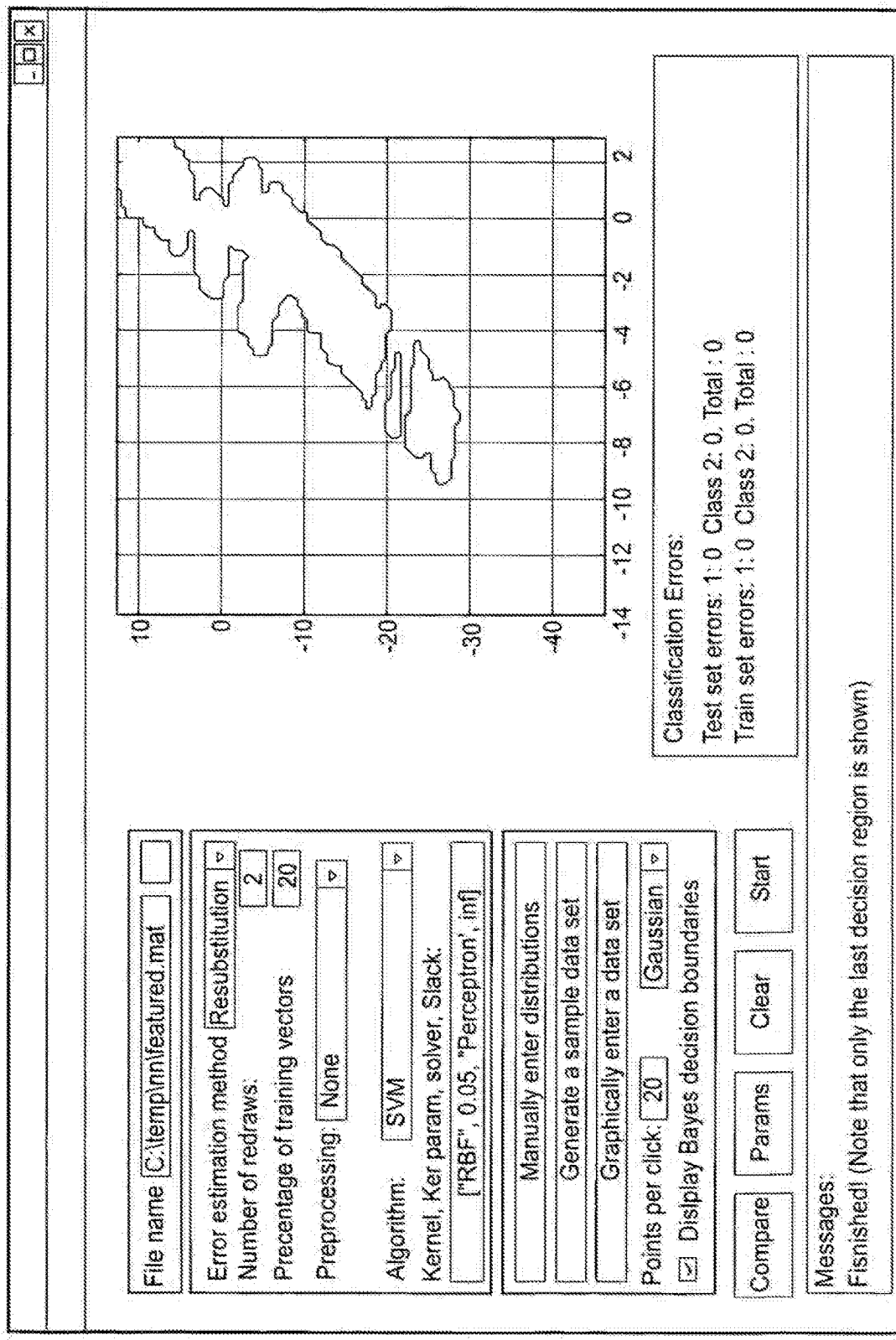

FIG. 43 is a data plot which illustrates how a Matlab® Pattern Classification Toolbox by Duda can be used in combination with a training set to learn to classify dark spot defect regions of interest as "true defects" or "noise" for a specific vector of interest and the settings here which are shown provide a 100% correct classification result.

Figure 44:
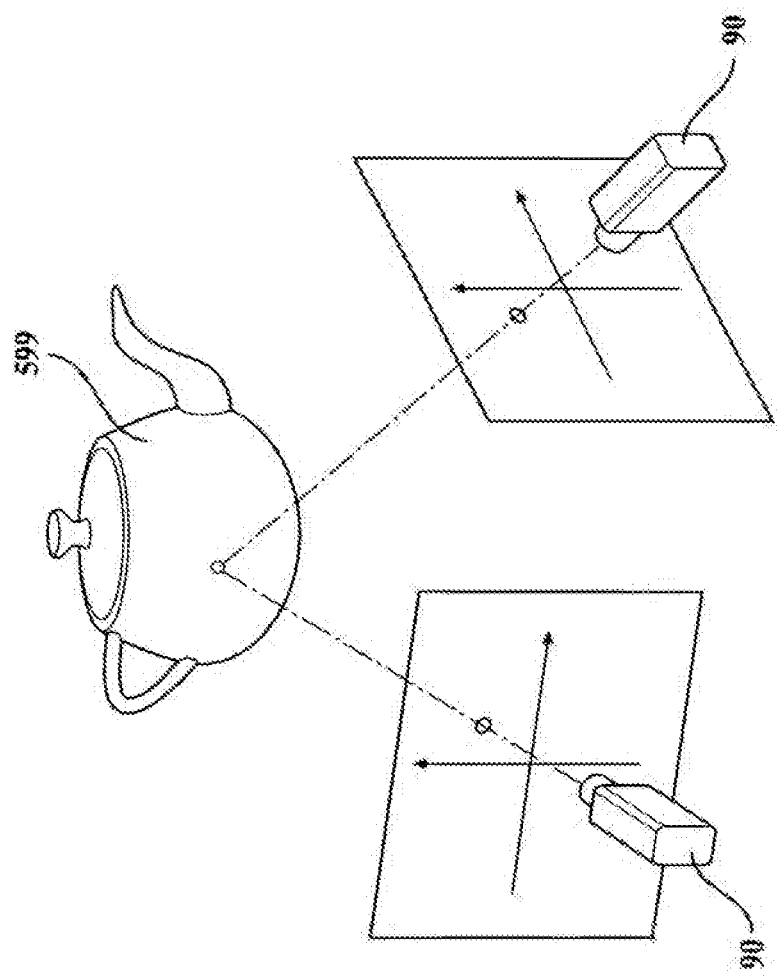

FIG. 44 is an illustration of a stereo based point location in three dimensional ("3D") space.

Figure 45C:
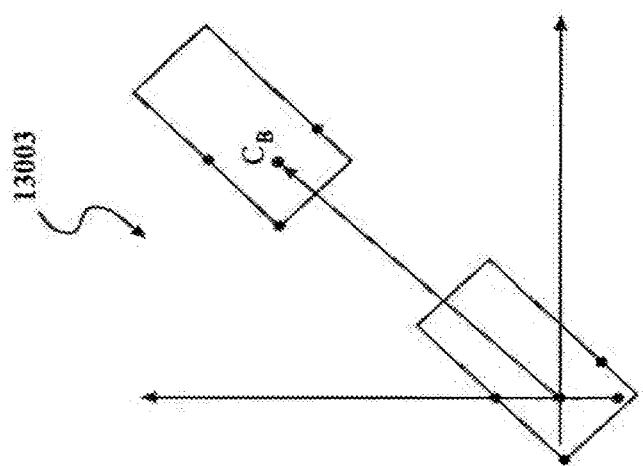
Figure 45B:
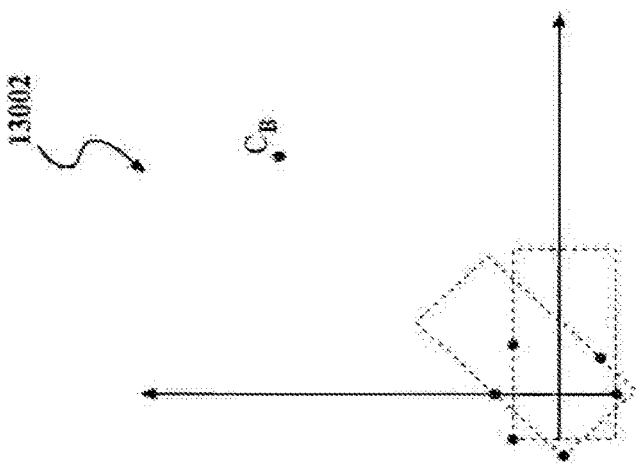
Figure 45A:
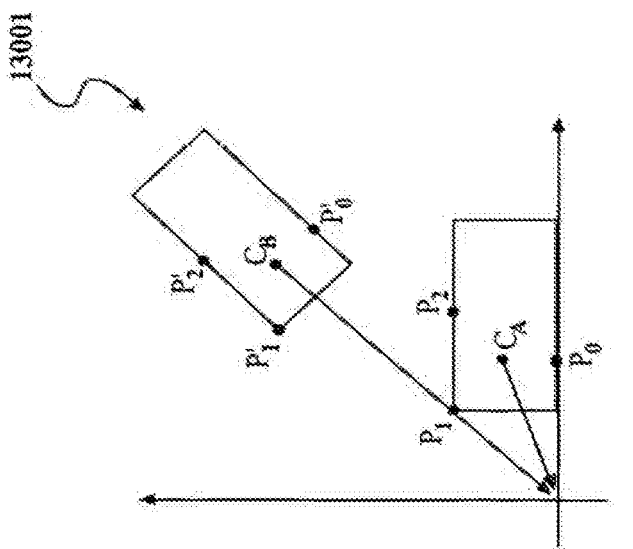

FIGS. 45A, 45B, and 45C are diagrams which illustrate rigid body rotational and translational motion.

Figure 46:
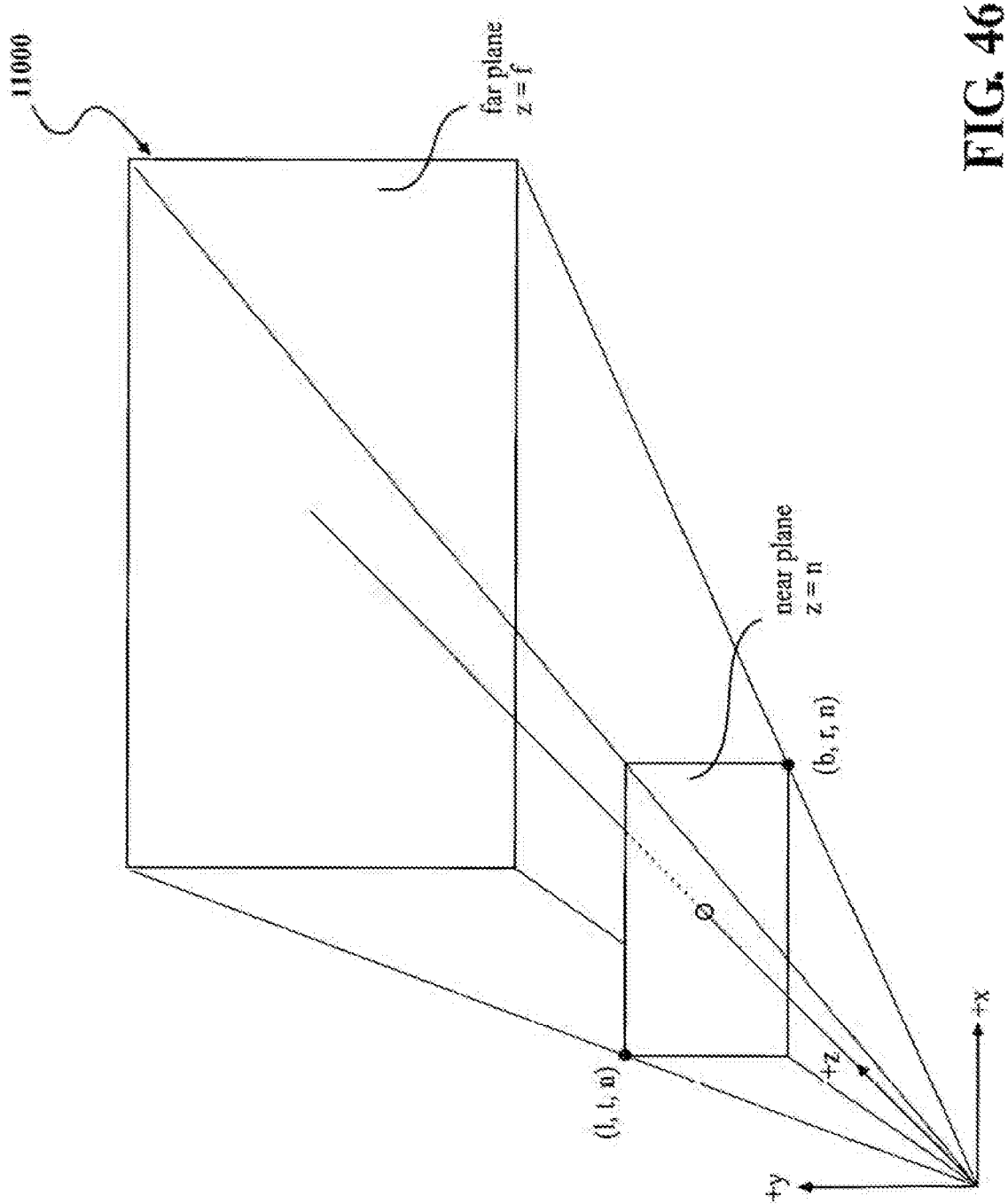

FIG. 46 is an illustration of the projection of a camera frustum.

Figure 47:
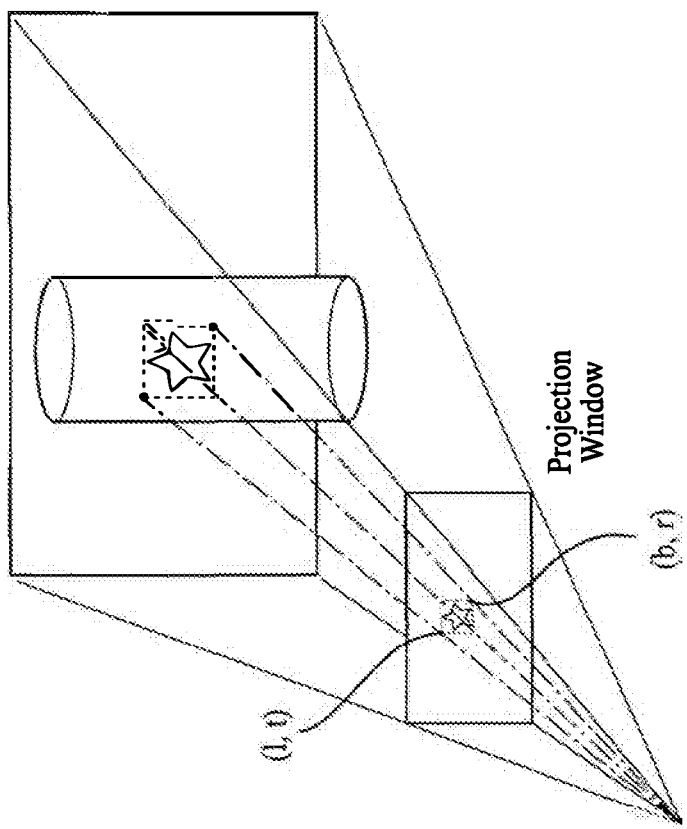

FIG. 47 is a view which is similar to that which is shown in FIG. 46 but further illustrating the use of such a camera in an object inspection system.

Figure 48:
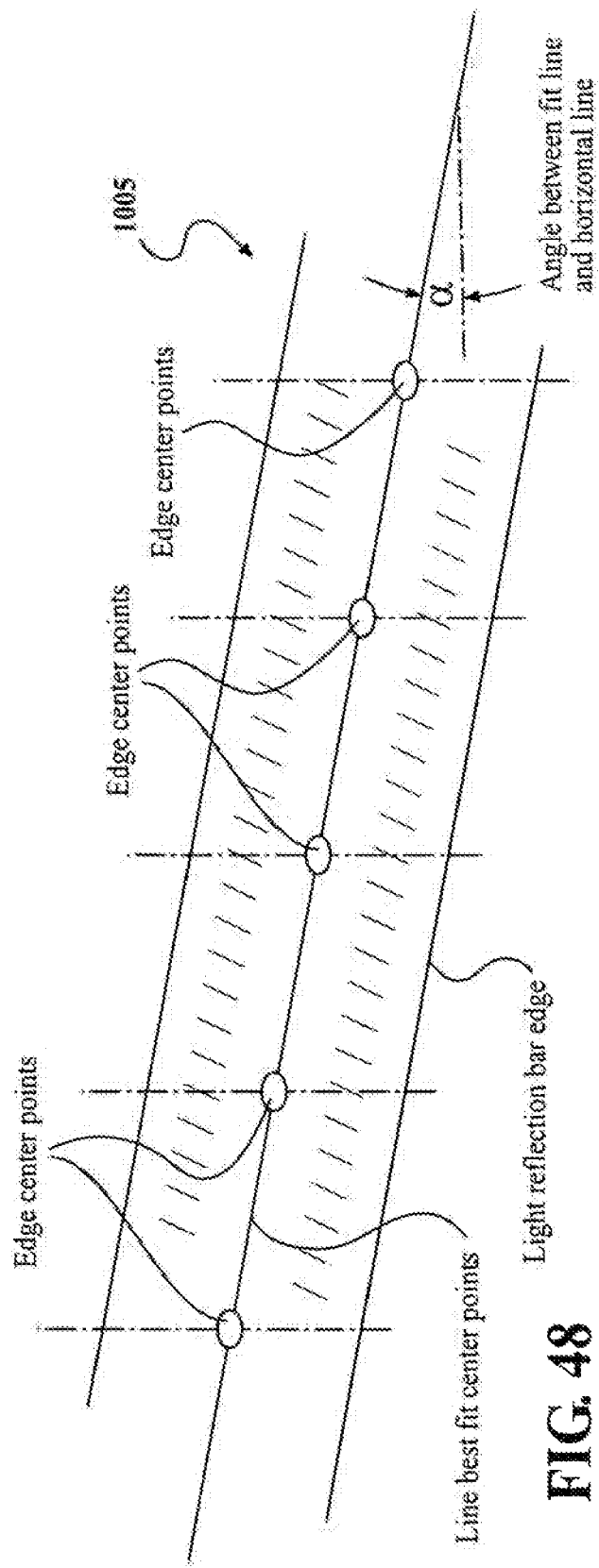

FIG. 48 is an illustration of an exemplary calculation of rotational angle to correct reflection light bar for frame section alignment.

Figure 49:
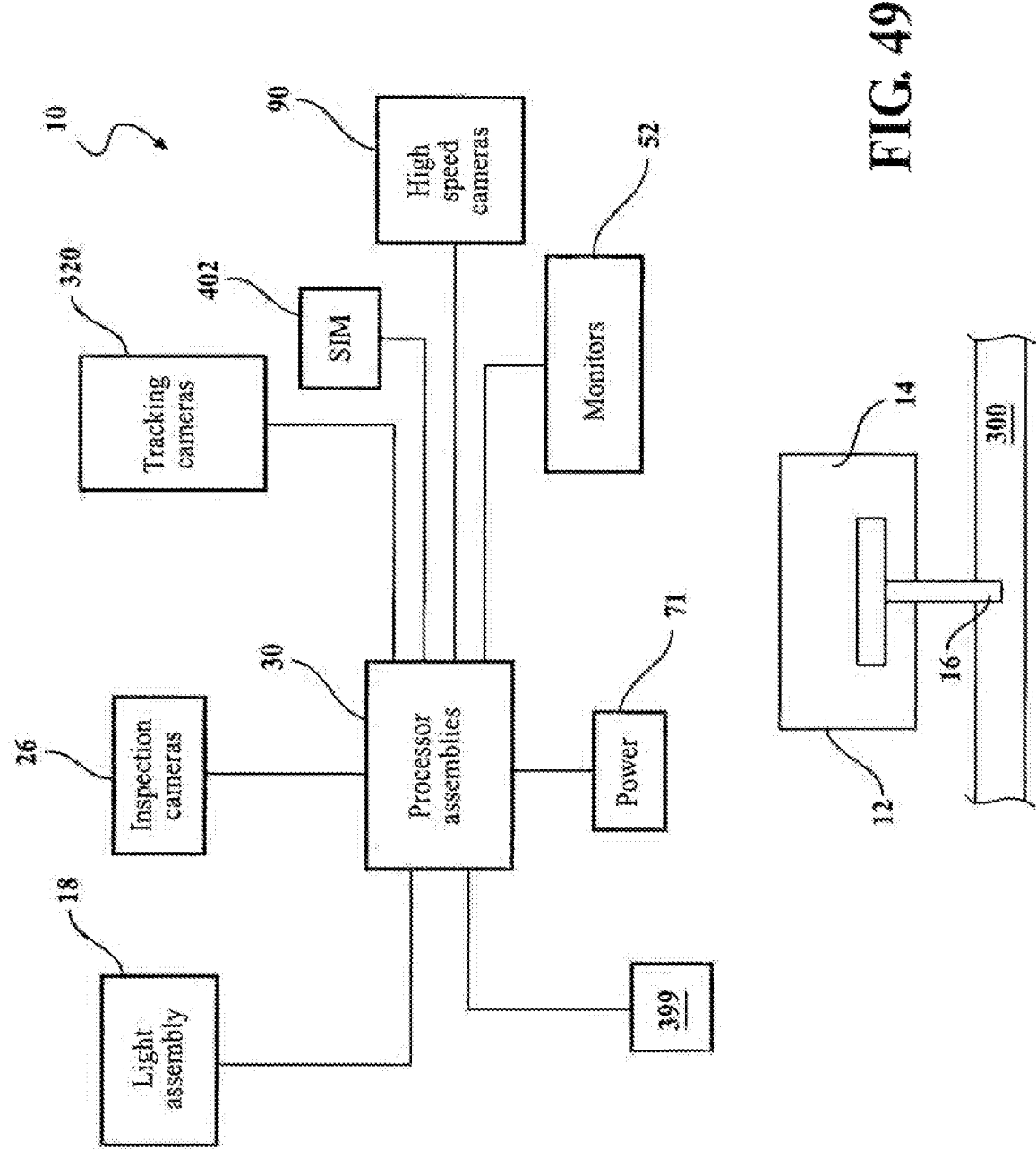

FIG. 49 is a block diagram of an exemplary subsystem organization for use in a tracking system made in accordance with the teachings of an embodiment of the inventions.

Figure 50:
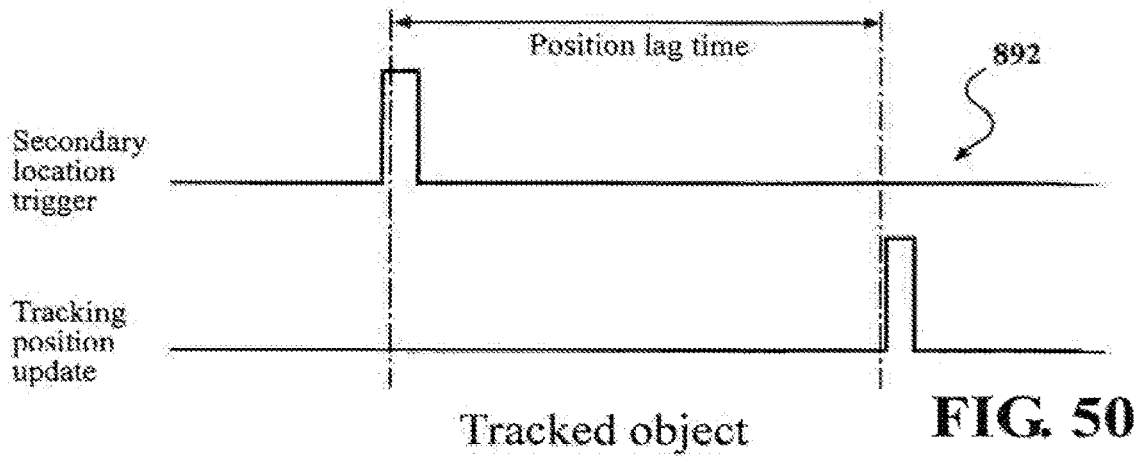

FIG. 50 is a timing diagram illustrating the lag time associated with a tracked item.

Figure 51:
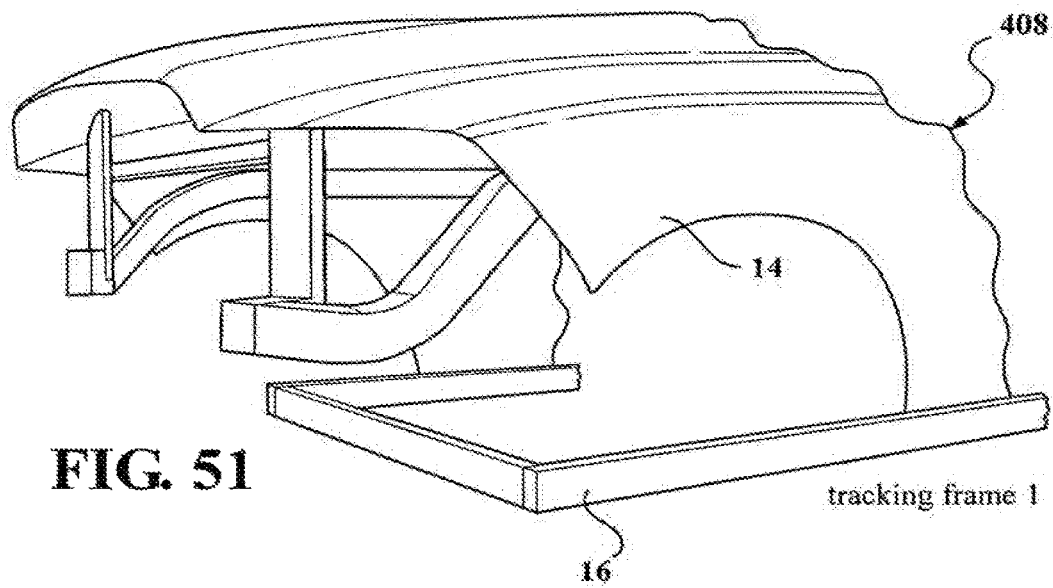

FIG. 51 is an image of an object to be inspected and forming a first tracking frame.

Figure 52:
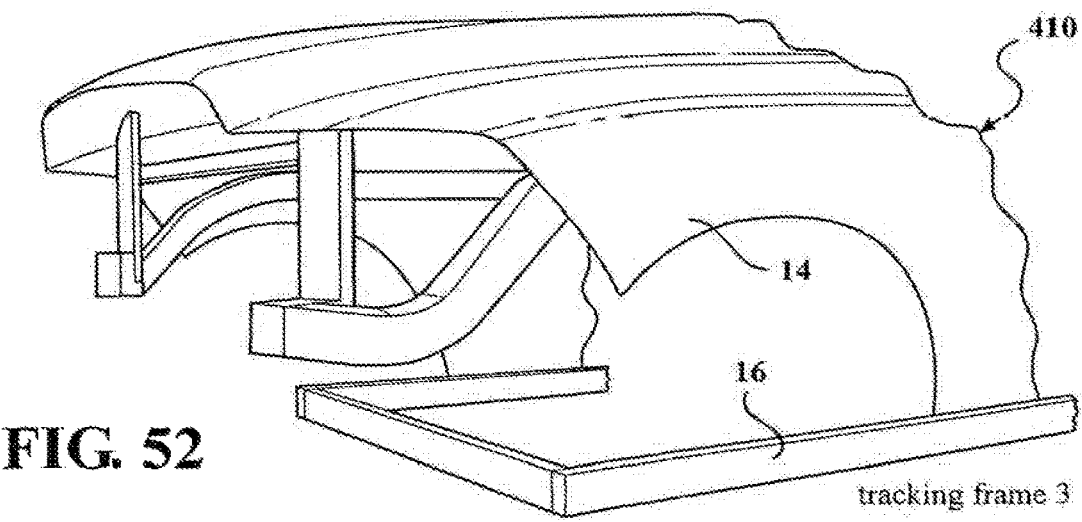

FIG. 52 is a view which is similar to that shown in FIG. 51 but representing a third tracking frame showing object motion.

Figure 53:
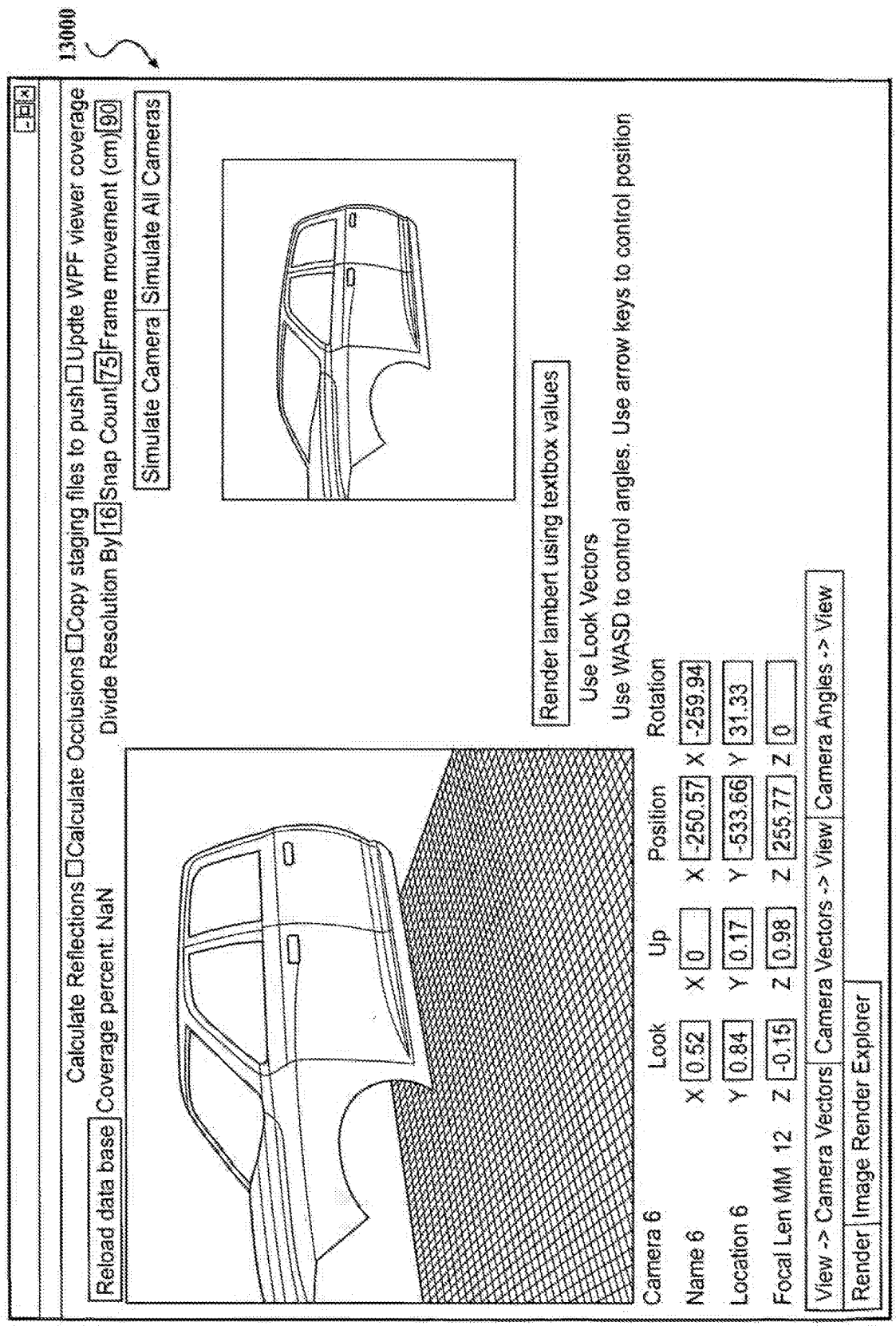

FIG. 53 is an exemplary simulation view of an object to be inspected.

Figures 54, 55:
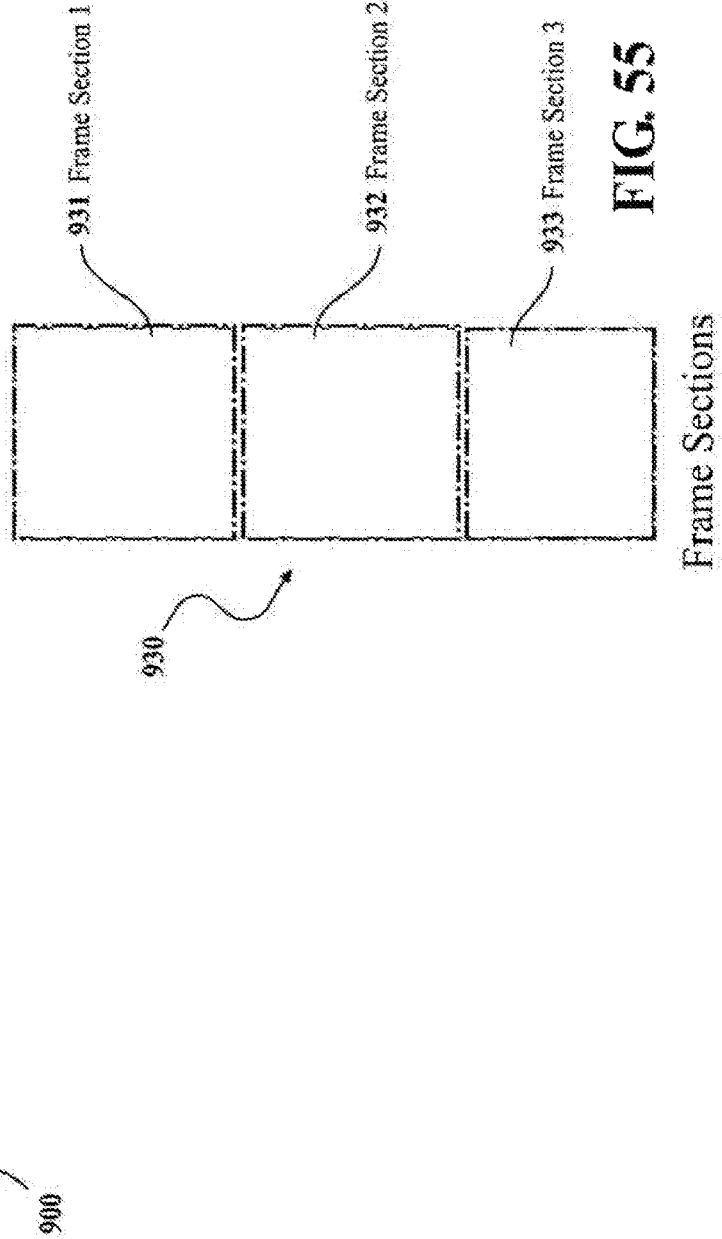

FIG. 54 is an exemplary table of data cooperatively comprising an exemplary frame position table.

FIG. 55 is an image comprised of a plurality of frame sections.

Figure 56:
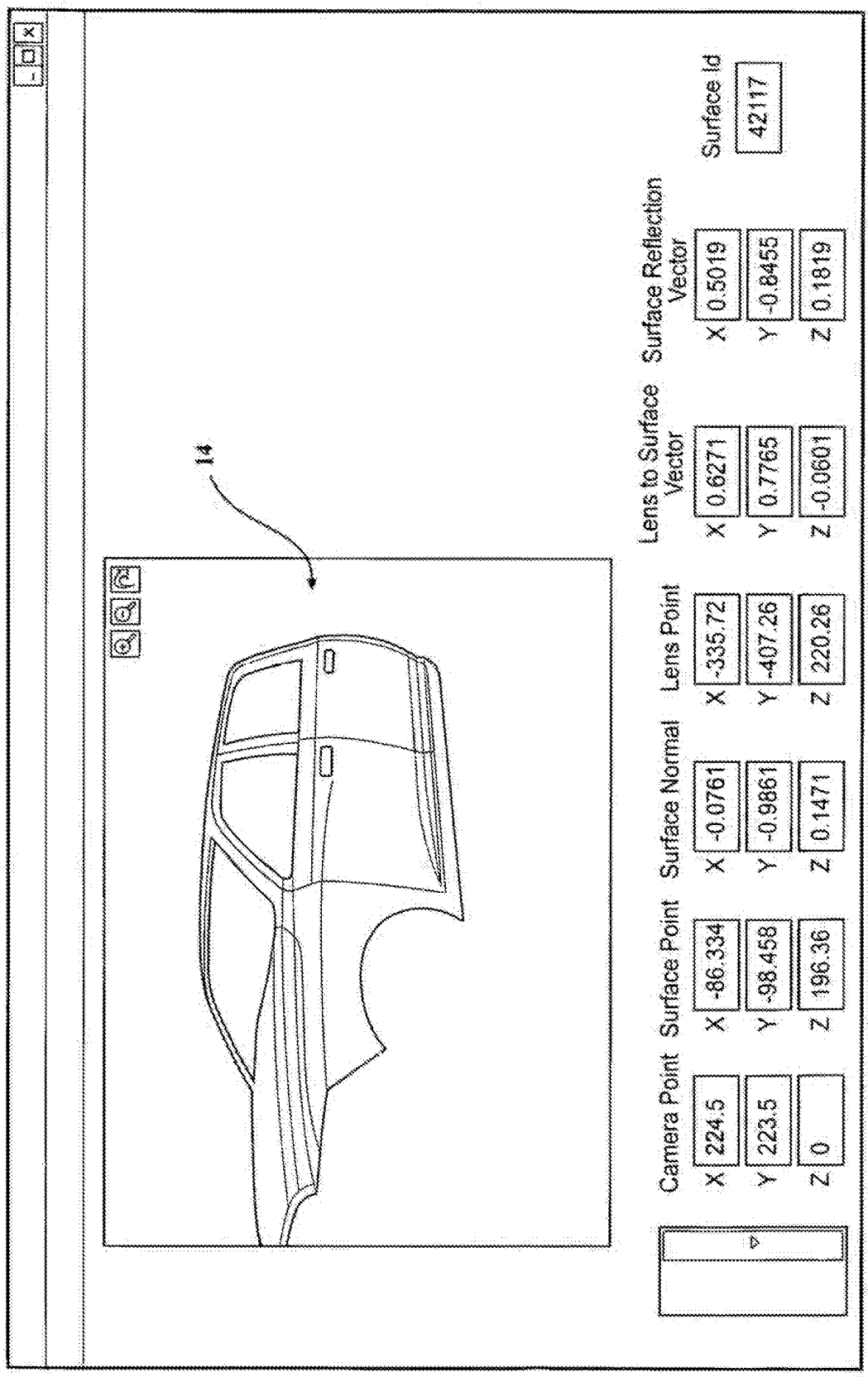

FIG. 56 is an image created by use of a simulation tool which allows points on the surface of a vehicle to be viewed in a simulator and which shows the points on mesh and surface normal.

FIGS. 57A, 57B, 57C, and 57D are calculations used to determine system resolution and camera placement.

FIGS. 58A, 58B, 58C, and 58D are calculations used to determine system resolution and camera placement and further showing actual utilized formulas.

Figure 59:
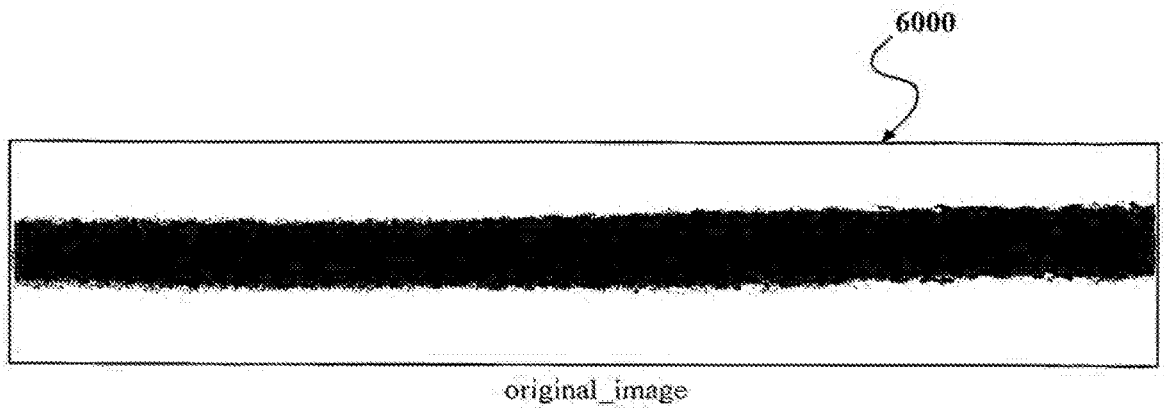

FIG. 59 is an image of a light reflection bar in a frame section captured on a surface of a truck cab.

Figure 60:
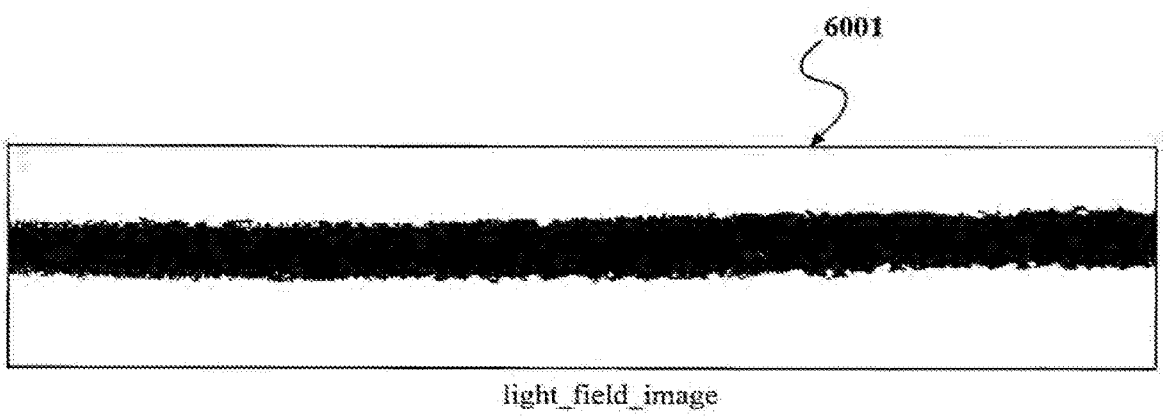
Figure 61:
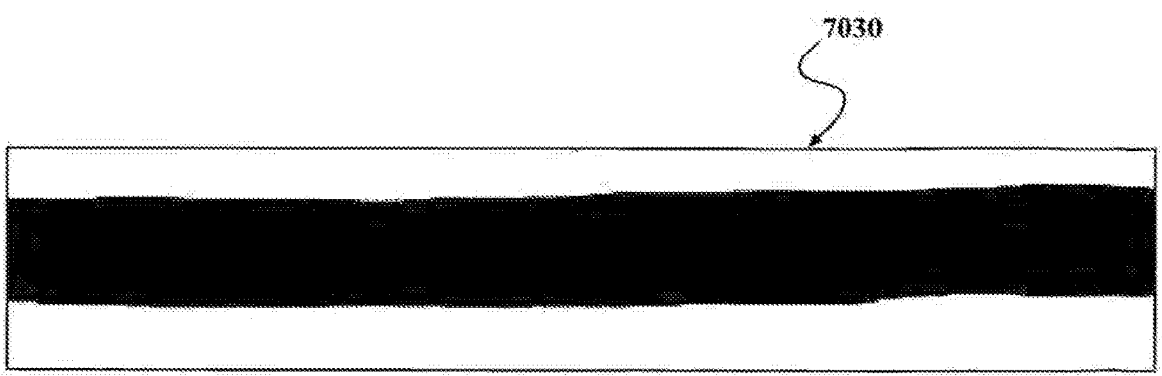

FIG. 60 is an exemplary light field image.
FIG. 61 is an exemplary dilated bright field image.
FIG. 62 is an exemplary eroded bright field image.
FIG. 63 is an exemplary small edge mask image.
FIG. 64 is an exemplary final edge mask image.
FIG. 65 is an exemplary bright mask image.
FIG. 66 is an exemplary holes image.
FIG. 67 is an exemplary holes eroded dilated image.
FIG. 68 is an exemplary bright field edge distance image.
FIG. 69 is an exemplary regional difference image.
FIG. 70 is an exemplary dark holes image.
FIG. 71 is an exemplary dark holes eroded dilated image.
FIG. 72 is an exemplary inverse bright field image.
FIG. 73 is an exemplary dark field image.
FIG. 74 is an exemplary dark field image binary image.
FIG. 75 is an exemplary dilated eroded binary image.

FIG. 76 is an exemplary original dilated eroded binary image.
FIG. 77 is an exemplary bright spots image.
FIG. 78 is an exemplary dark edge region image.
FIG. 79 is an exemplary dark edge region eroded image.
FIG. 80 is an exemplary rough edge binary image.
FIG. 81 is an exemplary edge distance dark field image.
FIG. 82 is an exemplary binary spots image.
FIG. 83 is an exemplary scratches image.

Figure 84:
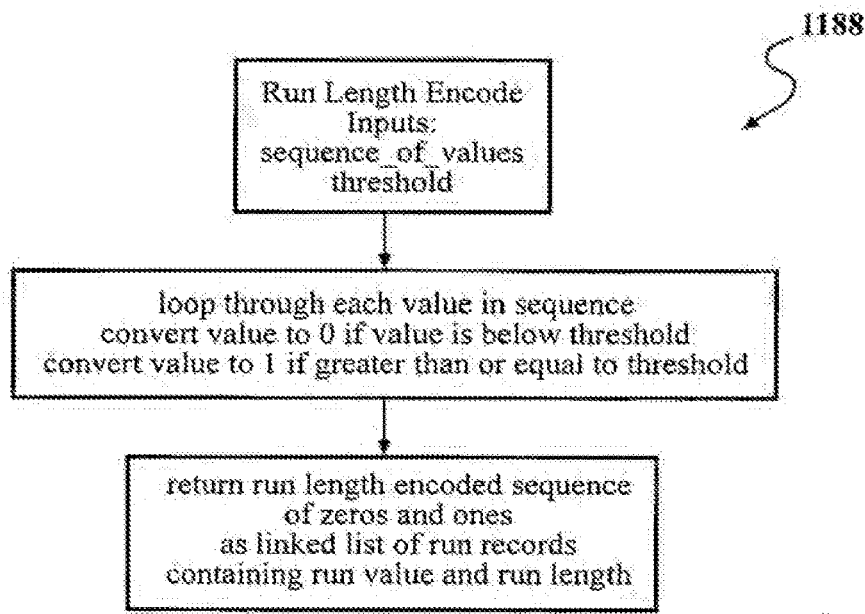

FIG. 84 is a flowchart illustrating the sequence of steps associated with the run length encode function of at least one non-limiting embodiment of the inventions.

Figure 85:
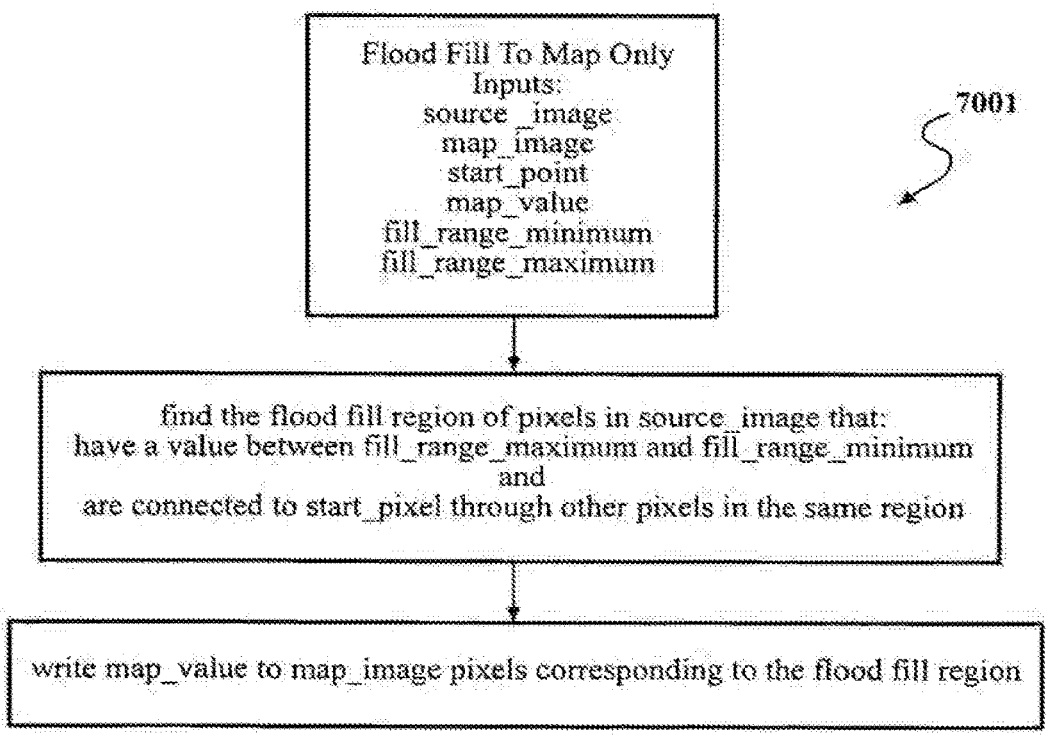

FIG. 85 is a flowchart illustrating the sequence of steps associated with the flood to fill function of at least one non-limiting embodiment of the inventions.

Figure 86:
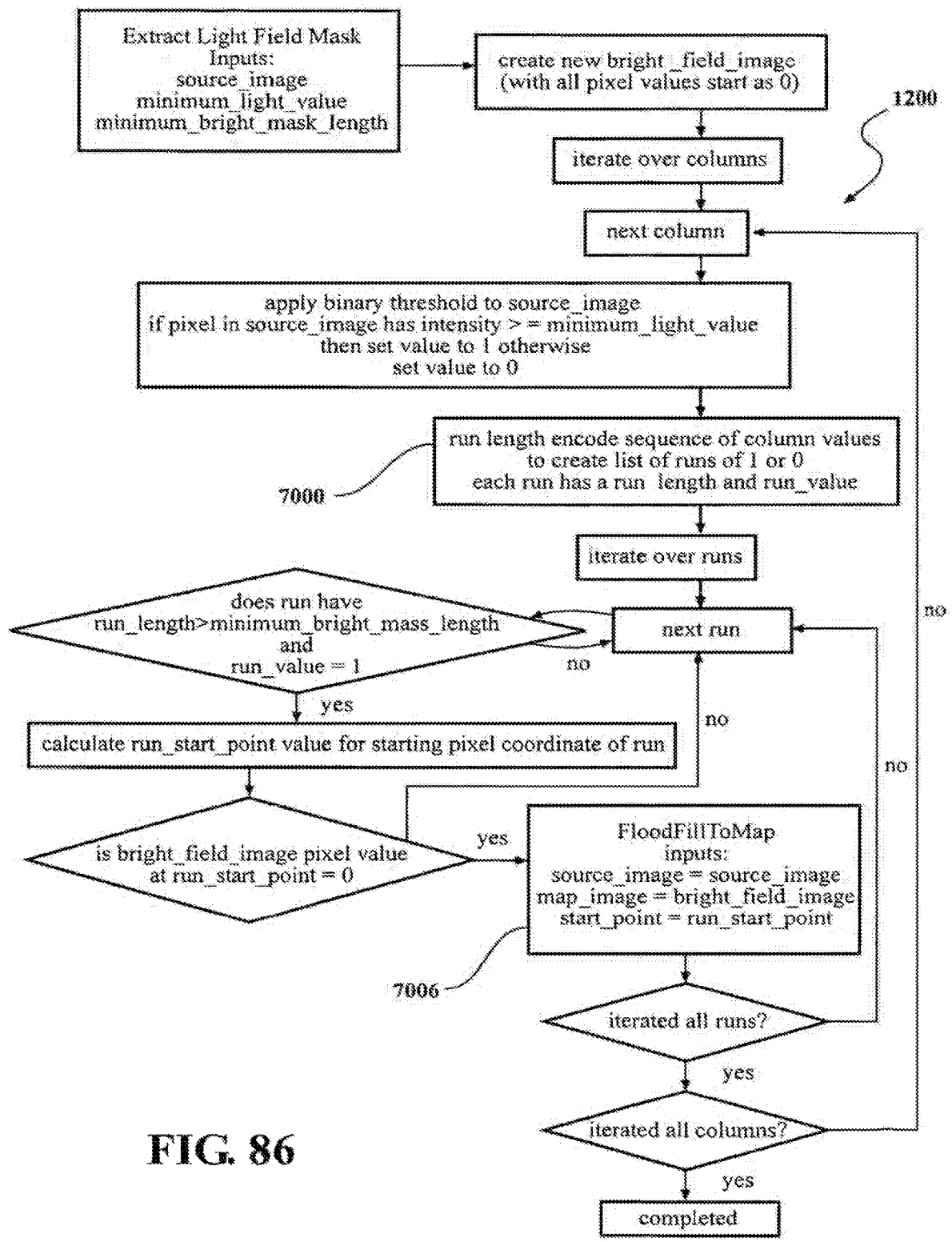

FIG. 86 is a flowchart illustrating the sequence of steps associated with the extraction of light field mask function of at least one non-limiting embodiment of the inventions.

Figure 87:
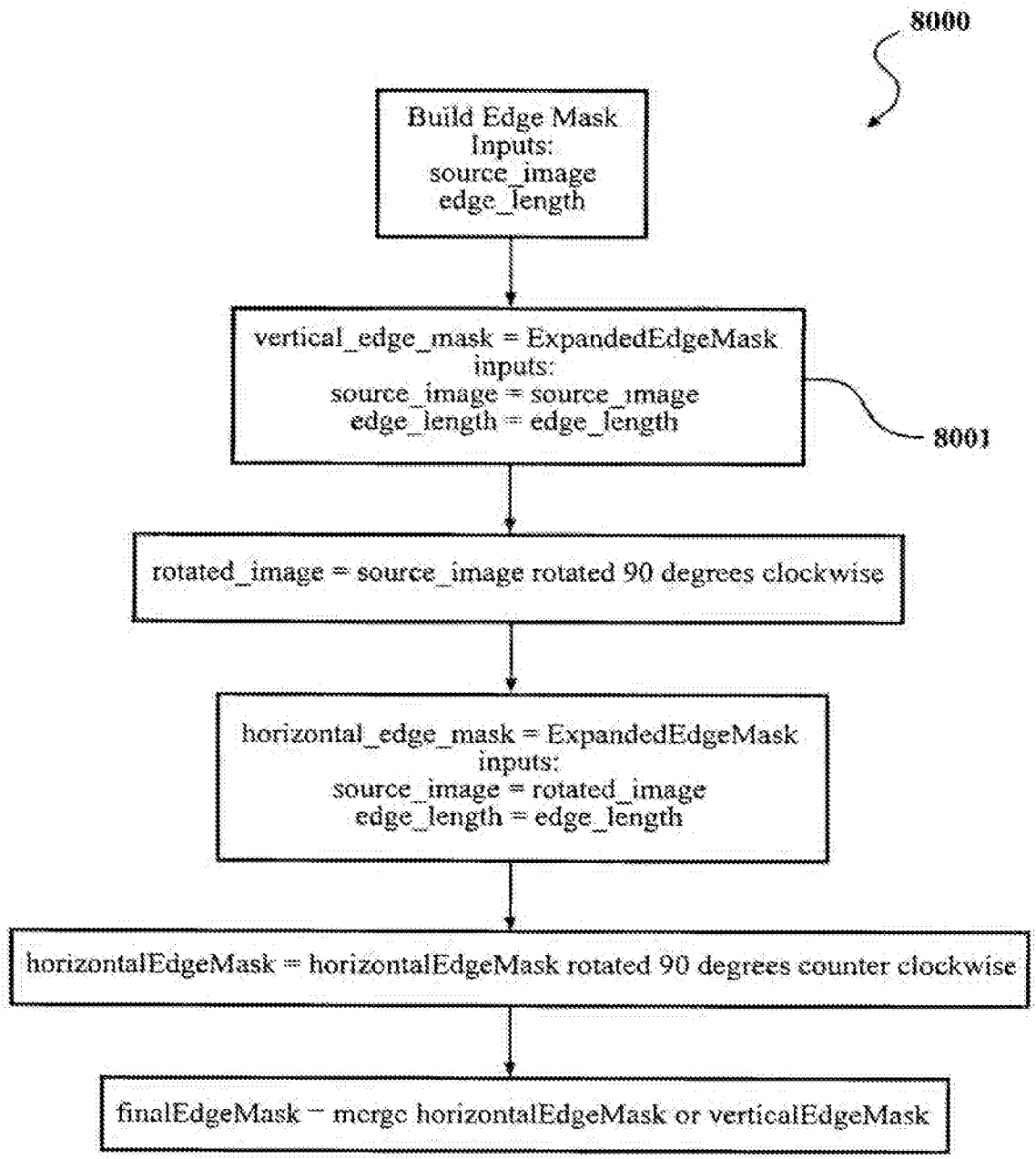

FIG. 87 is a flowchart illustrating the sequence of steps associated with the build edge mask function of at least one non-limiting embodiment of the inventions.

Figure 88:
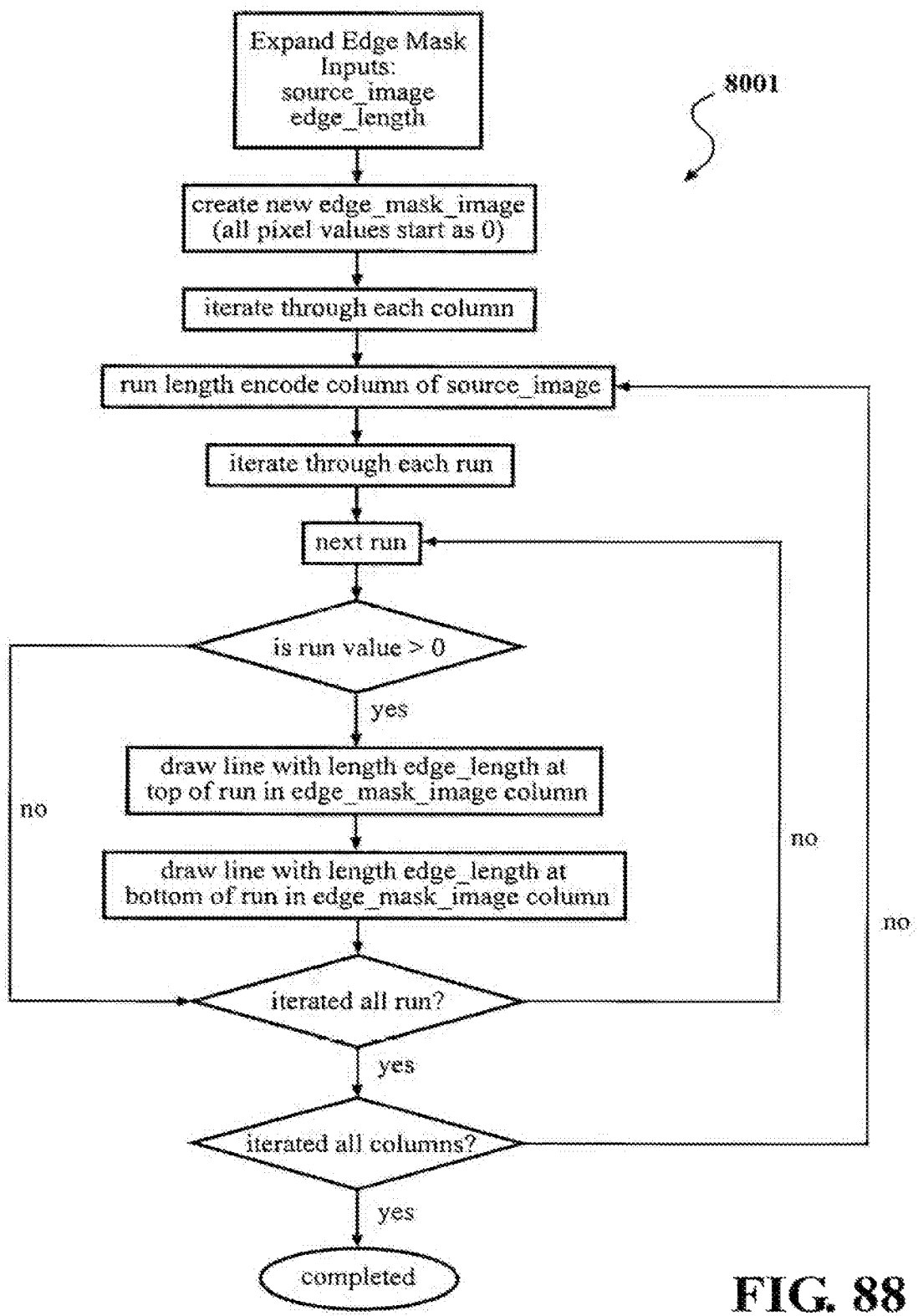

FIG. 88 is a flowchart illustrating the sequence of steps associated with the expand edge mask function of at least one non-limiting embodiment of the inventions.

Figure 89:
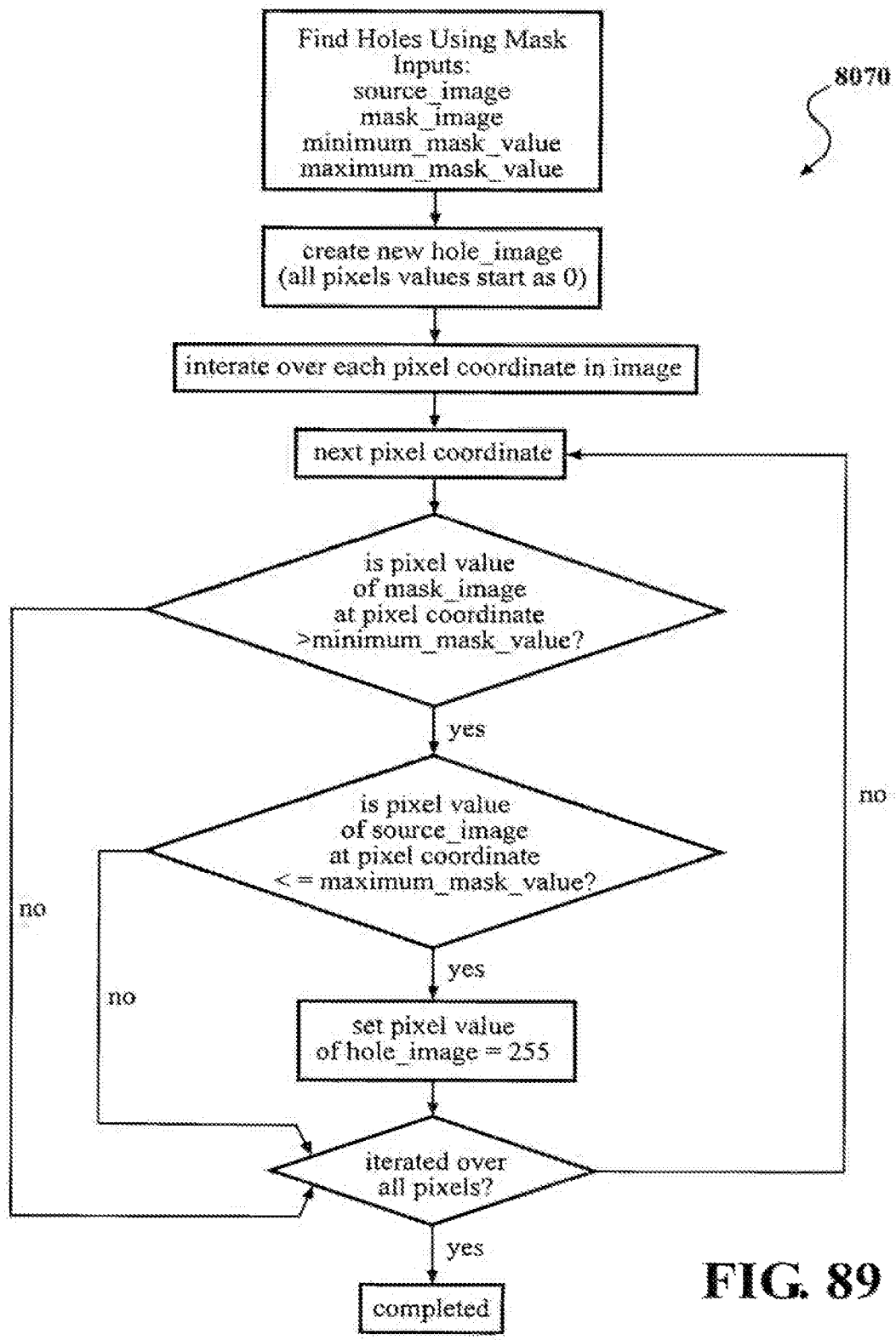

FIG. 89 is a flowchart illustrating the sequence of steps associated with the find holes using mask function of at least one non-limiting embodiment of the inventions.

Figure 90A:
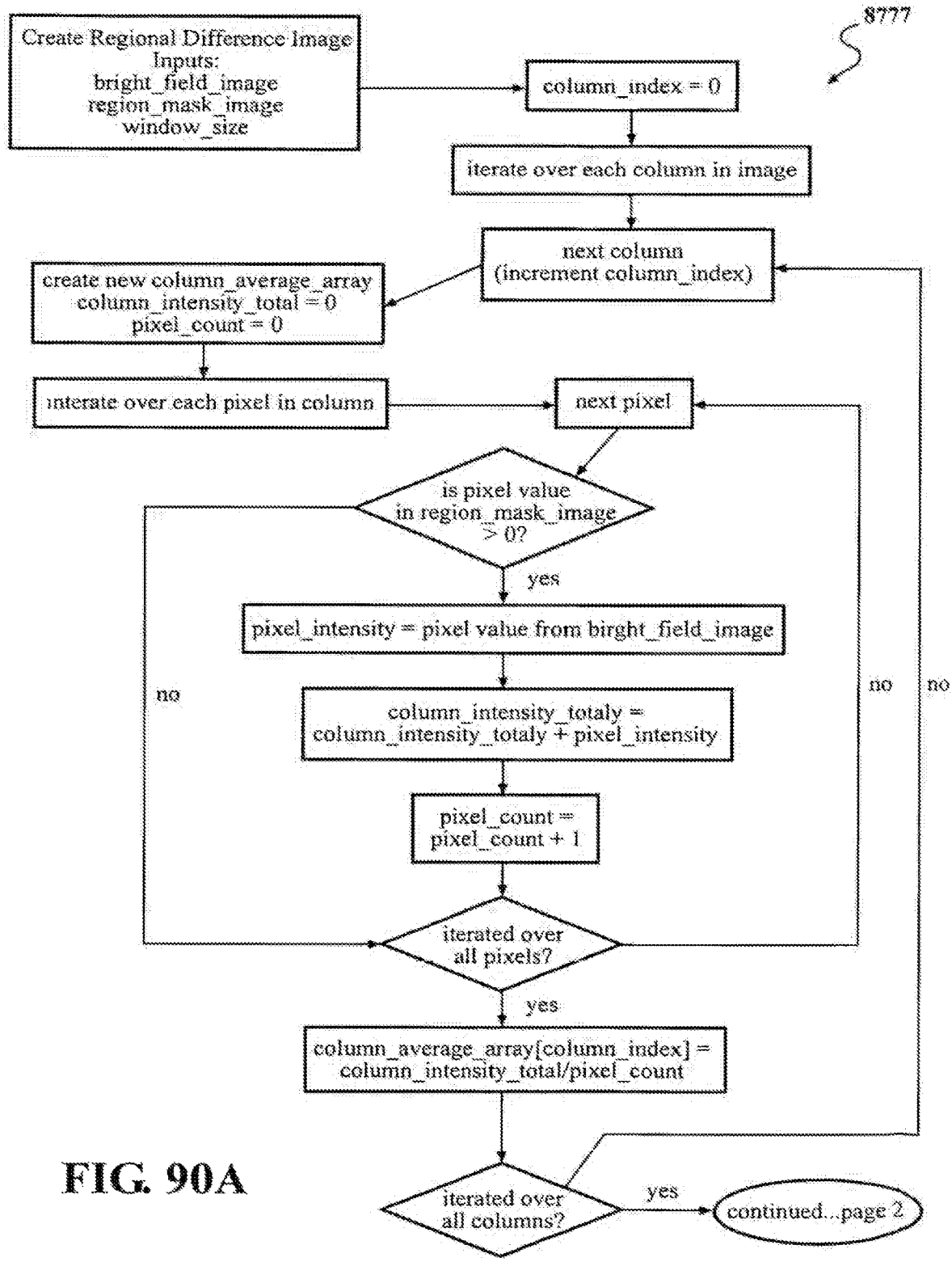
Figure 90B:
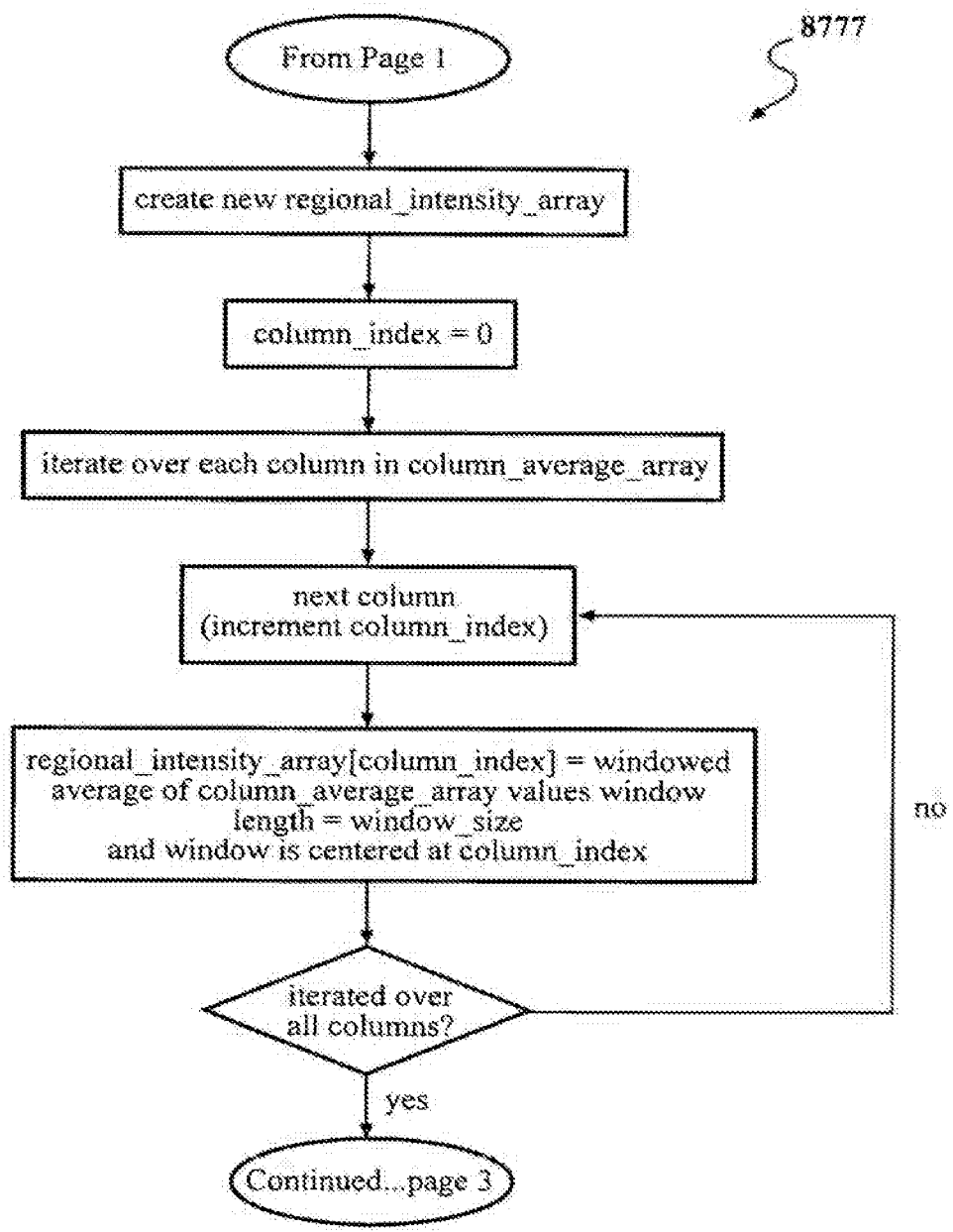
Figure 90C:
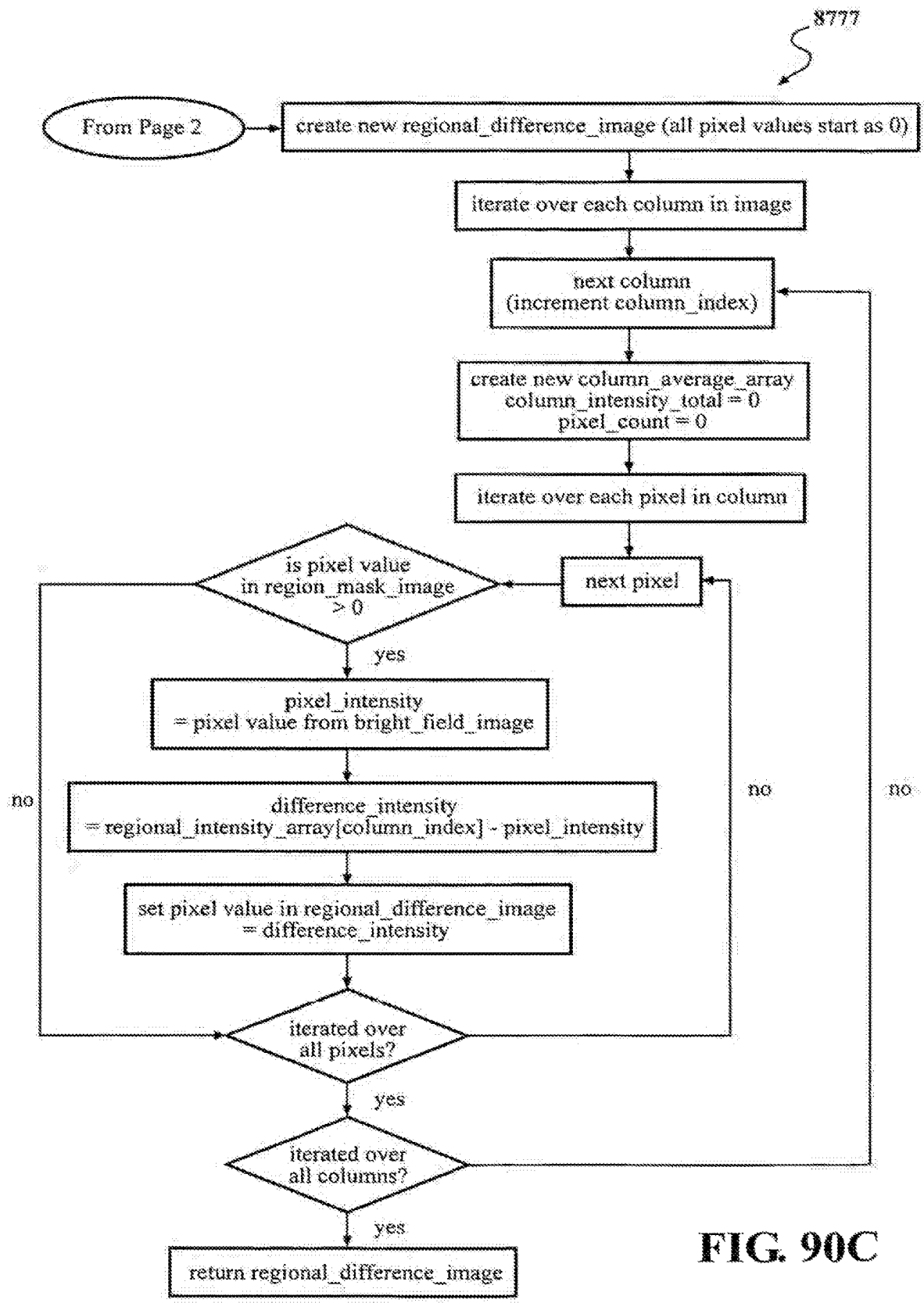

FIGS. 90A, 90B, and 90C are a flowchart illustrating the sequence of steps associated with the create regional difference image function of at least one non-limiting embodiment of the inventions.

Figure 91:
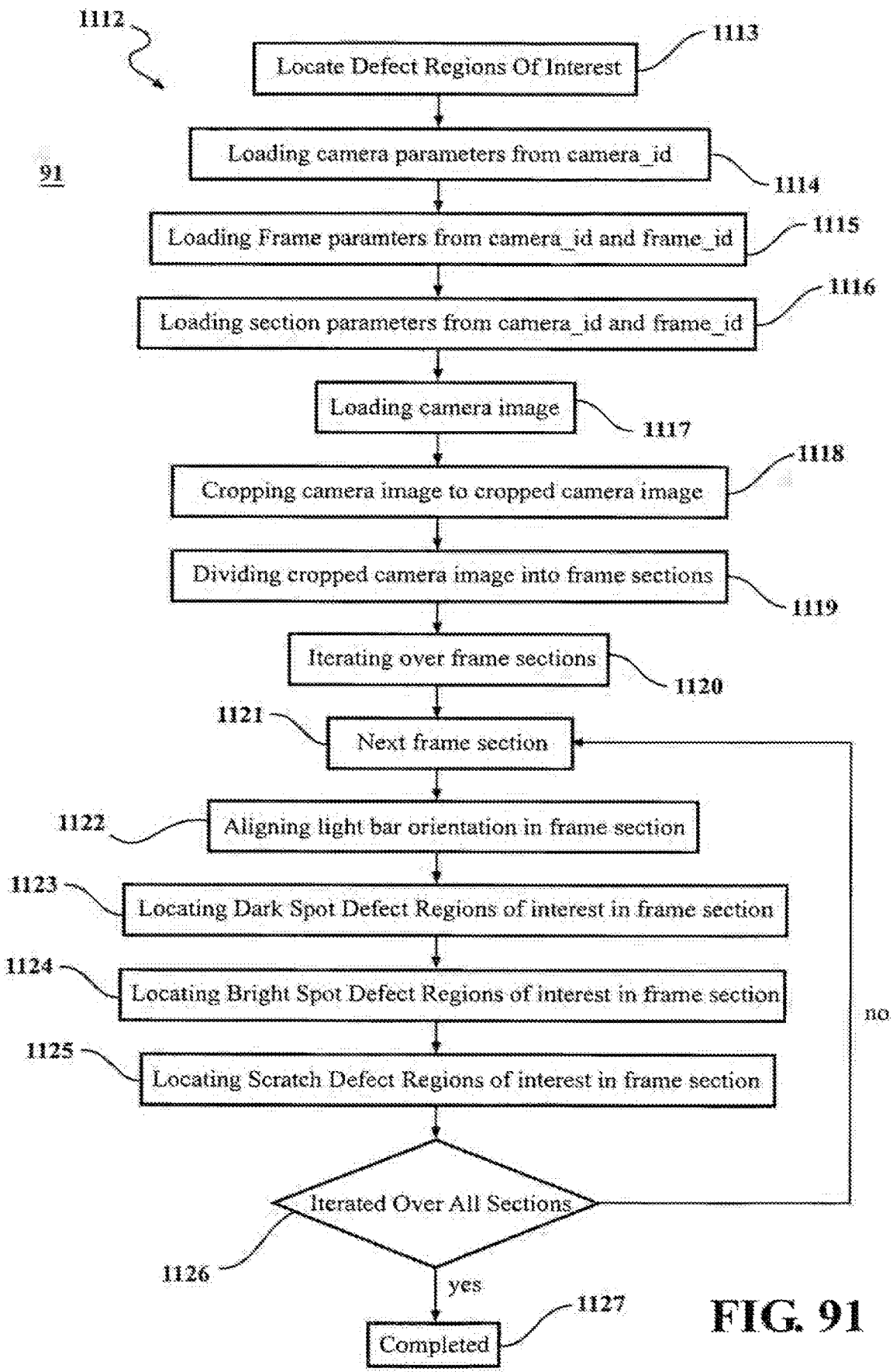

FIG. 91 is a flowchart illustrating the sequence of steps associated with the locate defects regions of interest function of at least one non-limiting embodiment of the inventions.

Figure 92A:
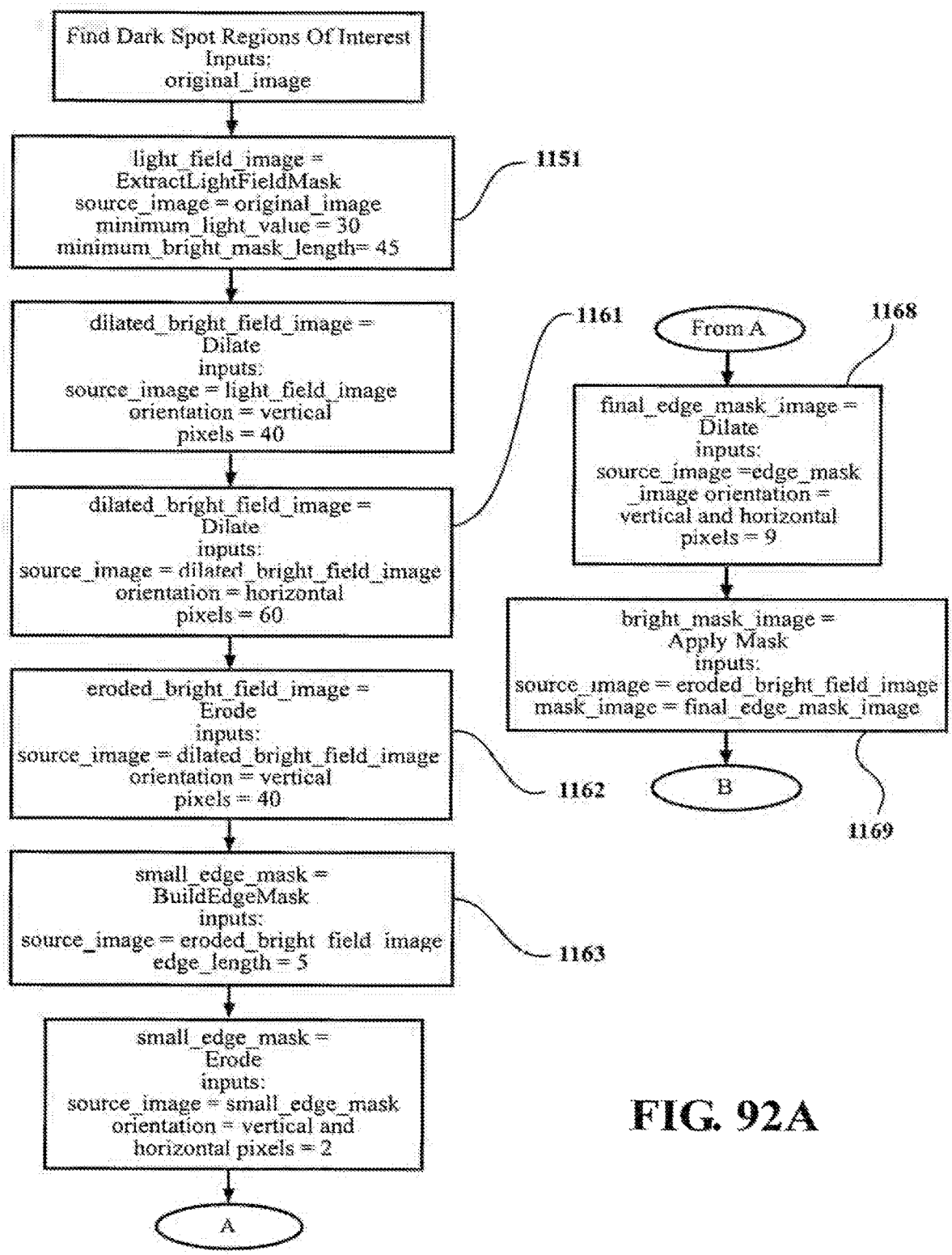
Figure 92B:
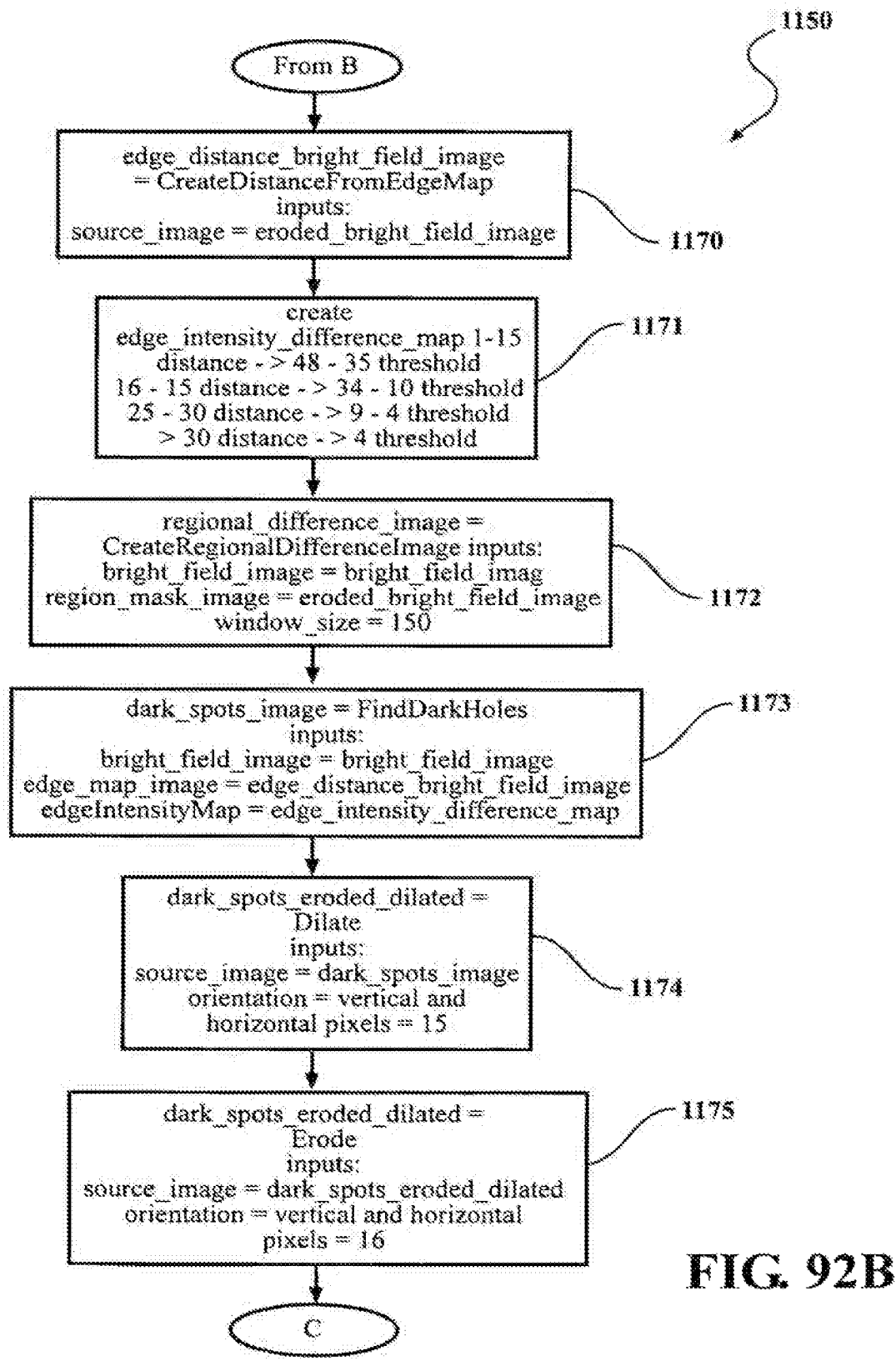
Figure 92C:
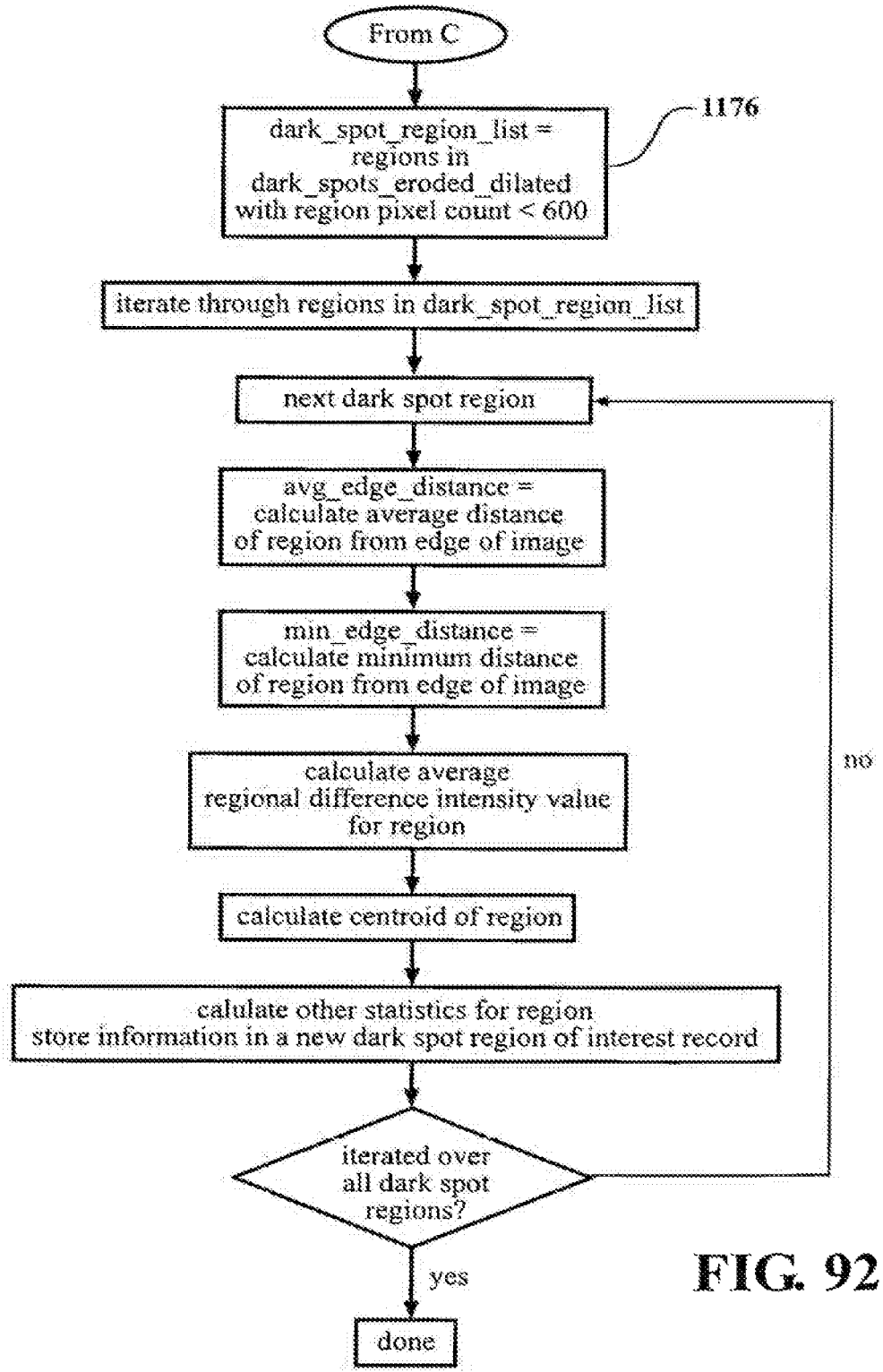

FIGS. 92A, 92B, and 92C are a flowchart illustrating the sequence of steps associated with the find dark spot regions of interest function of at least one non-limiting embodiment of the inventions.

FIGS. 93A-1, 93A-2, 93A-3, 93A-4 and 93B are flowcharts cooperatively illustrating the sequence of steps associated with the find bright spots function of at least one non-limiting embodiment of the inventions.

Figures 1, 93A:
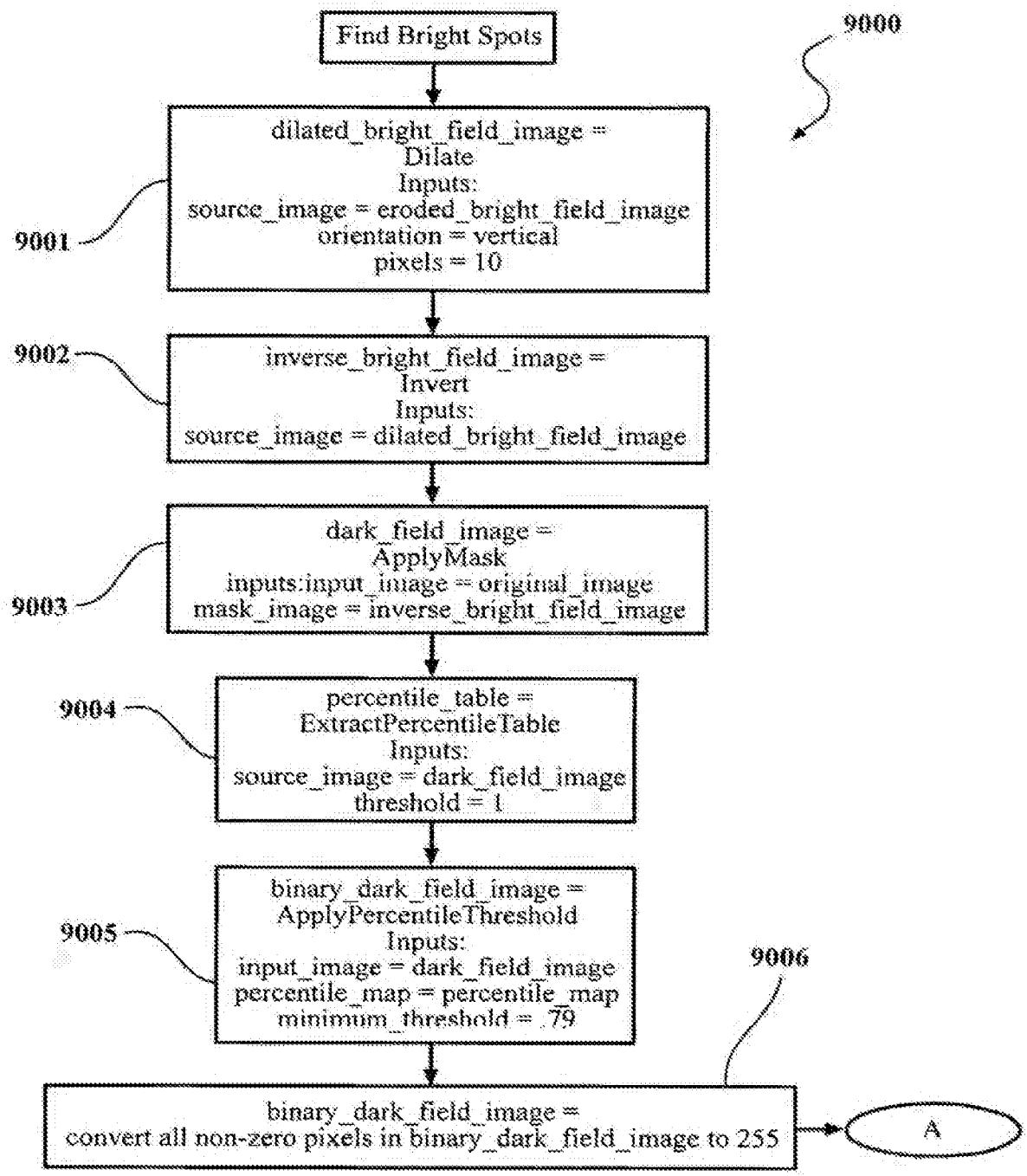
FIG. 1 is a block diagram of an object inspection system which is made in accordance with the teachings of the various embodiments of the inventions.
Figures 2, 93A:
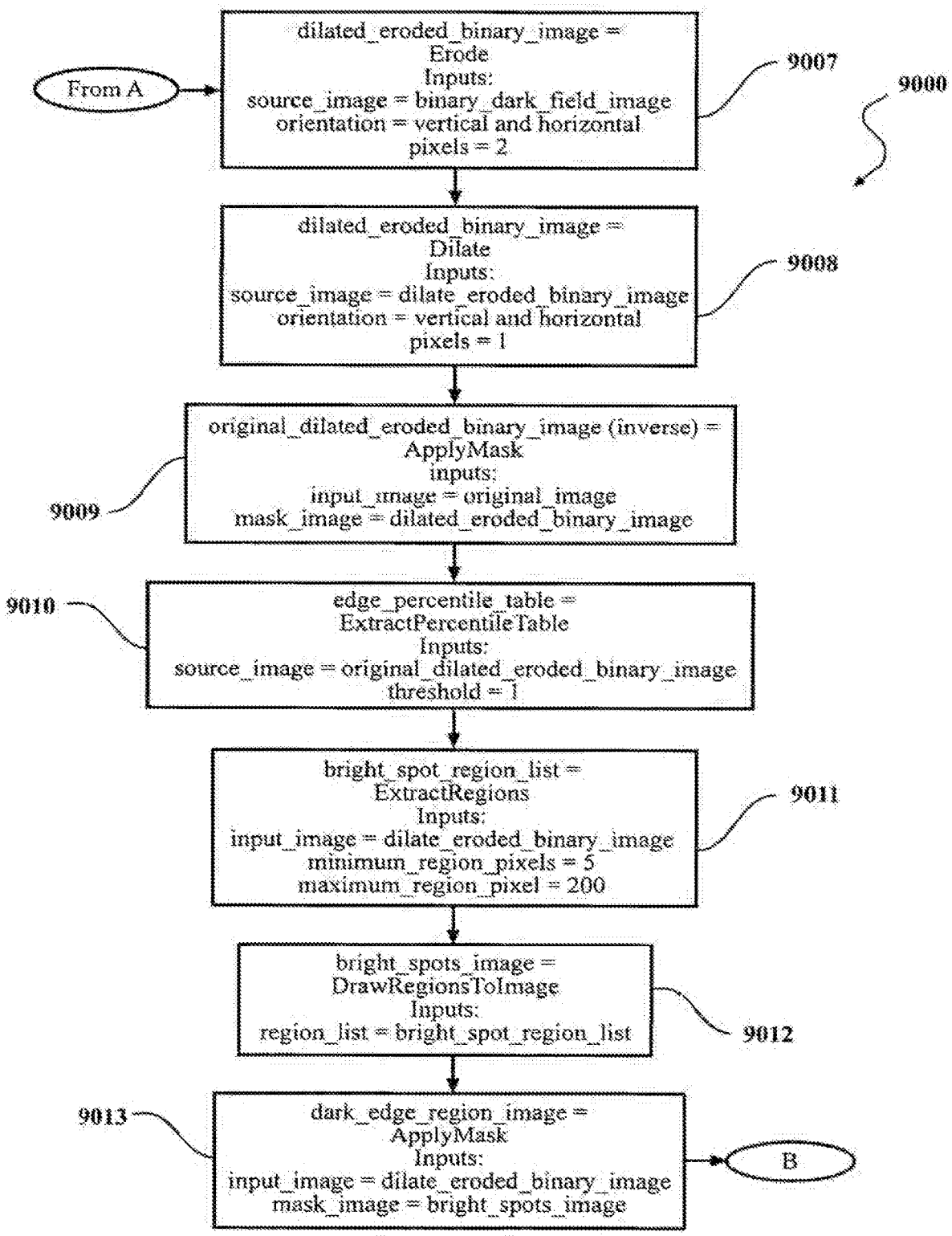
Figures 3, 93A:
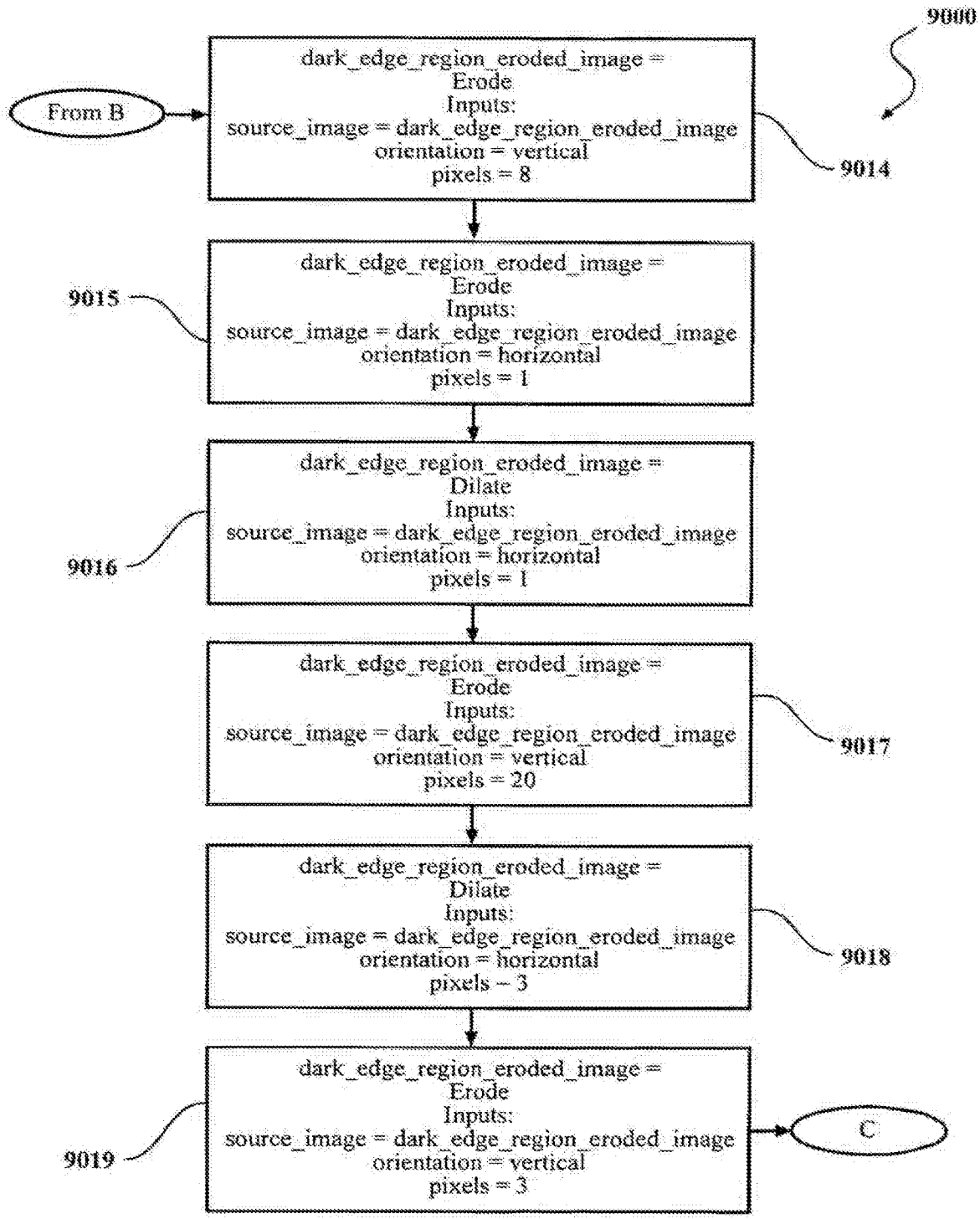
Figures 4, 93A:
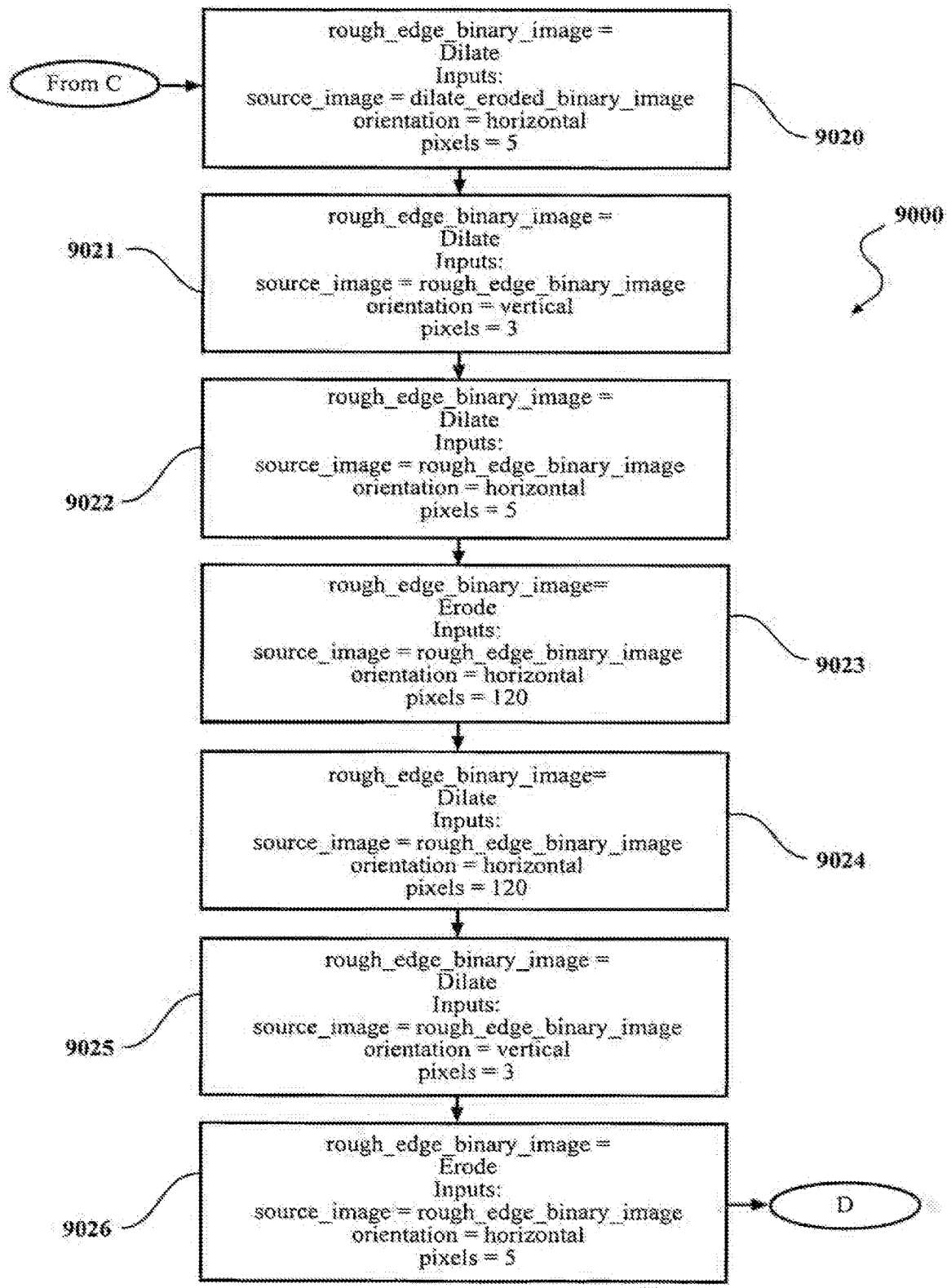
Figure 93B:
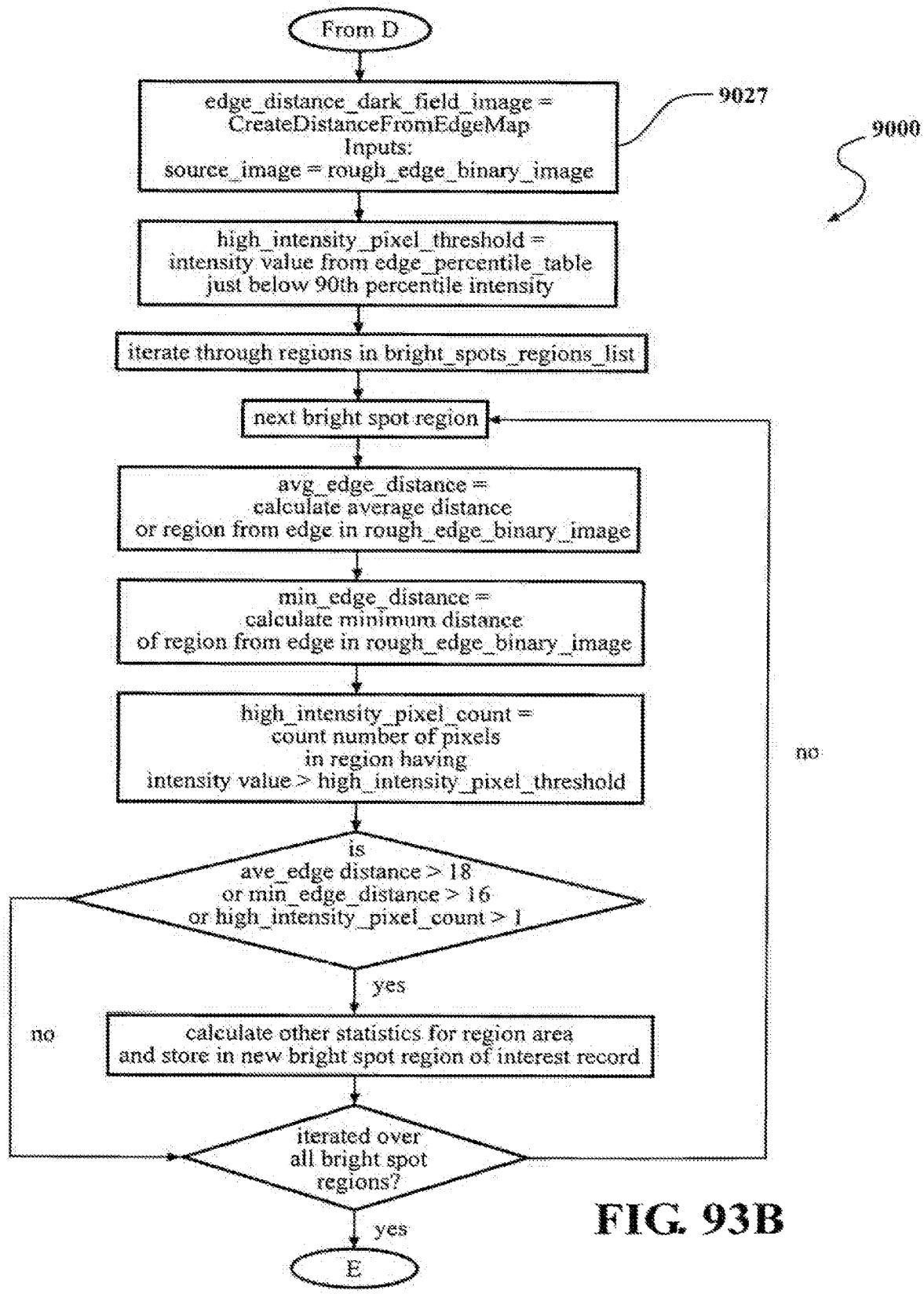
Figure 94:
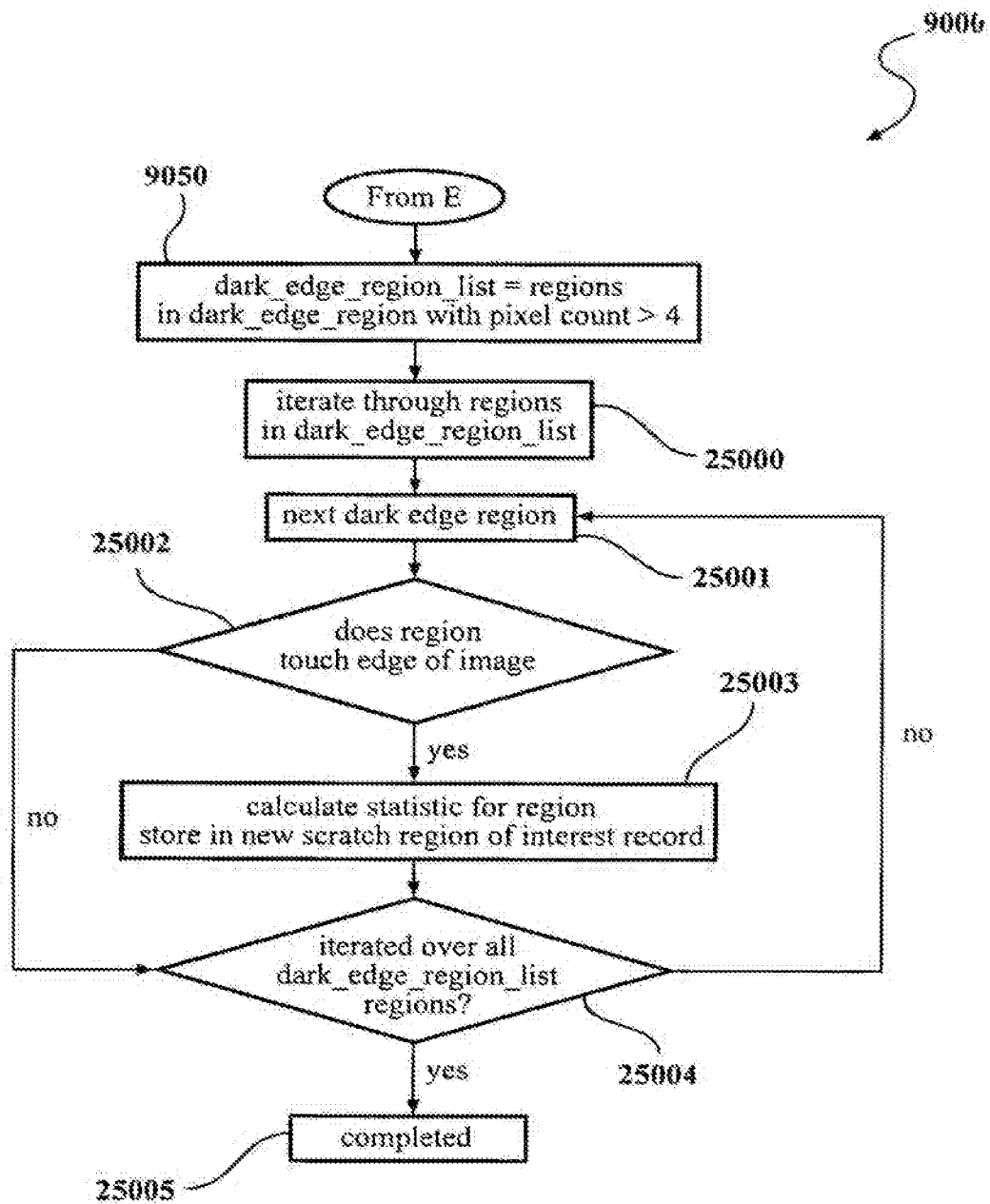

FIG. 94 is a flowchart illustrating the sequence of steps associated with the find bright scratches function of at least one non-limiting embodiment of the inventions and represents part of the overall process of the algorithm set forth in FIGS. 93A-1, 93A-2, 93A-3, 93A-4 and 93B.

Figure 95:
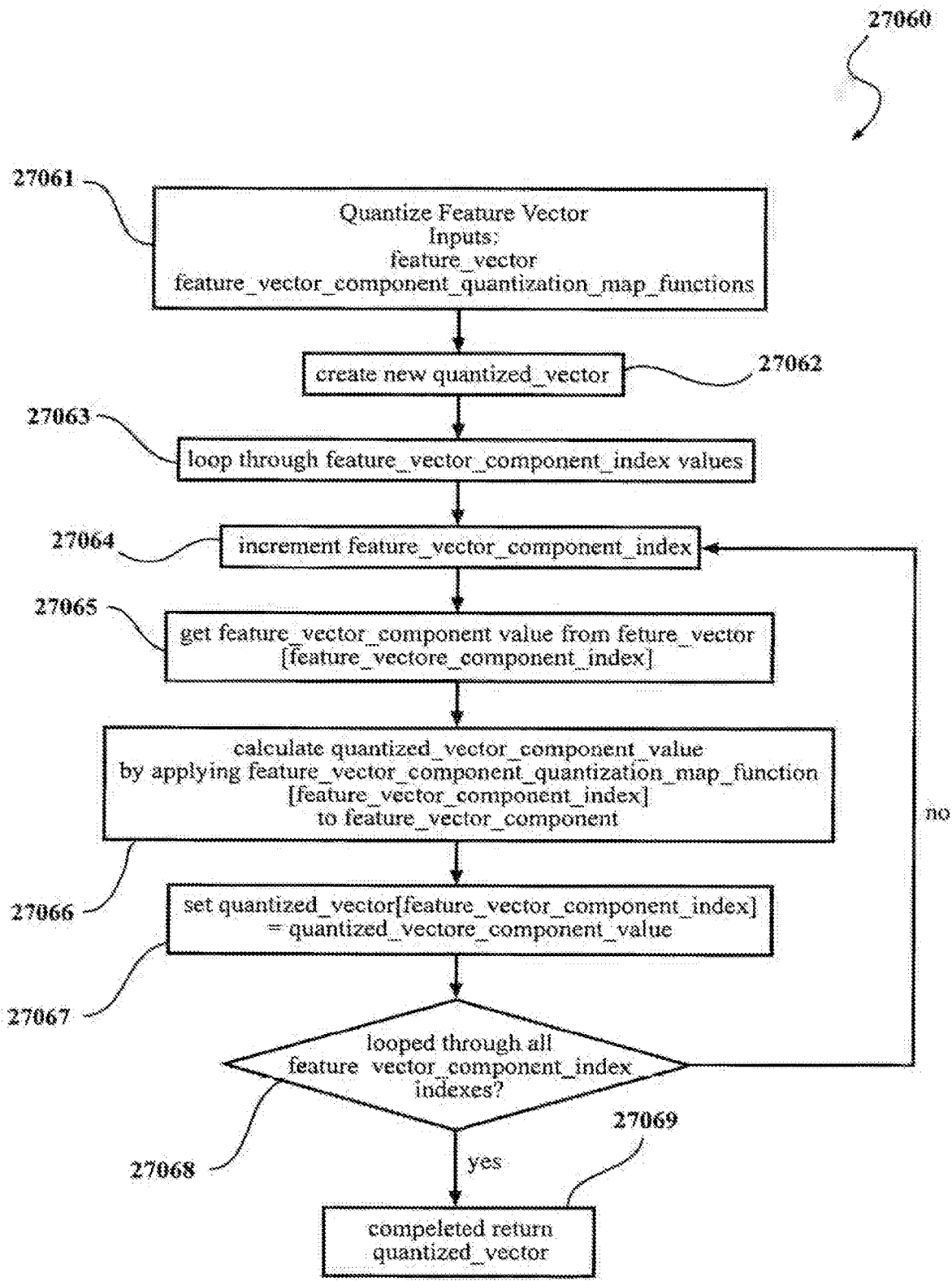

FIG. 95 is a flow chart illustrating the sequence of steps associated with the quantize feature vector function of at least one non-limiting embodiment of the inventions.

Figure 96:
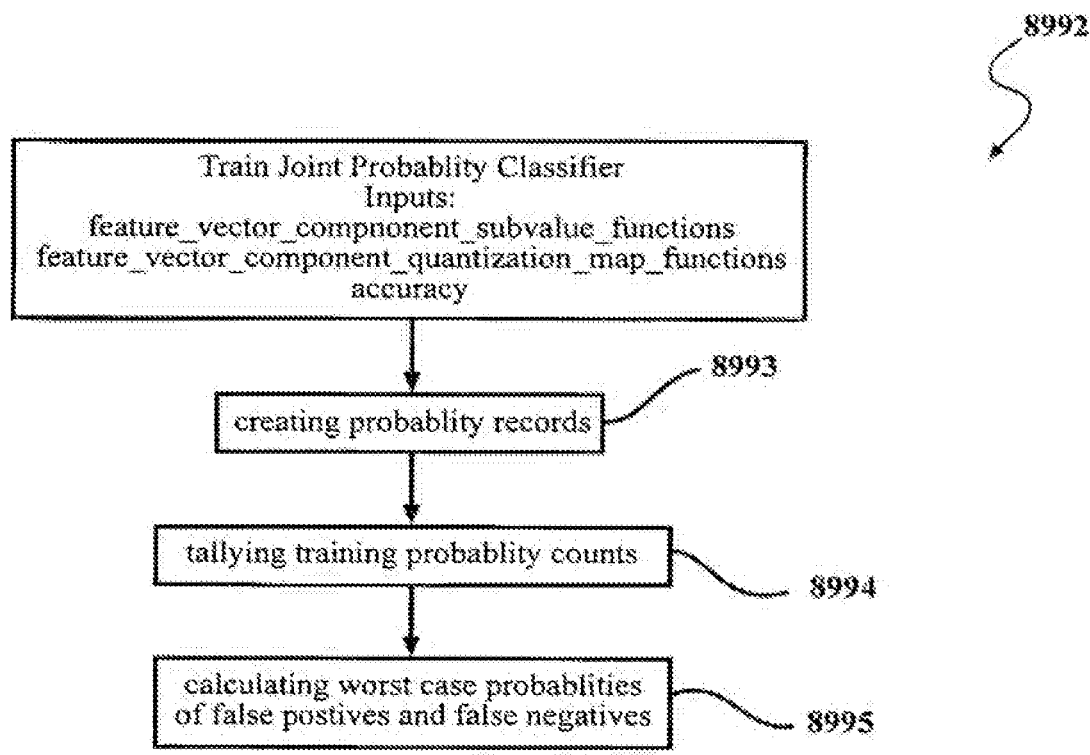

FIG. 96 is a flow chart illustrating the sequence of steps associated with the train joint probability function of at least one non-limiting embodiment of the inventions.

Figure 97:
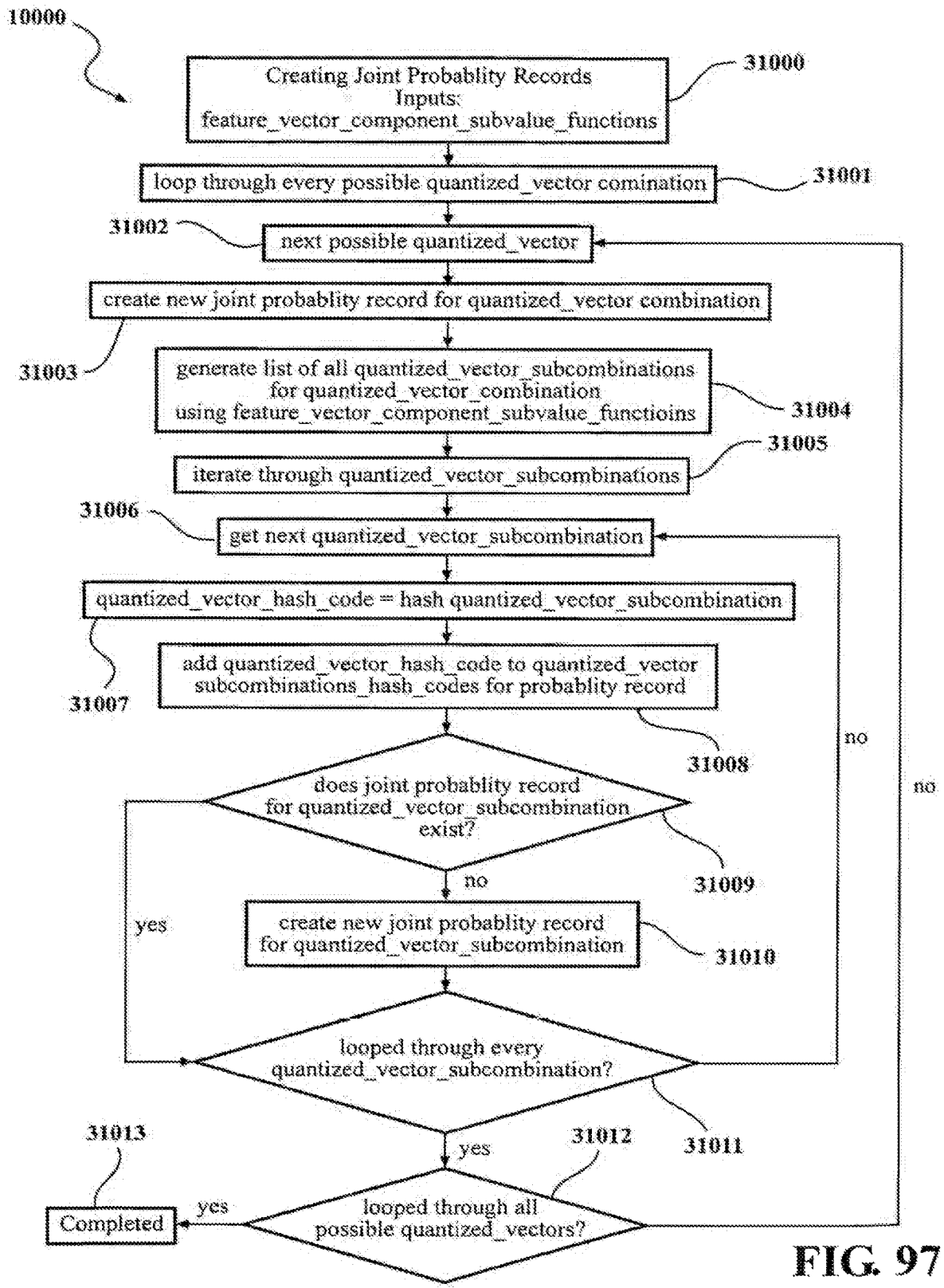

FIG. 97 is a flow chart illustrating the sequence of steps associated with the create joint probability records function of at least one non-limiting embodiment of the inventions.

Figure 98:
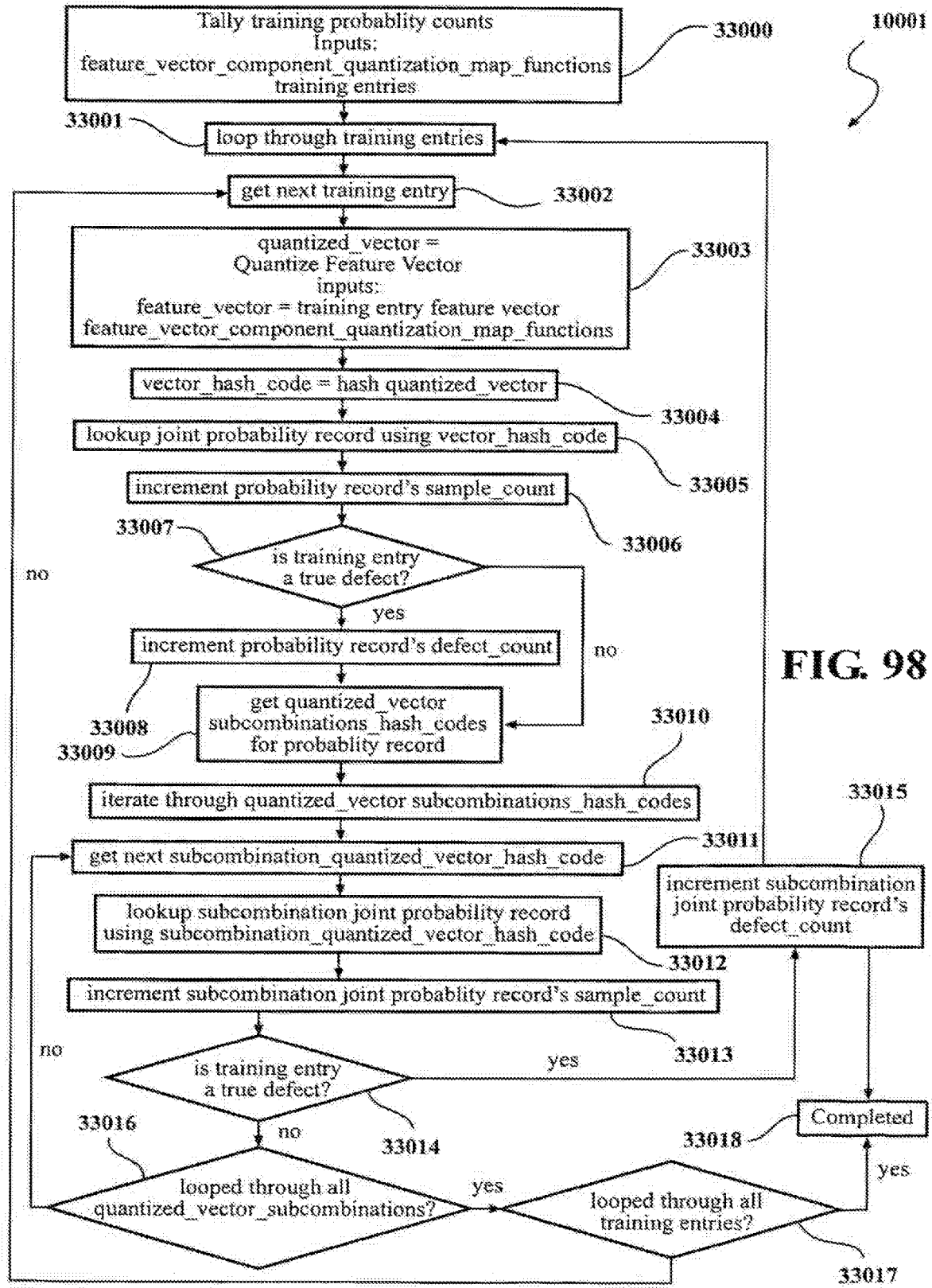

FIG. 98 is a flow chart illustrating the sequence of steps associated with the tally training probability counts function of at least one non-limiting embodiment of the inventions.

Figure 99A:
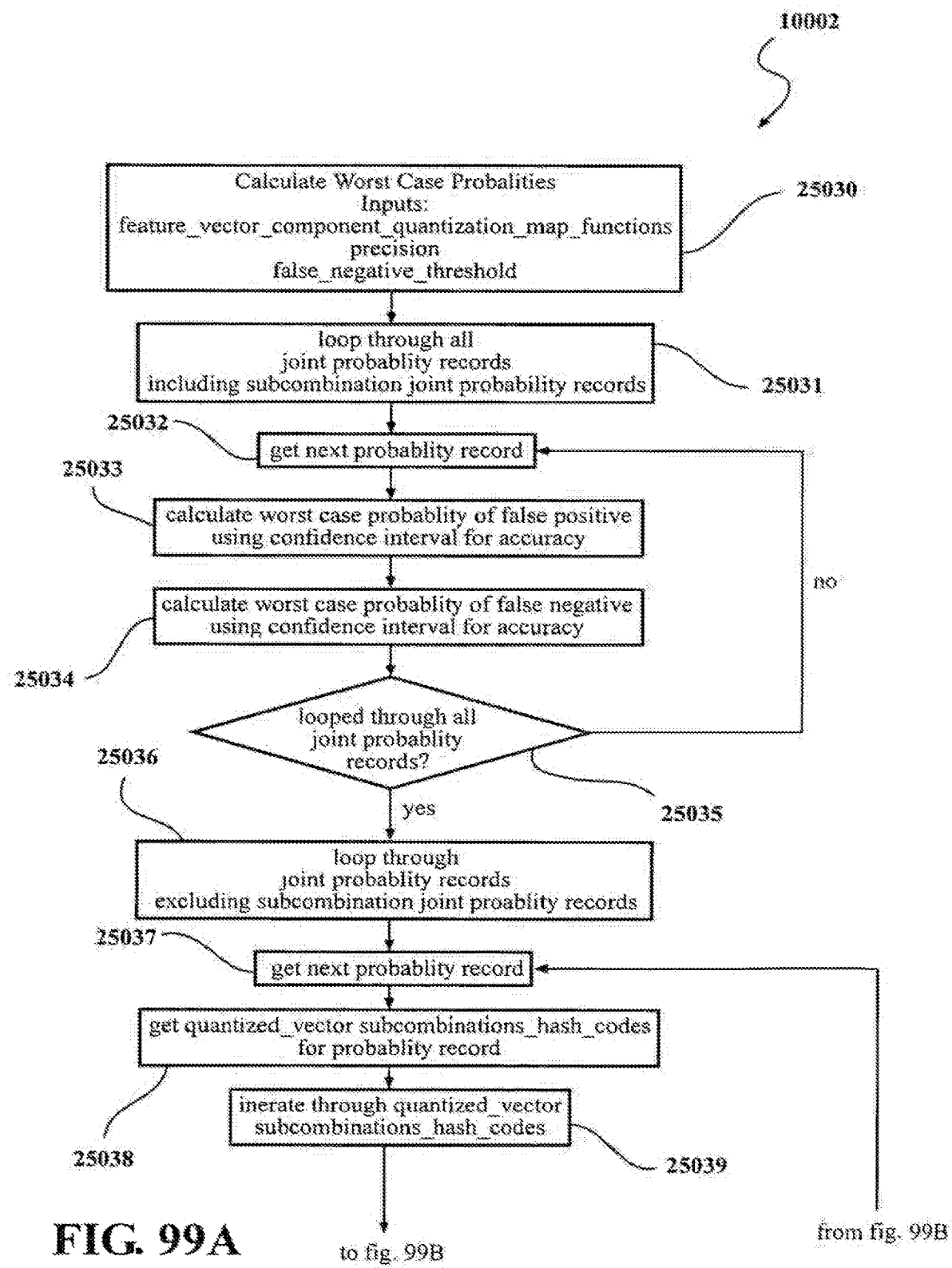
Figure 99B:
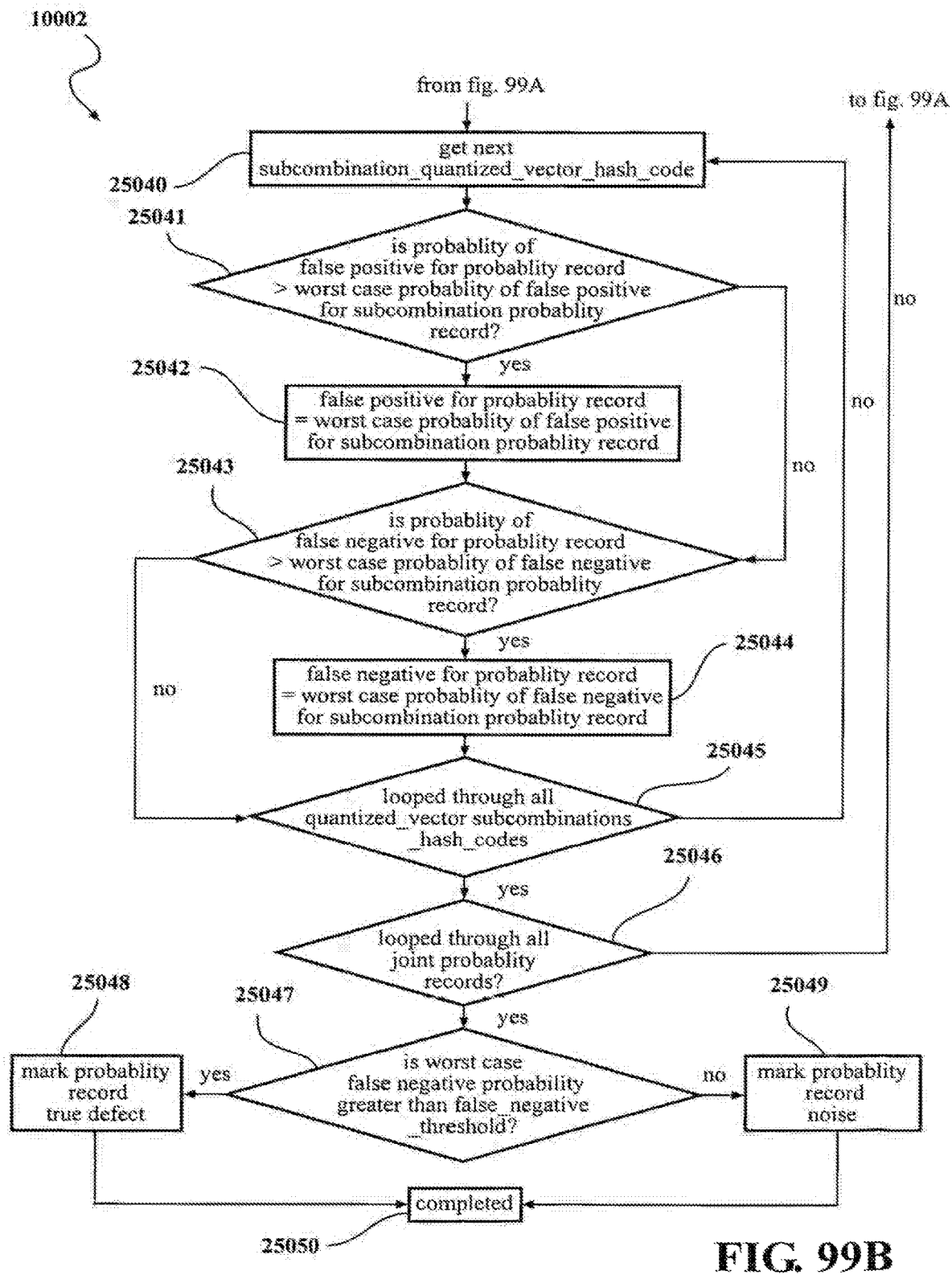

FIGS. 99A and 99B are a flow chart illustrating the sequence of steps associated with the calculate worst case probabilities function of at least one non-limiting embodiment of the inventions.

Figure 100:
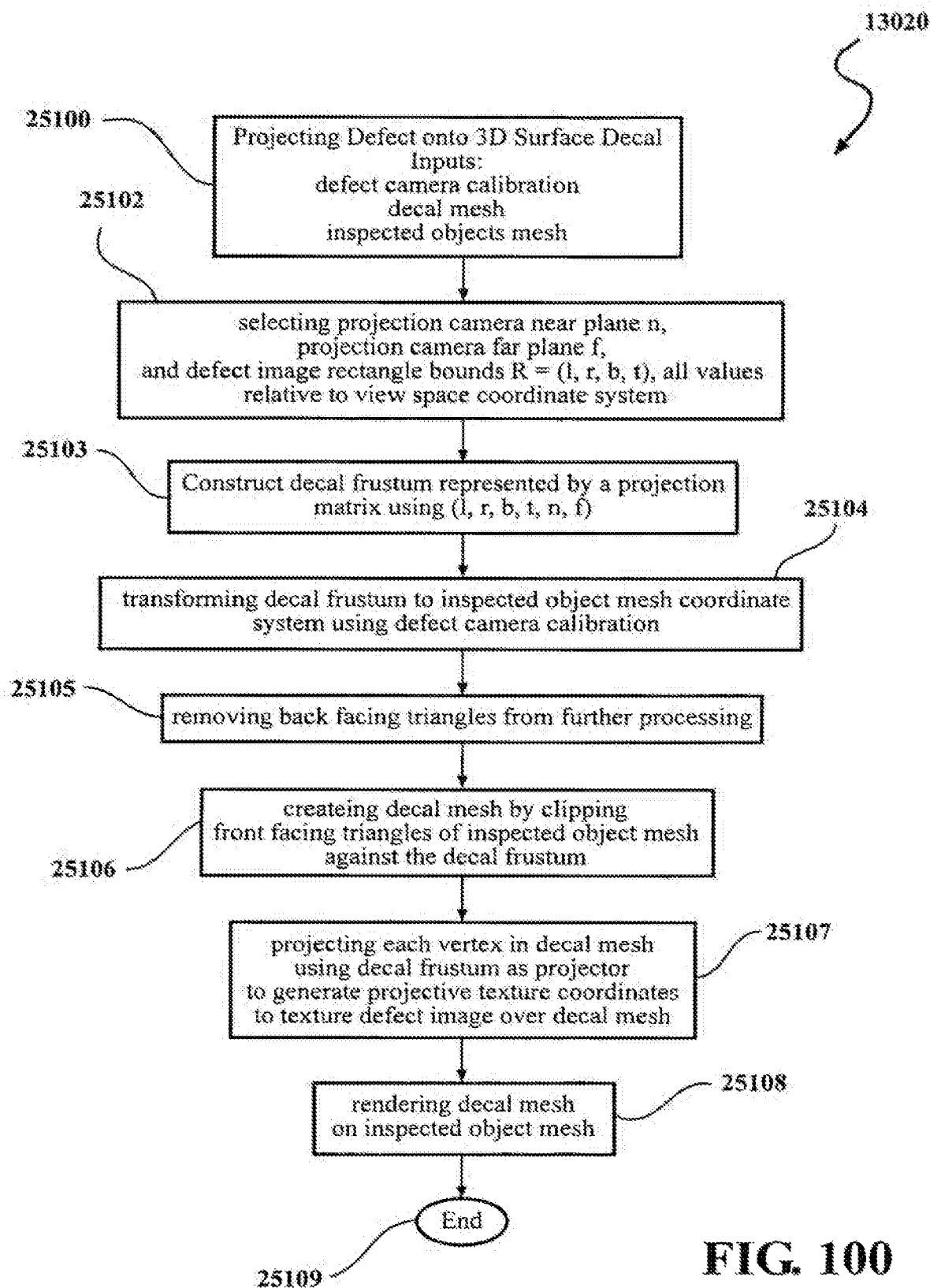

FIG. 100 is a flow chart illustrating the sequence of steps associated with the projecting defects onto three dimensional surface function of at least one non-limiting embodiment of the invention.

Figure 101:
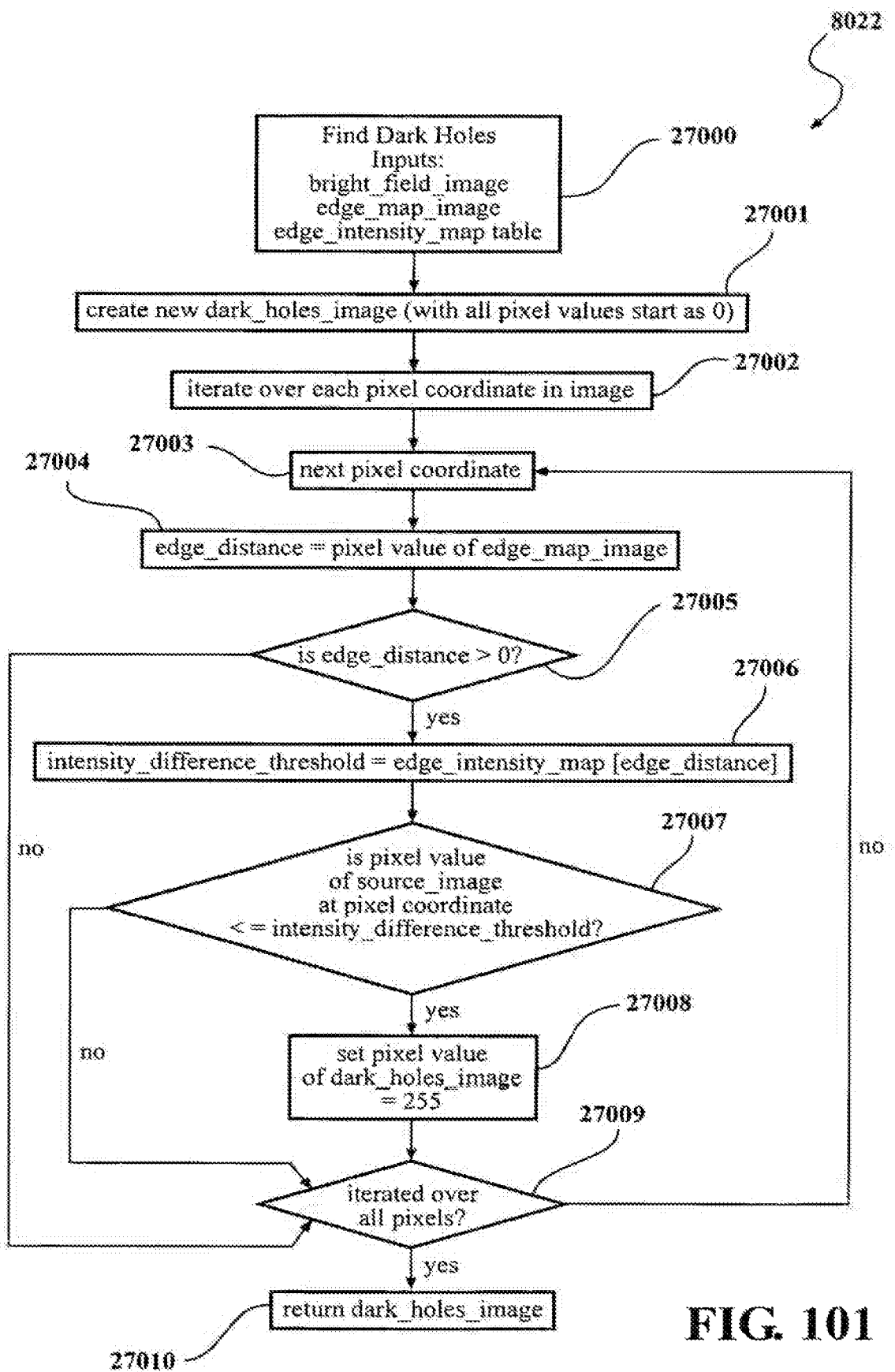

FIG. 101 is a flow chart illustrating the sequence of steps associated with the find dark holes function of at least one non-limiting embodiment of the inventions.

Figure 102:
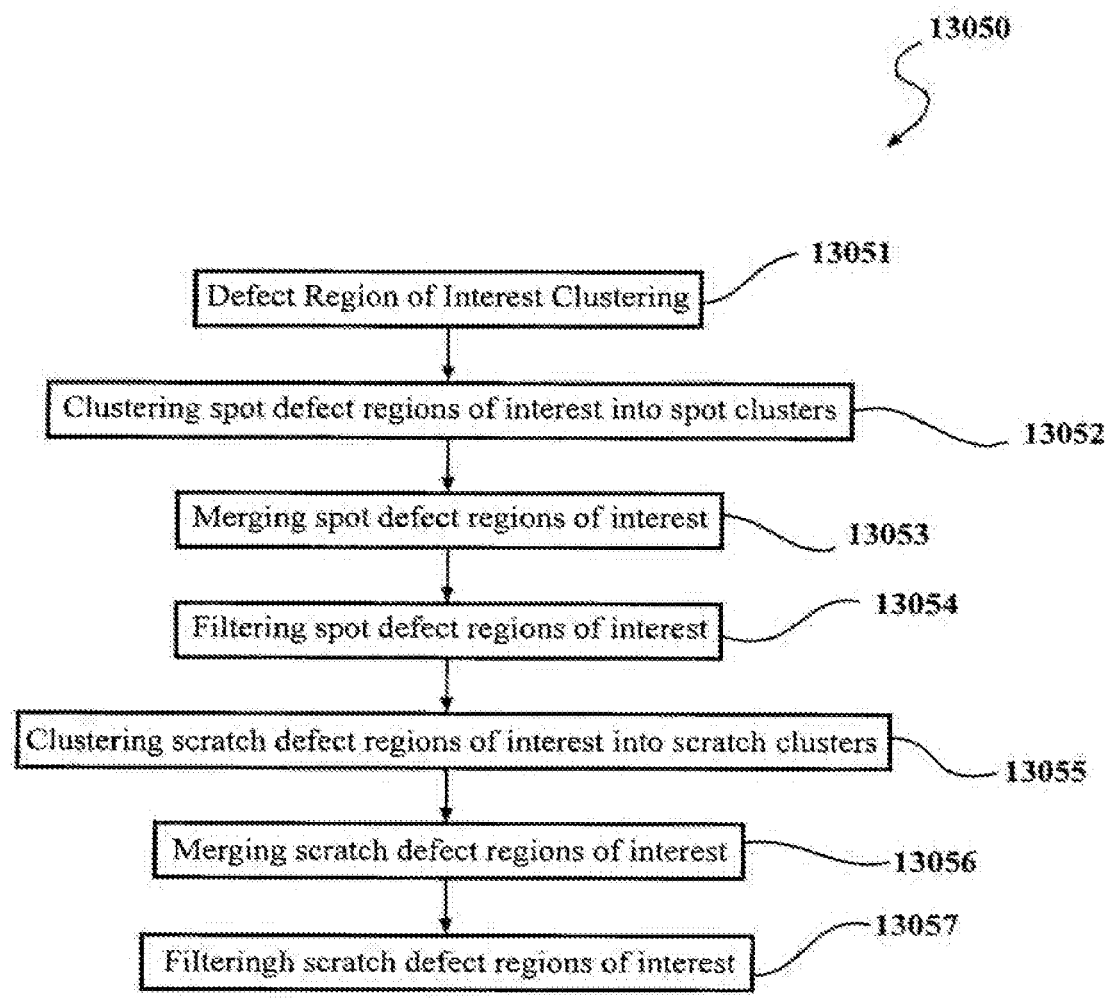

FIG. 102 is a flow chart illustrating the sequence of steps associated with the clustering function of at least on non-limiting embodiment of the inventions.

Figure 103:
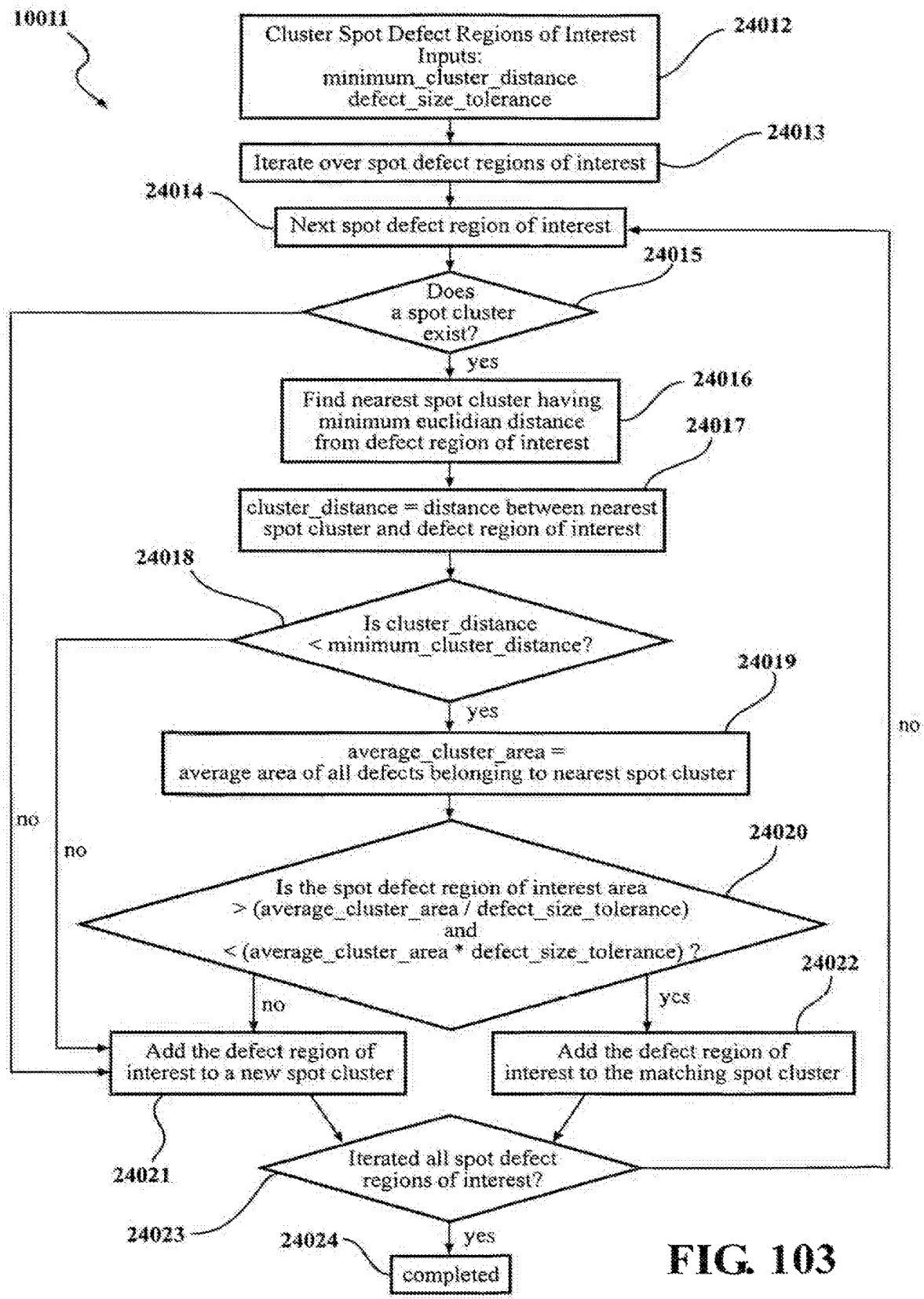

FIG. 103 is a flow chart illustrating the sequence of steps associated with the clustering spot defect regions of interest function of at least one non-limiting embodiment of the inventions.

Figure 104:
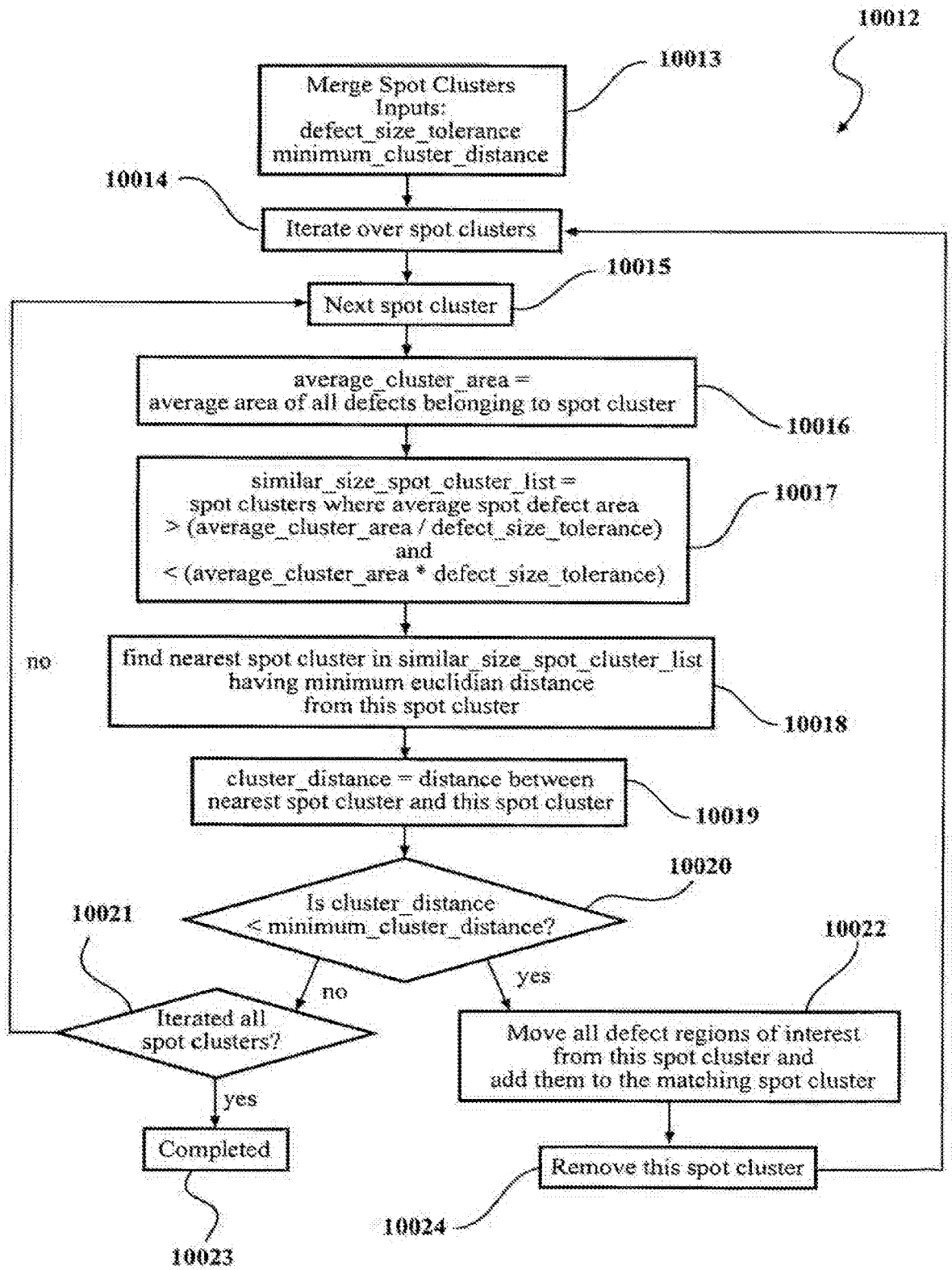

FIG. 104 is a flow chart illustrating the sequence of steps associated with the merge spot clusters function of at least one non-limiting embodiment of the inventions.

Figure 105:
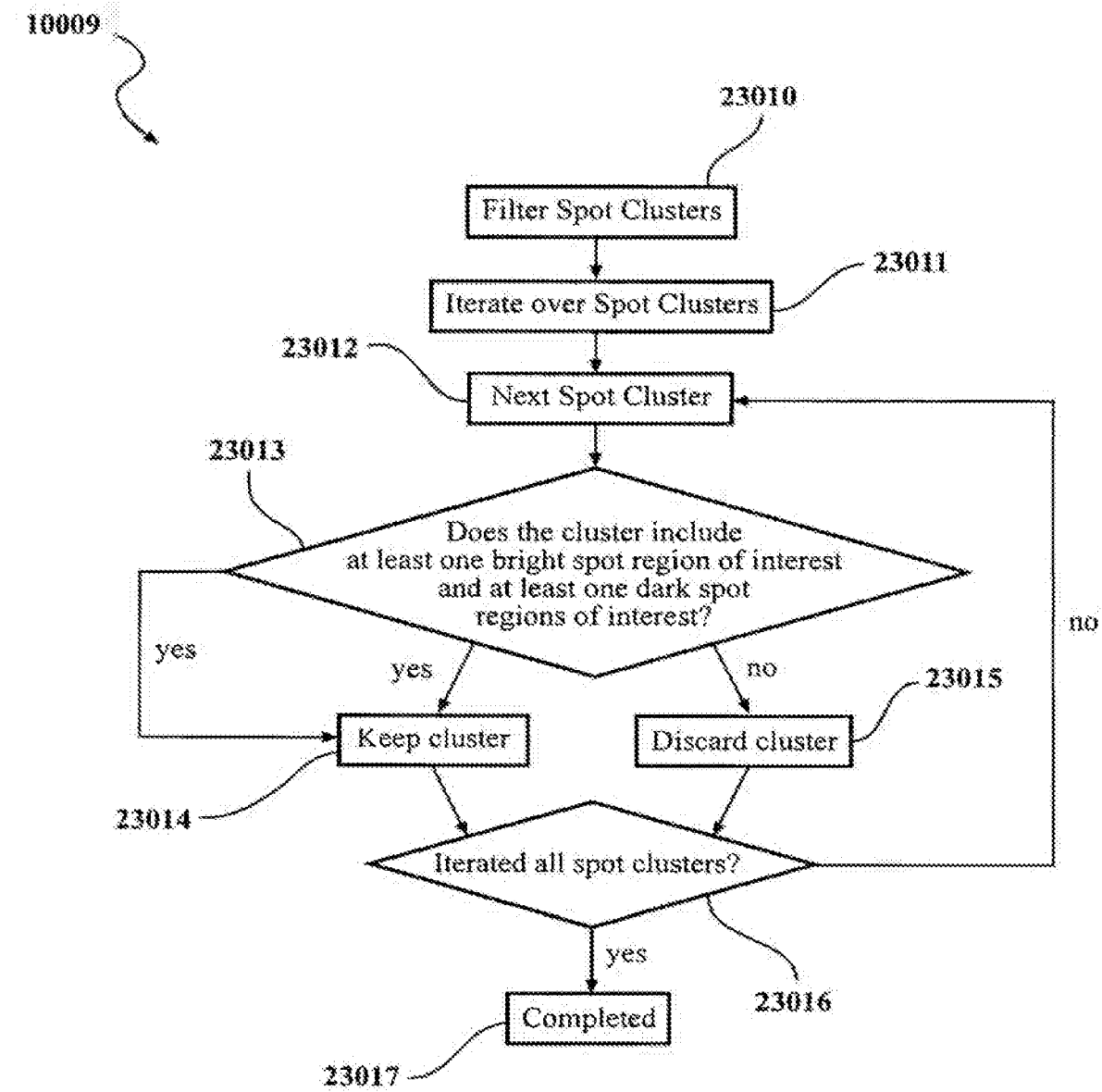

FIG. 105 is a flow chart illustrating the sequence of steps associated with the filter spot clusters function of at least one non-limiting embodiment of the inventions.

Figure 106:
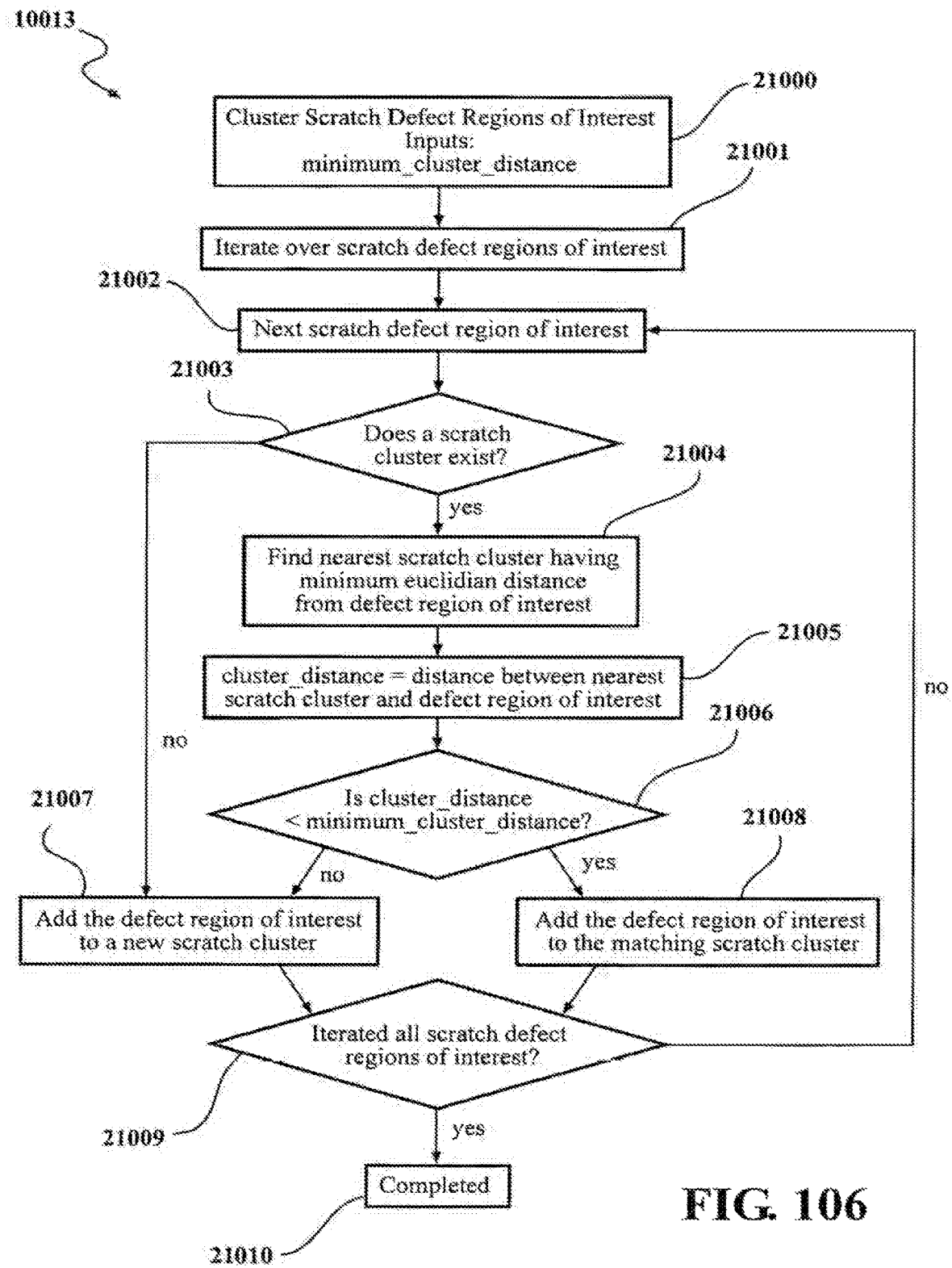

FIG. 106 is a flow chart illustrating the sequence of steps associated with the cluster scratch defect regions of interest function of at least one non-limiting embodiment of the inventions.

Figure 107:
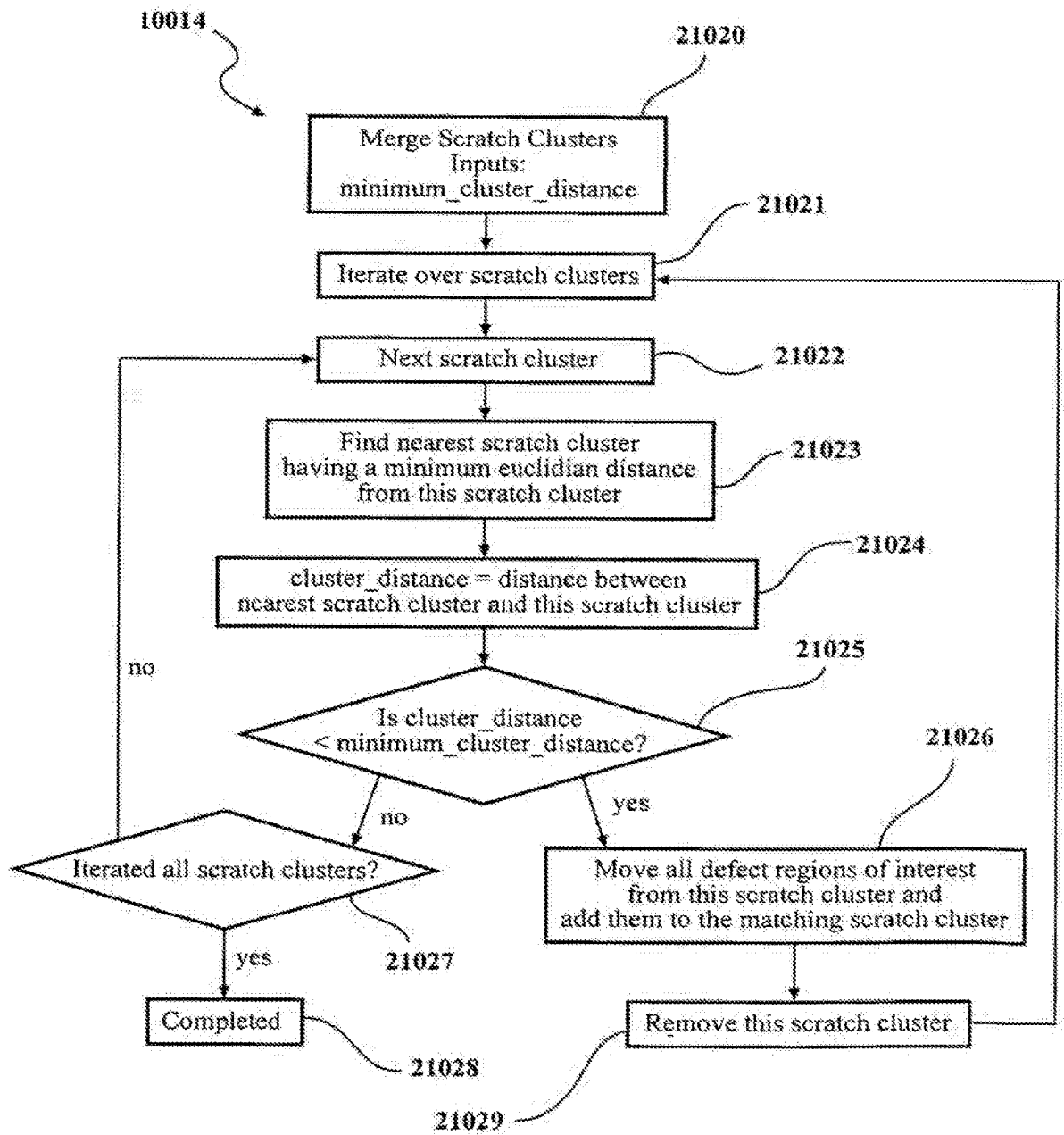

FIG. 107 is a flowchart illustrating the sequence of steps associated with the merge scratch clusters function of at least one non-limiting embodiment of the inventions.

Figure 108:
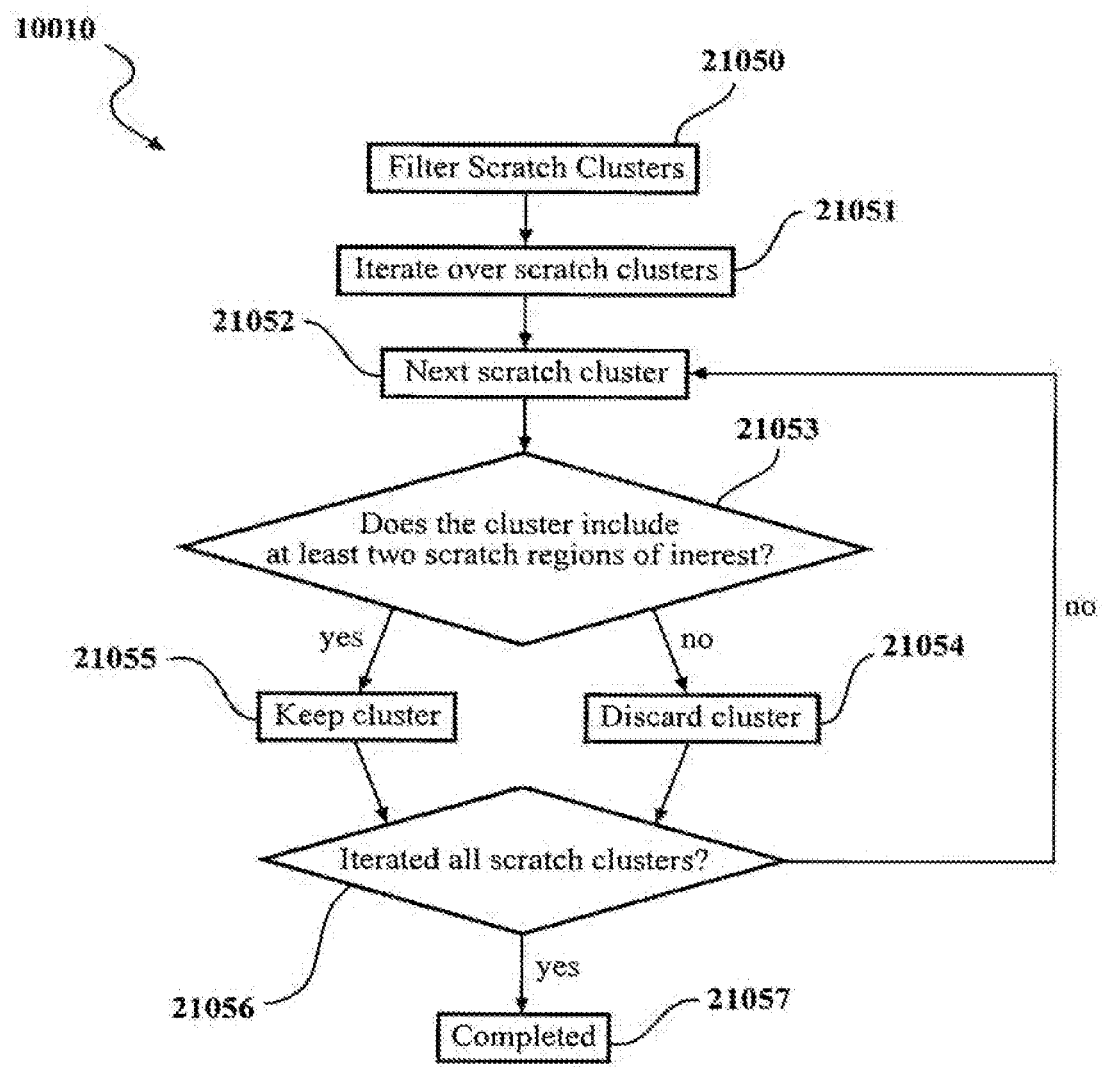

FIG. 108 is a flow chart illustrating the sequence of steps associated with the filter scratch clusters function of at least one non-limiting embodiment of the inventions.

Figure 109:
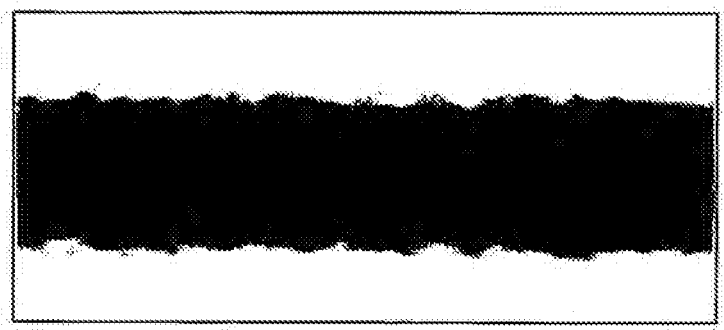

FIG. 109 is an exemplary light bar image in an area with a mild orange peel.

Figure 110:
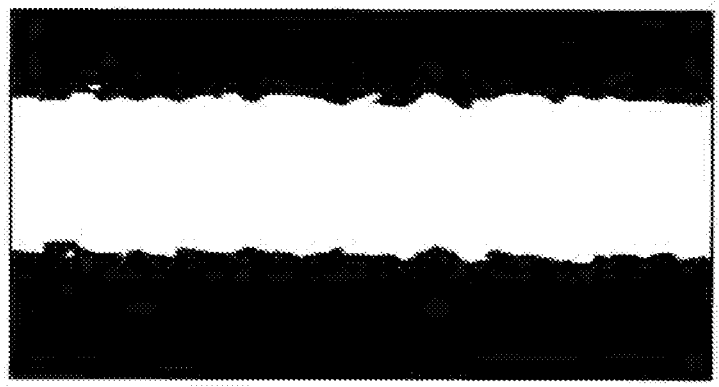

FIG. 110 is an exemplary out edge image.

Figure 111:
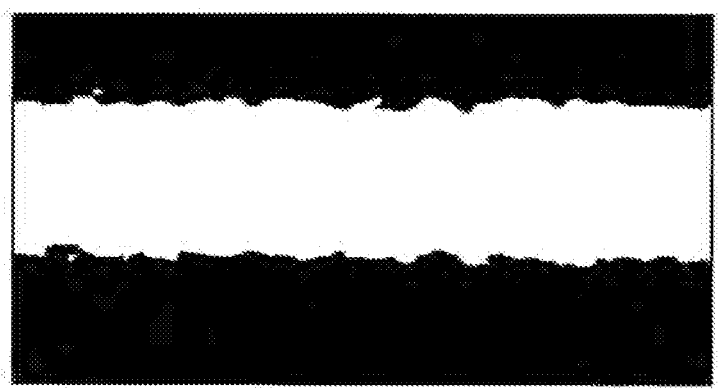

FIG. 111 is an exemplary inner edge image.

Figure 112:
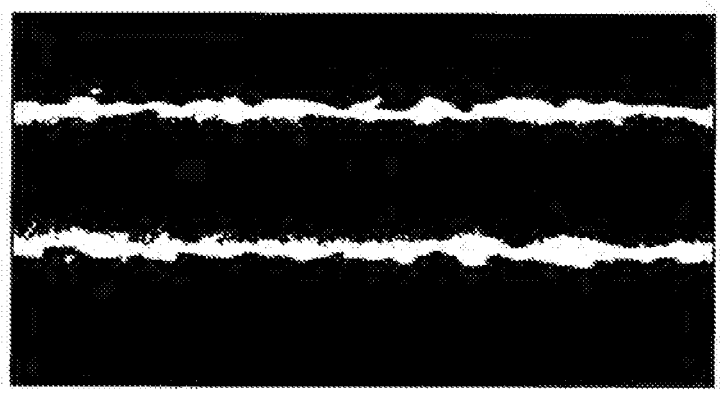

FIG. 112 is an exemplary dual edge image.

Figure 113:
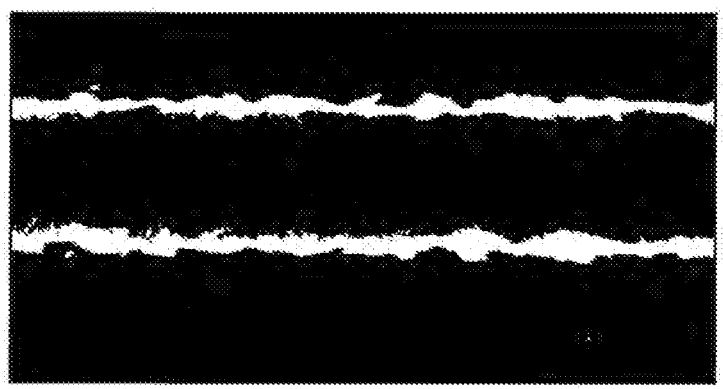

FIG. 113 is an exemplary dual edges eroded image.

Figure 114:
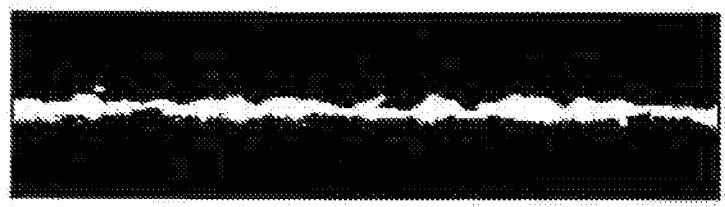

FIG. 114 is an exemplary top edge image.

Figure 115:
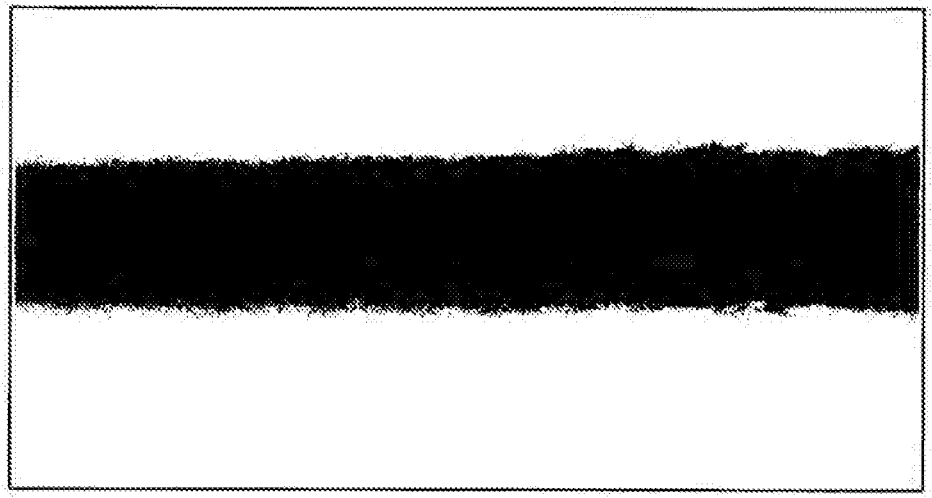

FIG. 115 is an exemplary light bar image in an area with relatively very little orange peel.

Figure 116:
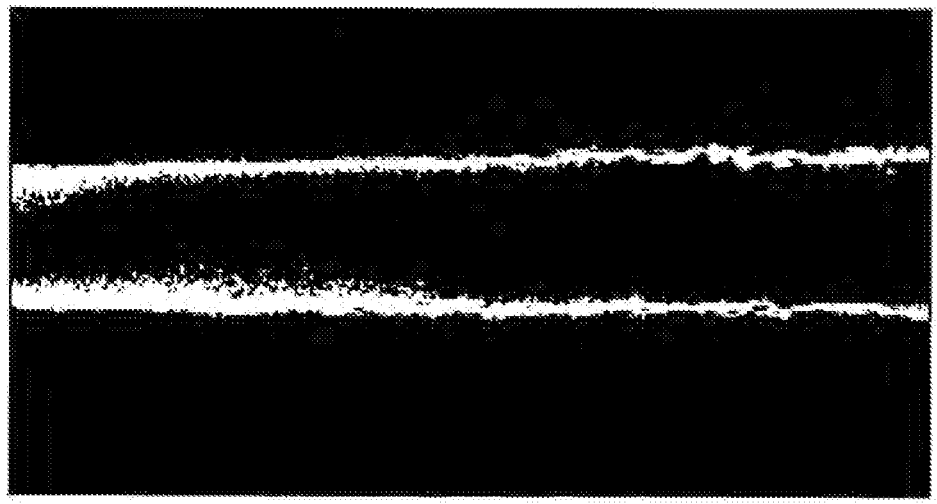

FIG. 116 is an exemplary dual edge eroded image for the image shown in FIG. 115.

Figure 117A:
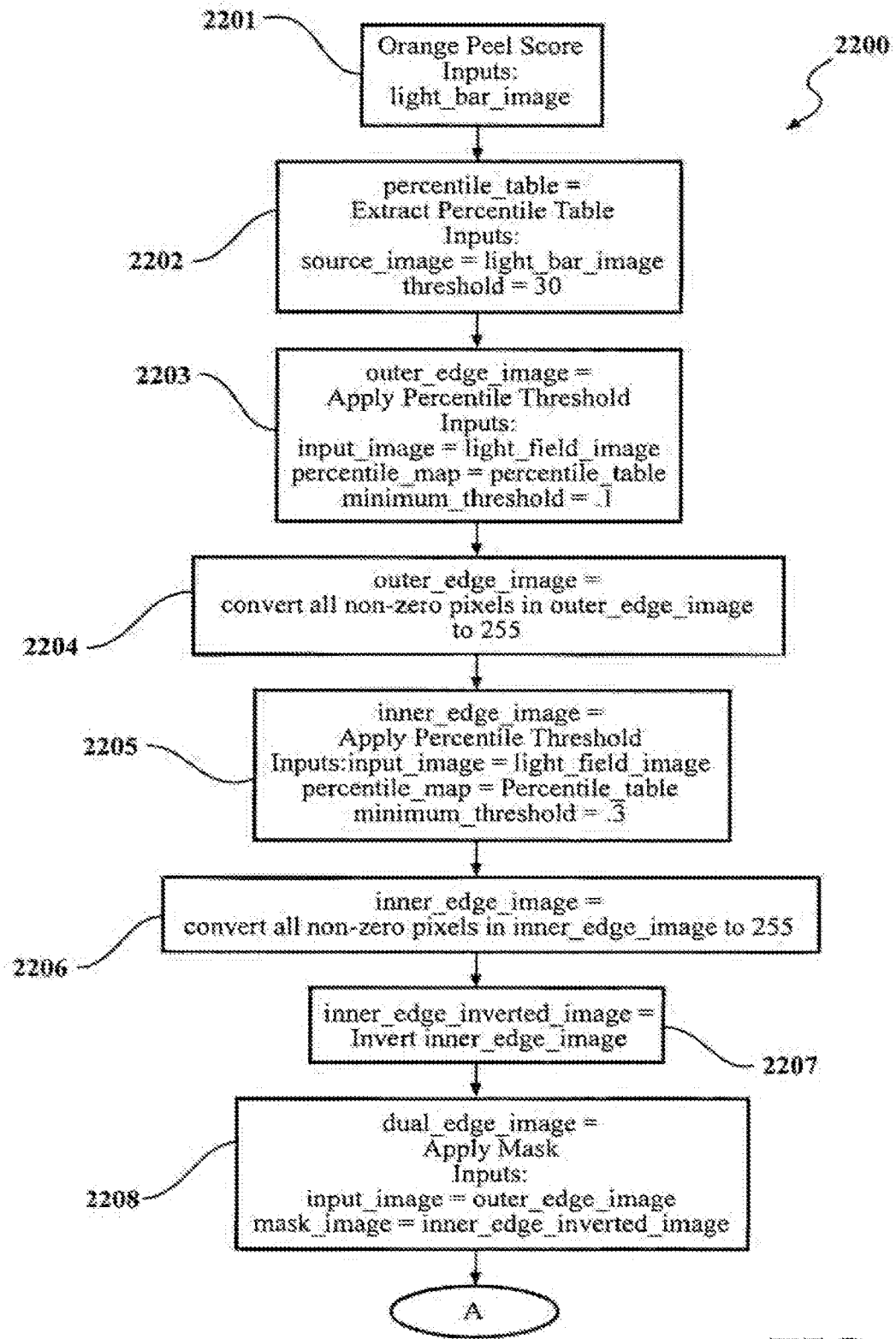
Figure 117B:
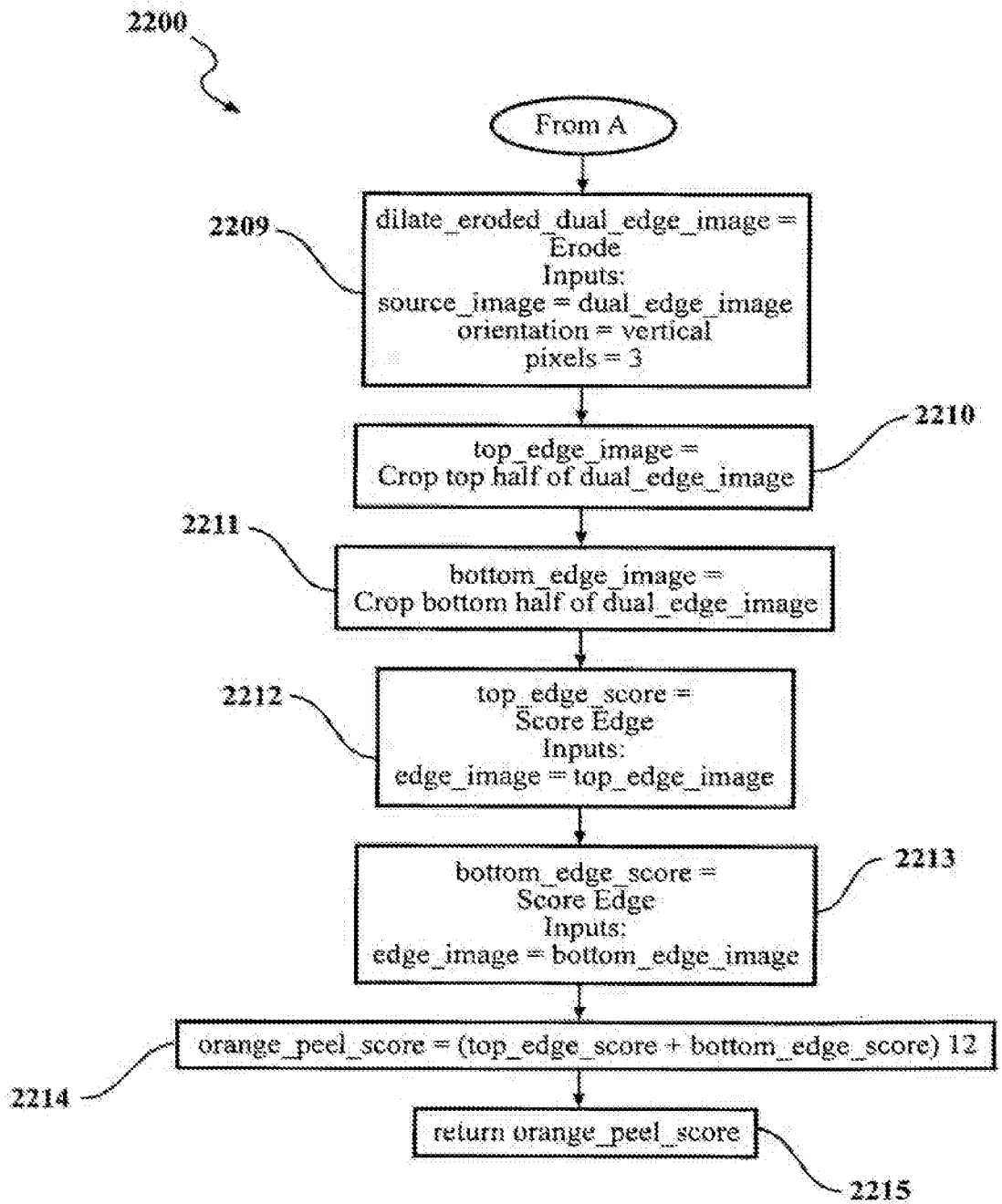

FIGS. 117A and 117B are a flow chart illustrating the sequence of steps associated with the orange peel score function of at least one non-limiting embodiment of the inventions.

Figure 118:
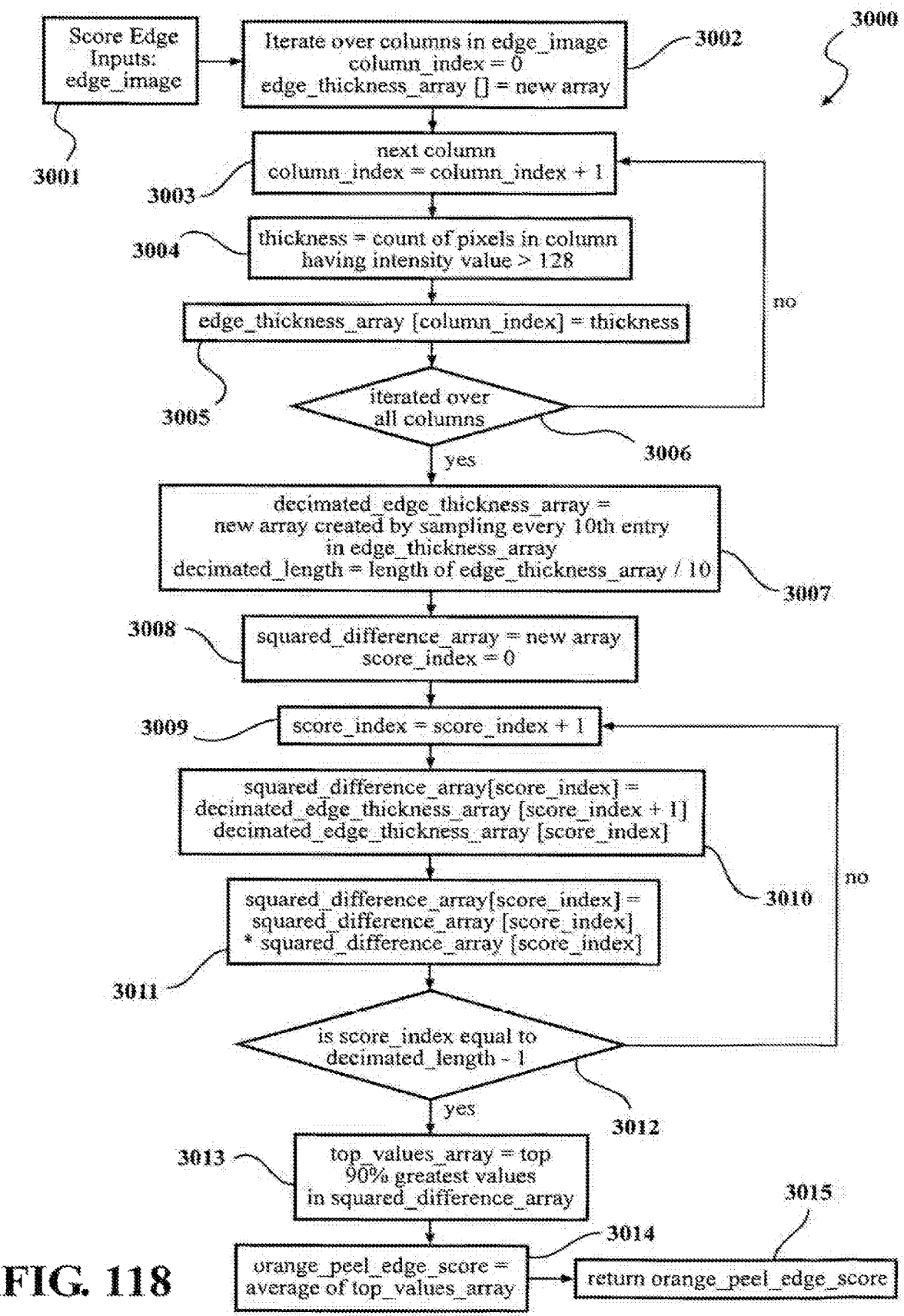

FIG. 118 is a flow chart illustrating the sequence of steps associated with the Score Edge function of at least one non-limiting embodiment of the inventions.

Figure 119:
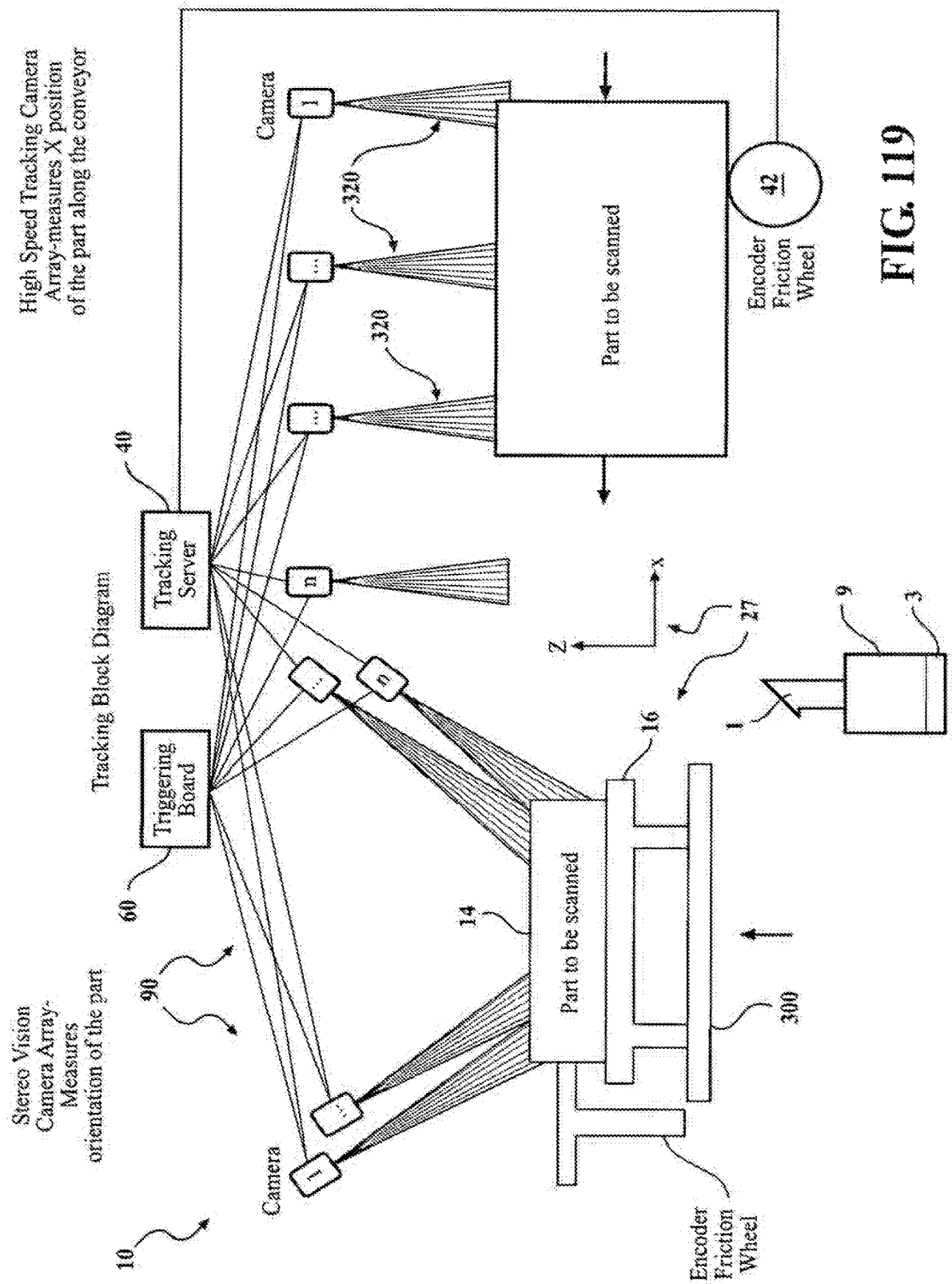

FIG. 119 is a block diagram of the system shown in FIG. 1 but further illustrating the tracking function of the preferred embodiment.

Figure 120:
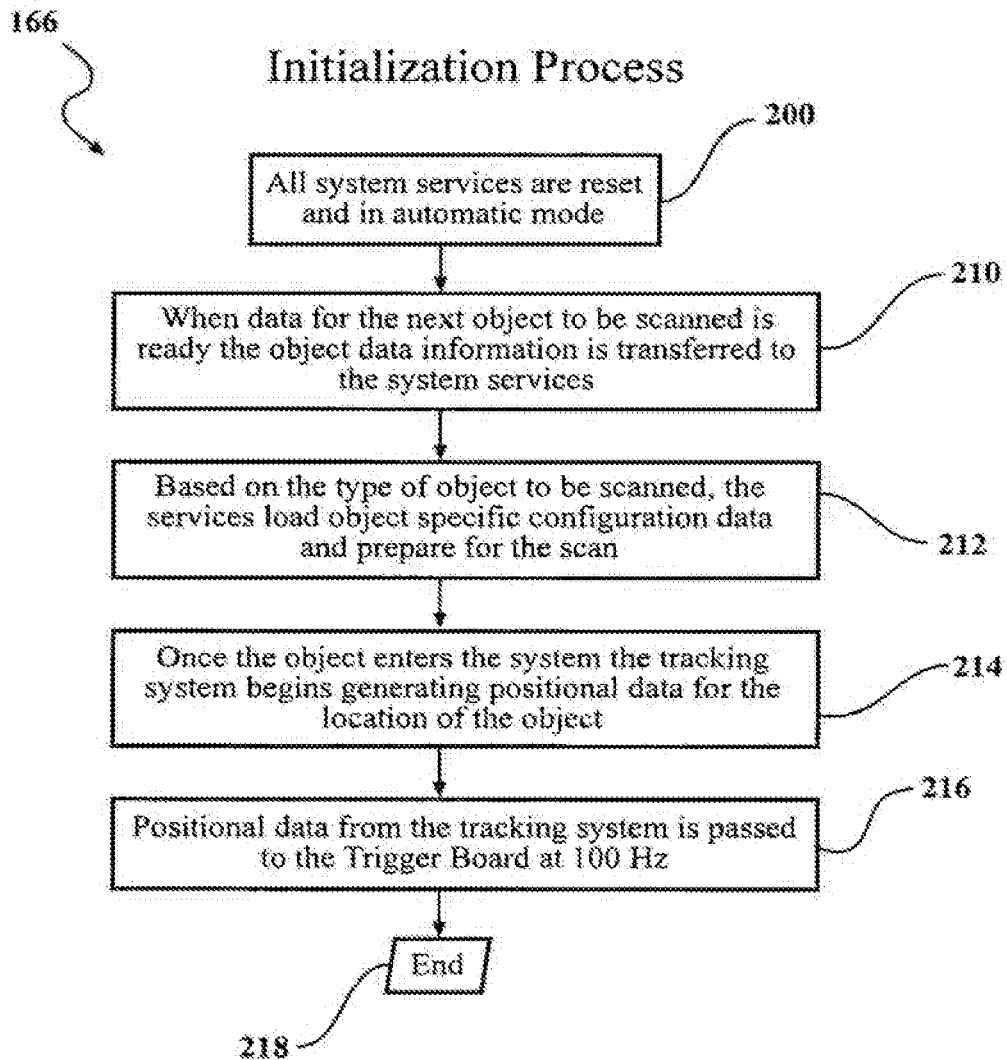

FIG. 120 is a flow chart illustrating the sequence of steps associated with the initialization process methodology of the preferred embodiment of the various inventions.

Figure 121:
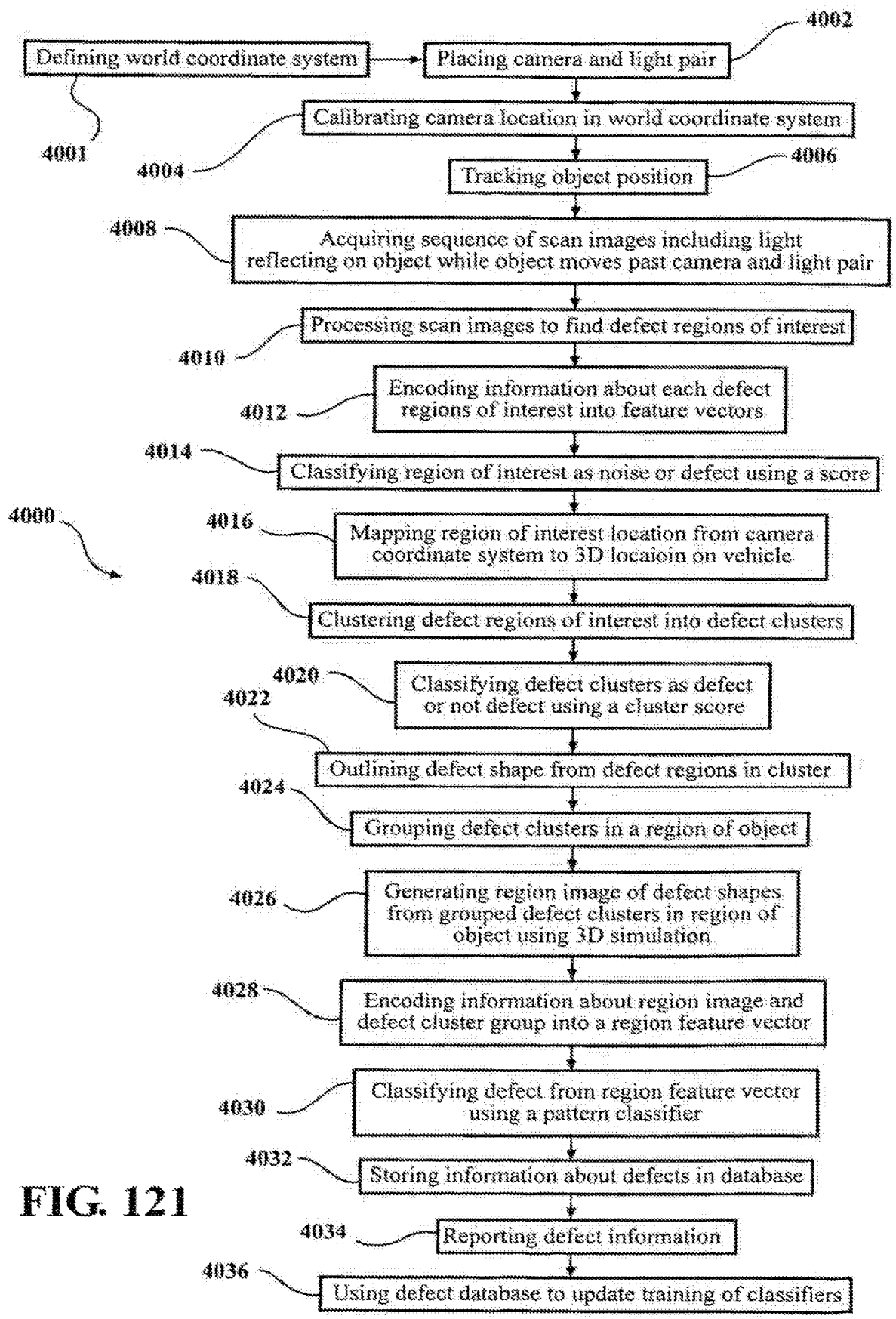

FIG. 121 is a flowchart illustrating the sequence of steps associated with the operation of the system made in accordance with the teachings of the preferred embodiment of the invention.

Figure 122:
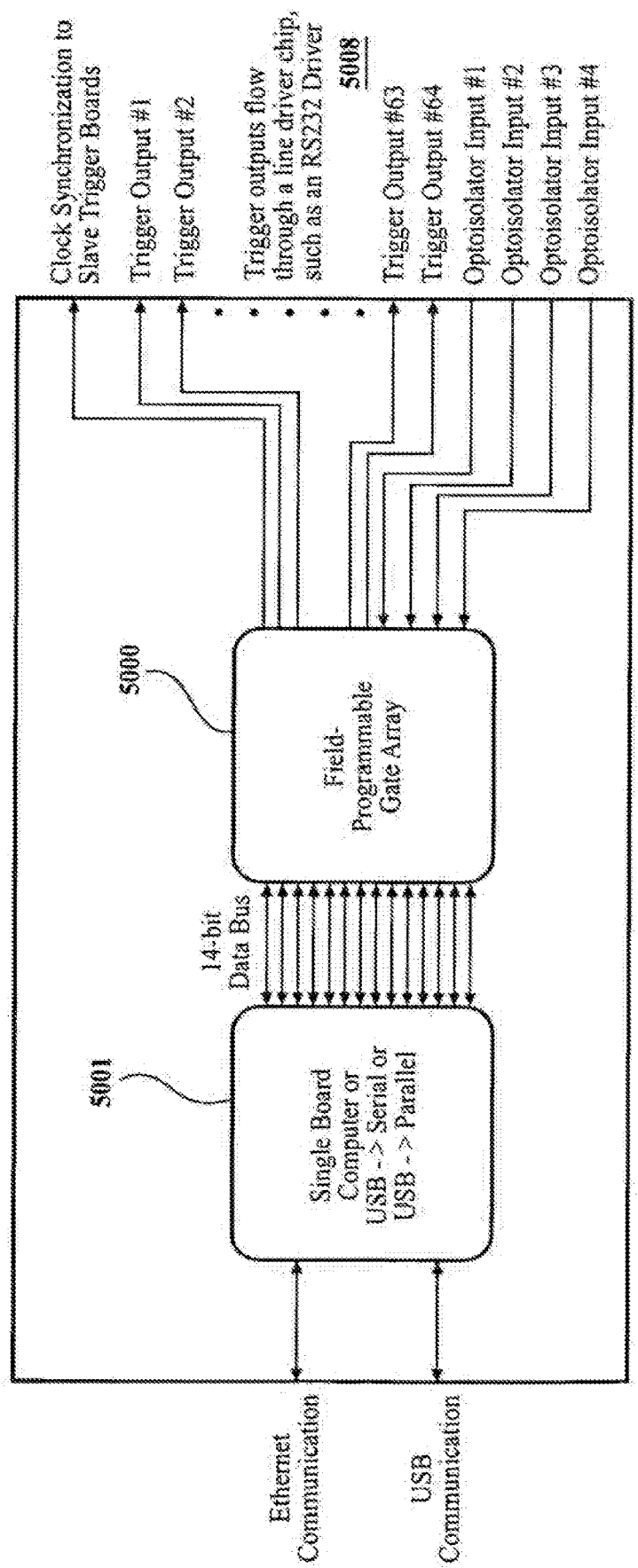

FIG. 122 is a block diagram of a triggering board used by the preferred embodiment of the invention.

Figure 123:
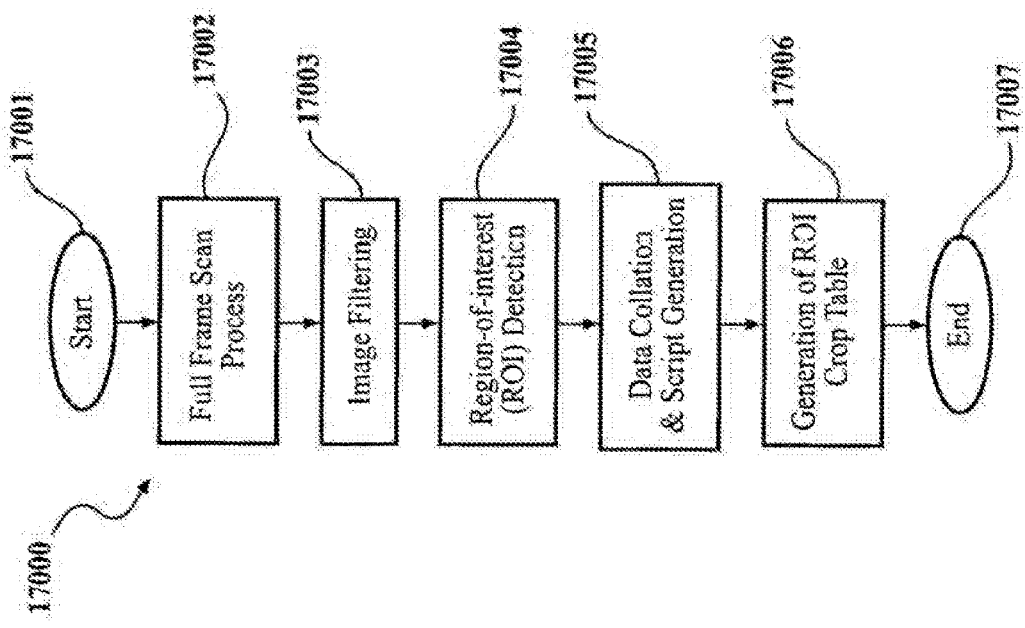

FIG. 123 is a flowchart illustrating a sequence of steps associated with creating a trigger table.

Figure 124:
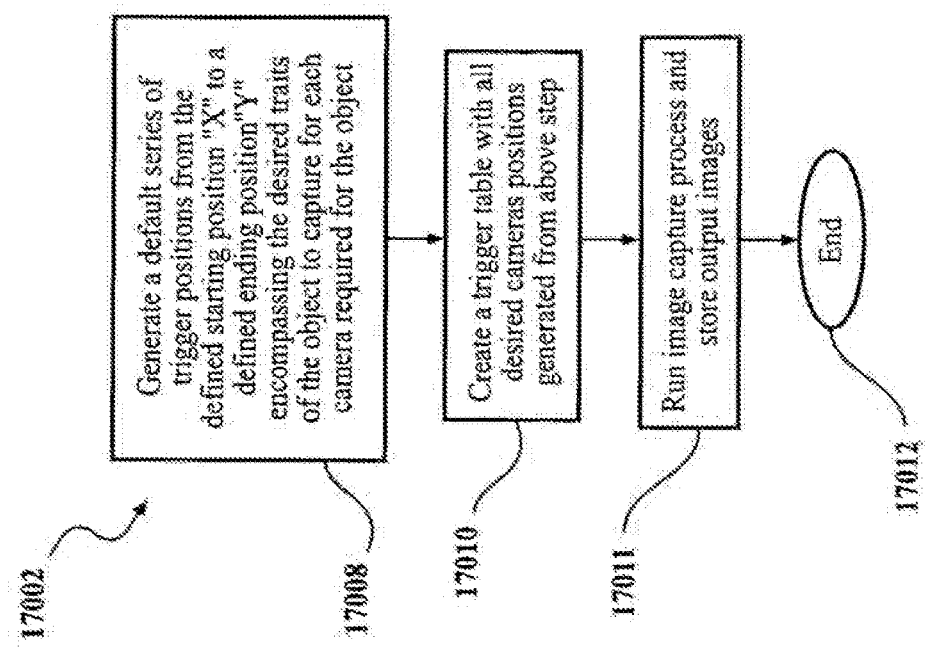

FIG. 124 is a flowchart illustrating a sequence of steps associated with the step of "full frame process scan" required of the flowchart of FIG. 123.

Figure 125:
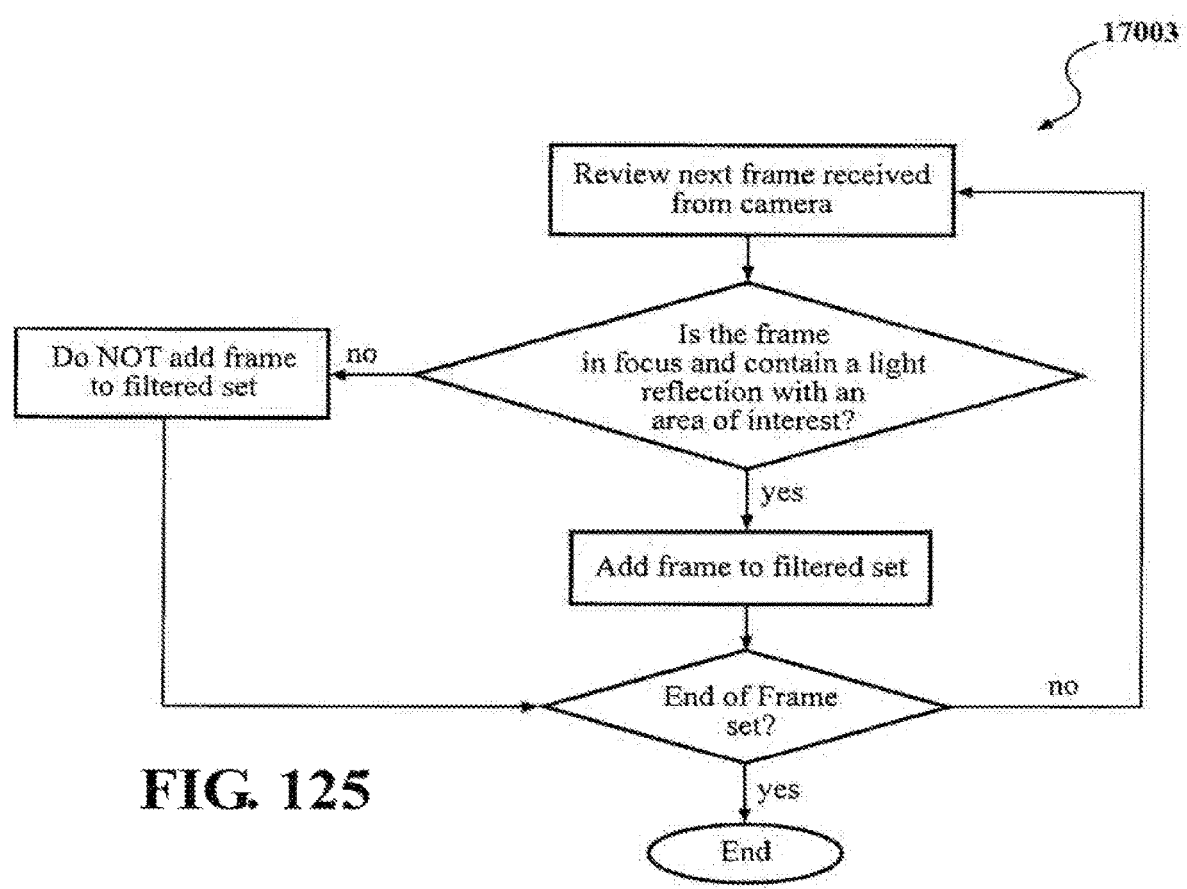

FIG. 125 is a flowchart illustrating a sequence of steps associated with the step of "image filtering" required of the flowchart of FIG. 123.

Figure 126:
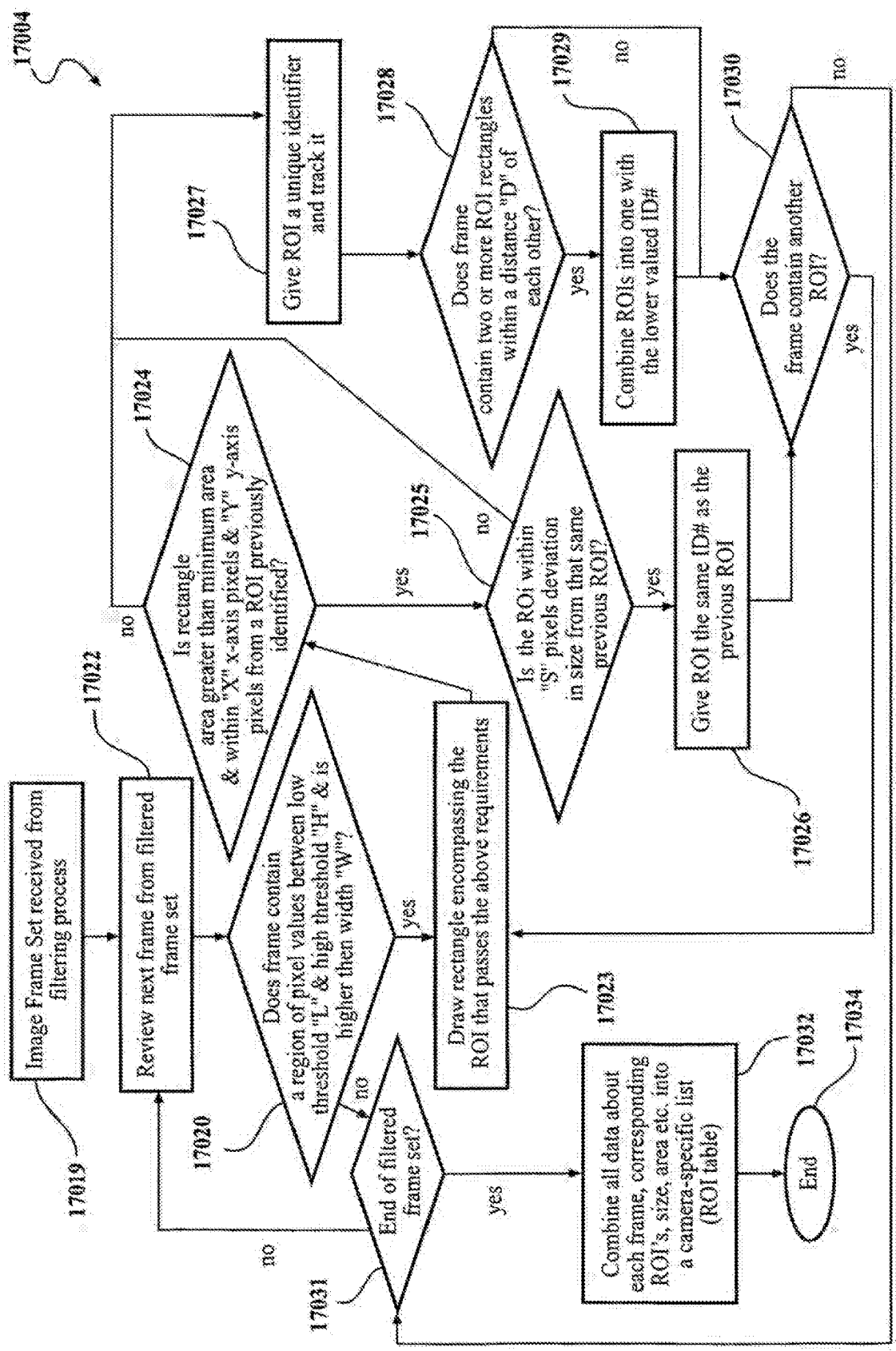

FIG. 126 is a flowchart illustrating a sequence of steps associated with the step of "ROI detection" required of the flowchart of FIG. 123.

Figure 127:
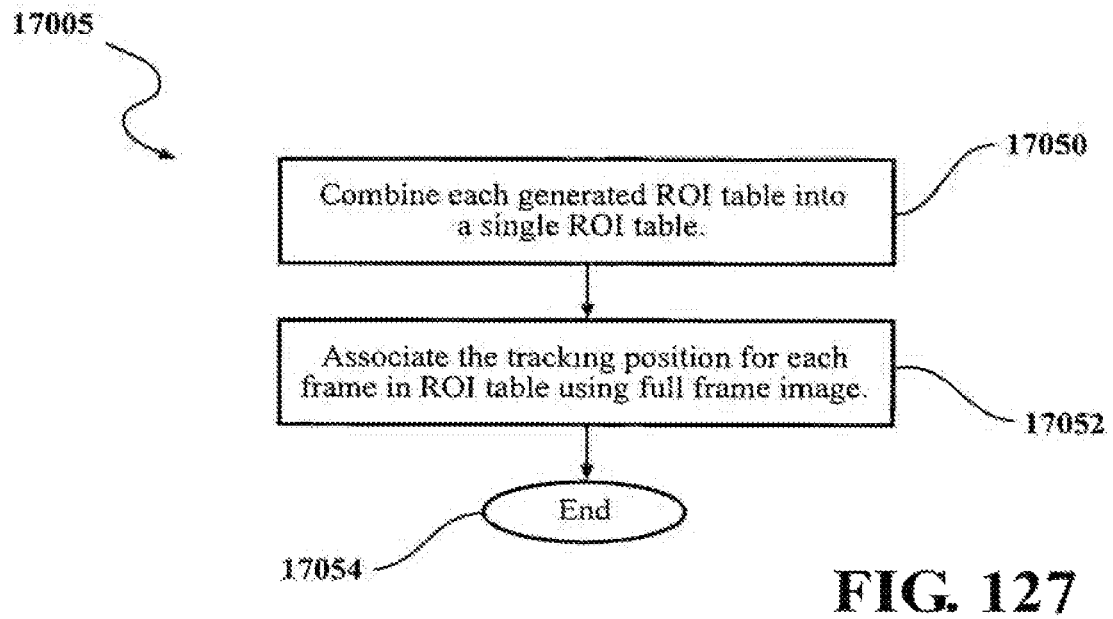

FIG. 127 is a flowchart illustrating a sequence of steps associated with the step of "data collection and script generation" of the flowchart of FIG. 124.

Figure 128:
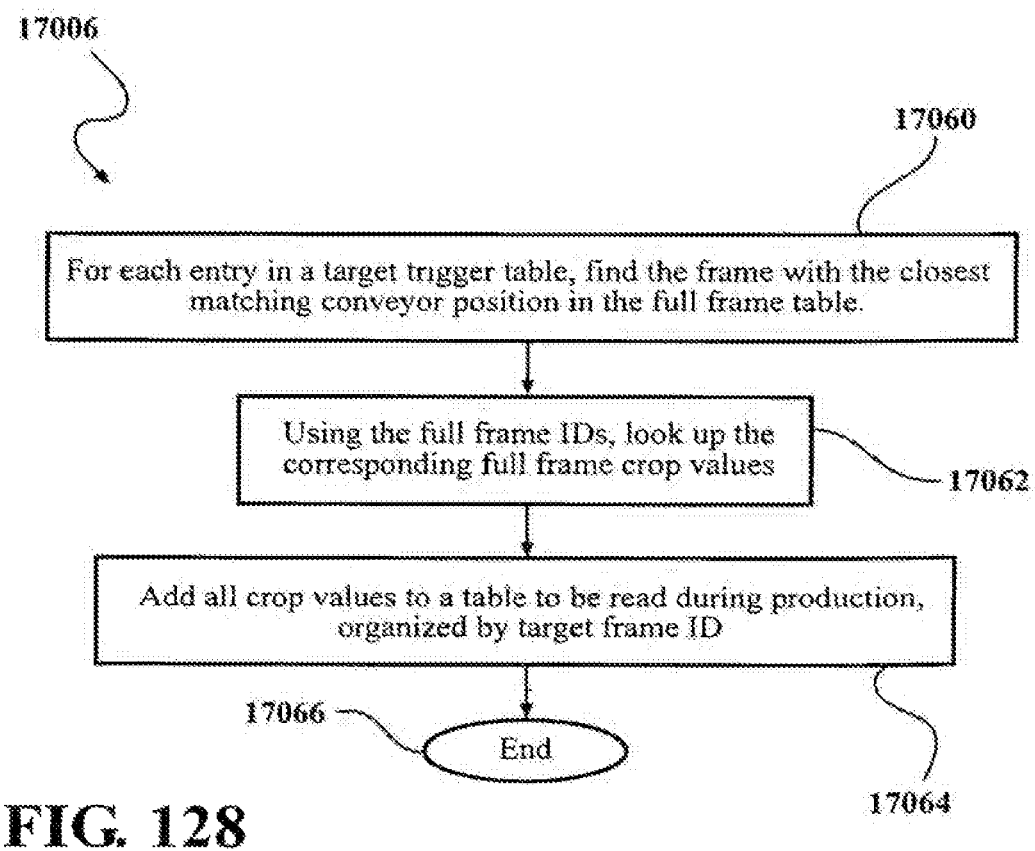

FIG. 128 is a flowchart illustrating a sequence of steps associated with the step of "generation of ROI crop table" of the flowchart of FIG. 124.

Figure 129A:
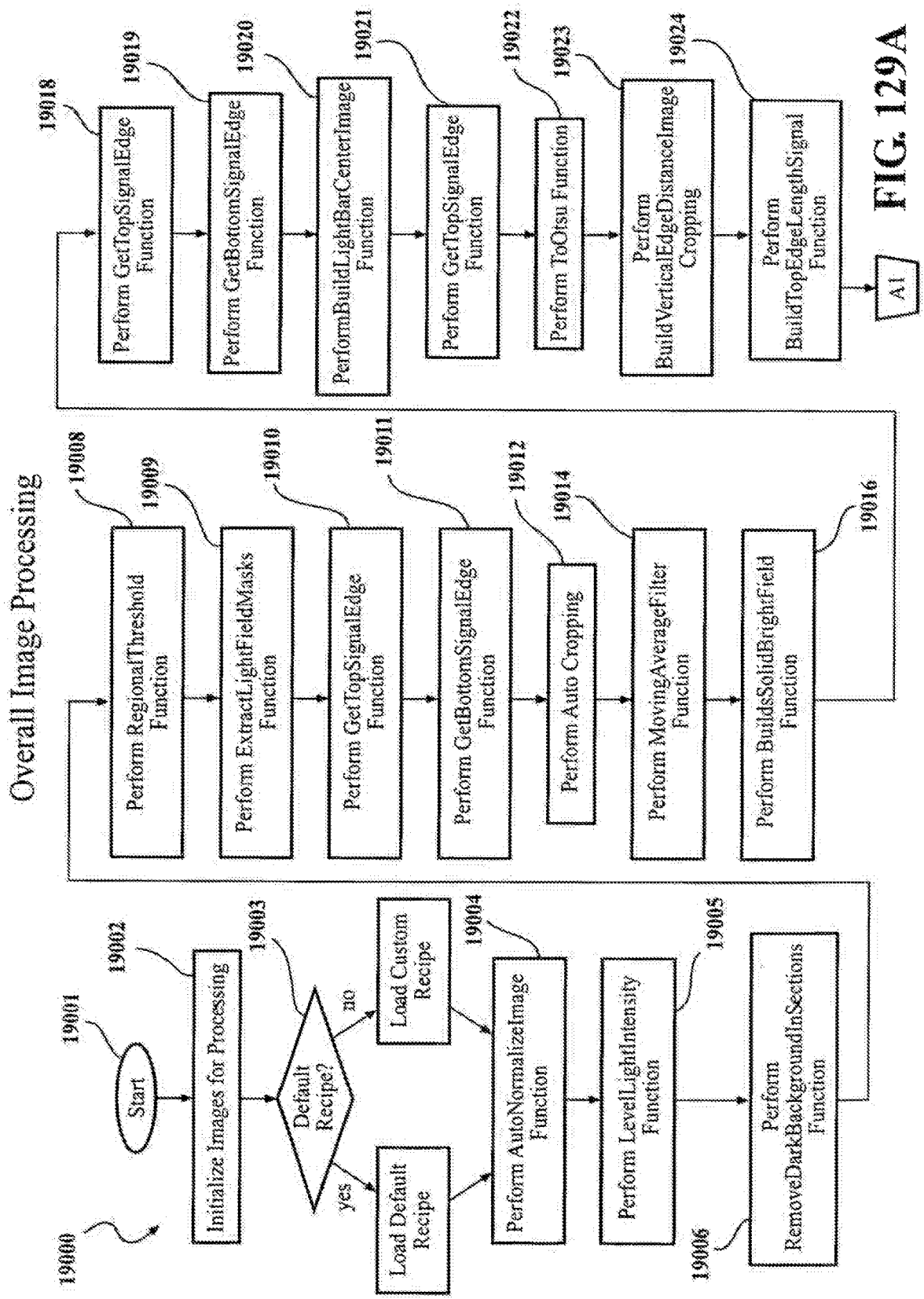
Figure 129B:
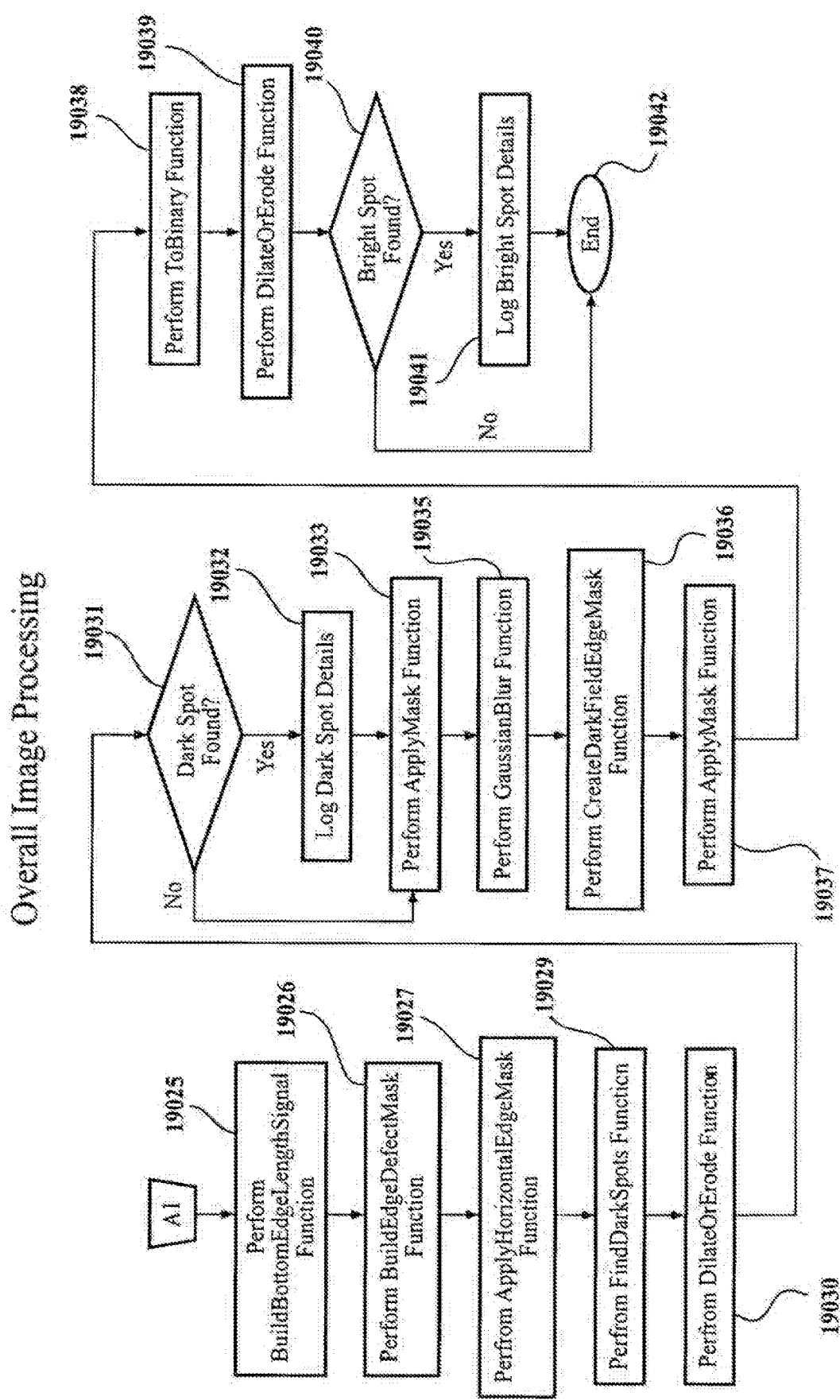

FIGS. 129A and 129B are flowcharts illustrating a sequence of steps associated with an alternative image processing algorithm.

FIGS. 130A, 130B, and 130C are a table of the image processing parameters that are used by the image processing algorithm in FIGS. 129A and 129B.

Figure 131:
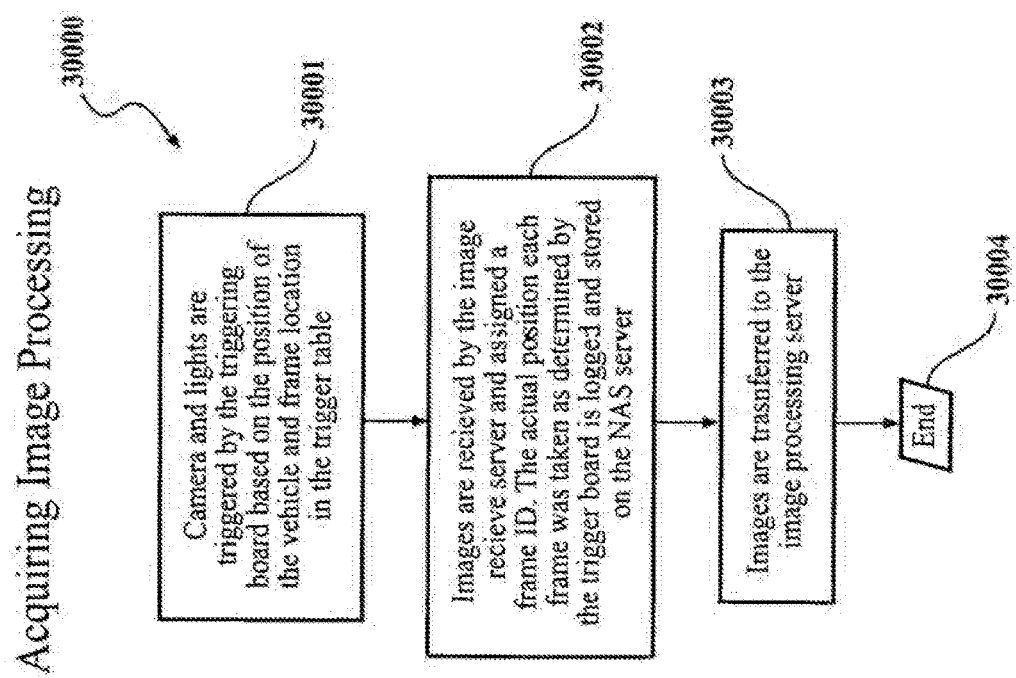

FIG. 131 is a flow chart illustrating the sequence of steps associated with the acquiring images process methodology of the preferred embodiment of the various inventions.

Figure 132:
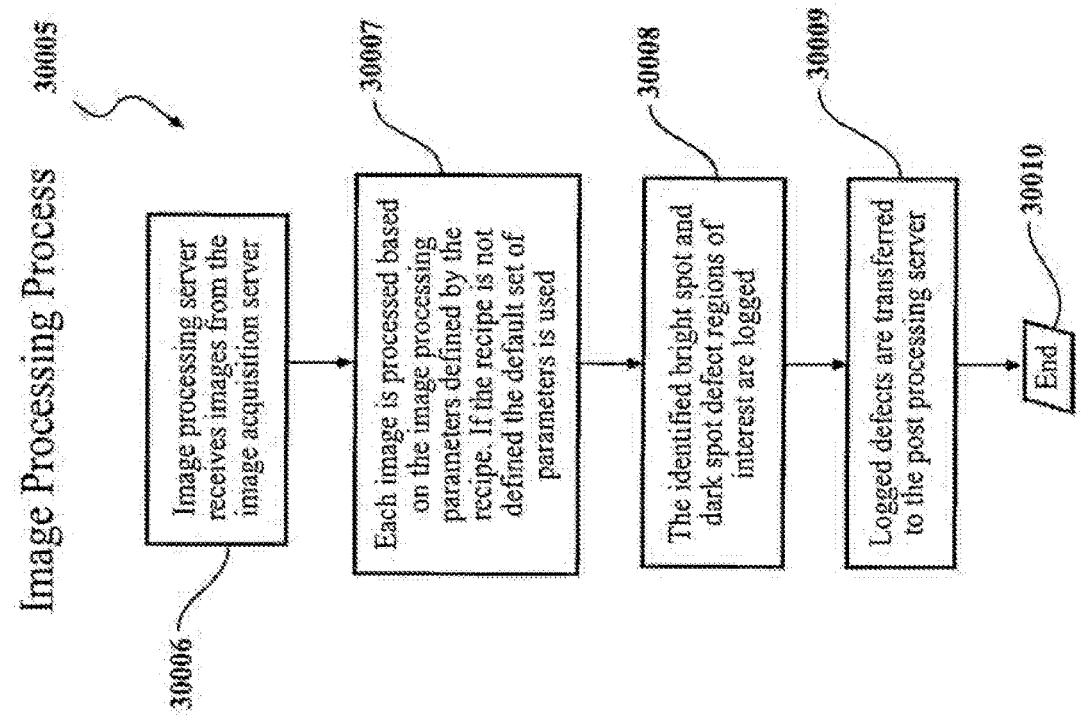

FIG. 132 is a flow chart illustrating the sequence of steps associated with the image processing process methodology of the preferred embodiment of the various inventions.

Figure 133:
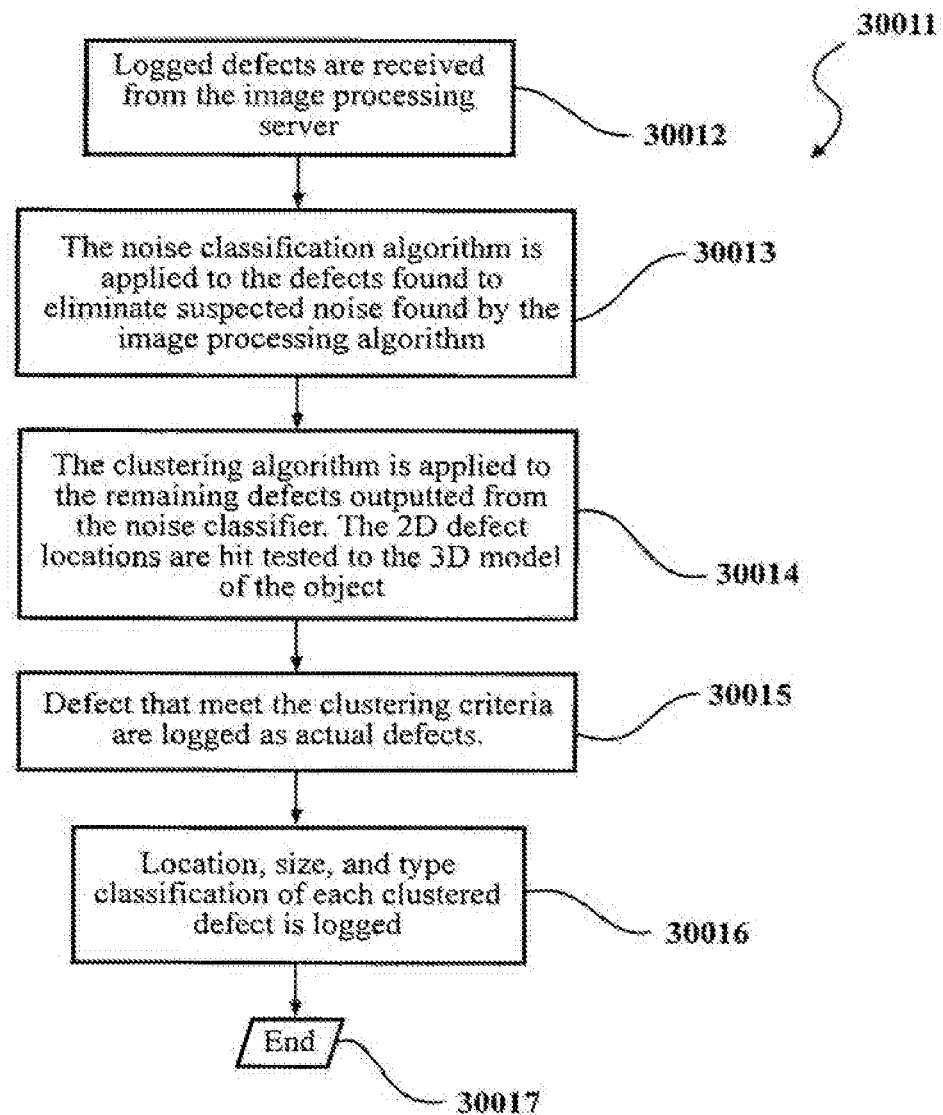

FIG. 133 is a flow chart illustrating the sequence of steps associated with the applying algorithms process methodology of the preferred embodiment of the various inventions.

Figure 134:
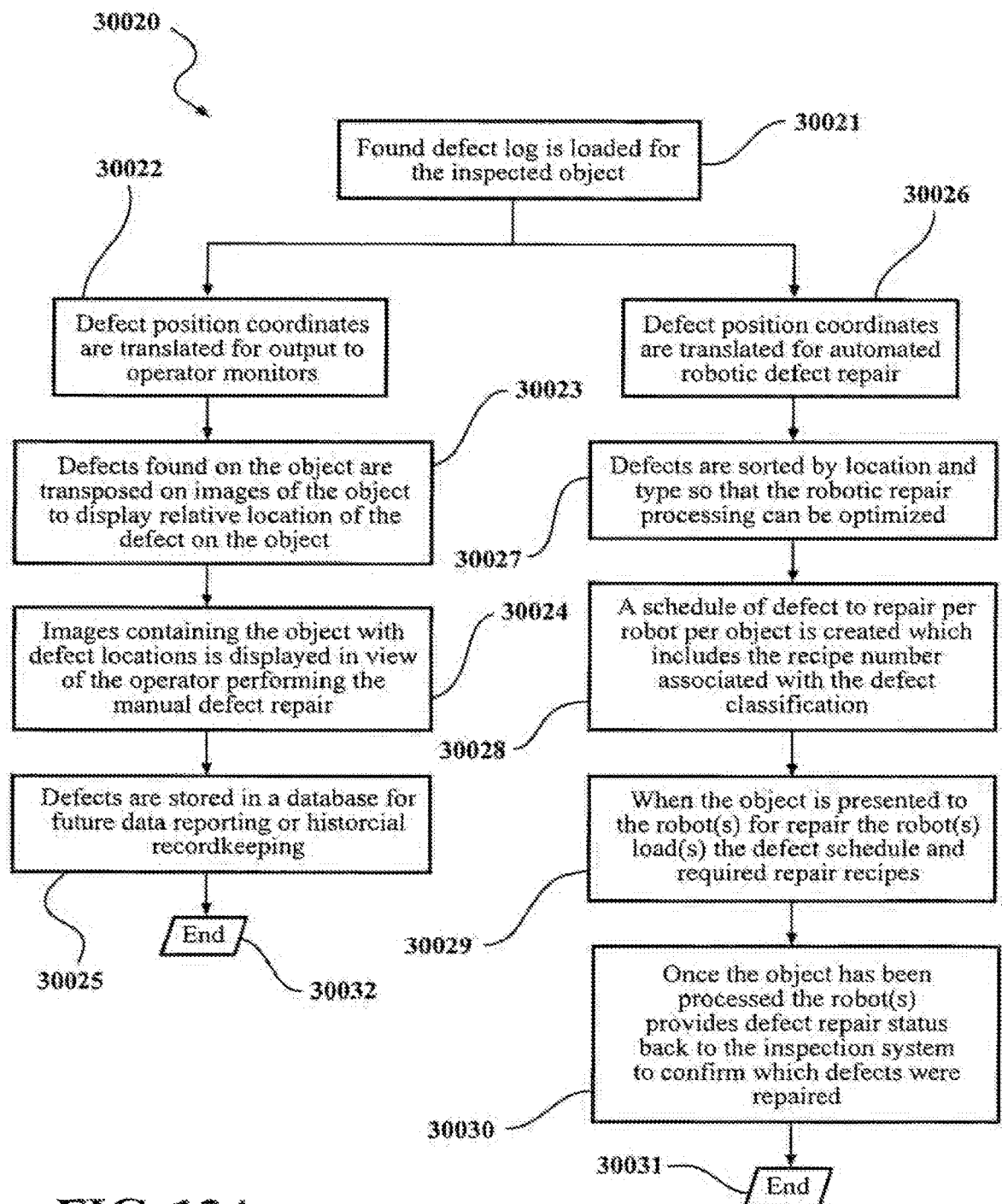

FIG. 134 is a flow chart illustrating the sequence of steps associated with the output process methodology of the preferred embodiment of the various inventions.

DETAILED DESCRIPTION

Referring now to FIGS. 1 and 49, there is shown an object inspection system 10 which is made in accordance with the teachings of the preferred embodiment of the various inventions and which, as will be shown and which has previously been explained, is adapted to detect the presence of a defect or an unwanted feature upon the surface 12 of an object 14. It should be realized that the present inventions are not constrained to detect the presence of a defect or an unwanted feature upon the surface of a particular type of object and that substantially any tangible object may be inspected by the present inventions. Further, surface 12 may comprises substantially and desired surface to be inspected upon substantially any desired type of object.

By way of example and without limitation the object 14 may comprise the body of a vehicle. Further, the term "defect" or "unwanted feature" each refer to surface condition, upon the inspected object, which has visually discernable characteristics from other portions of the adjacent surfaces. Some non-limiting examples of such "defects" or "unwanted features" include a hair within/upon a painted surface, a scratch upon a painted surface, and a "bump" or raised portion of a painted surface in which the paint has not been properly applied or properly cured. The terms "defect" and "unwanted feature", in this description, may be used interchangeably and refer to the same type of undesired feature.

As shown in the FIG. 1, the object 14 is deployed upon a selectively movable carrier 16 which physically transports the produced or manufactured object or part 14 from one place to another as part of an overall manufacturing process. Typically, the carrier 16 is coupled to a selectively movable conveyor or transport assembly 300 which, when moving, allows the carrier 16 (and whatever is coupled to the carrier 16) to be transported through the manufacturing and/or defect detection process. As will be seen, one of the advantages of the system 10 is that the system 10 may be operatively deployed in an "in line" manner, thereby obviating the need for the produced object 14 to be stopped within the overall manufacturing process and thereby greatly reducing or eliminating the impact of the inspection function upon the overall manufacturing process and thereby reducing or eliminating the impact upon cycle time or the time in which the objects 14 are produced and are output from the overall manufacturing process. This is very important in such processes as vehicular production where a production cycle disruption results in a relatively large profitability degradation.

The system 10 includes a first plurality of lights 18 which are placed along the pathway or direction 20 in which the carrier 16 (and the conveyor or other type of movement assembly 300) transports the produced object 14 and which are each adapted to respectively become selectively activated or energized and to thereafter selectively and controllably emit light energy 22. In one non-limiting embodiment, the plurality of lights 18 each comprise a light emitting diode type light, although other types of lights may be utilized. In one non-limiting embodiment, the plurality of lights 18 are distributed about the conveyor or movement assembly 300 effective to produce a substantially uniform amount of light about and upon the object 14 as the object 14 moves along path or direction 20 and effective to produce a substantially uniform amount of intensity along this path or direction 20 and on and about the object 14 as it is moving. The system 10 further includes a plurality of inspection cameras 26 which are also placed along the pathway or direction 20 in which the carrier 16 transports the produced object 14 and these cameras 26 are adapted to cooperatively receive reflected light energy 30 "bouncing off" or being reflected from the surface 12. These reflections, of course, occur due to the impingement of the light energy 22 upon the surface 12. Each of the plurality of cameras 26 are selectively energized and selectively activated once energized.

The reflected light energy 30 includes or comprises image information about the characteristics (e.g., visual characteristics) of the surface 12 and it is this information which is used to detect defects upon the surface 12. It should be realized that should other surfaces of the object 14 be desired to inspected then these other surfaces would need to have this light energy 22 respectively impinged upon them and have their respective energy 30 analyzed in the manner as will be discussed for surface 12.

The system 10 further includes a processing assembly 30 which may comprise several distinct computer processors acting under stored program control as shown in FIG. 1, or a single computer processor assembly and the functionally of the assembly 30 will now be explained.

The assembly 30 includes a tracking server or processor 40 and, in one non-limiting embodiment, a friction wheel encoder 42, which is communicatively coupled to the tracking server 40. In a non-limiting embodiment, the friction wheel encoder 42 comprises a commercially available friction wheel encoder which is obtainable from Edon Controls, Inc. of Troy, Michigan. Other types of positional encoders may be utilized. The assembly 30 also includes a simulator 402 which, in one non-limiting embodiment, comprise a commercially available MATLAB® simulator with Simulink MathWorks® tools and the simulator 402 may be coupled to the output monitor assembly 52 and which is more fully explained below. The simulator 402 may be communicatively coupled to computer systems and monitors remote from the system 10 as well. Alternatively, the simulator 402 may be a separate and distinct processing system from the processor assembly 30 and may also be powered directly from the power source 71.

The system 10 further includes a display computer portion 50, operating under stored program control and a plurality of output display monitors 52 which are each coupled to the display computer portion 50 or multiple display computer portions 50. The system 10 further includes a triggering board or processor 60 which is coupled to the tracking server or processing assembly 40, an image capture server or processing assembly 62 which is coupled to each of the plurality of cameras 26, and an image processing server or processing assembly 66 which is coupled to the image capture server or processing assembly 62. The system 10 also includes a post processing server or processing assembly 68 which is coupled to the image processing server/assembly 66 and a "NAS" or archive server or processing assembly 70 which is coupled to the post processing server/assembly 68. It should be realized that such terms "board", "processing assembly", and "server" (as well as other utilized descriptive names) may be used interchangeably here to refer to entities 50, 60, 62, 66, 68, 70, and 40 and that these terms are meant to generally refer to some sort of processor based entity without limiting the referred to entity to an particular hardware or software configuration. The trigger board 60, image server 62, image processing server 66, post processing server 68, NAS or historical server 70, display computer portion 50, and tracking server 40 are each connected to a communications network (such as, by way of example and without limitation, an Ethernet® network) 80 through a switch 82 and hence are in selective communication with each other through the network 80. The plurality of lights 18 may also connected to the network 80. The plurality of cameras 26 and the plurality of lights 18 are each respectively and selectively "energizable" or "activatable" upon the receipt of commands from the triggering board or server 40. A source of electrical power 71 is also coupled to the processor assemblies 60, 62, 66, 68, 70, and 40 and the trigger board or processor assembly will selectively source some of the produced electrical power to the cameras 26, lights 18 and other entities which will be discussed further in order to selectively activate or selectively energize these items and will cease sourcing such electrical power to these items or entities in order to selectively and respectively cause them to be deactivated. Further as is shown perhaps best in FIG. 119, the system 10 may also include a set or plurality of tracking cameras 320 which are coupled to the tracker server 40 and which cooperatively provide positional information to the tracking server 40 about the location or position of the object to be inspected 14 within the system 10 as that object 14 moves due to the movement of the conveyor or movement assembly 300. These tracking cameras 320 will be more fully described below.

In operation, the encoder 42, is movably coupled upon and to the conveyor or movement assembly 300 and frictionally engages the carrier 16 and turns (e.g., rotates) as the carrier 16 moves along the conveyor or movement assembly 300. Such turning is effective to provide continual information to the server 40 concerning the location of the carrier 16 and hence the object 14 along the path or direction 20.The triggering board 60 uses this positional information to determine the identity and sequence of lights from the plurality of lights 18 to illuminate and the identity and sequence of the plurality of cameras 26 to activate. In essence, image data is captured of and along the surface 12 of the object 14 as it is moved along the direction or path 20. The captured image data is communicated to the image capture server 62 then communicated to the image processing server 66. One of the lights of assembly 18 along with an object to be inspected 14 is shown at different times in FIGS. 19, 20, 21, 22, 24, and 25.

In one non-limiting embodiment only some of the captured image data may be communicated to the image capture server 62 after a "cropping" operation occurs. Particularly, the image processing server 66 performs a selected sequence of image processing algorithms which will be discussed later and which are cooperatively effective to create a processed image of each of the "raw" images received by the image capture server 62. The processed images, some or all of which contain a region of interest on the surface 12 and possibly a potential defect, are then communicated to the post processing server 68 in which the processed images are analyzed (in a manner which will be more fully described later) in order to ascertain the identity and location of respective defects upon the surface 12. The post processing information is then communicated to the historical or NAS server 70 where it is stored for archival purposes and the data is also made available to the display computer 50 in order that operators may use the output monitors 52 to view, either in "real time" the identified defects or to view historical defect data residing within the NAS server 70.

In an alternate embodiment, as shown best in FIG. 119, the encoder 42 may be supplemented or replaced with a high speed camera assembly 90 which is coupled to the triggering board 60 and the tracking server 40 and which provides object positional information along the path or direction 20 to the triggering board 60 and the tracking server 40 and such information may be used in combination with the positional information from the encoder 42 or to replace such encoder generated information.

Importantly, a "stereo assembly" 90 using at least two cameras may be used to determine the orientation of the object 14 within the carrier 16 and such orientation information is important because, in one non-limiting embodiment, once a defect is detected at a certain location on the surface 12 by the post processing server 68, the identified defect may be corrected or repaired in an automated manner by a robot or another type of automated assembly. Here, the term "automated" means that the actual physical repair or correction of the identified defect is done by a non-human. The use of a robot of course requires highly precise positional information concerning the location of the identified defect and the part or object 14 may have shifted within the carrier 16 as it travelled along the path or direction 20 or it may have not been positionally measured even at the start of the defect detection process. Hence, the benefit of the high speed camera and stereo camera assembly 90 is that the location upon the surface 12 of the identified defect may be accurately communicated to the robot (or other automated repair assembly) and even to workman doing a manual repair or correction of the defect even after taking into account the location or position of the object 14 within the carrier 16. In one non-limiting embodiment this robotic automated defect correction assembly, such as assembly 9 in FIG. 119, may be mobile (placed upon a wheel assembly 3 which is controlled wirelessly from the computer assembly 30 (such as by the post processing assembly 68) and the positional defect information (along with the positional information of the object 14) may be wirelessly communicated to the assembly 9. That is, the wheel assembly 3 may include motors which are controllable from commands generated by the assembly 30 a (e.g., processor 68) and an "onboard" battery or power supply is effective to selectively operate the motors and once the robot 9 is in close proximity to the object to be repaired, the robotic arm 1 may be selectively controlled by further commands from the assembly 30 (e.g., from processor 68) to effectuate the needed physical repair.

It should also be realized that the foregoing assembly 10 requires a relatively small overall footprint since only cameras 26 (and possibly 90 and 320 and/or 42) and lights 18 need to be deployed on the "manufacturing floor" or in the process thereby reducing the need for critical manufacturing space and that the object 14 may be inspected in an "in process" manner without the need to stop or delay the overall manufacturing process. In fact, if a defect is found, the object 14 may be easily directed to a defect correction location without the need to stop the manufacturing process in which other objects are continually created. It is in this separate defect correction location that the defects may be corrected without impacting the remainder of the manufacturing process. The system 10 may be positioned between manufacturing steps, be positioned at the beginning of a manufacturing process, or be positioned at the end of a manufacturing process.

Figure 2:
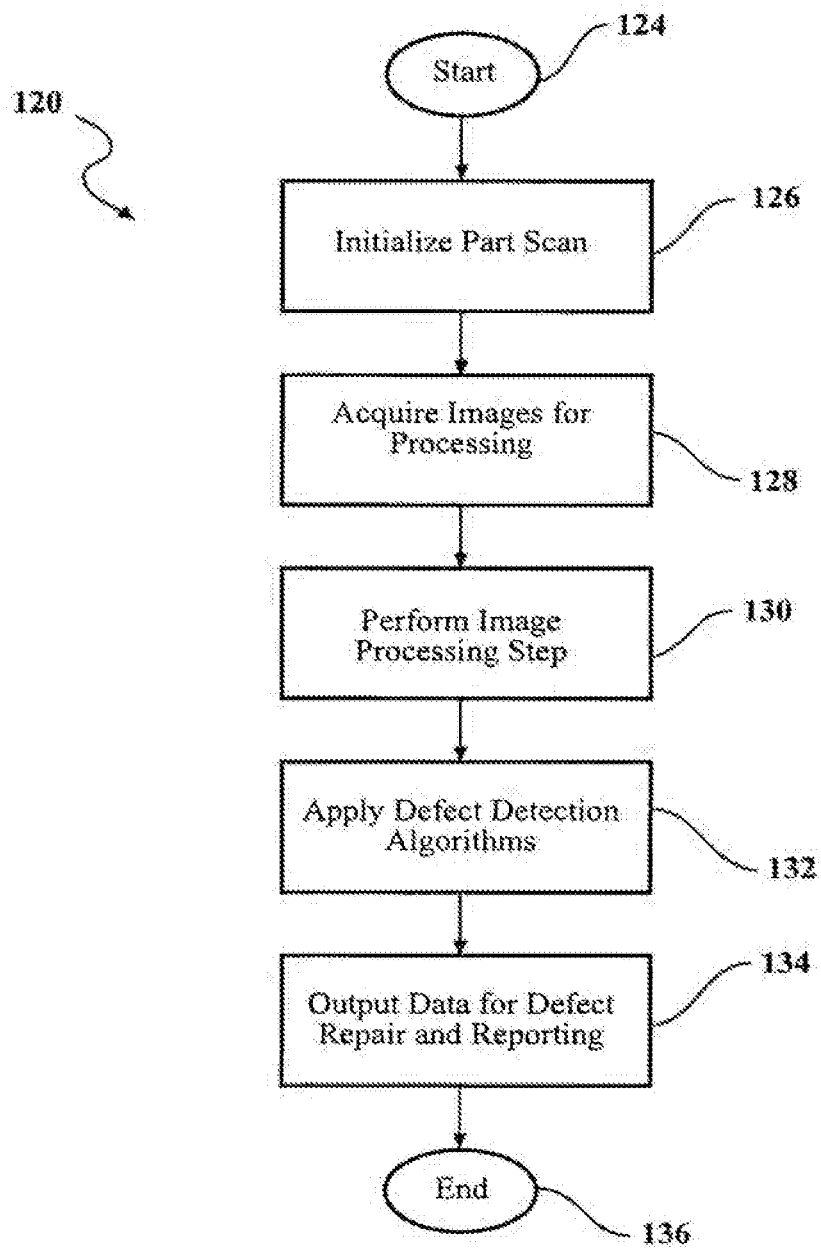
FIG. 2 is flow chart generally illustrating the sequence of steps comprising the object inspection methodology of the preferred embodiments of the inventions.

Referring now to FIG. 2, there is shown a flowchart 120 comprising a sequence of operational steps associated with the defect detection operation of system 10.

The defect detection functionality of system 10 begins with an initial step 124 in which the process begins. Step 124 is followed by step 126 in which a part scan is initialized and in which the trigger board 60, using the positional information from the encoder 42 (and alternatively or in combination with the encoder 42, the positional information from the tracking cameras 90 or other types of position detection assemblies) and the tracking server 40, determines the sequence of lights 18 and cameras 26 to be activated as the object 14 moves along the path or direction 20. Step 126 is followed by step 128 in which the images of the surface 12 are acquired by use of the reflected light energy 30 in the previously described manner. Step 130 follows step 128 and each acquired image is processed by the processor 66 and communicated to the post processing server 68 where defect detection algorithms are applied to each processed image. Step 134 follows step 132 in which the defect detection identities along surface 12 are reported to the server 70 or to a robotic or automated repair and/or correction processor. The process ends with step 136 which follows step 134. The respective functionality of steps 126-134 will now be discussed further.

Referring now to FIG. 120 there is shown a flowchart 166 which comprises a sequence of steps required to initialize the part or object scan associated with step 126 of flow chart 120.

Particularly, the part or object scan is initialized or begins in step 200. In this initial step 200, system elements or portions, such as by way of example and without limitation portions or elements 60, 62, 66, 68, 40, and 70, are reset to respective predefined initial states and made to be respectively ready to begin operation. For automatic object processing the system services (e.g., the services are, in one non-limiting embodiment, software functions/operations respectively provided by the respective and various elements of system 10) need to be reset and placed in automatic mode so they are ready for objects entering the inspection system 10. Step 200 is followed by step 210 in which the data for the next object to be scanned is transferred to the respective systems services portions of the respective system elements 40, 60, 62, 66, 68, and 70. This may be done automatically with a Programmable Logic Controller (PLC) and the use of a presence sensor placed at the beginning point 303 (see FIG. 39) of path or direction 20 and which detects the presence of the object 14 to the triggering board 60, or it may be done by an operator or a proximity switch which may be engaged by the carrier 16 as the carrier 16 begins to transport the object 14 along the path or direction 20.

Step 210 is followed by step 212 where the system services cooperatively load the object specific configuration data based on the type of object to be scanned in preparation for the start of the scan. Step 212 includes loading data which is required by the triggering board 60 to determine the sequence of activation of the plurality of lights 18 and cameras 26 (and in a non-limiting embodiment of the invention also cameras 90 and/or 320) which will be needed. This may, in one non-limiting embodiment of the invention, be based upon the identity of the part or object 14 which is transmitted to the triggering board 60 by the tracking server 40 and which occurs in step 212. In one non-limiting embodiment of the invention, each part or object 14 having a unique shape or spatial geometry has an associated and unique light and camera activation sequence which is stored within the triggering board 60 and which cooperatively comprises a "trigger table". Thus, in step 212 the triggering board 60 will use the stored trigger table to identify the desired activation sequence of lights 18 and cameras 26 (and possibly cameras 320, 90 in other non-limiting embodiments) to be achieved during the scan. A trigger table entry for a part, such as part 14, defines the sequence of lights 18 and cameras, such as cameras 26, to be activated and is effective to produce images of the surface to be inspected 12 as the part or object 14 travels along the path or direction 20. To understand how such a trigger table may be created, reference is now made to flowchart or algorithm 17000 of FIG. 123 which provides a sequence of steps for the creation of one such trigger table. A further discussion of the remaining steps 214-218 is set forth below after the functionality of the trigger table is more fully described.

Flowchart or algorithm in FIG. 123 beings with an initial step 17001 in which it is decided to build a trigger table. Step 17001 is followed by step 17002 in which a full frame scan process is completed and step 17002 is followed by step 17003 in which image filtering occurs. Step 17003 is followed by step 17004 in which a region of interest or "ROI" is detected. Step 17004 is followed by step 17005 in which data collation and script generation occurs and step 17005 is followed by step 17006 in which the generation of a ROI crop table occurs. The flowchart or algorithm ends in the last step 17007.

Referring now to FIG. 124 it is seen that the step 17002 includes a first step 17008 in which trigger positions are predefined from a predefined starting position (e.g., position 303 in FIG. 39) to a predefined end position (e.g., 17009 of FIG. 39 in which the object to be inspected 14 leaves the energy field 30 of the cameras 26). These predefined trigger positions 17009 must respectively allow the surface 12 to be captured or "imaged" by the cameras 26 in the manner described in this description Step 17008 is followed by step 17010 in which a table with all of the respective camera positions are defined. Step 17010 is followed by step 17011 in which the images of the surface 12 of the object 14 are taken by the predetermined cameras 26 at these various respective predefined positions and these images are transmitted to the server 62 in step 17011. Step 17012 follows step 17011 and defines the completion of this flowchart 17002.

Referring now to FIG. 125, it is seen that step 17003 requires a review of each of the received frame images in order to determine whether each received frame image has a focus and an area of interest of the surface 12. If so, the frames are added to the frame set and if not then the inspected frame is not added to the frame set. This functionality occurs for each of the received image frames.

Referring now to FIG. 126, it is seen that step 17004 requires an inspection of each of the received image frames from the filtering process in step 17003. That is, in the first step 17019 an image frame set is received. Step 17019 is followed by step 17022 in which the first or next image in the set is loaded and ready for review. Step 17022 is followed by step 17020 in which a determination is made whether the inspected frame has a region of pixel values between and low and a high threshold and is higher than a certain predefined width. If this is not the case, then step 17020 is followed by step 17031 in which a determination is made whether this was the last image in the frame set. Alternatively, step 17020 is followed by step 17023 in which a rectangle image is made to encompass the region that has those characteristics set forth in step 17020. Step 17023 is followed by step 17024 in which a determination is made as to whether the created rectangle has an area which is greater than a predefined minimum area and is within a certain amount of pixels in the "x" direction of a previously identified region of interest and is within a certain amount of pixels in the "y" direction from a previously identified region of interest. If this is true than step 17024 is followed by step 17025 and otherwise step 17024 is followed by step 17027. In step 17025 a determination is made whether the region of interest is within a certain deviation of size from other previously identified region of interests. If so, then step 17025 is followed by step 17026 in which the currently identified region of interest is given the same identification number as the previously identified region of interest to which this currently identified region of interest is closest in size to. Otherwise, step 17025 is followed by step 17027 in which the currently identified region of interest is given a unique identification number. Step 17027 is followed by step 17028 in which a determination is made whether the currently inspected image frame has two or more region of interest rectangles within a certain predefined distance of each other. If so, then step 17028 is followed by step 17029 and otherwise step 17028 is followed by step 17030. In step 17029 all of the region of interests (having respective rectangles in the current image frame) are combined with the single region of interest having the lowest identification number. Step 17029 is followed by step 17030 and step 17030 also directly follows step 17026. Specifically, in step 17030, it is determined whether the current image frame contains another region of interest. If so, then step 17030 is followed by step 17023. Alternatively, step 17030 is followed by step 17031 in which a determination is made whether the end of the filtered image frame set has been reached. If the end of the filtered image frame set has been reached then step 17031 is followed by step 17032 in which all data about each image frame and each region of interest which respectively provided within each respective image frame are used to create the trigger table. Alternatively, step 17031 is followed by step 17022. Step 17034 follows step 17032 and ends the functional step 17004.

Step 17005 is shown by flowchart 17005 in FIG. 127 and begins with a first step 17050 in which each identified region of interest (each region of interest having a respective identification number as described with respect to step 17004) is combined in a single table. Step 17050 is followed by step 17052 in which each combined region of interest in that singled table has an associated and respective position within system 10 assigned to it using a full frame image. Particularly, the assigned position of a region of interest is the position along the "x" axis which allows the region of interest to have its image captured by cameras 26 in a full frame. Step 17052 is followed by step 17054 in which the functional step 17005 is ended.

Step 17006 is shown by flowchart 17006 in FIG. 128 and begins with a first step 17060 in which for each entry in a target trigger table, the frame is found with the closest matching conveyor position in the full frame table. Step 17060 is followed by step 17062 where, using the full frame identification numbers or "IDs", the corresponding full frame crop values are identified or "looked up". Step 17062 is followed by step 17064 where all the crop values are added to a table to be read during production, organized by target frame ID. Step 17066 follows step 17064 and is where step 17006 is ended.

Referring back to flowchart 166 of FIG. 120, step 212 is followed by step 214 where the object enters the system and a start signal is sent to the triggering board 60 and the tracking server 40 resets its position tracking function to the beginning point 303 of the direction or path 20. This "beginning point" 303 is the point at which the part or object 14 begins to enter the field of energy 22 or enters the inspection system 10. During this step 214 the tracking server 40 sends a signal to the triggering board 60 which indicates to the triggering board 60 that a new object or item 14 is to be inspected. Step 216 follows step 214 and this is where positional data from the tracking system 40 is passed to the triggering board 60 which is used to determine the location of the object 14 so the cameras 26 and lights 18 can be triggered or selectively activated/energized based on the defined positions in the trigger table. Once the cameras 26 have been triggered, the actual position where the image was taken is recorded and logged into a file on the NAS server 70 so that it can use used by the clustering service later in the process. Step 218 follows step 216 and in this step 218 the scan process is completed. A more detailed discussion will now ensue regarding the operation of the system 10 by reference to the flowchart 4000 in FIG. 121.

Particularly, flowchart 4000 or the operation of system 10 begins with an initial step 4001 in which a world coordinate system is defined. This world coordinate system is more fully described below.

Step 4001 is followed by step 4002 in which at least one of the cameras 26 and at least one of the lights 18 are "associated" or paired. A light is paired with a camera when the light generates light at a correct and predefined time and effective to allow light energy to be generated of a correct and predefined uniformity and intensity to allow the camera to acquire an image of a surface to be inspected, such as surface 12, of an object, such as object 14.

Step 4002 is followed by step 4004 in which the at least one camera is calibrated to the defined world coordinate system. This is also more fully described below. Step 4004 is followed by step 4006 in which the position of an object, such as object 14, is tracked as the object travels through the system 10. This tracking functionality has been discussed and will be discussed further below. Step 4006 is followed by step 4008 in which a sequence of scan images is acquired of the surface to be inspected of the object which is to be inspected. This functionality has been discussed and will further be discussed later.

Step 4008 is followed by step 4010 in which the acquired scanned images are processed to find defects regions of interest and this has been discussed and will further be discussed below.

Step 4010 is followed by step 4012 in which information about each of the defect regions of interest is encoded into feature vectors and this function will be more fully described below. Step 4012 is followed by step 4014 in which each of the regions of interest are classified as being noise or being a true defect and this classification uses a score technique. This function will be more fully described below.

Step 4014 is followed by step 4016 in which a mapping is accomplished of the region of interest location associated with a defect from the coordinate system used to calibrate the cameras to a three dimensional location on the object to be inspected (such as, by way of example and without limitation, a vehicle). Step 4016 is followed by step 4018 in which a clustering of defect regions of interest into defect clusters is accomplished. The functionality associated with steps 4016 and 4018 are more fully described below.

Step 4018 is followed by step 4020 in which the created defect clusters are classified as being a true defect or not a defect according to a derived score. This functionality is more fully described below.

Step 4020 is followed by step 4022 in which an outline of a defect shape is made from the true defect regions in a defect cluster. This functionality is also more fully describe below. Step 4022 is followed by step 4024 in which the defect clusters of a true defect are grouped in a region of the object to be inspected and step 4024 is followed by step 4026 in which a three dimensional simulator is used to generate region images of defect shapes from the grouped defect clusters in a region of the object to be inspected. The respective functions of steps 4022 and 4024 are more fully described below.

Step 4026 is followed by step 4028 in which the information about a region image and defect cluster group is encoded into a region feature vector and step 4028 is followed by step 4030 in which a pattern classifier is used to classify a defect from a region feature vector. The functionality of step 4028 and 4030 are more fully described below.

Step 4030 is followed by step 4032 in which information about the various identified defects are stored in a database, such as that resident within the NAS or archival server 70. Step 4034 follows step 4032 and in this step 4034, defect information is allowed to be accessed by various monitors 52 or transmitted by the system 30 to a predetermined location. Step 4034 is followed by step 4036 in which the defect database, resident within the system 30 (e.g., within the server 70) may be used to update the training of classifiers and this will be discussed below.

Figure 13:
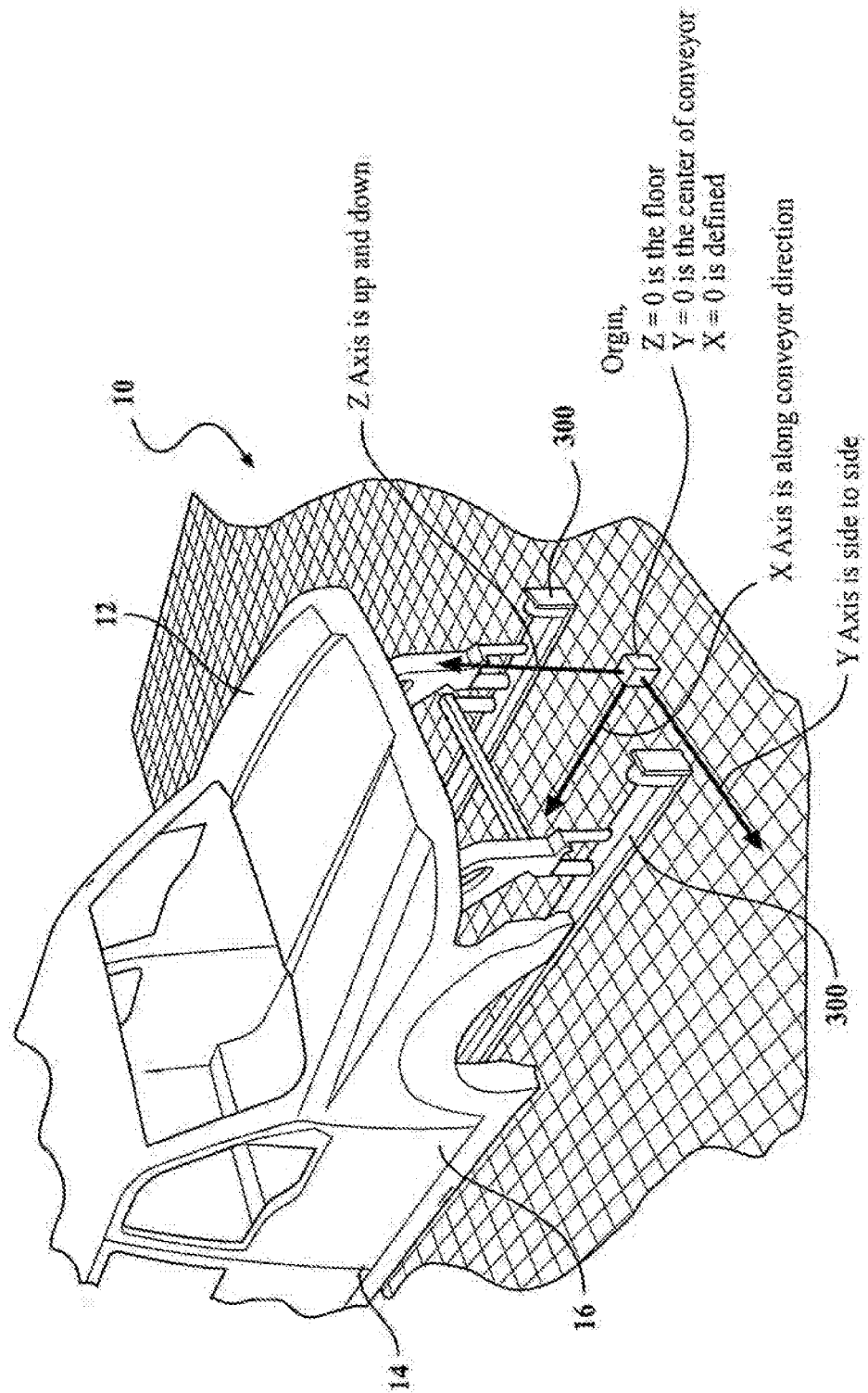
FIG. 13 is a perspective view of a tracked object in combination with a conveyor assembly and further illustrating a utilized world coordinate system.

As discussed briefly earlier, an object to be inspected 14 is transported along a repeatable object travel path or direction 20. The object travel path or direction 20 is really defined in a three dimensional world coordinate system having a world origin point and a world coordinate axis. In this description the terms "path" and "direction" each refer to the route that an inspected object, such as object 14, traverses as it travels through the inspection system 10. In one non-limiting example, the inspected object 14 could be an automobile body, and the object travel path 20 could be the path followed by the automobile body on a conveyor in a manufacturing plant as shown in FIGS. 1 and 119. The world coordinate system may be defined by a point on the floor in the geometrical center of the conveyor 300 (upon which the carrier 16 resides), with the "z" axis pointing up from the floor, the "y" axis pointing to the side of the conveyor, and the "x" axis pointing in the opposite direction of the conveyor's forward motion direction, see for example, FIGS. 1, 13 and 119.

Referring now to FIG. 131 there is shown a flowchart 30000 which comprises a sequence of steps required to acquire the images of the part or object scan associated with step 128 of flow chart 120.

Flowchart or algorithm 30000 begins with step 30001 where certain predefined cameras (of camera assembly 26) and certain predefined lights (of assembly 18) are activated by the trigger board 60 based upon the sensed position of the object 14 and the frame location, both of which are specified in the trigger table. In this step the image capture server 62 is prepared to receive images from the cameras of assembly 26 as the images are transmitted from the cameras (of assembly 26) and as these cameras (of assembly 26) are selectively activated or triggered by the triggering board according to the trigger table. Step 30002 follows step 30001 which is where the camera service portion of the image receive or capture server 62 receives the images as they are transmitted and saves them to memory and labels them with the assigned "frameID" or frame identification number. The frameID is synchronized with the trigger table so that later in the process the clustering service (a software portion of the image processing server 66) can look up the actual position that the frame was taken to accuracy locate defects that were found. The actual respective object position the respective images were taken is recorded by the triggering board 60 and stored in a file in memory on the NAS server 70 once the scan is completed. Following step 30002 is step 30003 which is where the acquired images are transferred to the image processing server 66 and then the acquiring image process ends on step 30004.

Referring now to FIG. 132 there is shown a flowchart or algorithm 30005 which comprises a sequence of steps required for processing the images received as a result of the scan of the part or object 14 which occurred in step 130 of flow chart 120.

Flowchart 30005 begins with step 30006 in which the image processing server 66 receives images from the image receive server 62. Step 30006 is followed by step 30007 where the individual images from the scan of the part or object 14 is processed within the image processing server 66 and by use of algorithms described later in the document. Based on the respective identity of the camera and region on the part or object 14 at which the respective images were taken, a respective image processing "recipe" is used for each respective and received image and which are respectively determined during the image tuning process. If there is not a specific recipe defined for the identified camera and the identified region of an acquired image, the default image processing parameters are used for the processing of that image. In step 30008, which follows step 30007, a sequence of image processing algorithms are respectively applied to each of the received images to find respective bright spot and dark spot defect regions of interest. These defect regions of interest are saved to a log in memory. Following step 30008 is step 30009 in which a transfer is made of the log file containing all the defect regions of interest to the post processing server 68. Step 30010 follows step 30009 which is the end of flowchart 30005.

Referring now to FIG. 133 there is shown a flowchart 30011 which comprises a sequence of steps required to apply the defect identification algorithms to the images of the part or object scan associated with step 132 of flow chart 120.

Flowchart 30011 shows a sequence of steps associated with applying defect detection algorithms for a single image and which is applied, during system operation, to all of the processed images which have been processed in accordance with the previously described step 130. The flowchart 30011 begins with step 30012 in which is the log of defects found by the image processing algorithm is received from the image processing server 66 to the post processing server 68.

Step 30013 follows step 30012 and represents the process of applying a noise classification algorithm to the defect regions of interest which is effective to eliminate potential defect regions of interest that are determined to be noise. The output data of step 30013 is used in the next step, which is 30014, and in this step 30014 the two dimensional or "2D" locations of the identified defect region of interest are projected or "hit tested' to the three dimensional or "3D" model of the part or object 14. In step 30015, which follows step 30014, a clustering algorithm determines if any of the defect regions of interest meet the clustering criteria and those that do are determined to be an actual defect. Following step 30015 is step 30016 in which further analysis is performed on the actual defects found, including determining the three dimensional or "3D" location of the defect, size of the defect, and type classification of each defect and this information is saved in a log in memory for the part or object 14 that was scanned. Following step 30016 is step 30017 which is the end of flowchart 30011. As earlier indicated, the foregoing functionality is applied to each processed image from step 130.

Referring now to FIG. 134 there is shown a flowchart 30020 which comprises a sequence of steps required for outputting the defects identified on the part or object 14 which is required by and associated with step 134 of flow chart 120.

Flowchart 30020 begins with step 30021 where the logged defects are loaded from the NAS server 70 for the part or object 14 that was scanned. Step 30022 follows step 30020 if manual repairs of the defects are going to be made and step 30026 follows step 30021 if a robotic or automatic repair is going to be made. In some systems, both step 30022 and step 30026 may be executed if the system uses a combination of manual repair and automated robotic repair. The manual repair process starts with step 30022 where the three dimensional or "3D" positional coordinates of the defect are translated to a coordinate system that can be used to display the data on a monitor (such as one of the monitors 52) that is viewed by the manual repair operator. Following step 30022 is step 30023 which requires that the identified or "found" defects are respectively transposed onto an image of the part or object 14 so that the relative and respective positions of the respective "found" defects on the part or object 14 can be determined by the operator who is using the monitor to determine the position of the defects that need to be repaired. In step 30025, which follows step 30024, the part or object 14 is presented to the operator for manual repair while the image of the object 14 including the respective locations of the respective "found defects" upon an image of the object 14 will be displayed on a monitor (such as one of monitor 52) to the operator(s) thereby eliminating the need for the operator(s) to search the part or object 14 for defects. Instead the operators can determine the respective location of the defects from the monitor (e.g., monitor 52) and focus of repairing the found defects. Following step 30024 is step 30025 in which the "defects found" are saved in a database for future data reporting capabilities and historical recordkeeping. Step 30032 follows step 30025 and is the end of the flowchart for a system using manual defect repair method.

For a system using automated and/or robotic defect repair, step 30021 is followed by step 30026 in which the respective defect positional coordinates are translated to the coordinate system determined by the type of robot (or other automation assembly) being used for the automated defect repair process. Following step 30026 is step 30027 in which algorithms are used to sort the respective defects by location and their classification type so that the defects can be grouped based on the respective identity of a robot (or other type of automated) repair assembly that could physically reach each respective defect for repair. The algorithm would last determine the overall processing time required for each robot (or other automated assembly) and redistribute the defect repairs amongst multiple robots (or other automated assemblies) to equalize the processing time of all the robots (or other automated assemblies) in the automated repair zone. This distribution could be limited by whether the robot (or other automated assembly) in a zone could reach a defect. Step 30028 follows step 30027 where the data determined in step 30027 is used to create a schedule of defects for each robot (or other automated assembly) to be repaired. The repair schedule would also include the respective recipe numbers for the type of respective repairs required which is determined by the defect type classification determined during the scan process. Following step 30028 is step 30029 in which the part or object 14 is presented to the robot (or other automated assembly) for automated defect repair; and the schedule of defects to be repaired are transmitted to the robot or robots or other automated assemblies for a multiple robot or multiple automated assembly repair system. The robot (or other automated assembly) would use the locational data to locate the defect on the object 14 and the recipe number to determine the type of repair process which can vary depending on the defect classification type. Following step 30029 is step 30030 where upon completion of a defect being processed by the robot (or other automated assembly), conformation that the defect was successfully repaired would be communicated back to the inspection system and logged in the database for that part or object. This logged information, by way of example and without limitation could reside upon server 70. This feedback from the robot(s) (or other automated assemblies) is especially important in a system that is using a secondary manual repair after the automated repair zone because those defects that were automatically repaired can be filtered from the defects remaining which will be shown on the display when the part of object is presented to the manual repair operator. Following step 30030 is step 30031 which is the end of flowchart 30021.

At this point it should be again realized that a path start point 303 is defined in the world coordinate system as being on the object travel path 20. The inspected object position is the position of the inspected object 14 on the object travel path 20 relative to the path start point 303. See, for example, FIG. 39. The various components and functions of the inspection system 10 will now be discussed in more detail.

(I). The Tracking System

A reference start time, represented as "t0", corresponds to a moment in time when an inspected object (such as object 14) position is zero and equal to the path start point 303. An expected inspected object position may be calculated from an object motion function having motion time as an input parameter, where motion time is relative to the reference start time, "t0". The tracking system or processor/server 40 is used to track the position of the inspected object. In this example, the tracked object is the inspected object 14.

An object position tracking system 40 (it should be realized that the term "system" includes an embodiment which is comprised of a single processor or multiple processors which cooperatively provide the tracking functions which have been and will be described) is used to measure a tracked object position as a tracked object (such as object 14) moves along a repeatable object travel path 20. The object position tracking system 40 provides a best estimate of a tracked object position for an input motion time. The tracked object position includes a tracked object location point and a tracked object rotation matrix. The tracked object rotation matrix specifies how the tracked object (such as object 14) is oriented in three dimensional or "3D" space relative to some chosen frame of reference which is a point 302 of attachment of the object 14 to the carrier 16. See, for example FIGS. 9(a-b) and FIG. 45. A pivot point offset vector specifies the location offset from the tracked object location point and the rotation pivot point. Motion time is specified relative to a starting time, "t0". There are currently commercial object tracking systems known for tracking inspection objects on conveyors. One such system is offered by Liberty Reach, Inc. of Ann Arbor, Michigan such as the commercially available VFIX™ system.

One non-limiting embodiment of an object position tracking system uses one or more tracking cameras having a tracking camera calibration to specify the tracking camera location and tracking camera orientation in the world coordinate system. A tracking camera intrinsic camera matrix is also part of the camera calibration, and includes information for simulating a tracking camera lens, tracking camera sensor, and tracking camera lens distortion. See for example, FIG. 16. This type of camera based tracking system is disclosed within the website www.docs.opencv.org and this material is fully and completely incorporated herein by reference.

An object tracking simulator uses a three dimensional tracked object mesh file and the produced image 400 from the file for simulating the surfaces, such as surface 12, of the tracked object (e.g., object 14). See, for example FIG. 15. Using the tracked object mesh file and image 400 and the tracking camera calibration, the object tracking simulator portion 402 of the assembly 30 generates simulated tracking camera images of a simulated tracked object, such as object 14. The simulator 402 may be coupled to the display monitors 52, in one non-limiting embodiment of the invention, effective to allow the file image 400 to be viewed by a user or operator of the system 10.

A tracked object equation of motion is specified for use by the object position tracking system 40. The tracked object equation of motion inputs an initial tracked object position, "p0", an initial tracked object velocity, "v0", and an initial tracked object acceleration, "a0", and a time interval, "dt". The output of the tracked object equation is the estimated tracked object position, "pe", the estimated tracked object velocity, "pv", and the estimated tracked object acceleration "pa", after the "dt" time interval has elapsed. The tracked object equation of motion is created from known information including how the tracked object 14 is expected to progress along the repeatable object travel path 20 (e.g. the length of the path 20) known information about the inertial properties of the tracked object (e.g., the weight of the tracked object), and properties of the object conveyance system or assembly 300, such as speed The initial tracked object position is typically detected using a first laser distance sensor or proximity sensor 310, which is positioned to detect when a tracked object is at the initial tracked object position 303 See, for example, FIG. 39. This laser proximity sensor 310 may be communicatively coupled to the tracking server or processor 40.

A sequence of tracking image frames is acquired during object tracking. The sequence of tracking image frames starts when the tracked object (e.g. object 14) first reaches the initial tracked object position 303. A tracking image frame is a tracking camera image that is acquired as part of a tracking sequence. The acquisition of tracking image frames is signaled by a digital signal designated as the acquire tracking image signal. In a system with a plurality of object tracking cameras 320, each object tracking camera acquires a tracking image simultaneously when the "acquire tracking image signal is triggered" and communicated to the camera assembly 320 by the tracking server 40. As shown, the cameras 320 may be communicatively coupled to the tracking server or processor 40. The set of tracking image frames taken by object tracking cameras from an acquire tracking image signal is designated as a tracking image frame set. See, for example FIGS. 51 and 52 which respectively provided time sequence images of an object to be inspected, such as object 14, at a first time (associated with the image 408 of FIG. 51) and a second time which is later than the first time (associated with the image 410 of FIG. 52). Such motion tracking systems are commercially available from many companies such as the Polhemus Corporation having a website at www.Polhemus.com and the simulator may be in addition to the image simulator 402.

Figure 17:
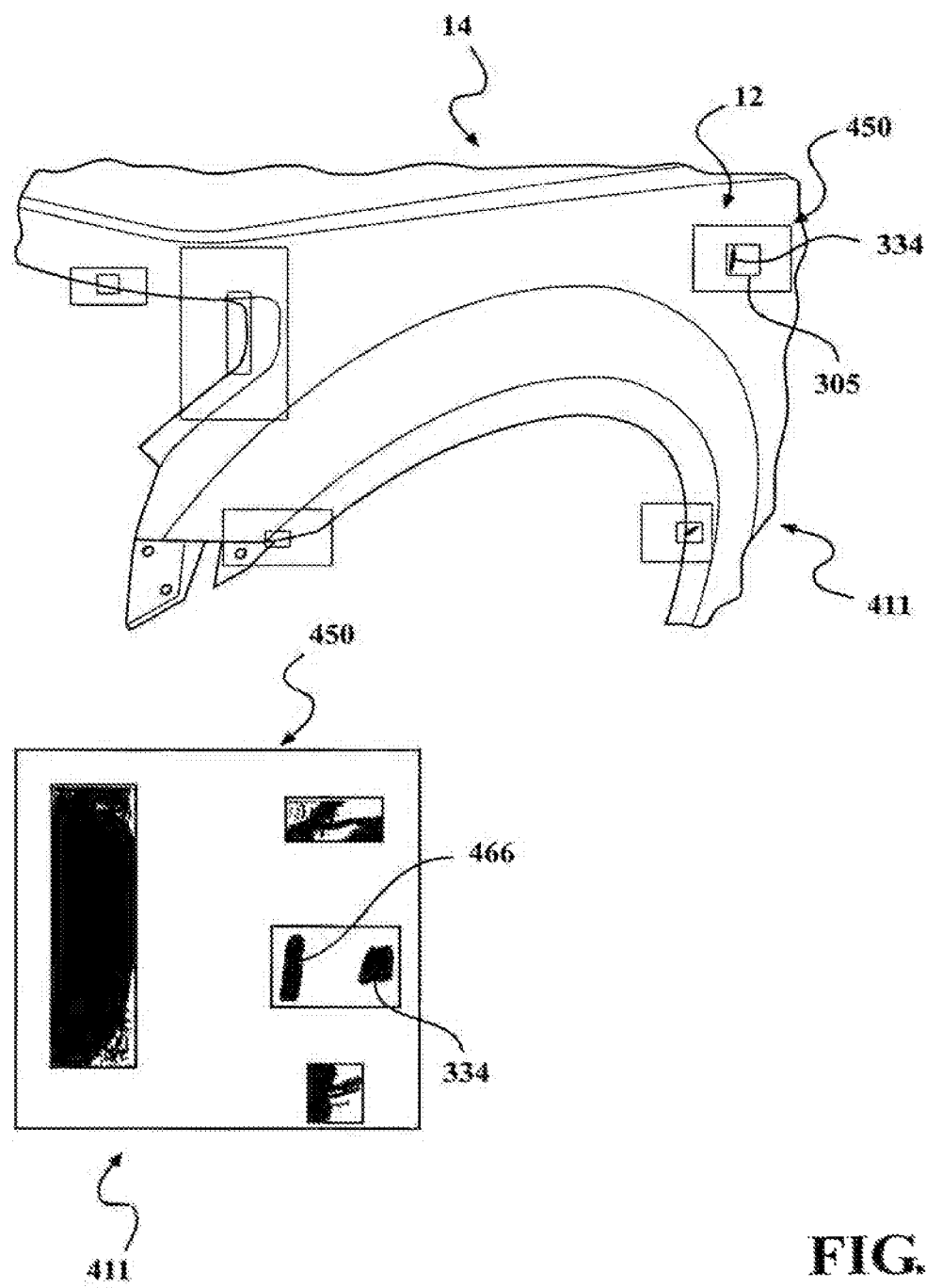
FIG. 17 are exemplary images of a plurality of tracked features, tracked feature keystone images, tracked feature keystone frames, and keystone tracked features search regions.

A tracked feature is a visible feature on a tracked object surface 12 that is selected to be uniquely located in a tracking image frame, such as frame or image 411 of FIG. 17. An example of a tracked feature might be a highly visible bolt hole 334 and/or a highly visible edge corner 305 on the tracked object surface, See, for example, FIG. 17.

A tracked feature is defined to appear in a tracked object position ranging from a tracked feature starting position and a tracked feature ending position. The object tracking system 40 will expect to see the tracked feature in a tracking image frame, such as frame 411, when the tracked object position is between the tracked feature starting position and the tracked feature ending position. A "tracked feature keystone frame" is defined to be the first tracking object frame taken after the tracked object position has reached the tracked feature starting position, such as position 303.

A "keystone tracked feature image region", such as region 450 of FIG. 17, is defined as a region surrounding the tracked feature in a tracked feature keystone frame. A "keystone tracked feature image", such as image 334, is defined as a sub-image extracted from a tracked feature keystone frame, which is bounded by the keystone tracked feature image region. See, for example FIG. 17.

The "tracked feature image center point" is defined as the point at the center of a tracked feature image. For example, center point 466 of image 305 which is shown in FIG. 17. A "tracked feature search region" is a region encompassing a tracked feature image region that is larger than the tracked feature image region.

During a setup process, a tracked feature keystone frame is acquired, and the keystone tracked feature image region is designated, typically by drawing on the tracked feature keystone frame. The keystone tracked feature image is extracted, and the tracked feature search region is typically generated by expanding the edge boundaries of the tracked feature image region by a user defined number of tracked feature search pixels. See, for example, FIG. 17.

A computer simulation 501 of the three dimensional or "3D" object (e.g., object 14), in one non-limiting embodiment of the invention, is also used to select the tracked feature surface center point using hit testing of the 3D object. The "tracked feature surface center point" is defined as the point on the tracked object surface 12 that corresponds to the center point of the tracked feature image region on the tracked object surface. The tracked feature surface point is identified in the tracked object local coordinate system. See for example, FIG. 56. See also, simulation 13000 of FIG. 53.

During the object tracking process, a tracked feature keystone frame is acquired and a search operation locates a tracked feature image point in the frame using a window search. In an example window search, the tracked feature image is systematically shifted throughout the tracked feature search window and convolved at each shift point with the keystone tracked feature image pixels to calculate a search convolution value for the tracked feature image at the shift point. The tracked feature image point is the center point of the tracked feature image inside the tracked feature search window where the search convolution value is maximum.

When a tracked feature frame is not a tracked feature keystone frame, then the window search uses a different tracked feature search window. For these non-keystone frames, the tracked feature search window is shifted so that it is centered on the tracked feature image point from the immediately prior tracked feature frame. This shift of the tracked feature search window at each frame takes place to adjust for movement of the tracked object from frame to frame. The tracked feature image point is calculated for each tracked feature frame until the tracked object moves past the tracked feature end position.

The measured tracked object location and measured tracked object rotation is estimated, in one non-limiting embodiment, from six or more unique tracked feature points that are located in one tracking image frame set. The tracked feature points that are located in one tracking image frame set are designated as a tracked feature frame point set. For each tracked feature point in a tracked feature point set, the following associated data is known from earlier configuration: (a) the tracked feature surface point on the tracked object, in local tracked object coordinates, and (b) camera calibration.

A measured tracked object rotation and measured tracked object location is estimated using conventional and known numerical methods such the well-known quaternion approach. Tracked object rotation and tracked object location are applied to shift the tracked feature surface points to world coordinates, and then the world coordinates are translated to image coordinates using the one or more tracking camera calibrations to get a simulated tracked feature point set. One method of achieving this functionality is shown within steps 13001, 13002, and 13003 of FIGS. 45(A-C). The steps 13001, 13002, and 13003 are applied sequentially with step 13001 being done first and step 13003 begin done last. The camera tracking measured error is the mean squared error of the difference between the simulated tracked feature point set and the actual tracked feature point set. The camera tracking measured error is calculated while the tracked object rotation and tracked object position is systematically adjusted to find the tracked object rotation and tracked object position where the camera tracking measured error is minimized for the tracked feature point set. The tracked object rotation and tracked object location that provide the minimum tracking measured error is reported as the measured camera tracked object location and the measured camera tracked object rotation for a tracking image frame set.

In a special case using a stereo configuration, a plurality of tracking cameras, such as those cooperatively comprising assembly 90, with known calibrations to specify tracking camera intrinsic and tracking camera extrinsic matrixes are positioned so that the same tracked feature points are estimated independently by two or more tracking cameras. In other words, each feature point is tracked by a plurality of cameras. The well-known "OpenCV library triangulate points method" may be used to estimate the position of each tracked point in world coordinates. See, for example, FIG. 44. These calculated feature point locations in world coordinate space are then used to calculate the measured tracked object position and tracked object rotation using point data from the tracked object mesh. In this case the object to be tracked is a tea pot 599 although other objects may be tracked in a similar way.

Secondary object tracking subsystems may be employed to provide higher frequency position estimates than can be provided by the camera tracked object location estimates. For example, one or more laser distance sensors (such as sensor 399 shown in FIGS. 38 and 49) may be positioned along the repeatable object travel path 20 to measure the forward motion of the tracked object 14 Laser distance calibration data may be used along with laser distance measurements to triangulate the estimated tracked object position. The laser distance sensors may be staggered with overlapping ranges if the range of a single laser distance sensors is not sufficient to cover the entire distance traveled by the tracked object along the repeatable object travel path. See, for example, FIG. 38. One potential laser distance sensor is offered by Keyence Corp., sensor head IL-2000.

The secondary object tracking subsystems may only provide the location change along the tracked object path 20 but not rotation updates. However, the secondary object tracking system may update position data with a higher frequency than the camera object tracking system. The secondary object position is updated when a digital signal known as the update secondary location signal is triggered. The update secondary location signal usually has a frequency that is an integer multiple of the acquire tracking image signal. The two signals are in phase so that the rising edge of the acquire tracking image signal will occur at the same time as a rising edge of the update secondary location signal.

The object tracking system 40 estimates the true tracked object position and true tracked object rotation using a Bayesian inference network. A special case version of the Bayesian inference network is the Kalman filter. The Bayesian inference network combines statistical models of noise sources in the object tracking system, the tracked object equation of motion, past history, and the current measurements of tracked object position to make a best estimate of the true tracked object position and true tracked object location. Noise in the object tracking system includes estimation error, sensor measurement error, vibration noise, and modeling error in the tracked object equation of motion. The Bayesian inference network also estimates the current true velocity and current true acceleration.

A Bayesian inference network is configured to estimate the true tracked object position and rotation. Each time a measured position or rotation is updated, the true states are estimated using a deep learning tool such as Microsoft's Infer.net library or by using a classical Kalman filter. A Bayesian inference network may implement a Kalman filter, but it is flexible and more generalized than a Kalman filter.

For example, a Bayesian inference network may estimate the true state position and rotation of the tracked object, and also estimate the expected next state position and rotation. The Bayesian inference network is organized using state variables for the system, the tracked object equation of motion, and math models of the conveyance system. Inputs to Bayesian inference network include the measured tracked object location and measured tracked object rotation as well as secondary tracked object position estimates. The Bayesian network would use learned statistical noise profiles for measured values and noise profiles for the error introduced by the tracked object equation of motion.

Thus, in one non-limiting embodiment of the invention, one or more tracking cameras (such as tracking cameras 320) are connected to one or more tracking system computers (such as computer assembly 40) A tracking camera computer 40 is preloaded with tracking system configuration data for the tracked object that is expected. Tracking system configuration data includes keystone tracked images, search windows, tracked feature start positions, tracked feature end positions, the tracked object motion equation, tracked feature surface points, tracking camera calibrations, and noise profiles for the Bayesian inference network. The tracking system computer is aided by multiprocessor computing systems such as multi-core graphical processing units. When a tracking image frame sets are received by the tracking system computer, the measured tracked object location and measured tracked object rotation is calculated. Additionally, the secondary object tracking subsystem supplies measurement updates to the tracking system to provide high speed tracked object position estimates.

(II) Inspection

At least some of the inspected object surface, such as surface 12, is either specular or covered by a specular coating, meaning that the surface is at least partially reflective. For example, an automobile body may be covered by a reflective paint coating. The specular coating allows light to be specularly reflected from the inspected object surface.

The inspection system 10 can be configured to inspect more than one type of inspected objects. The configuration group identifies configuration data for the inspected object. A tracked object model number identifies the type of tracked object handled by the system. The tracked object version number specifies a version of tracked object for a tracked object model number. Surface variations such as color or coating variations may also be coded as part of the configuration data. Configuration data for a tracked object configuration group is organized and stored hierarchically by tracked object model number and by tracked object version number then by surface characteristics. The tracked object model number and tracked object version number and tracked object surface characteristics will be supplied to the inspection system before the inspected object reaches the path start point. The inspection system 10 loads configuration data for the tracked objects configuration group and waits for the tracked object to reach the path start point.

A camera-light pair includes an inspection camera and a light source (e.g. one of the cameras 26 and one of the lights 18) The camera is located at a camera position and the light source is located at a light position. See, for example, FIG. 22. A camera orientation describes how the camera is oriented using a camera look vector and a camera up vector. A light source orientation describes how the light source is oriented using a light source look vector and a light source up vector. The camera and light source are individually positioned near the object travel path, such as path 20, so that the light source 18 reflects light from part of the inspected object's specular coating into the camera's lens while the inspected object 14 moves along the object travel path. The light reflection bar 700 the region on the inspected object surface 12 that reflects light from the light source (e.g. one of the light sources 18) into the camera (one of the cameras 26) when the inspected object 14 is at a particular inspected object location. See, for example, FIG. 30. A dark spot defect 701 is shown.

A camera image is an image taken by the camera (e.g., one of the cameras 26) and is comprised of camera pixels having camera pixel values. The camera image has a camera image pixel width and a camera image pixel height. The camera (e.g., each of the cameras 26) includes a camera lens having a lens focal length value, a lens f-stop value, and a lens focus setting. Each of the cameras 26 respectively includes a camera sensor having a camera sensor width and a camera sensor height.

A sequence of camera frames is created when the camera (e.g., one of the cameras 26) takes a series of camera images while an inspection object (e.g., object 14) moves past the camera. A "camera frame" is defined as a camera image that is included in the sequence of camera frames. Each camera frame in the sequence of camera frames is assigned a unique frame identification number or "id". Typically, the camera frames in the sequence are ordered by the time when each camera image was acquired; so the frame id is the same as the position of the camera frame in the sequence of camera frames; and the first camera frame taken in the sequence has a frame id of 1, the second camera frame taken in the sequence has a frame id of 2, and so forth.

The "reflection swath" is defined as the region of the inspected object surface, such as surface 12, created by combining the light reflection bars for all inspected object positions as the inspected object, such as object 14, moves completely along the object travel path.

An "inspection swath" is defined to be the subset of the reflection swath which is singled out for inspection by the camera (e.g. one of the cameras 26). Typically the inspection object surface regions covered by an inspection swath will have similar surface normal vectors with only minor deviation from an inspection swath average surface normal. See, for example, simulation tool image 501 of FIG. 56. See the inspection swath 703 and the camera swath 711 on object 14 in FIG. 31. The camera position and camera orientation are typically selected to target a desired inspection swath on the inspected object surface of interest 12. The camera look vector is typically oriented so that is in the opposite direction of the inspection swath average surface normal.

The camera image pixel resolution has units of area per pixel. The camera image pixel resolution gives the area of the inspected object surface captured by a camera image pixel. The camera image pixel resolution may vary among camera image pixels in the same camera image because the curvature and orientation of the inspected object surface may vary significantly under the different camera image pixels of the camera image. The camera image pixel resolution can be modified by changing the camera location or by changing the lens focal length.

The camera location and lens focal length are selected to obtain a desired camera image pixel resolution within the light reflection bar in the camera image. While the camera image pixel resolution may vary within the light bar reflection, the average camera image pixel resolution should be close to the desired camera image pixel resolution. The desired camera pixel image resolution is typically selected so that there are at least 7 pixels per minimum defect width and 7 pixels per minimum defect height. This level of resolution provides for a high resolution view of a defect and aids in rapid defect detection. For example, if a minimum defect width is 7 mm, then the desired camera image pixel resolution would be about 0.01 mm2 per pixel. Non-limiting examples of calculations related to the positioning of the camera are in FIGS. 57(A-D) and 58(A-C).

Variations in the curvature of the inspection object surface 12 will cause the position of the light reflection bar within a camera image to vary over a sequence of camera frames. The light position and light orientation are typically configured so that the light reflection is at or near the center of the camera image for most of the camera frames within the sequence of camera frames.

An angle of reflection at a point on the spectral coating of the inspection object surface 12 is the angle at which a light ray from the light source reflects from the inspection object surface. The angle of reflection is calculated for an incident ray from the light source where the incident ray intersects with the inspection object surface using the surface normal at the point of intersection. When the specular surface is defect free then the angle of reflection which is created from the light emanating from the light source 18 is consistently reflected into the light reflection bar in a camera image.

In brightfield analysis, defects are identified by finding dark spots in the light reflection bar. Defects on the inspection object, such as object 14, cause discontinuity in the specular surface normal vector, causing incident rays from the light source to reflect inconsistent angles of reflection in areas where the defect is located. A defect will prevent the light source from reflecting consistently into the light reflection bar of the camera image because the surface normal on the inspection object surface is different from the surface normal surrounding the defect. The defect will appear as a dark spot 801 in the light reflection bar 805. See, for example, FIG. 5.

In darkfield analysis, defects are identified by finding bright spots (such as bright spot 808) near the exterior edges (such as edge 809) of the light reflection bar (such as bar 817) The light reflection bar has a darkfield located on the external edges of the bar where light is not usually reflected. Bright spots are formed by light reflected from a defect that appears in a region of the image outside of the light reflection bar. See, for example, FIG. 3, The light source (such as one of the lights 18) has a light source width and a light source height. Typically the light source height is much greater than the light source width. The light source width is selected to highlight defects in the specular coating. If the light source width is too large, then dark spots may be washed out and be difficult to detect in the light reflection bar. If the light source width is too narrow, it will be difficult to distinguish defects in the light reflection bar from noise on the edges of the light bar reflection. A typical light source is a fluorescent tube ranging from a T4 to a T8 sized bulb. In one non-limiting embodiment each of the lights 18 are substantially identical and are of the "flat LED" type.

The light reflection bar width is the width of the light reflection bar on the inspected object surface 12. See light reflection bar 13005 in FIGS. 20 and 21. Variations in the positions and curvature of the inspection object surface will cause the light reflection bar width to vary. The light position also impacts the light reflection bar width. Typically, the light position and light source width are selected so that the light reflection bar width will be predominately between 0.5 cm and 2.5 cm on the inspected object surface.

Advantageously, the camera location, camera orientation, and light position do not need to be precisely calculated and may be established using the simulation techniques described above and further below or through physically adjusting the camera location, light position, camera orientation, and light orientation with the goal of having substantially uniform intensity and brightness while covering the surface 12 to be inspected.

A frame position table, such as table 900 of FIG. 54, specifies the inspected object position when each camera frame in the sequence of camera frames will be acquired. The frame position table pairs a camera identification number or "id" (such as frame 901) with an inspected object position (such as position 902) having a frame identification number or "id" (such as frame 903). The term "id" here means identity or identification as set forth above. Entries in the frame position table may be manually created, or they may be updated from a simulation described above and below. Typically, the frame position table is generated so that an inspection point in the reflection swath will appear in the light reflection bar for at least three camera frames. See, for example, the frame sections 931-933 which cooperatively form a frame 930 as shown in FIG. 55. Entries on the same horizontal line of the displayed table 900 in FIG. 54 are those that are jointly associated and paired That is the camera, identification information, the frame identification information, and the position data respectively residing on the same horizontal line in table 900 all refer to the respective camera and respective frame identification for that respective listed position.

(III) The Simulation

An object coordinate system is defined for the inspected object 14. This object coordinate system is local to the inspected object. An inspection object mesh is a three dimensional or "3D" simulation data object that defines the surfaces of the inspection object 14 for 3D simulation. Mesh vertex points in the inspection object mesh specify points in the object coordinate system to define triangular mesh surfaces in the inspection object mesh. A mesh surface is defined using three mesh vertex points. The inspection object mesh contains mesh vertex points and mesh surfaces to describe the inspected object surface sufficiently for simulation.

A simulator, such as simulator 402, is used to simulate the inspection camera's view of the inspected object at a particular inspected object position. The camera view may be modeled in the simulator using the camera location, the camera up vector, camera look vector, and camera distortion parameters. A simulated inspected object position can be calculated using the object motion function using an input motion time. A simulated light reflection from a simulated light source from the simulated object's surface into the simulated camera may also be simulated using a technique such as ray-tracing. A simulated camera frame is a simulated camera image taken using the simulator.

(IV) The Camera Region of Interest

An image computer assembly 66 processes frames from the inspection cameras 26. When the inspection object 14 is examined using a high camera image pixel resolution, it may be important to reduce the bandwidth needed to transfer frames between the camera and the image capture or reception computer 62 One or more camera regions of interest may be specified as part of the camera firmware. A camera region of interest specifies a subset of camera pixels in a camera frame that are transferred from a camera (such as those within camera assembly 26) to an image computer assembly, such as assembly or server 62, which reduces the bandwidth needed to transfer frames between the camera and the image computer. Camera regions of interest may be modified for each camera frame in a sequence of camera frames, or the camera region of interest may be constant for all camera frames in the sequence of camera frames. The camera region of interest is selected so that it will capture the areas of light reflection bar in a camera image that will become part of the inspection swath. The camera region of interest should be wider than the light reflection bar so that it can capture both the dark field and bright field regions.

The light reflection bar will vary from camera frame to camera frame within a sequence of camera frames due to changes in the inspection object position and variations in the curvature of the inspection object surface. The camera region of interest can vary from frame to frame in the sequence of camera frames to accommodate the movement of the light reflection bar. A camera region of interest frame table can be used to define the camera region of interest for each frame id. The camera region of interest frame table defines the boundaries of the camera regions of interest for each frame id (note that there may be more than one camera region of interest per frame). One non-limiting example of a camera region of interest is camera region of interest 1999 shown in FIG. 33 for a JAI Go series camera.

The simulator may be used to create simulated camera frames having simulated light reflections for the sequence of camera frames. The simulator can test predefined camera regions of interest using the simulated camera frames and verify that the camera region of interest is wide enough to capture the light reflection bar, dark field, and bright field for the inspection swath.

Typically, the simulator may be used to generate the camera regions of interest for a sequence of camera frames. The camera region of interest algorithm will input parameters including a minimum light bar edge distance, a surface normal tolerance, and a pixel resolution tolerance.

The camera region of interest for each frame can be calculated using simulation. The simulator, such as simulator 402, generates a simulation image for an inspection object position and identifies simulated image pixels that are illuminated by the reflection bar and sets these camera image pixel values to 255. All pixels in the simulation image that are not illuminated by the reflection bar are masked to 0. Pixels in the reflection bar with a surface normal outside the range of the surface normal tolerance are also masked to 0. Pixels in the reflection bar with a camera image pixel resolution out of range of the pixel resolution tolerance are masked to 0. An erosion and dilation image processing step may be used to eliminate small regions in the simulation image. A bounding box encompassing the non-mask pixels having a value of 255 is calculated. This bounding box is padded by the minimum light bar edge distance to create the final camera region of interest bounding box. The process is repeated for each camera frame to build the camera region of interest frame table.

Camera regions of interest defined in a camera region of interest frame table may be compacted to reduce the total number of camera regions of interests needed for a sequence of camera frames by combining a plurality of camera regions of interests into a single bounding box that encompasses all of the individual bounding boxes defined for the combined camera regions of interest. In some cases a single camera region of interest may be defined for all camera frames in the sequence of camera frames.

(V) The Use of Multiple Cameras

A single camera-light pair is associated with an inspection swath. A single inspection swath will seldom completely cover the inspected object surface. In the inspection system, at least one camera-light pair is used, but a plurality of camera-light pairs may be positioned at various camera locations and light locations to increase overall inspection coverage of the inspected object. Each camera light pair is assigned a unique camera id.

Figure 14:
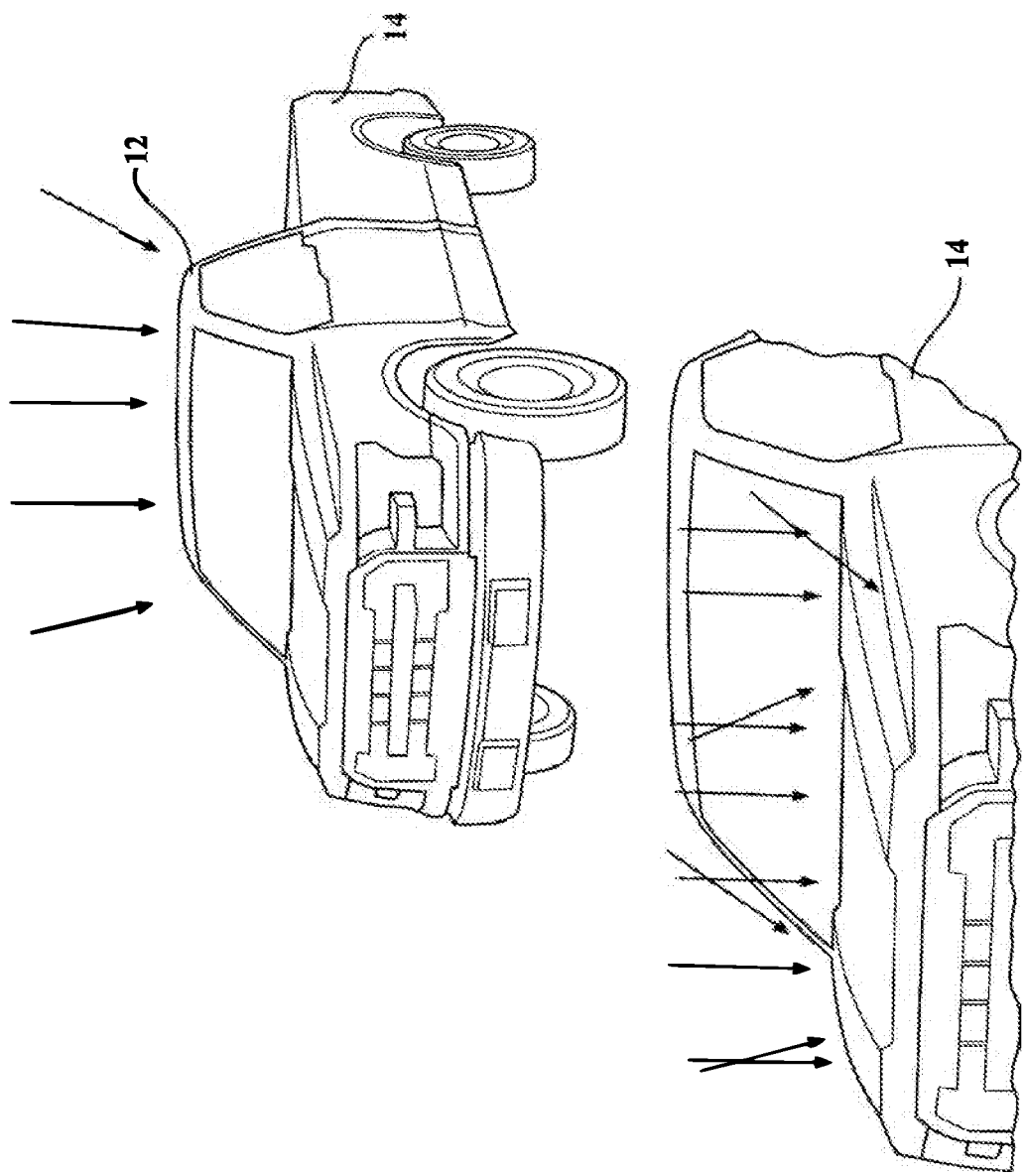
FIG. 14 is a perspective view of an object to be inspected in combination with a plurality of light vectors respectively corresponding to unique object image swaths.

When a plurality of camera-light pairs is used, some camera-light pairs may be positioned to inspect the sides of the inspection object, while other camera-light pairs may be positioned to inspect the top of the inspection object. Camera-light pairs are typically placed so that inspection swaths overlap. The inspection object 14 may have variable curvature, so camera-light pairs may need to be added to target various ranges of surface normal on the inspection object surface in order to increase overall inspection coverage. Examples are shown in FIG. 14. With reference to FIG. 14, arrows indicate multiple camera loom vector directions to get inspection swaths that cover a surface of the object. Many cameras may be used to cover various depths and angles of hoods, roofs, and trunks, where the object is a vehicle as shown in FIG. 14.

(VI) Coverage Analysis

Overall inspection coverage of the inspected object surface is analyzed using a simulator. The simulator coverage analysis uses an inspection object mesh, the camera-light pair camera locations, camera orientations, light locations, light orientations and the object motion function to simulate the inspection object as it is passing through the inspection system on the repeatable path. The inspection swaths for the various camera-light pairs are calculated to determine overall inspection coverage.

Simulation is also used to generate a combined frame position table that incorporates the frame position table for each camera into a combined table that specifies the object location when each camera frame should be acquired using a common start path point for all cameras. The combined frame position table will only schedule camera frames that contribute to an inspection swath, which will vary from camera to camera. When the light source is capable of being turned on and off very quickly, then the simulator can construct the frame position table so that only one light source is turned on at a given moment of time, preventing any interference by other light sources in a camera image.

(VI) The Light Source

The light source (such as lights 18) may comprise florescent tube lights. Alternatively, a light source that is capable of being turned on and off very quickly is preferred. A plurality of light emitting diode ("LED") light sources covered by a light diffuser is one example of a light source that can be turned on and off very quickly. See. For example, FIG. 32. It is advantageous to use a light source that is capable of being turned on and off (e.g., activated and deactivated) quickly to minimize heat from the light source, to conserve electricity, and to prolong the lifespan of the light source. The light may be turned on immediately before the camera image is acquired, and then turned off immediately after the camera image is acquired. Light source intensity may be programmatically controlled using digitally adjusted programmable variable resistor to control power to the light source. Other examples of well-known light control options include light sources controllable by Dali standard light controllers. In one non-limiting embodiment, the intensity is adjusted by changing the rate at which they turn on and off or are activated or deactivated. Light source intensity may also be controlled by the length of time the light is turned as a percentage of the camera's exposure time.

(VI) Frame Computing Steps

When more than one camera-light pair is in use, it is unlikely that all of the cameras will be in use at the same time because the individual inspection swaths of the individual cameras will come into view at different object positions. Therefore, the camera-light pairs can sometimes share computing resources.

An image processing computer assembly 66 receives an image frame from the camera assembly 26, as previously described, over a camera connection having a limited bandwidth and by use of an image capture server 62 which may or may not form a separate processing unit separate and apart from the assembly 66. The image processing computer assembly 66 has one or more processing units and memory. The image processing computer assembly 66 may also be in communication with other image processing computers using a data connection. Typically the processing units on the image processing computer assembly 66 are a combination of central processing units (CPU) and graphics processing units (GPUs). The memory is also a combination of memory types and has capacity sufficient to support buffering of images, sub-images, and associated data as they are processed to detect defects. Processing of the image and defect analysis may be buffered and queued to take place in processing stages separated by buffers. Processing stages may be distributed across more than one image processing computer, and data may be transferred between buffers on image processing computers via the data connection. Separating processing stages with queues and buffers allows computing resources to be used efficiently.

A camera frame may be constructed from one or more camera frame regions of interest images. Pixels in a camera frame that are not part of a camera frame region of interest will typically default to a pixel value of zero. A frame cropping boundary may be applied to the frame image to further decrease the image dimensions and make the frame image smaller for faster processing by the computer algorithms. In some cases, no frame cropping boundary is defined at all. The frame cropping boundary may be stored as part of configuration for the frame. The frame cropping boundary may change on a frame by frame basis to accommodate changes in the inspected object position from frame to frame. For example, in one frame there may be a large hole in the inspection object surface that is cropped out using a frame cropping boundary configured as part of the frame algorithm parameter.

If the frame image is a color image having more than one color channel, then the frame image may be converted to a grayscale image using one of several well-known techniques for converting from color to grayscale. For example, the new grayscale value may be an average of the color channel values. Converting a color frame image to grayscale can reduce the size of the image which can speed up data transfer and image processing time.

(VI) Vibration

The inspected object 14 may vibrate and lurch as it moves along the repeatable object path 20. The inspected object 14 will also have a forward velocity in the direction of the movement of object 14. Vibration contributes to the tracked object velocity. A vibration profile can be measured on an inspected object vehicle using a three axis accelerometer, such as accelerometer 370 which may be mounted upon the object to be inspected 14 or upon the carrier 16 (see, for example FIG. 1) and which, by way of example and without limitation, may be in wireless communication with the server or assembly 66. By integrating the measured acceleration over windows of time, velocity shifts due to vibration may be calculated over windows of time. See, for example, the vibration data 869 shown in FIG. 18. A maximum probable vibration velocity may be estimated from the vibration profile. The maximum probable velocity with respect to the inspection camera is calculated by adding the tracked object velocity to the maximum probable vibration velocity. The inspection camera shutter speed should be fast enough to prevent a defect from smearing across pixels due to motion when the tracked object is moving at the maximum probable velocity.

Figure 18:
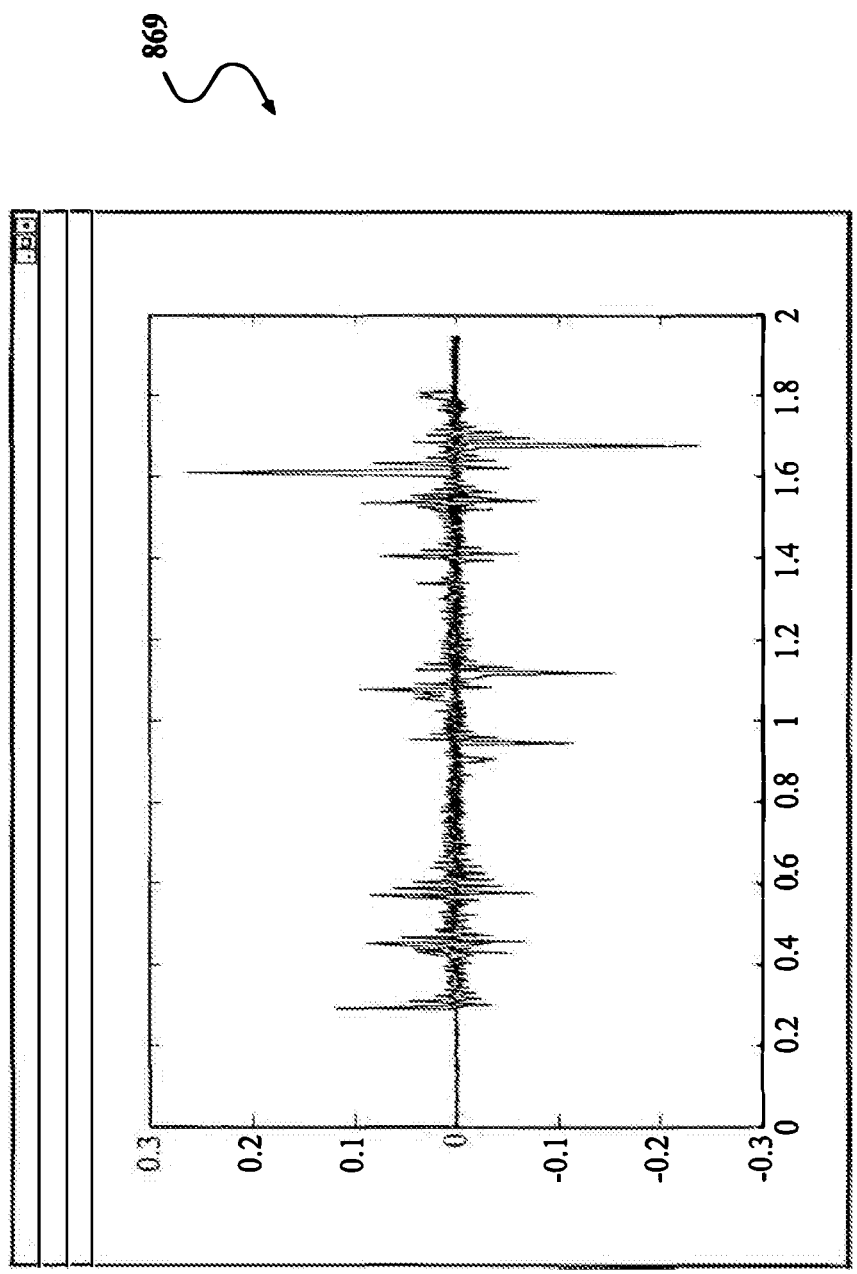
FIG. 18 are exemplary "x", "y", and "z" axis plots of velocity profiles of the vibration of a vehicle as it moves along a conveyor.
Figure 19:
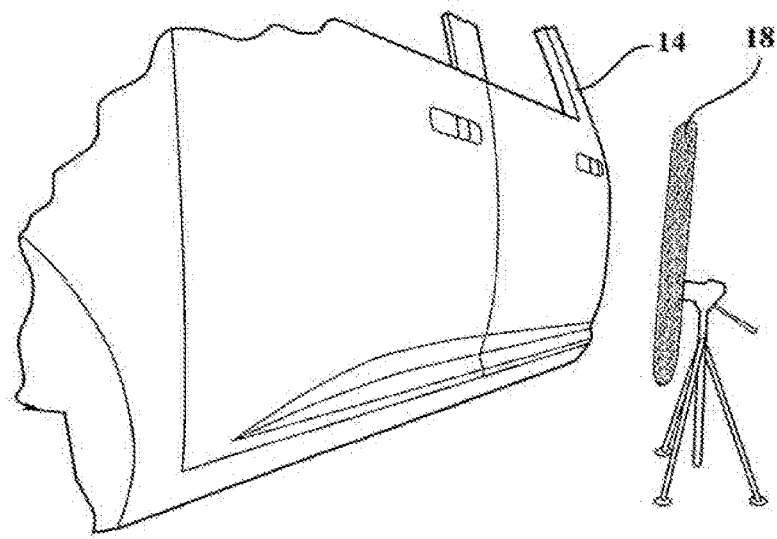
FIG. 19 is an image illustrating the calibration of an inspection camera using a calibration plate which is aligned with a conveyor.
Figure 20:
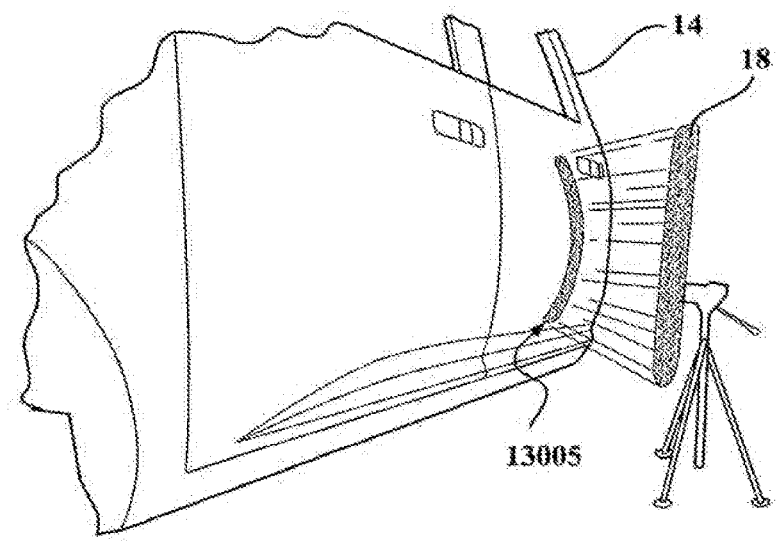
FIG. 20 is an image of an exemplary light source reflecting light upon an object to be inspected.
Figure 21:
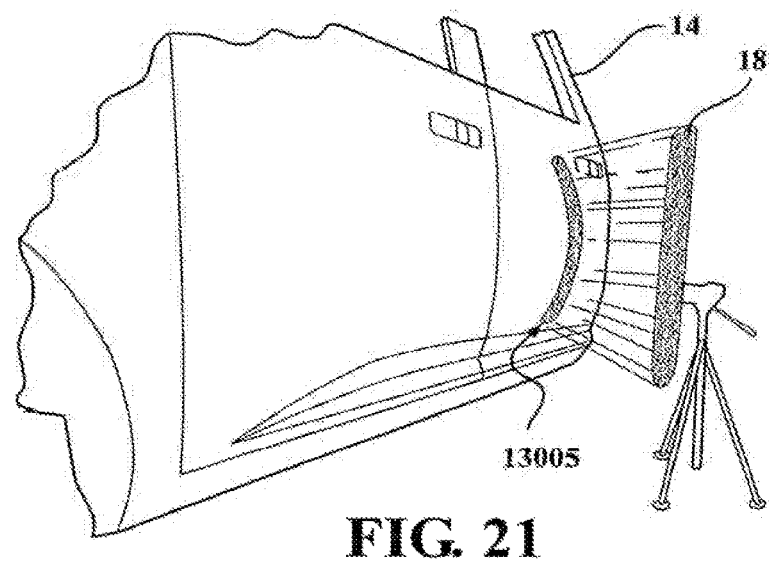
FIG. 21 is an image of an exemplary light source reflecting light upon an object to be inspected and further illustrating the motion of the tracked object upon a conveyor.
Figure 22:
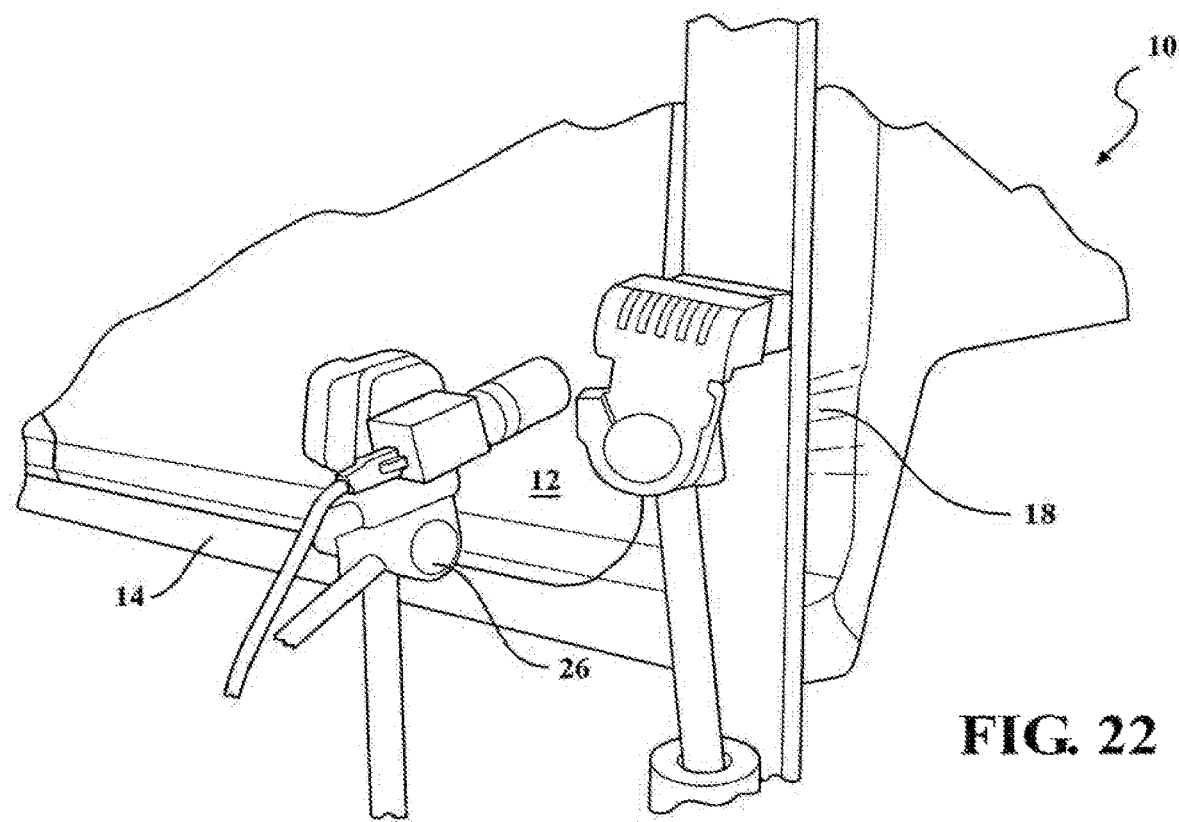
FIG. 22 is an image of a camera in combination with an object to be inspected and further illustrating the inspection of the lower half side of the object.
Figure 23:
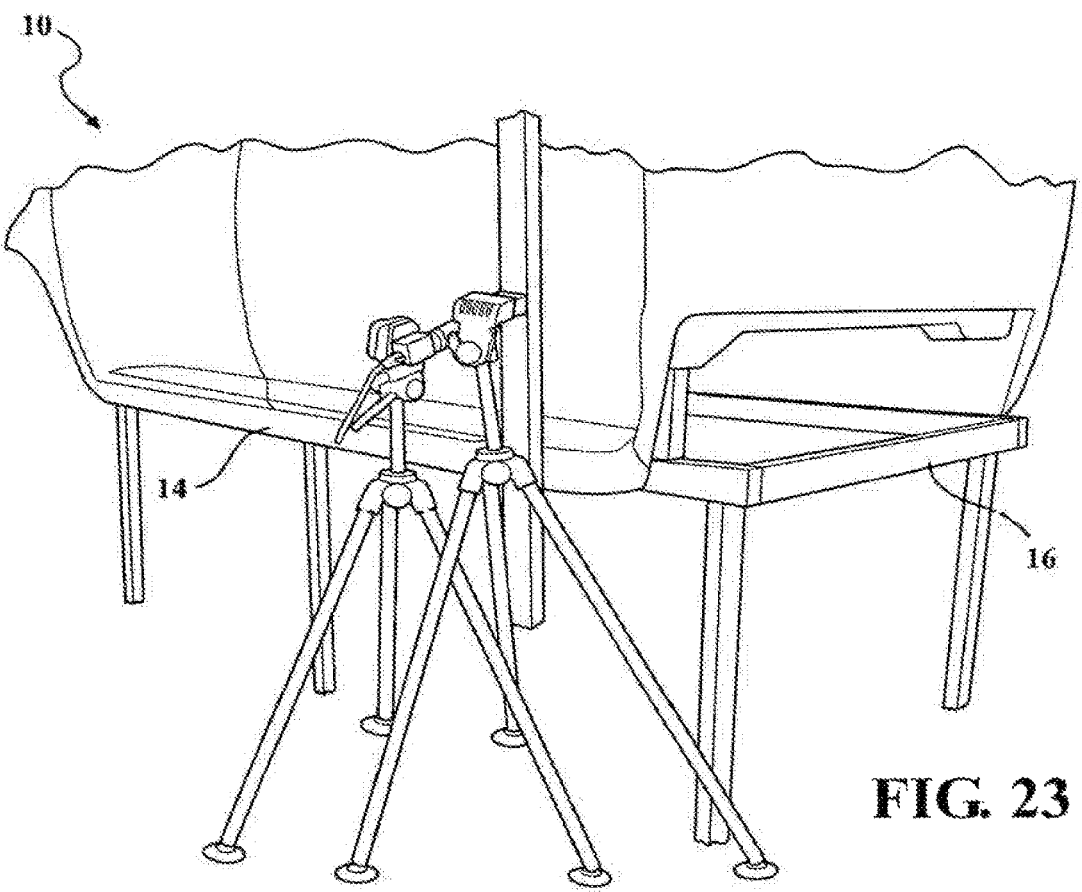
FIG. 23 is an image of an inspection camera, an inspection light source, a conveyor, an object to be inspected, and the connection from the camera to the inspection computer assembly.
Figure 24:
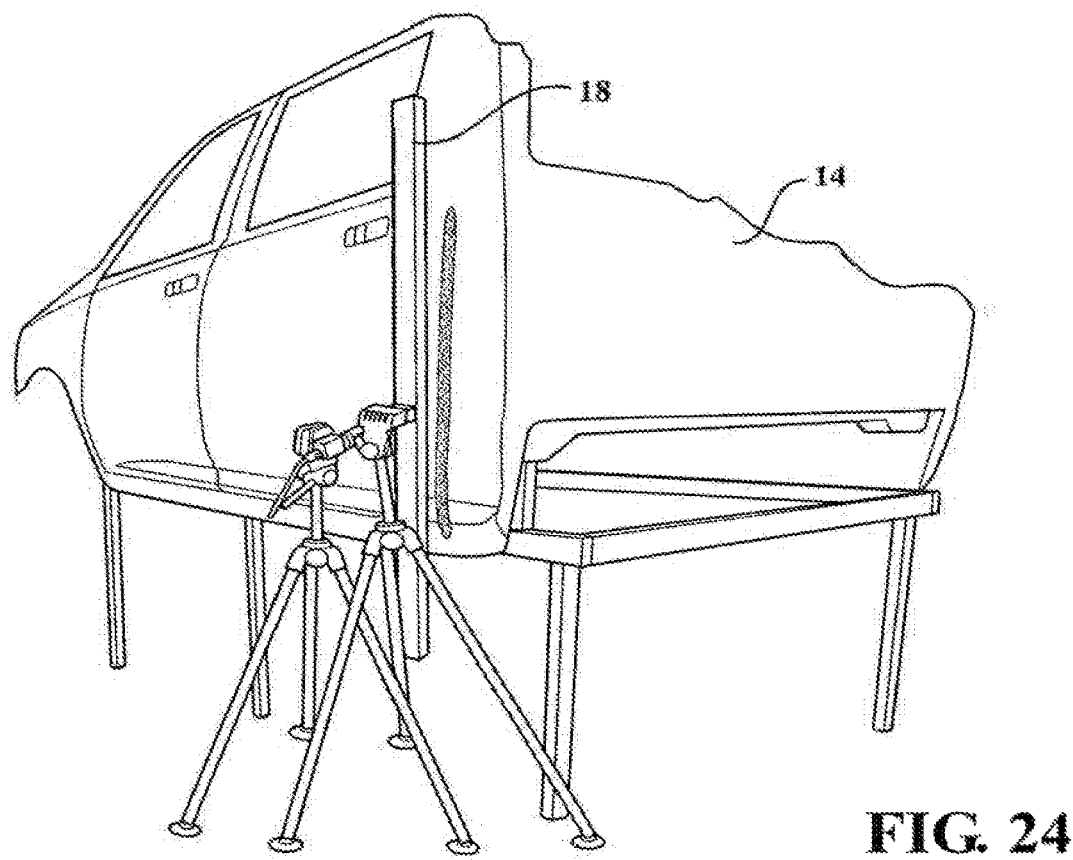
FIG. 24 is a view similar to that which is shown in FIG. 23 but further illustrating some of the upper portion of the object.
Figure 25:
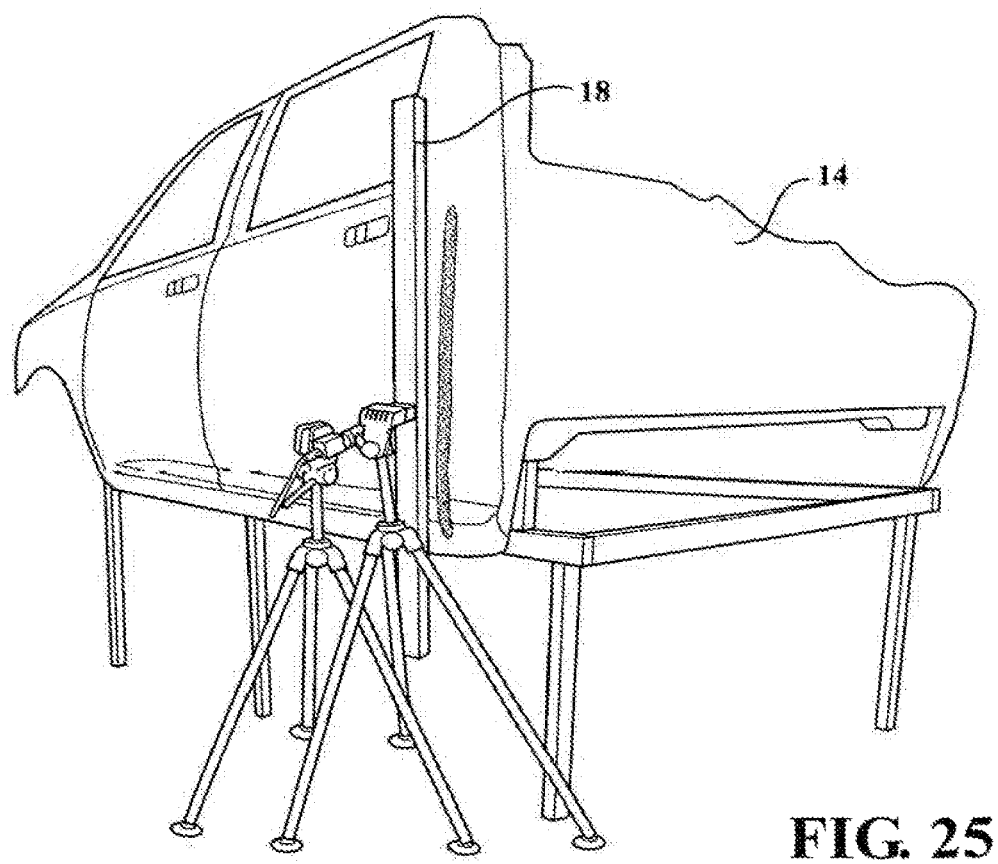
FIG. 25 is a view similar to that which is shown in FIGS. 23 and 24.

With reference to FIG. 18, the vibration data shows a maximum velocity that could potentially occur during a 0.1 sec interval. It is undesirable for the velocity to go above 0.25 mis or a defect may be missed. In the image, shown are a combination of spikes in a Z direction, a X direction with the conveyor, and side to side Y direction. The image shows a worst case scenario where the conveyor was driven over the pieces of wood and changed its direction from forward to reverse. The peek spikes occurred when the conveyor direction was abruptly changed.

(VII) Camera Settings

A fast shutter speed reduces the amount of light available to the image. To mitigate this issue, the camera lens f-stop value must be adjusted to increase the amount of light available for the image. However, this adjustment reduces the focus depth. Brighter light sources are preferred over darker light sources to increase the overall light captured by the camera at higher f-stop ranges. The image processing algorithms are adapted to detect relative differences in light intensities, which makes the detection process less sensitive to overall light intensity and more sensitive to differences in light intensity.

(VIII) Light Tuning and Bad Pixel Identification

Simulation will be used to identify a best light reflection frame index for a camera image pixel. The best light reflection frame index is selected by the simulator as the frame where the intensity of light reflection can be best examined for light consistency. The light reflection is best examined for a pixel at the frame where (a) the pixel reflects light from the light reflection bar and (b) the pixel distance from an edge of the light reflection bar is maximal within the sequence of frames and (c) the pixel distance from an edge of the light reflection bar exceeds a minimum pixel distance. The minimal pixel distance may be 5. A camera light reflection map stores the best light reflection frame index for each pixel in a camera image. Simulation may show that a camera pixel will never be located in the light reflection bar with a distance from an edge of the light reflection bar exceeding the minimum pixel difference; in which case a zero value is assigned to the camera pixel in the camera light reflection map.

A composite light sample image is constructed while camera frames are being acquired. The composite light sample image starts with all pixels assigned a value of 0. When the frame image specified by a pixel's best light reflection frame index in the pixel map is captured, the light intensity of the pixel is stored in the composite light sample image at the pixel's coordinate. The best light reflection frame index is taken from the camera light reflection map. Camera pixels having a null value in the camera light reflection map will be ignored and will not cause the composite light sample image to be updated.

The light intensity index is calculated by averaging the light intensity values of pixels in the composite light sample image having an intensity value greater than 0. The light intensity index may be sampled regularly to detect changes in the light source. Light intensity index samples may be stored and analyzed statistically over time to learn mean baseline light intensity index mean values and baseline light intensity index standard deviation values for the various configurations groups of a tracked object. These baseline light intensity index statistics can be used to set up computerized control chart rules to detect changes in the light source that could impact image processing algorithm parameters. For example, if the light intensity index shifts below the baseline value, then the intensity of the light source can be increased incrementally until the light intensity index is back in the range of the baseline value. Maintaining a baseline light intensity value helps normalize inputs to normalize behavior of the image processing algorithms.

Dust on the inspection camera lens could trigger false positive defect detection. Dead pixels stuck at 0 and hot pixels stuck at an intensity value from the camera can also result in false positive detect detection. The composite light sample image is monitored for dirt and stuck pixels. A long term average composite light sample image is created for a tracked object configuration group by periodically sampling the composite light sample image taken within the tracked object configuration group to calculate a long term running average of light intensity values and a long term running standard deviation of light intensity values. When a light intensity value for a pixel in a composite light sample image is outside the expected statistical distribution value for light intensity after a preset number of samples then an alarm will be raised so that an operator can check for stuck pixels or dust on the camera. Methods for determining when a sampled light intensity value is outside the expected statistical distribution are well known and taught in textbooks for statistical process control.

Dead pixels and hot pixels, once identified, are written to a camera dead pixel map. After a frame is sampled, known dead pixels are replaced by the average intensity value of the surrounding pixels.

(IX) The Triggering System

The triggering board or system 60 receives position estimates from the tracking system or assembly 40 and schedules inspection light triggers and inspection camera trigger events to capture frames when the inspection object 14 is at inspection object positions as required by the frame table. The triggering system is connected to the inspection light triggers and the inspection camera triggers which are respectively resident within each of the lights 18 and each of the cameras 26. The light triggers and the camera triggers are activated by triggering system computer 60 that receives the tracked object position from the tracking system 40 and queries the frame position or trigger table to determine precisely when to trigger the lights and cameras.

A tracking system computer 40 provides high frequency true tracked object position estimates and high frequency true tracked object rotation estimates for each tracked image frame set. However, there is a tracked object position lag time which is the time delay between the trigger of the update secondary location trigger event time and the actual calculation of the tracked object position estimates.

The triggering system 60 may be implemented using a microcontroller with high precision timer registers that can be configured to start a timer by external digital input signals, such as the Freescale 68HC12. The triggering system computer receives the secondary location trigger signal and the acquire tracking trigger signal. The triggering system computer, in one non-limiting embodiment, has high precision timers to measure the tracked object position lag time between a secondary location trigger signal and the time that the actual tracked object position estimate is received from the tracking system. See, for example, the trigger information 892 of FIG. 50. After a tracked object position estimate is received, the tracked object position lag time and the object position estimates are applied to the tracked object equation of motion to estimate when the next light triggers or camera triggers should be applied. A high speed timer in the computer is used to trigger a light or a camera at an exact time after a secondary location trigger signal is received. The trigger offset time is calculated using the inspected object equation of motion. The trigger is activated using a register in the triggering system computer that will cause an external output trigger signal to change value at the precise moment in time. After the tracked object position estimate is received, an estimated inspection object position is calculated from the tracked object equation of motion. The estimated inspection object position is stored in an estimated frame position table, which is then communicated from the triggering subsystem back to an inspection system computer. The estimated frame position table is used to provide the best estimate of the exact object position when an inspection frame was captured. A motion tracking log records the estimated position of the inspected object for each frame id in a sequence of camera frames. In one non-limiting embodiment of the invention, as shown best in FIG. 122, the triggering board or processor assembly 60 comprises a field gate programmable array 5000 and an input/output assembly 5001 which is coupled to the array 5000. It is this array 5000 which is programmed to provide the output signals 5008 to perform the functionality which has been described in response to input signals communicated to the array 5000 from the input/output assembly 5001 and such input signals being discussed previously.

(X) Frame Sections

A frame image may be divided into frame sections. Frame sections are preconfigured sub-regions of the frame image. Frame sections are identified by a frame section number. Frame section algorithm parameters are defined for each frame section. Some examples of frame section algorithm parameters include the average inspected object surface normal in the frame section, the average pixel resolution in the frame section, or a mask image to indicate where the frame section should not be processed for a particular frame because a hole is expected in the inspected object surface.

The frame section parameters, frame parameters, and image parameters may be configured by a human being, or configuration of these parameters may be automated using the simulator. The simulator 402 may be configured to automatically generate frame sections based on a target region size or based on variations of the inspected surface normal in the light reflection bar. For example, the simulator may be configured to automatically create sections for each frame by dividing the simulated image into three sections that equally divide the number of pixels in the light bar reflection for each section. The simulator can also calculate the average pixel resolution or the average inspected object surface normal and save these values as frame section parameters. In some cases, there will only be one frame section in the camera frame, in which case the entire camera frame is treated as if it were a single frame section. See, for example, FIG. 55 which illustrates frames 931, 932, and 933 which cooperatively form a frame composite image 930.

(XI) Defect Region of Interests

Figure 3:
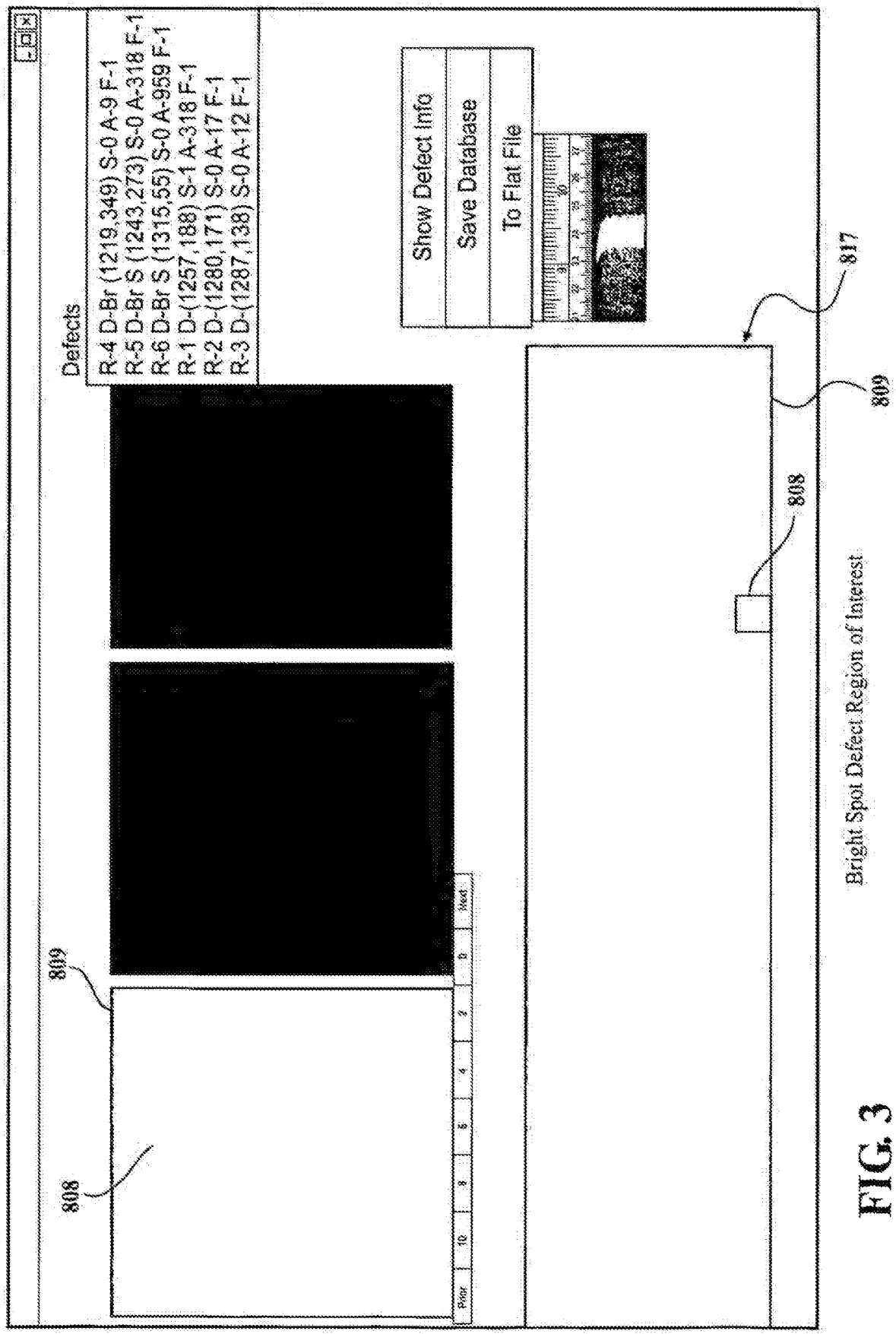
FIG. 3 is an exemplary histogram image of bright spot defect region of interest in combination with a wavelet transform in context.
Figure 4:
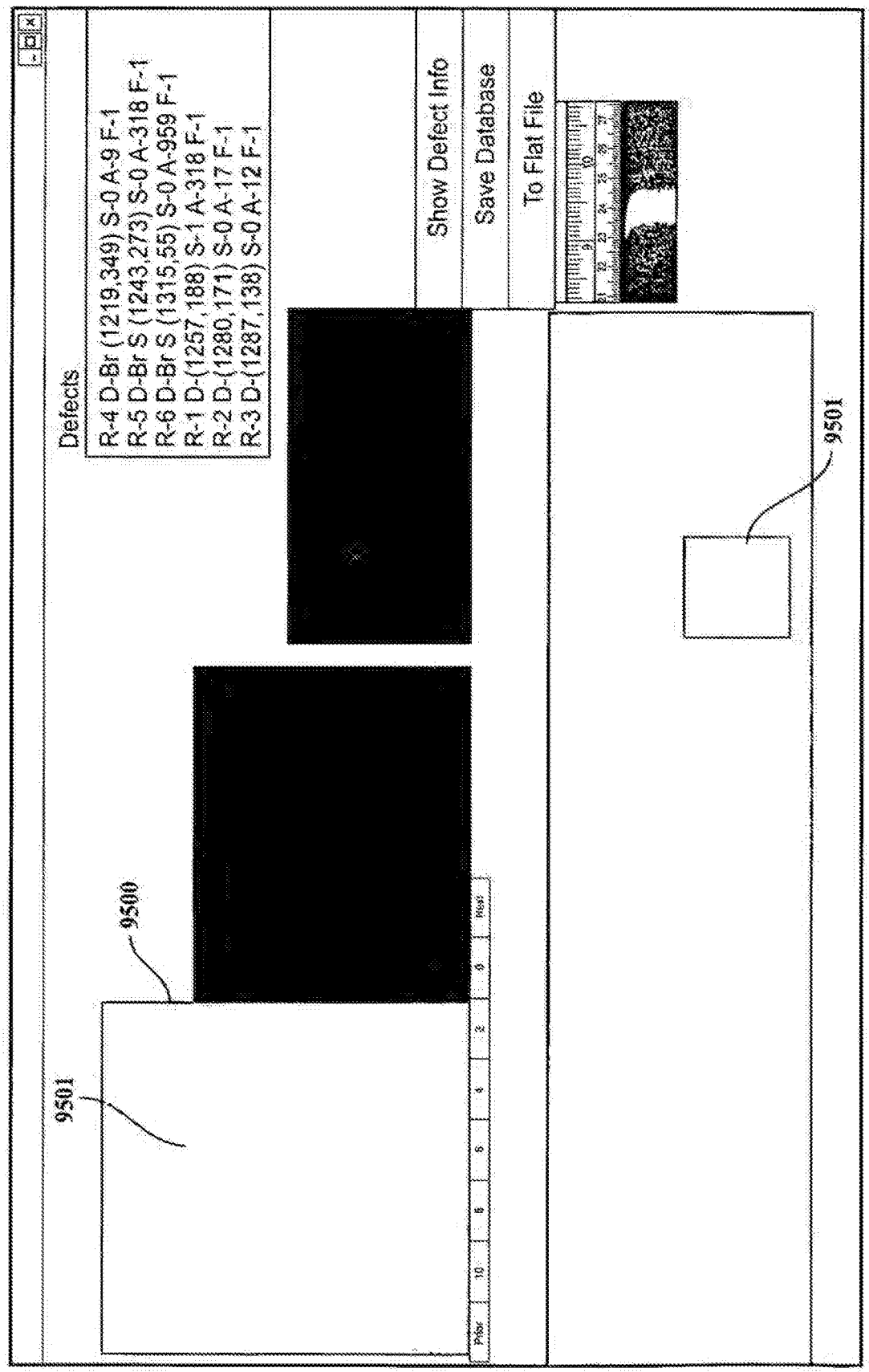
FIG. 4 is an exemplary histogram image of a scratch defect region of interest in combination with a wavelet transform in context.
Figure 5:
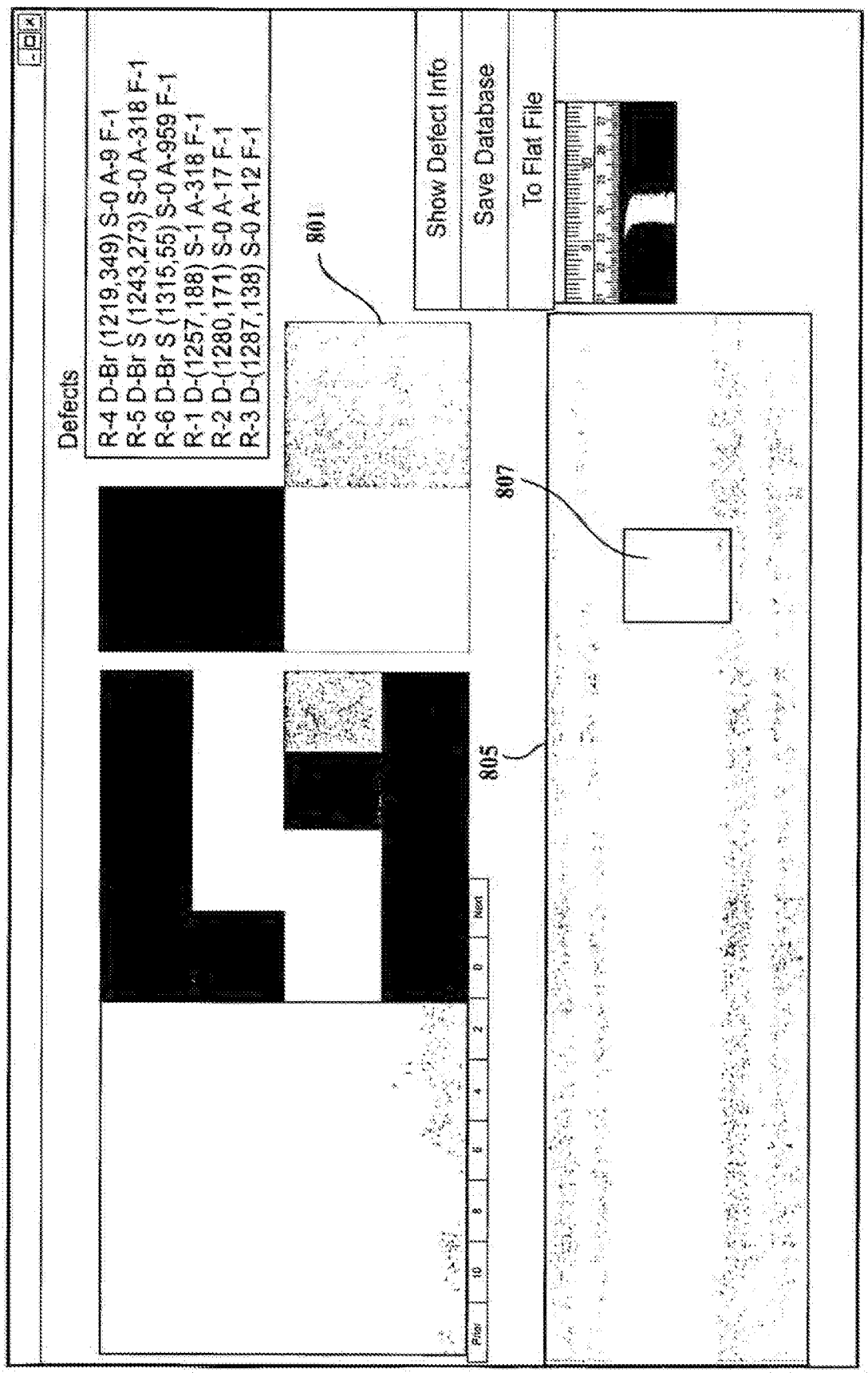
FIG. 5 is an exemplary histogram image of a dark spot detection defect region of interest in combination with a wavelet transform in context.
Figure 6:
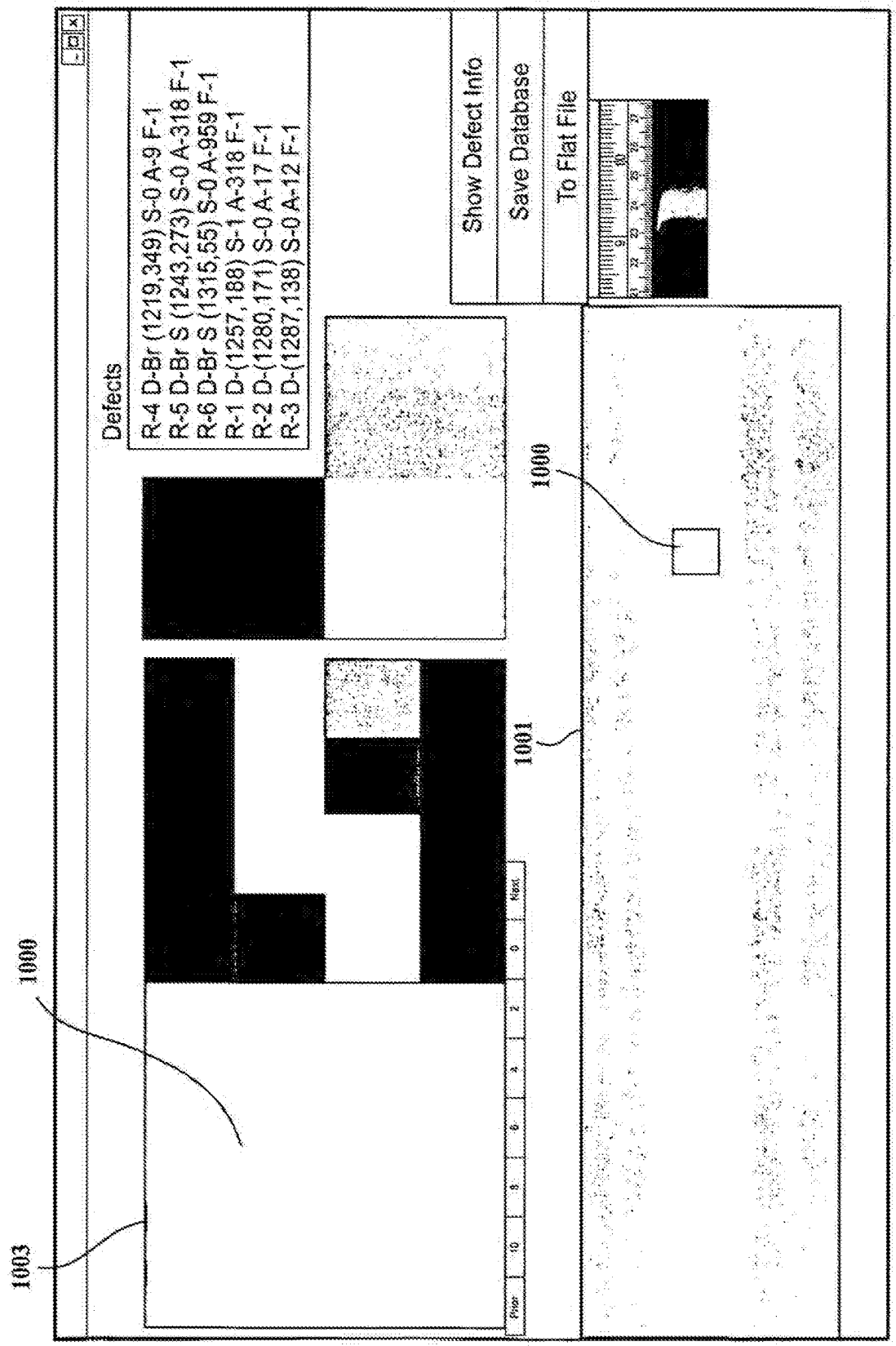
FIG. 6 is second exemplary histogram image of a dark spot detection defect region of interest in combination with a wavelet transform in context.

The pixels in a camera frame are processed by defect region computer algorithms to find defect regions of interest. Algorithms are used to identify regions of interest including bright spot regions, dark spot regions, and scratch regions. A dark spot region of interest is a record containing information about a region of a camera image where a potential dark spot defect in a bright field is located. See, for example. FIGS. 5 and 6 in which respective dark spots 801 and 1000 are identified in the overall respective images 805 and 1001. The information included about a dark spot region of interest includes a pixel map showing where the potential defect pixels are located in the image, a bounding box 807, 1003 around the potential defect pixels, information about the potential defect's distance to the bright field edge, information about the light intensity difference of the dark spot, and information about the shape or skew of the potential defect. A bright spot region of interest is a record containing information about a region of a camera image where a potential bright spot defect in a dark field is located. See, for example, the image 817 and the bright spot 808 within the boundary 809 as shown in FIG. 3. Additional defect regions of interest include a scratch region of interest which is a record containing information about a region of a camera image where a potential scratch defect in a dark field is located. See, for example, the boundary 9500 and the scratch region 9501 as shown in FIG. 4.

(XII) Alignment

The defect region of interest computer algorithms relies on algorithm parameters that are configured and saved before the algorithms are executed. The camera algorithm parameters are configured for the camera and associated with the camera identification number or _"id" for future lookup. The frame parameters are configured for the frame and are associated with a combination of the camera_id and the frame identification number or _"id".

The image defect region of interest computer algorithms may assume that the light reflection is oriented along a particular direction in the image plane. For example, the algorithms may assume that the light reflection bar is oriented along the "x" axis of the image. Curvature of the inspected object surface 12 may cause the light reflection bar to twist in other directions than the "x" axis. A corrective alignment of the light bar orientation may be applied to each frame section. One corrective alignment algorithm scans the image either horizontally or vertically at 5 equal distant scan lines. The light reflection bar center points are located along these scan lines by finding the center of mass of pixel values along the line. An interpolated line equation is calculated to generate an interpolated line that fits to the light bar center points with a minimum squared error. An alignment rotation angle and alignment center point that would rotate the interpolated line to match the alignment of the expected light bar orientation line is calculated. The frame section image is then rotated about the alignment center point by the alignment rotation angle to create a rotated frame section with the desired alignment. See, for example, the illustration 1005 of FIG. 48.

(XIII) Region of Interest Algorithms

Dark spot region of interests are located in a frame section using an algorithm. The parameters to the algorithm may vary based on the frame section parameters. The algorithm itself may also vary based on the frame section parameters. For example, a specialized gap algorithm may be called only in frame sections where there is large gap that is expected to appear near the light reflection bar. The algorithm is typically optimized using an assumption that the light bar has a consistent alignment in the frame, for example a predominately horizontal alignment along the image "x" axis may be assumed. In general, the dark spot region of interest algorithm uses image processing steps including thresholding, dilation, and erosion to adaptively locate the light bar reflection and the edges of the light reflection bar. After the light bar reflection has been located in the image, the expected regional light intensity of each pixel in the light bar reflection is calculated. The pixel intensity difference is calculated as the difference between the regional light intensity and the actual pixel intensity. Also, a pixel edge distance of each pixel from the edge of the light bar reflection is calculated. A threshold lookup table is an algorithm parameter that specifies a pixel intensity threshold for each possible pixel edge distance. Dark spots are identified by finding pixels that have a pixel intensity difference greater than the pixel intensity threshold for their pixel edge distance. Dark spots are merged and filtered using dilation and erosion. The resulting dark spot regions are located extracted, and information about the dark spot region of interest including the average edge distance, bounding box, and pixel list are stored in a dark spot region of interest record.

Bright spot regions of interest are located in a frame using a bright spot algorithm. In general, the bright spot region of interest is calculated by finding the edge of the light reflection bar and locating the dark field region external to the light reflection bar. Noise is filtered from the dark field region, typically using dilation, erosion, thresholding, and subtraction. Thresholds may be set dynamically using percentile values of the image intensity. After noise is removed, spots are selected as bright spot regions of interest based on their distance from the edge of the light bar and based on the percentile of the intensity of one or more pixels in the bright spot. The resulting bright spot regions are located, extracted and information about the bright spot region of interest including the average edge distance, bounding box, and a pixel list are stored in a bright spot region of interest record.

Scratch defect regions of interest appear as large bright spots in the dark field having a muted intensity. A specific algorithm for detecting scratches is discussed below.

Referring now to FIG. 91, one processes 1112 of locating regions of interest in a frame section image is described generally. Parameters for the image processing algorithms are loaded from configuration based on the context of the frame. Context of the frame includes the camera used to acquire the image, the frame identification or "id" of the frame image, and the model and version of the inspected object. The image is divided into one or more frame sections as discussed above, and parameters may be defined specifically for the frame section.

The reflection light bar in a frame section may be optionally aligned along a predominate axis in the image, in this example, the light reflection bar is aligned along the "x" axis by an image rotation using the method described above. A sequence of image processing algorithm steps are applied to the frame section to locate the dark spot regions of interest, the bright spot regions of interest, and scratch regions of interest. That is the flowchart or process 1112 begins with an initial step 1113 in which defect regions of interest are identified. Step 1114 follows step 1113 and in this step 1114 camera parameters are loaded from a camera acquiring the image. These have been previously described. Step 1114 is followed by step 1115 in which frame parameters are loaded from the camera providing the image and the frame and these have been previously discussed. Step 1115 is followed by step 1116 in which section parameters are loaded from the camera and frame and these parameters have been previously discussed. Step 1116 is followed by step 1117 in which the camera image is loaded or received by the server or processor 66. Step 1117 is followed by step 1118 in which the received or loaded camera image is cropped and step 1118 is followed by step 1119 in which the cropped camera image is divided into sections. Step 1119 is followed by step 1120 in which an iteration is done over each section with steps 1122-1125 until all sections have had the processes respectively and sequentially applied to them as set forth in these steps 1122-1125. The respective process in step 1122 is to align the light bar orientation in the frame section and the respective process in step 1123 is to locate dark spot defect regions of interest in the frame section. The respective process in step 1124 is to locate bright spot defect regions in the frame section and the respective process in step 1125 is to locate scratch defect regions of interest in the frame sections. Once all of the sections have been analyzed by separately having steps 1122-1125 sequentially and respectively applied to them, the flowchart 1112 is completed in step 1127.

Dark Spot Algorithm Example

In one example of a dark spot region of interest algorithm is delineated in FIG. 92. In this algorithm, parameter values are scaled for a frame region having a resolution of 0.01 mm2 per pixel and having the light reflection bar oriented along the image's "x" axis. In practice, the number of pixels that are dilated or eroded may be scaled by an image parameter, frame parameter, or frame section parameter that is calculated based on the expected pixel resolution of the frame section. Additionally, the exact sequence of algorithm steps may be adjusted by image parameters, frame parameters, or frame section parameters.

Referring now to FIG. 92, one algorithm 1150 for finding dark spot regions in the light spot reflection bar is documented. This parameters to this algorithm are given for the region 6000 shown in FIG. 59, where the pixel resolution is about 0.01 mm2, the inspected object is a truck cab, and the inspection swath covers the bottom half of the driver's side.

First, in step 1151, the light_field_image is extracted from the original source_image using the "ExtractLightFieldMask" algorithm. The ExtractLightFieldMask algorithm 1200 is documented in FIG. 86. The light_field_mask image is an image representing the light reflection bar region. The ExtractLightFieldMask algorithm 1200 inputs a minimum_bright_mask_length parameter and a source image and creates a new bright_field_image. In this example, the minimum_bright_mask_length is 30 pixels, and the light bar is oriented along the images "x" axis. Referring now to FIG. 86, the algorithm 1200 first creates the bright_field_image having all 0 pixel values and then iterates over each column of the image and run length encodes the column pixels.

The algorithm 1188 for Run length encoding, used in the step 7000 of algorithm 1200 is documented in FIG. 84. The run length encode algorithm inputs a sequence of 1 dimensional values and returns a linked list of runs. The run length encode algorithm also inputs a threshold parameter. First the algorithm converts all values in the sequence to either a 1 or a 0 using the threshold input parameter. In this example, the threshold minimum_light_value is 30. A run a consecutive set of pixels in the sequence that are all the same value (either 1 or 0). A run record contains a run value and a run length value. The run value is either 1 or 0, and the run length is the number of consecutive pixels that have the value specified in the record.

Returning again to algorithm 1200 of FIG. 86, a column is run length encoded as runs of zeros and ones after thresholding. Each run is examined. Runs having a value of 1 and a length greater than minimum_bright_mask_length are considered to be part of the bright field region and processed further. The starting pixel of the run that is part of the bright field region is determined from the run's start pixel. The value of the bright_field_image at this pixel location is checked to see if it the pixel intensity is equal to 0. If the value of the bright_field_image pixel intensity is 0, then the bright_field_image is updated at the pixel location using the "FloodFillToMap algorithm" 7001 which is documented in FIG. 85. This "FloodFillToMap" function is used in step 7006 of the algorithm 1200.

The "FloodFillToMapOnly" algorithm 7001 inputs a source_image, a map_image, and a start point. A standard flood fill algorithm is initiated on the source_image at the start point, however instead of updating the pixel intensity of the source_image, the FloodFillToMap only causes the pixel values of the map_image to be updated by the flood fill operation instead. So, the pixel locations that would have been modified in the source image by a normal flood fill operation are updated in the map_image instead.

Returning again to FIG. 86, the"FloodFillToMapOnly" algorithm is applied at the bright field run's pixel location using the source image and the output updates the bright_field_image. This process is iterated over all columns and over all runs. The resulting bright_field_image is returned to the dark spot algorithm and is assigned to the light_field_image variable. The original image 6000 is shown in FIG. 59, and the resulting light_field_image 6001 is shown in FIG. 60.

The dilate and erode algorithms used here input a source_image, direction (horizontal or vertical), and a pixels parameter. The dilate and erode algorithms will operate in either the horizontal direction along the image "x" axis, or the vertical direction along the image "y" axis, or in both directions, applying the vertical direction first. The pixel count is the number of pixels to erode or dilate in the specified direction.

Looking again at flowchart or algorithm 1150 of FIG. 92, the dilated_bright_field_image (required of step 1161) is created using the image processing algorithm for dilate. The dilated_bright_field_horizontal_image 7030, shown in FIG. 61, is created by dilating the bright_field_image first in the vertical direction and then in the horizontal direction.

The eroded_bright_field_image 7031 is the dilated_bright_field_image eroded by 40 pixels in the vertical direction, as shown in FIG. 62. This operation is required in step 1162 of algorithm or flowchart 1150. The small_edge_mask (required in step 1163 is created from the "BuildEdgeMask" algorithm which inputs the eroded_bright_field_ image and an edge length. The "BuildEdgeMask" functionality is documented in flowchart or algorithm 8000 of FIG. 87 which requires in step 8999 the algorithm 8001 of FIG. 88. The edge mask algorithm 8000 operates in the horizontal and vertical directions on the image and draw a line of a specified pixel length at edges of the image. Returning again to FIG. 92, the small_edge_mask is finished by dilating the small_edge_mask in both the vertical and horizontal directions by 2 pixels. The resulting small_edge_ mask is shown in image 7032 of FIG. 63. The "Final Edge Mask" operation in step 1168 creates an image 7033 by dilating the small_edge_mask (shown in FIG. 63) by 9 pixels in both directions, as shown by image 7033 FIG. 64.

The "ApplyMask" operation, in step 1169, inputs a source image and a mask image. The mask image is used to zero out pixels in the source image. The bright_mask_image is created by applying the eroded_bright_field_image to the final_edge_mask image 7033 and the resultant created image 7034 is shown in FIG. 65.

The "CreateDistancesFromEdgeMap" algorithm, in step 1170, inputs an edge map image and outputs and image that encodes the distance of a pixel from an edge in the source_image. The distance is encoded as the minimum pixel distance from an edge in either the horizontal direction or the vertical direction. The edge_distance_bright_field_image 7035, in FIG. 68, was created by the "CreateDistancesFromEdgeMap" algorithm using the eroded_bright_field_image 7031 of FIG. 62 as an input. Pixel intensity is equal to the edge distance.

The CreateRegionalDifferenceImage algorithm, in step 1172, is described in FIG. 90 and shown as algorithm or flowchart 8777. The algorithm 8777 inputs a bright_field_image and a region_mask_image to produce a regional pixel intensity difference image 7036 which is shown in FIG. 69. The algorithm 8000 processes each column and locates pixels locations in the column that are masked by region_mask_image. The intensities of these masked pixel locations in the bright_field_image are averaged to compile a column_average_array, indexed by column index. The column_average_array contains the average pixel intensity of pixels in the bright_field image for pixels that are under the mask specified by region_mask_image. The regional intensity for each column is then calculated using a windowed average of the column_average_array. Finally, the difference between the regional intensity value of the column and the bright_field_image is calculated. FIG. 69 shows the regional intensity difference calculated using the bright_field_image in eroded_bright_field_image in FIG. 62 as the mask.

The edge_intensity_map_table (required in step 1171) is a table with two columns, the key column is the distance of a pixel to the edge of the bright field, and the data column is an intensity_difference_threshold. The table specifies the threshold intensity difference of a dark hole pixel for a given distance to the edge of the bright field region. Small intensity differences near the center of the bright field are more likely to be dark hole pixels than larger intensity differences that are near the edge of the bright field region. The edge_intensity_map_table for this example has intensity_difference_ threshold values that vary linearly from 48 to 35 when the edge distance ranges from 1 to 15 respectively. The intensity_difference_threshold values vary linearly from 34 to 10 when the edge distance is from 16 to 25 respectively. The intensity_difference_threshold values vary linearly from 9 to 4 when the edge distance is from 25 to 30 respectively. And any pixel having an edge distance greater than 30 will have an intensity_difference_threshold of 4.

The "FindDarkHoles" algorithm, used in step 1173 is shown by flowchart or algorithm 8022 of FIG. 101 shown in inputs the regional_intensity_difference_image, the edge_distance_bright_field_image, and the edge_intensity_map_table. The algorithm creates a new dark_holes_image and sets all pixels to 0. The algorithm next iterates over all pixels in the bright_field_image. The distance of the pixel from the edge of the bright field is read from the intensity value stored at the pixel location in the edge_distance_bright_field_image and this value is assigned to edge_distance. If the edge_distance is greater than 0, then the intensity_difference_threshold value is queried from the edge_intensity_map_table using edge_distance as the lookup key. If the intensity_difference_threshold value is greater than the pixel value of the regional_intensity_difference_image then the pixel is considered part of a dark hole and the pixel value at the pixel location in the dark_holes_image is updated to 255. The dark_holes_image 7037, shown in FIG. 70, is the output of the "FindDarkHoles" algorithm from the regional_intensity_difference_image and the edge_distance_bright_field_image.

The dark_holes_image is then dilated and eroded, in respective steps 1174 and 1175 to produce the dark_spots_eroded_dilated image 7038 of FIG. 71.

The "dark_spot_region_list", of step 1176 is created by extracting all contiguous regions from a dark_spots_eroded_dilated image. Regions having a pixel_count less than 600 pixels are processed as dark spot regions of interest. Each region is examined pixel by pixel to calculate a bounding box around the region. Other statistics are calculated for the region including the average distance of the region from a bright field edge, the minimum distance of the region from a bright field edge, the area of the region in pixels, the centroid of the region, and the average intensity difference of the pixels in the region using the regional_intesnsity_difference_image. These region statistics are calculated region by region, and the results are stored in a dark spot region of interest record.

Particularly the "Find Dark Holes" algorithm 8022 (See FIG. 101) begins with an initial step 27000 in which inputs are received by the processor operating or performing the algorithm 8022 (e.g. processor 66) and these inputs define the bright field image; the edge field image; and the edge intensity map table. Step 27001 follows step 27000 in which a dark holes image is created with all pixel values at zero to start. Step 27002 follows step 27001 in which the processor is directed to iterate over each pixel coordinate in an image. Step 27004 follows step 27003 in which a pixel coordinate is identified. Step 27004 follows step 27003 in which the edge distance is made equal to the pixel value of the edge map image. Step 27005 follows step 27004 in which a determination is made whether the edge distance is greater than zero. If so, then step 27005 is followed by step 27006 in which the intensity difference threshold is made equal to the edge intensity map edge distance. Alternatively, step 27005 is followed by step 27009. Step 27008 follows step 27007 in which the pixel value of the dark holes image is made equal to 255 and step 27009 follows step 27008 in which a determination is made whether the foregoing functionality was accomplished overall all pixels of the image. If so, then step 27009 is followed by step 27010 in which a dark holes image is returned. Alternatively step 27009 is followed by step 27005.

Bright Spot Region Algorithm

One method of calculating bright spot regions of interest is show in algorithm or flowchart 9000 of FIGS. 93(A-B) and 94. The eroded_bright_field_image is first dilated and then inverted, in respective steps 9001 and 9002, to produce an inverse_bright_field image as demonstrated by image 8040 FIG. 72. The original_image is then masked by the inverse_bright_field_image, in step 9003, to produce the dark_field_image 8041 shown in FIG. 73. Images 15000 and 15001 of FIG. 40 respectively show a bright spot defect region of interest and a bright spot defect region of interest histogram image.

The "ExtractPercentileTable" function, in step 9004, calculates the percentile of each possible intensity value for a given image into a table, but ignores the pixels having a value of 0. The percentile_table is tallied from dark_field_image pixels using pixels that have values greater than 0. The percentile table calculates the percentile value for each possible pixel intensity value in an input image. However, pixels with a value of zero in the input image are ignored and ignored for the percentile tally.

The "ApplyPercentileThreshold" operation, in step 9005, inputs the dark_field_image, the percentile_table, and a minimum_percentile_threshold. The percentile of each pixel intensity in the dark_field_image is looked up using the percentile_table. If the pixel's percentile value in the dark_field_image is less than the minimum_percentile_threshold then the pixel is converted to a 0. Otherwise, the pixel is converted to a 255. The binary_dark_field_image 8042 is the result of the ApplyPercentileThreshold operation on the dark_field_image 8041, in step 9006. The binary_dark_field_image 8042 (shown in FIG. 74) is created from image 8041 which is shown in FIG. 73 using a minimum_percentile_threshold of 0.79.

The binary_dark_field_image 8042 is processed by a series of erosion and dilation steps 9007 and 9008 to produce a dilate_eroded_binary_image 8043, as shown in FIG. 75.

The dilate_eroded_binary_image is next inverted and applied as a mask to the original_image, in step 9009, to create the original_dilated_eroded_binary_image 8044, shown in FIG. 76, as an example.

The edge_percentile_table, in step 9010, is tallied from the original_dilate_eroded_binary_image using pixel values greater than zero to calculate the percentile of each possible intensity.

Contiguous pixel regions in the dilate_eroded_binary_image 8044 are extracted and stored in a bright_spot_region_list, in step 9011. Regions having a pixel area less than 5 pixels or greater than 200 pixels are discarded from the list. The remaining regions are redrawn onto a new bright_spots_image 8045 as shown in FIG. 77. This functionality is achieved in step 9012.

Referring again to FIG. 93, the dark_edge_region_image, is created, in step 9013, by masking the dilate_eroded_binary_image by the bright_spots_image. An example dark_edge_region_image 8046 is shown in FIG. 78. A series of dilation and erosion steps 9014-9019, are applied to the dark_edge_region_image 8046 to produce the dark_edge_region_eroded_image 8047. An example of a dark_edge_region_eroded_image 8047 is shown in FIG. 79.

As shown in FIG. 93, the rough_edge_binary_image is created by a series of dilation and erosion steps 9020-9026 applied to the dilate_eroded_binary_image 8043. An example rough_edge_binary_image 8048 is shown in FIG. 80.

The "CreateDistanceFromEdgeMap" function is applied to rough_edge_binary_image 8048, in step 9027, to produce the edge_distance_dark_field_image 8049, one example of which is shown in FIG. 81. Step 9027 follows step 9026.

As shown, the algorithm 9000, after step 9027, iterates through each bright_spot_region in the bright_spot_regions_list. The edge distances stored in the edge_distance_dark_field_image are queried to calculate an average distance of the pixels in the region to the edge, which is stored in avg_edge_distance. The minimum distance to an edge is also calculated and stored in min_edge_distance. The pixel intensity of the region pixels stored in the original_image and used to calculate an average_pixel_intensity for pixels in the region. Other statistics such as the region bounding box are calculated. A hight_intensity_pixel_threshold value is calculated from the edge_percentile_table as the intensity value just below the 0.9 percentile level in the table. The total number of pixels in the region having an intensity value greater than high_intensity_pixel_threshold is counted. A region is identified as a bright spot region of interest only if at least one of the following conditions are satisfied: (a) min_edge_distance >16 or (b) average_edge_distance >18 or (c) high_intensity_pixel_count >1. If a region is identified as a bright spot region of interest, then the statistics for the region are stored in a new bright spot region of interest record.

Scratch Region Algorithm

Referring now to FIG. 94, after the foregoing iterations are accomplished by flowchart or algorithm 9000 (occurring right after step 9027 and described above), the scratch regions of interest are located, in step 9050 by extracting a dark_edge_region_list from the contiguous regions in the dark_edge_region_image 8049 having a total pixel count >4. A region from the dark_edge_region_list is considered a scratch region of interest only if has a pixel area >4, and if the region does not touch an outer edge of the frame section. Statistics for the scratch region are calculated and stored in a scratch region of interest record. An iteration is done for every dark edge region. Step 25000 follows step 9050 in which an iteration is made through the image processor (e.g., processor 66) is directed to iterate this algorithm 9000 through the various regions in the dark edge regions list. Step 25001 follows step 25000 in which a dark region from the list is identified. Step 25002 follows step 25001 in which a determination is made as to whether the region touch an edge of an image. If it does than step 25002 is followed by step 25003 in which statistics are calculated for the region and stored in a new scratch region of interest. Alternatively, step 25002 is followed by step 25004. Step 25004 follows steps 25003 and 25002 in which a determination is made as to whether an iteration is made overall dark edge regions in the list. If so, then step 25004 is followed by step 25005 denoting the end of the algorithm 9000. Alternatively, step 25004 is followed by step 25001.

It should be noted that the algorithms described here to locate defect regions of interest can be implemented in a myriad of different ways using different combinations of image processing algorithms and different image processing parameters. The flowcharts included here demonstrate just one possible example of algorithms developed for finding regions of interest on the side of a vehicle. One goal of the algorithms described above is to quickly process the frame section to identify regions of interest using parallel graphical processing units. For example, vertical and horizontal dilation and erosion operations used in this example can be implemented relatively easily on parallel processing units for fast image processing and do not suffer from memory contention problems. An image 15010 of a bright spot is shown in FIG. 82 and an image of scratches 15011 is shown in FIG. 83.

There are other algorithms readily apparent to one wishing to find regions of interest. As another example of finding dark spot regions of interest, the "FindHolesUsingMask" algorithm 8070 is documented in FIG. 89. The algorithm 8070 inputs a source_image, a mask_image, a minimum_mask_value, and a maximum_mask_value. The algorithm scans over all pixels in the mask_image for pixel locations where the mask_image's pixel value is greater than the minimum_mask_value and the source_image's pixel value at the location is less than or equal to the minimum_mask_value. If both tests are true, then the pixel is identified as a hole and the pixel location is activated in the return hole_image.

Returning again to algorithm or flowchart 1150 which is shown in FIG. 92, the holes_image is created by applying the "indHolesUsingMask" algorithm to the bright_mask_image, as shown in image 8066 of FIG. 66. The holes_eroded_dilated_image 8067 is created by dilation and erosion operations and shown is FIG. 67. These holes can be processed as an alternative way to find dark spot regions of interest. Many other variations are possible.

Referring now to FIGS. 129(*a*-*b*), there is shown a flowchart 19000 which provides an algorithm which may be used by System 10 to process images in accordance with an alternate embodiment of the various inventions.

Particularly, flowchart 19000 begins with an initial step 19001 in which the process begins. Step 19001 is followed by step 19002 in which images are acquired for processing. Step 19003 follows step 19002 and in this step 19003 a determination is made whether to utilize a default recipe (a set of baseline parameters known to provide good results in many cases or whether these parameters need to be tuned specifically for the camera and region combination, a list of these parameters is shown in FIG. 130). The following steps described the processing for a single acquired image and these steps are repeated for all of the remaining acquired images. Step 19002 is followed by step 19004 in which an "AutoNormilzation" function is achieved on the image. The purpose of this step is to histogram equalize the image and adjust the dynamic range of the image so that the light reflection predominately has a target high intensity value, and the background predominately has a target low intensity value. The histogram of the image intensity is calculated. A percentile threshold (typically about 0.9) is selected. The algorithm selects searches for the high intensity peak value having the highest histogram count and also that has a percentile value greater than the percentile threshold. If no peak value is found above the threshold value, then the percentile threshold is reduced in steps of −0.05 until a peak is found in the histogram. After the high intensity peak value is found, and then the low intensity peak value is found. The low intensity peak value has the highest histogram count and also has a percentile value less than or equal to the percentile threshold. A linear mapping function is assigned such that the low intensity peak value maps to the target low intensity value and the high intensity peak value maps to the target high intensity value. The pixel intensities of the image are remapped using the linear mapping function.

Step 19004 is followed by step 19005 in which a "LevelLightintensity" function is performed. The purpose of this step is to make the intensity of the light reflection more uniform in a specified direction. For this description, assume the light is oriented along the horizontal axis. The image is segmented into image segments along the "x" axis. The percentiles of each image segment are calculated. The percentile pixel intensity at a specified percentile value is then looked up for each image segment. A function is defined along the "x" axis such that the center point of each image segment along the "x" axis is assigned the percentile pixel intensity of that image segment. These center points are connected to the center points of immediately adjacent image segments by line segments to create a piecewise linear mapping function. The calculated value of the piecewise linear mapping function at a specified column having a specified x value is known as the levelSignalValue. The intensity of all the pixels in each column along the "x" axis are then adjusted using the value of the level Signal Value for that column. The new value is limited to be no less than 0 and no more than 255. A pixel in the column is always mapped to zero if it is below a specified threshold.

Step 19005 is followed by step 19006 in which a "RemoveDarkBackground Sections Function" is performed. The purpose of this step is to zero out the pixel intensities of pixels that seem to be obviously in the background. The image is divided into segments along the "x" axis. For each segment, the percentile value of each pixel intensity is calculated. The well-known Otsu threshold is calculated from the histogram of the image segment. A percentile adjustment for the Otsu threshold is then calculated using this formula:

darkFieldArea=imageSegmentAreaInPixels*otsuPercentile;

targetNoisePerDarkField=imageSegmenWidthInPixels*
    noisePixlesPerEdge;

percentileAdjustment=targetNoisePerDarkField/darkFieldArea*−1;

Note: noisePixelsPerEdge is a tunable parameter.

The Otsu percentile is adjusted by the percentileAdjustment and then the pixel intensity at the adjusted percentile is found for the image segment. Any pixel in the image segment that is below the threshold is assigned a value of 0.

Step 19006 is followed by step 19008 in which a "RegionalThreshold Function" is performed. This function is a threshold operation, where the when the value in the image is above the threshold they are set to 0 and for all other values, they are set to 255.

Step 19008 is followed by step 19009 in which a "ExtractLightFieldMasks Function" is performed. This algorithm 1200 is documented in FIG. 86.

Step 19009 is followed by step 19010 in which a "GetTopSignalEdge Function" is performed. This function returns a 1D signal where the value is the top edge pixel's y value in the brightField image.

Step 19010 is followed by step 19011 in which a "GetBottomSignalEdge Function" is performed. This function returns a 1D signal where the value is the bottom edge pixel's y value in the brightField image.

Step 19011 is followed by step 19012 in which an "Autocropping function" is performed. This function inputs the top edge and bottom edge signals and finds where the signal edges are in the x direction.

Step 19014 follows step 19012 and, in this step 19014, a "MovingAverageFilter Function" is performed. This function processes 1D signals and is a moving average low pass filter. The window length for the average is input as a parameter.

Step 19016 follows step 19014 in which a "BuildsSolidBrightField Function" is performed. This function builds the solid bright field image. It inputs the *actual* top edge signal and the *filtered* top edge signal to create a final top edge signal. It also inputs the *actual* bottom edge signal and the *filtered* bottom edge signal to create a final top edge signal. One general rule is that if the actual top(bottom) edge location is above the filtered top(bottom) edge location, then use the actual top(bottom) edge location. Another general rule is that the actual top(bottom) edge location should be used unless there is a steep discontinuity in the actual signal. If there is a steep discontinuity, then us the filtered edge value, but only if the filtered edge value is above the actual edge value.

Step 19017 follows step 19016 in which a "GettopSignalEdge Function" is performed. This is same function as described in step 19010.

Step 19019 follows step 19018 in which a "GetBottomSignalEdge Function" is performed. This is same function as described in step 19011.

Step 19020 follows step 19019 in which a "BuildLightBarCenterImage function" is performed. The purpose of this function is to try to only calculate the regional averages in the middle of the light bar and keep the noisy edge regions from skewing the average. It inputs the top and bottom edges of the bright field. It then returns an image that is in the center of the edges and extends for a certain percentage (or technically a fraction). So for a percentage of 0.5 (really 50%) the returned light bar will be 50% the size of the original. Within this function the "FindEdgeDiscontinuityRegions Function" is performed. This function returns a Boolean vector indicating if a particular x location is considered part of a discontinuity region or not. It includes a margin parameter, and pixels in the left and right margin will never be considered part of a discontinuity region. The derivative threshold is the minimum derivative value of the edge signal that qualifies as a discontinuity region.

Step 19021 follows step 19020 in which a "GetTopSignalEdge" Function is performed. This is same function as described in step 19010.

Step 19022 follows step 19021 in which a "ToOtsu Function" is performed. This function applies Otsu threshold to entire image.

Step 19023 follows step 19022 in which a "BuildVerticalEdgeDistanceImage Function" cropping is performed. This function has the same functionality as the "CreateDistancesFromEdgeMap" algorithm in step 1170 in FIG. 92.

Step 19024 follows step 19023 in which a "BuildTopEdgeLengthSignal function" is performed. This function takes the Otsu threshold regional difference map and the solidBrightField edge signal. It starts at the edge of the bright field and walks inward along the vertical column in the direction of the center of the light bar. It measures the length of the edge region for that column as the number of consecutive pixels set by the Otsu threshold allowing for some gaps between bright pixels. The blurGap parameter is the maximum number of pixels allowed in a gap. The length measurement ends where there is a gap greater than blurGap. The resulting edgeLength signal is basically the number of pixels deep the gap region is at that x value of the image.

Step 19025 follows step 19024 in which a "BuildBottomEdgeLengthSignal Function" is performed. This function performs the same function described in step 19024 expect it for the bottom edge.

Step 19026 follows step 19025 in which a "BuildEdgeDefectMask Function" is performed. Its functionality is documented in flowchart or algorithm 8000 of FIG. 87 which includes the algorithm 8001 of FIG. 88.

Step 19027 follows step 19026 in which an "ApplyHorizontalEdgeMask function" is performed. The algorithm scans along each row from the left until it reaches an edge of the light bar region. Once at the edge, it creates a mask along the row for horizontalEdgeMaskLength pixels (this is a tunable parameter as seen in FIG. 130), starting at the edge and moving right. This is also repeated from the right edge, except then but the mask is applied moving in the left direction.

Step 19029 follows step 19027 in which a "FindDarkSpots Function" is performed. This algorithm is documented in FIG. 92.

Step 19030 follows step 19029 in which a "DilateorErode Function" is performed. The function used here inputs a source_image, direction (horizontal or vertical), and a pixels parameter. The dilate and erode algorithms will operate in either the horizontal direction along the image "x" axis, or the vertical direction along the image "y" axis, or in both directions, applying the vertical direction first. The pixel count is the number of pixels to erode or dilate in the specified direction.

Step 19031 follows step 19030 in which a determination is made as to whether a dark spot has been found in step 19030. If a dark spot has been found in step 19030 then step 19031 is followed by step 19032 in which the dark spot details are logged or recorded. Alternatively, step 19031 is followed by step 19033 and step 19033 also follows step 19032. In step 19033 an "ApplyMask Function" is performed. This function is the same as described in FIG. 92, step 1169.

Step 19035 follows step 19033 in which a "GaussianBlur Function" is performed. The Gaussian Blur function is a well-known function in literature.

Step 19036 follows step 19035 in which a "CreateDarkFieldEdgeMask function" is performed. This function moves along the top edge of the bright field in the x direction. For each column, move up from the top edge and test if the value of the pixel is above the threshold parameter. If the pixel is above the threshold then reset the gap count and write 255 to the pixel location on the output mask. The function continues until the gap count exceeds the blur gap parameter. The above procedure is repeated for the bottom edge, but instead moves down from the bottom edge.

Step 19037 follows step 19036 in which an "ApplyMask Function" is performed. This function is the same as described in FIG. 92, step 1169.

Step 19038 follows step 19037 in which a "ToBinary Function" is performed. This function is a threshold operation, all numbers below a value are 0 and all numbers above a value are set to 255.

Step 19039 follows step 19038 in which a "DilateOrErode Function" is performed. This is the same function described in step 19030.

Step 19040 follows step 19039 in which a determination is made as to whether a bright spot has been found. If a bright spot has been found, then step 19040 is followed by step 19041 in which the details of the discovered bright spot are recorded and/or communicated to server/processor 68 and/or to processor 70. Alternatively step 19040 is followed by step 19042 and step 19041 is also followed by step 19042 in which the process of flowchart 1900 is ended for that image. If another image is available for processing, that image is processed beginning at step 19025.

(XIV) Dark Spot Region of Interest Noise Classifier

Defect regions of interest may be processed by a classifier to eliminate false positive defect reports. Information in the dark spot region of interest is encoded into a feature vector for classification as either "noise" or as a "true defect". A feature vector has feature vector components. Example feature vector components for the dark spot region of interest feature vector include the average distance of the defect region of interest from the light bar edge, the mass of the pixels, the average intensity difference of the region pixels, and the shape of the defect. Additionally, information about the defect region of interest may be encoded by a wavelet transformation and the wavelet coefficients can be used to supplement the feature vector as discussed below.

A defect classifier is trained to input defect feature vectors and output a classification for the defect region of interest as either noise or true defect. A defect region of interest training set for the classifier can be generated initially by using a tool that presents a human with an image of the defect region of interest in context, and the human makes a decision and updates a record with the human determined classification of the defect, as noise or true defect.

The defect region of interest is bounded by a defect region of interest bounding box in the camera image having a defect region of interest bounding box top left corner and a defect region of interest bounding box bottom right corner. A defect region of interest histogram image is extracted from the regional difference image using the defect region of interest bounding box. See, for example, the dark spot defect region of interest 8077, the dark spot defect region of interest histogram image 8078, and the dark spot defect Haar wavelet 8079 of FIG. 41.

To achieve scale invariance, the defect region of interest histogram image 8078 s processed by a two dimensional Haar wavelet transformation. The well-known Haar wavelet transform outputs an approximation image with a reduced pixel resolution. The Haar wavelet transform is applied repeatedly to the approximation image until the resulting image resolution is 2×2 pixels resulting in a defect region of interest approximation image. To achieve rotation invariance, the defect region of interest approximation is rotated until the sum of the bottom two pixels is the overall minimum sum of bottom two pixels for the image. Images 14000, 14001 of a noise Haar pattern are respectively shown in FIGS. 35 and 36 and an image 14002 of a Haar wavelet pattern of a defect region of interest correlated with not noise is shown in FIG. 34.

The coefficients of the 4 pixels in the approximation may be used as features in a classification directly as floating point values. Alternatively, the pixel values may be quantized to integer values. When the pixels are quantized to three levels corresponding to black, grey, and white, then a pattern may be extracted. Some identified four pixel patterns of the black, grey, and white levels are highly correlated with noise. The incidence or non-incidence of one of these patterns may be a binary feature component of the feature vector.

Classifiers that can be trained to input feature vectors and provide a classification result are known in the prior art, notably in Richard Duda's Pattern Classification textbook and Matlab toolbox 8090 shown in FIG. 42. The result 13010 of this classifier is shown in FIG. 43. Many of these classifiers available in the Matlab® toolbox have been tested and provide excellent results. Specifically, the SVN toolbox classifier works well for the example dark spot feature vector as shown in FIG. 42 with no error for representative training data. FIG. 42 is an example classification that is showing no error, but there could be error with other data.

(XV) Joint Probability Table Classifier

A joint probability table may also be used for classification. A mapping function assigns each component of the feature vector to an integer feature value. The training data is used to create a joint probability table of every possible combination of integer feature values to estimate a precise probability. The probability table also learns the probability of every sub-combination of integer feature values for the cases where one or more feature is removed from the feature vector. The probabilities are estimated with confidence intervals that are calculated for a specified level of precision. When training data is sparse, there may not be enough samples for a particular combination of integer feature values. In this case the best estimate of probability for the combination is found by scanning all possible sub-combination records in the probability table for the best estimate.

The basic use of the joint probability table is shown by flowchart or algorithm 8992 in FIG. 96 and includes the step of creating probability records in step 8993, tallying probability counts in step 8994, and then calculating worst case probability estimates for each feature vector in step 8995.

Referring to algorithm or flowchart 27060 of FIG. 95, the steps are shown to enable a feature vector to be encoded into a quantized feature vector. Each feature vector component is associated with a feature_vector_component_quantization_map function. The feature_vector_component_quantization_map function inputs a feature vector component value and converts it to an integer quantized_vector_component_value. For this implementation, the quantized_vector_component_value is always a value greater than one.

In one example implementation where the probability classifier classifies a dark spot region of interest feature vector as either noise or not noise, the feature vector components include: (a) area of region in pixels, (b) the edge distance, which is maximum distance of a pixel in the region from an edge of the bright field in pixel units, (c) edge proximity, which is the average distance of pixels in the region from an edge of the bright field, and (d) a wavelet noise signal, which is binary.

The wavelet signal is created by finding the centroid pixel of the region of interest. A defect region of interest bounding box centered at this centroid point is created. The defect region of interest bounding box is square, the length of a side is an integer power of 2, the length of a side is at least 16 pixels, and the box will completely enclose the defect region. The defect region of interest bounding box is used to extract a defect regional difference image. The defect regional difference image is converted to a 2 pixel by 2 pixel Haar wavelet approximation image. The wavelet image is rotated 90 degrees until the sum of the bottom two pixels is minimized. Each pixel value is then converted to "white" if the intensity of the pixel is greater than a white_threshold of 180. The pixel is converted to "black" if the intensity of the pixel is less than a black_threshold of 55. Pixels between 180 and 55 are assigned a grey value. The wavelet signal is assigned a value of true by default. The wavelet signal is assigned a value of false if the all pixels are white. The wavelet signal is also assigned a value of false if the top pixels are white and the bottom pixels are black.

The first feature component quantization map function inputs a region area in pixels and outputs an integer between 1 and 5 using thresholds. The thresholds for quantization are 4, 10, 50, and 600. If the region area is 4 or less, then it will be quantized to 1. If the region area is between 4 or 10, it will be quantized to 2, and so forth. If the region area is greater than 600, it will be quantized to 5.

Similarly, the second feature component quantization map function inputs the edge distance to integers between 1 and 3, using thresholds of 15 and 40. The third feature component quantization map function inputs the edge proximity and encodes the value to an integer between 1 and 3 using threshold of 10 and 40. The wavelet signal is encoded as either 1 or 2, depending on its state of false or true respectively.

Returning again to FIG. 95, a quantized feature vector is created by inputting a feature vector, looping through the feature vector components, and applying the feature vector quantization map functions to each component to create a final quantized_vector of integers. A description of each of the steps of flowchart or algorithm 27060 will now ensue.

The flowchart or algorithm 27060 includes an initial step 27061 in which inputs are received by the processor conducting the algorithmic steps (e.g., processor 66). These inputs are the feature vector quantization map functions. Step 27062 follows step 27601 in which the processor is directed to create a new quantized vector. Step 27603 follows step 27602 in which a review or "loop through" of the various vector component index values is accomplished. Step 27604 follows step 27063 in which the feature vector component index is incremented and step 27605 follows step 27604 in which the vector component value is obtained from the feature vector. Step 27066 follows step 27065 in which the quantized vector component value is calculated as shown ands step 27067 follows step 27066 in which the quantized vector component value is set in the manner shown. Step 27068 follow step 27607 and a determination is made whether all feature vector component indexes have been reviewed. If so, step 27069 follows step 27068 and a quantized feature vector is returned. Alternatively, step 27068 is followed by step 27064.

In FIG. 98, the initial joint probability records are created, in the flowchart or algorithm 10001, by looping through every possible integer combination of quantized_vectors. The number of possible quantization levels for each feature vector component is finite so it is possible to iterate through each possible combination of feature vector component quantization value. In the example above, there are 5 levels for the first component, 3 levels for the second and third components, and 2 levels for the final component. Thus there will be 5*3*3*3=90 possible combinations of quantized_vector.

Each quantized_vector has a number of quantized_vector_subcombinations created by removing or ignoring one or more feature vector components. The feature vector component quantized value is coded as 0 to signify that the feature vector component is being removed. For example, if the first feature vector component is removed (or ignored), then the first value of the quantized_vector_subcombination will be 0, and the other values will be the same as the original quantized_vector. More than one feature vector component can be removed in a quantized_vector_subcombination. Using the example above, one possible quantized_vector_subcombination is <0, 0, 0, 1> which indicates that all feature vector components are removed (ignored) except for the wavelet signal feature vector component which is true for this record. During the creation of the joint probability records, records are created for each possible combination of quantized_vector, and also for each possible quantized_vector_subcombination.

Each joint probability record is assigned a unique hash code integer used to quickly access the joint probability record. The hash code is uniquely generated by a hash function taking the values in the record's quantized_vector as inputs and returning a unique integer hash code. To speed up processing, all of the hash codes created from all of the possible quantized_vector_subcombinations for a quantized_vector are stored in a list associated with the quantized_vector's joint probability record referred to as the subcombinations_hash_codes.

Particularly, the flowchart or algorithm 10000 in FIG. 97 begins with an initial step 31000 in which inputs are received by the processor performing this algorithm 10000 (e.g. processor 66). These inputs include the feature vector component sub value functions. Step 31001 follows step 31000 in which a loop or review is made of every possible quantized vector combination and step 31002 follows step 31001 in which a possible quantized vector is identified. Step 31003 follows step 31002 in which a new joint probability record is created for the quantized vector combination and step 31004 follows step 31003 in which a list of all quantized vector sub combinations for the quantized vector combination are made in the manner shown. Step 31005 follows step 31004 in which the processor is directed to perform an iteration through each of the quantized vector sub combinations and step 31006 follows step 31005 in which the next quantized vector sub combination is obtained. Step 31007 follow step 31006 in which the quantized vector hash code is made equal to the hash quantized vector sub combination as shown. Step 31008 follows step 31007 in which the quantized vector hash code is added to quantized vector sub combination hash codes in the manner shown. Step 31009 follows step 31008 in which a determination is made whether the joint probability record for the quantized vector sub combination exists. If so, then step 31009 is followed by step 31011. Alternatively, step 31010 follows step 31008 in which a new joint probability record is created for the quantized vector sub combination and step 31010 is followed by step 31011. In step 31011, a determination is made whether a "loop" has been made through every quantized vector sub combination. If so, then step 31011 is followed by step 31012 and alternatively step 31011 is followed by step 31006. In step 31012 a determination is made whether a loop has been made through all possible quantized vectors. If so, then step 31012 is followed by step 31013 which denotes the end or completion of the algorithm 10000. Alternatively step 31012 is followed by step 31002.

Flow chart or algorithm 10001 in FIG. 98 shows how the probability classifier is trained. A list training entries is supplied to the probability classifier. Each training entry includes a feature vector coupled with a value indicating if the classification result should be either "true defect" or "noise". Each training entry is processed by first converting the feature vector to a quantized_vector. The quantized_vector is then converted to a hash code, which is used to look up the probability record. The probability record for the training entry has a sample_count, which is increased by 1. The probability record also has a defect_count, which is only incremented if the training entry is a "true defect".

Next, the subcombinations_hash_codes list is queried from the probability record that is associated with the quantized_vector for the training entry. The algorithm iterates through each hash code in the subcombinations_hash_code list and uses the sub combination hash code to look up the sub combination probability record. The sub combination probability record's sample_count is incremented by 1, and the defect_count is also incremented by 1 if the training entry is for a "true defect".

After the probability counts have been tallied using the training entries, the worst case probabilities for each probability record are estimated as documented in figure p4. Each probability record has totals for sample_count and defect_count. An estimated proportion of the feature vector being associated with a defect is the defect_count/sample_count. This estimated proportion can be qualified by a confidence interval using the well-known equation to calculate confidence interval for estimated proportions using a specified level of precision. The confidence interval of the proportion estimate is established for a specified precision and establishes a lower confidence interval value and an upper confidence interval value. The upper confidence interval value is the worst case probability of having a false negative classification for the probability record's associated feature vector or sub combination. The lower confidence interval value is subtracted from 1 to provide the worst case probability of having a false positive classification for the probability record's associated feature vector or sub combination feature vector. If there are not enough samples associated with the probability record (less than 5), then the worst case probabilities are simply set to 1. The worst case probabilities are stored as fields in each probability record.

Next, the algorithm 10001 iterates through all probability records that are associated with a feature vector combination, excluding the probability records for sub combinations. The probability record will have a list of subcombination_hash_codes. The algorithm 10002 of FIG. 99 loops through all of the subcombination_hash_codes and looks up the sub combination's probability record. The worst case probabilities for the sub combination are compared to the worst case probability of the feature vector's probability record. If the worst case probability of the sub combination record is better, then the feature vector's probability record is updated with the sub combination's worst case probability. This step allows the probability associated with a specific feature vector combination having zero or only a few sample counts to be improved by sub combination probabilities having more samples available to estimate more precise probabilities.

After the worst case probabilities have been updated for each feature vector combination, a final decision for the feature vector is determined using a false_negative_threshold. If the worst case false negative percentage for the probability record is greater than the false_negative_threshold, then the record is configured to classify the feature vector as a defect by storing true in the probability record's classify_as_defect field. Otherwise the record is configured to classify the feature vector as noise by setting classify_as_defect to false. In this example, the precision is 0.8 and the false_negative_threshold is 0.15. The precision can be much higher when many training entries are available. In this example, the classifier has been biased to consider false negative classification errors as a greater problem than false positive errors, so false positive classification errors are much more likely to result than false negative errors.

Referring now to FIG. 98 there is shown flowchart or algorithm 10001 beginning with an initial step 33000 in which an input is received by the processor performing this algorithm 10001 (e.g., processor 66). This input is the feature vector component quantization map functions training entries as shown. Step 33001 follows step 33000 in which the processor is directed to loop or review all training entries and step 33002 follows step 33001 in which a training entry is identified. Step 33003 follows step 33002 in which a quantized vector is made equal to a quantized feature vector in the manner shown and step 33004 follows step 33003 in which a vector hash code is made equal to a hash quantized vector in the manner shown. Step 33005 follows step 33004 in which a lookup or review is made of probability record using the vector hash code and step 33006 follows step 33005 in which an incrementation is made of the probability record's sample count. Step 33007 follows step 33006 in which a determination is made whether the training entry is a true defect. If so, step 33007 is followed by step 33008 in which the defect count for that probability training record is incremented. Alternatively step 33007 is followed by step 33009 and step 33009 follows step 33008.

In step 33009 the quantized vector sub combination hash codes are obtained for that probability record in the manner shown and step 33010 follows step 33009 in which an iteration is made through the sub combination vector hash codes in the manner shown and step 33001 follows step 33010 in which the next sub combination quantized vector hash code is obtained Step 33012 follows step 33011 in which a lookup or review is made of the sub combination joint probability record using the sub combination quantized vector hash code in the manner shown and step 33013 follows step 33012 in which an incrementation is made of the sub combination joint probability record's sample count. Step 33014 follows step 33013 in which a determination is made whether the training defect is a true defect and, if so, then step 33014 is followed by step 33015 in which an incrementation is made to the sub combination joint probability record's defect count. Step 33015 is followed by step 33018 denoting the end of the algorithm 10001. Alternatively, step 33014 is followed by step 33016 in which a determination is made whether all quantized vector sub combinations have been reviewed and, if so, step 33016 is followed by step 33017 in which a further determination is made whether all training entries have been reviewed or "looped through". Alternatively, step 33016 is followed by step 33011. If, in step 33017, a determination is made that all training entries have not been reviewed or "looped through" then step 33017 is followed by step 33002. Alternatively, step 33017 is followed by step 33018.

After training, classification of a feature vector follows the following steps. The feature vector is converted to a quantized_vector and then it is converted to a hash code from the quantized_vector. The hash code is used to look up the probability record. The probability record's classify_as-_defect value is queried to either classify the feature vector as noise or true defect. The calculated worst case probability of making a false positive or false negative error is also available in the probability record and this information can be returned as part of the classification result and used later.

While other classifiers work well, the joint probability table classifier is a good tool for classifying defect regions of interest because it allows the precise probability of false positive and false negative classifications to be calculated using confidence intervals, which can then be reported and used for later processing. These confidence intervals can be used to bias the classification slightly to error on the side of making a few false positive errors and no false negative errors. This bias towards false positive classification is acceptable and desirable when there will be an additional cluster based filter in later processing to remove the false positives. Another advantage for the joint probability table is that it can be incrementally updated to improve performance as more training data becomes available over time.

Particularly, the flowchart or algorithm 10002 begins with a first step 25030 in which a false negative threshold value is received by the processor (such as the processor 68). Step 25031 follows step 25030 in which the processor is directed to review all probability records and step 25032 follows step 25031 in which a probability record is identified. Step 25033 follows step 25032 in which a worse case probability of false positive is calculated. Step 25034 follows step 25033 in which a worse case false negative probability is calculate and step 24035 follows step 25034 in which a determination is made as to whether all joint probability records have been reviewed. If so, step 25035 is followed by step 25036 in which a review of all joint probability records excluding the sub combination joint probability records is achieved. Alternatively, step 25035 is followed by step 25032. Step 25037 follows step 25036 in which a joint probability record is identified and step 25038 follows step 25037 in which a quantized vector sub combination hash code is obtained for the probability record. Step 25039 follows step 25038 in which an iteration of all quantized vector hash codes is accomplished. Step 25040 follows step 25039 in which the next hash code is obtained. Step 25041 follows step 25040 in which to determination is made whether the probability of a false positive for the probability record is greater than the worst case probability of a false positive for the sub combination probability record. If so, then step 25041 is followed by step 25042. Alternatively, step 25041 is followed by step 25043. In step 25042 the false positive for probability record is made equal to the worst case probability of false positive for the sub combination probability record. Step 25043 follows step 25042 and step 25041 and, in this step, a determination is made whether the probability of a false negative for the probability record is greater than the worst case probability of false negative for the sub combination probability record. If so then step 25043 is followed by step 25044 in which the false negative for the probability record is equal to the worst case probability of false negative for the sub combination probability record and step 25045 follows step 25044 in which a determination is made whether a review of all quantized vector sub combination hash codes has been accomplished. Alternatively, step 25043 is also followed by step 25045. If the determination in step 25045 is an affirmative then step 25045 is followed by step 25046 in which a determination is made whether a review of all joint probability records has been made. Alternatively, step 25045 is followed by step 25040. If the answer in steep 25046 is an affirmative then step 25046 is followed by step 25047. Alternatively step 25046 is followed by step 25037. In step 25047 a determination is made whether the worst case false negative probability is greater than the false negative threshold input in step 25030. If so, then step 25047 is followed by step 25048 in which the probability record is marked as a true defect. Alternatively step 25047 is followed by step 25049 in which the probability record is marked as noise. Step 25050 follows each of the steps 25048 and 25049 and denotes the completion of the flowchart or algorithm 10002.

(XVI) Projecting Defect Regions onto Inspection Object Surface

A defect region of interest record includes the defect region top left corner image point, region bottom right corner point, and region centroid point using pixel coordinates of the frame image. Simulation is used to place the inspection object at the position reported by the frame position table and the two dimensional image points of the defect region are projected to the three dimensional points on the inspected object surface in the world coordinate system.

The calibrated camera position is used to simulate the simulation camera position and camera location. The motion tracking log is queried to provide the best estimate of the inspected object position at the frame id where the defect region of interest is located. This estimated tracked object position is used the place the simulated inspected object surface in the simulation. Full frame image points are created by adjusting the image points in the defect region of interest record by any cropping offsets or camera region of interest offsets. Hit testing in the simulator is used to estimate the exact three dimensional world points of the defect region of interest on the inspected object surface. Hit testing provides a region top left world point, region bottom right world point, and region centroid world point. A region surface normal vector can also be estimated at the region centroid world point using the simulator. The defect region of interest records are updated to include these world points and the region surface normal vector.

To further understand this process, reference is now made to FIG. 100 and to flowchart 13020 included therein Flowchart or algorithm 13020 begins with an initial step 25100 in which inputs are received, namely the defect camera calibration, the decal mesh, and the inspected object mesh. These may be input to a processor such as to processor 68. Step 25102 follows step 25100 and in this step the cameras are selected for a near plane and a far plane and rectangle bounds are set. Step 25103 follows step 25102 in which a decal frustum is constructed and step 25104 follows step 25103 in which the decal frustum is transformed to the inspected object mesh coordinate system using the defect camera calibration. Step 25106 follows step 25105 in which the decal mash is created by clipping the front facing triangles of the inspected object mesh against the decal frustum. Step 25107 follows step 25016 in which a projection of each vertex in the decal mesh is made using the decal frustum as a projector. Step 25108 follows step 25107 in which a rendering of the deal mesh is made on the inspected object mesh. Step 25109 follows step 25108 and denotes the end of the algorithm 13020.

(XVII) Clusters

Figure 26:
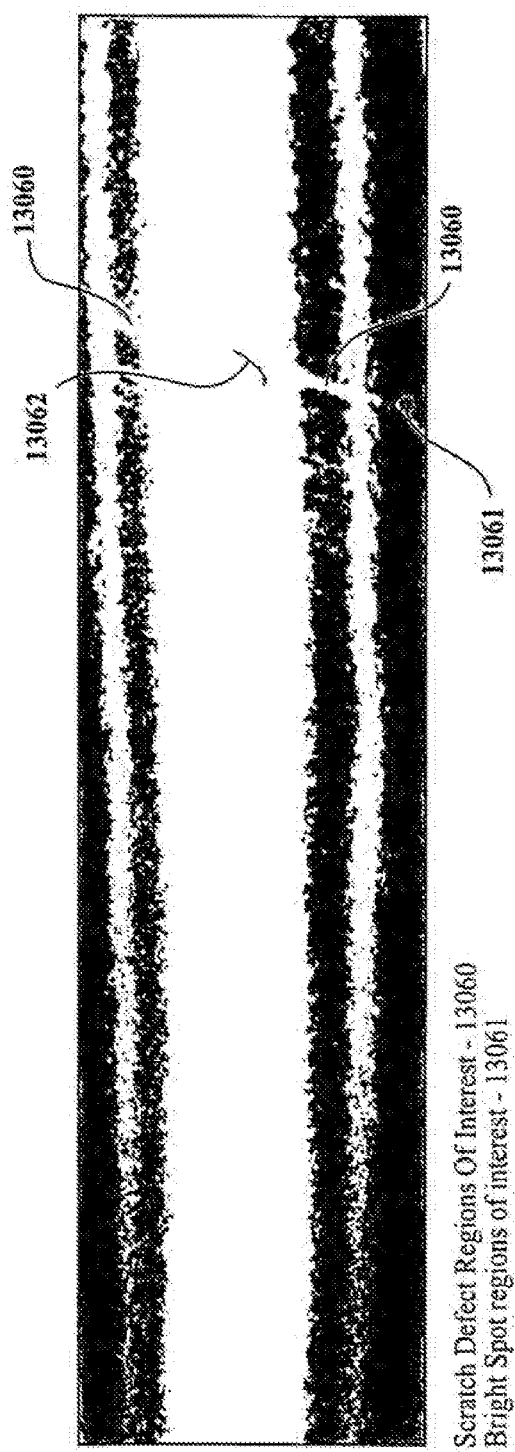
FIG. 26 is a histogram image of an inspection frame and further illustrating a scratch type defect region of interest, a bright spot region of interest, and a dark spot region of interest.

A defect on the surface 12 of the inspected object 14 should ideally appear in multiple frames. When the system 10 is designed to capture frame images so that a defect point appears in at least three reflection bars, then a defect can appear up to three times as a dark spot defect region of interest. There will typically be at least four opportunities for a defect point to appear as a bright spot region of interest. A clustering algorithm is used to combine spot defect regions of interest into spot clusters. An example of a scratch defect region of interest 13060, a bright spot region of interest 13061, and a dark spot region of interest 13062 are each shown in FIG. 26.

Spot clusters are intended to combine defect regions of interest into a single cluster after the defect regions of interest are found in multiple frames and are regions covering the same defect. To create spot clusters, bright spot defect regions of interest and dark spot defect regions of interest records are combined into a spot defect region of interest collection. The spots are clustered and filtered in three general steps. First the defect regions of interest are clustered in Euclidian space using the region of interest world points to measure proximity of the defect regions of interest to one another. Second, clusters that are close to each other may be merged. Finally, a filtering process is applied to remove clusters that appear to contain false positive defect regions of interest. These general steps for spot defect regions of interest and for scratch defect regions of interest are shown in flowchart or algorithm 13050 of FIG. 102. That is in flowchart 13050, an initial step 13051 occurs in which defect regions of interest are clustered and step 13052 follows step 13051 in which a clustering of spot defect region of interest are placed in spot clusters. Step 13053 follows step 13052 in which a merging of spot defect regions of interest occurs. Step 13054 follows step 13053 in which a filtering of the spot defect regions of interest occurs. Step 13055 follows step 13054 in which a clustering of scratch defect regions of interest are created and form scratch clusters. Step 13056 follows step 13055 and a merging of the scratch defect regions of interest occurs and step 13057 follows step 13056 and a filtering of the scratch defect regions of interest occurs and ends the flowchart or algorithm 13050.

Referring now to algorithm or flowchart 10009 of FIG. 105, one example's region of interest clustering algorithm steps are listed. First, the bright spot and dark spot regions of interest are clustered in Euclidean space using their world coordinates on the surface of the vehicle and the cluster's area. Then, the spot clusters are filtered to eliminate false positive clusters and to eliminate false negative clusters. Similarly, in flowchart or algorithm 10010 of FIG. 108. Scratches are clustered in the world coordinate system, merged, and then filtered to produce a final list of scratch clusters. This is shown, for example, in flowchart or algorithm 10013 of FIG. 106.

Particularly, in flowchart or algorithm 10010 of FIG. 108, begins with an initial step 21050 in which the image processor (e.g., processor 68) is directed to perform algorithm 10010. Step 21051 follows step 21050 in which the processor is directed to iterate this algorithm 10010 over all scratch clusters. Step 21052 follows step 21051 in which a scratch cluster is identified. Step 21053 follows step 21052 in which a determination is made as to whether the scratch cluster has at least two scratch regions of interest. If so, then step 21053 is followed by step 21055 in which the cluster is kept. Alternatively, step 21053 is followed by step 21054 in which the cluster is discarded. Step 21056 follows each of the steps 21055 and 21056 and requires a determination as to whether a complete iteration has been made overall all scratch clusters. If so, step 21056 is followed by step 21057 in which the flowchart or algorithm 10010 is ended. Alternatively, step 21056 is followed by step 21052.

Particularly, flowchart or algorithm 10013 (FIG. 106) includes a first step 21000 in which the minimum cluster distance is input or received by the image processor (e.g., processor 66) and step 21001 follows step 21000 in which the processor is directed to iterate this algorithm 10013 over all of the scratch defect regions of interest. Step 21002 follows step 21001 in which a scratch region of interest is identified. Step 21003 follows step 21002 in which a determination is made as to whether a scratch cluster exists. If a scratch cluster does not exist then step 21003 is followed by step 21007. Alternatively, step 21003 is followed by step 21004 in which the nearest scratch cluster having the minimum Euclidian distance from the defect region of interest is identified. Step 21005 follows step 21004 in which a cluster distance value is calculated as the distance between the nearest scratch cluster and the defect region of interest. Step 21006 follows step 21005 in which a determination is made whether the cluster distance is less than the minimum cluster distance input into the algorithm in step 21000. If so, then step 21006 is followed by step 21008 in which the defect region of interest is added to the matching scratch cluster. Alternatively, step 21006 is followed by step 21007 in which the defect region of interest is added to a new scratch cluster. Step 21009 follows each of the steps 21007 and 21008 and a determination is made as to whether all of the scratch defect regions of interest have been iterated. If so, then step 21009 is followed by step 21010 which requires the algorithm 10013 to be completed. Alternatively, step 21009 is followed by step 21002.

Particularly, the flowchart or algorithm 10009 (see, FIG. 105) begins with an initial step 23010 in which the direction is given to the processor (e.g. processor 62) to filter the spot clusters. Step 23011 follows step 10010 in which the processor is given the direction to iterate the filtering over all spot clusters. Step 23012 follows step 23011 in which a spot cluster is identified. Step 23013 follows step 23012 in which a determination is made as to whether the cluster include at least one bright and at least on dark spot. If not, then step 10015 follows step 10013 and the cluster is discarded. Alternatively, step 10013 is followed by step 10014 where the cluster is kept. Step 23016 follows each of the steps 23014 and 23015 and a determination is made whether all spot clusters have been filtered. If so, step 10016 is followed by step 23017 representing the completion of the flowchart 10009. Alternatively, step 10016 is followed by step 10012.

Referring now to algorithm or flowchart 10011 of FIG. 103, defect regions of interest are clustered in Euclidian space using a minimum_cluster_distance parameter. This parameter specifies the minimum distance between two points in a cluster during the first clustering step. The minimum_cluster_distance parameter is selected to be large enough to allow for error in inspected object position reported by the object tracking system yet small enough to prevent neighboring but distinct defects from being merged together. The value of minimum_cluster_distance used for this example is 0.2 mm. Additionally, a defect region of interest is only added to a spot cluster when the defect region of interest area is close to the average area of defect regions of interest already belonging to the spot cluster. The average area of defect regions of interest already belonging to the spot cluster is designated as the average_cluster_area. A defect region of interest area is considered to be close to the average_cluster_area when the defect region of interest area is between average_cluster_area/defect_size_tolerance and average_cluster_area*defect_size_tolerance. The defect_size_tolerance factor is typically about 3. If a defect region of interest cannot be added to an existing spot cluster, then it is simply added to a new spot cluster. That is, flowchart 10011 begins with an initial step 24012 in which inputs are received which specify the minimum cluster distance and defect size tolerance. This algorithm may be "run" or operated in image processor 66 (as all other image processing algorithms may be so run or performed/operated). Step 24013 follows steps 24012 and the processor (e.g., processor 66) is instructed to iterate this method or algorithm over all spot defect regions of interest. Step 24014 follows step 24013 where a new spot defect region of interest is identified for processing. Step 10015 follows step 10014 and a determination is made whether a spot cluster exists. If not, then step 24015 is followed by step 24021. Alternatively, step 24015 is followed by step 24016 in which the nearest spot cluster having a minimum Euclidian distance from the defect region of interest is identified. Step 20017 follows step 20016 in which a cluster distance is calculated and which equals the distance between the nearest spot cluster and the defect region of interest. Step 24018 follows step 20017 in which it is determined whether the calculated cluster distance less than the input minimum cluster distance. If it is not, then step 24018 is followed by step 24021. Alternatively, step 24018 is followed by step 24019 fin which an average cluster area is calculated and is equal to the average area of all defects belonging to the nearest spot cluster. Step 24020 follows step 24019 in which it is determined whether the spot defect region of interest area is respectively greater or less than a value equal to the product of average cluster area and defect size tolerance which was input or received in step 24012. If it is not, then step 24021 follows step 24020. Alternatively step 24020 is followed by step 24022 in which the defect region of interest is added to the matching spot cluster. In step 10021, the defect region of interest is added to a new spot cluster. Step 24023 follows steps 24021 and 24022 where a determination is made whether al spot defect regions of interest have been iterated. If not, step 24023 is followed by step 24014. Alternatively, step 24023 is followed by step 24024 representing the completion of the flowchart or algorithm 24011.

Referring now to flowchart or algorithm 10012 of FIG. 104, the spot clusters are merged based on area and proximity. Iteratively, each spot cluster is compared to the cluster that is both nearest to the spot cluster in Euclidian proximity and also within the tolerance range of similar area. A spot cluster area is considered close to another cluster in area when its own average_cluster_area is within the other spot cluster's area tolerance which is adjusted by the defect_size_ tolerance factor. The spot cluster is considered near to the other spot cluster in Euclidian proximity when the distance between two image points in the cluster is less than or equal to a minimum_cluster_proximity parameter. Whenever a pair of spot clusters are close in both area and proximity, then they are merged into a single spot cluster and the merge process is restarted. Particularly, the flowchart or algorithm 10012 begins with an initial step 10013 in which two inputs are received, namely the defect size tolerance and minimum cluster distance. Step 10013 follows step 10012 in which the processor (e.g. processor 66) is directed to iterate over all spot clusters. Step 10015 follows step 10014 in which a spot cluster is identified. Step 10016 follows step 10015 in which the average spot cluster area is calculated and is the average area of all defects belonging to a spot cluster. Step 10017 follows step 10016 in which a similar size cluster list is created and includes spot clusters having a respective average spot defect area having a respective value which is greater than the product of average cluster area and defect size tolerance which was input into the processor in step 10013 and wherein also includes those spot clusters having a respective average spot defect area which is respectively less than this product. Step 10018 follows step 10017 in which the nearest spot cluster having a similar size spot cluster list and having a minimum Euclidean distance from this spot cluster is identified. Step 10019 follows step 10018 in which the cluster distance is calculated as being equal to the distance between this spot cluster and the identified nearest spot cluster. Step 10020 follows step 10019 and a determination is made whether the calculated cluster distance is less than the minimum cluster distance which was input in step 10013. If this distance is indeed less than the input minimum distance then step 10020 is followed by step 10022 in which all of the defect regions of interest from this spot cluster are moved and added to the matching spot cluster. Alternatively, step 10020 is followed by step 10021 in which a determination is made as to whether the iteration over all spot clusters has been achieved If so, then step 10021 is followed by step 10023 signifying the completion of this flowchart or algorithm 10012. Alternatively, step 10015 follows step 10021. Step 10024 follows step 10022 in which this spot cluster is removed. Step 10015 follows step 10024.

Referring now to flow chart or algorithm 10013 of FIG. 106 spot clusters are examined and filtered to identify clusters that likely contain false positive defect regions of interest by using the spot cluster filter. The spot cluster filter makes a pass or a reject decision for a spot cluster by examining the regions of interest contained in the spot cluster. A spot cluster is passed by the filter step and retained if the spot cluster contains at least one dark spot region of interest and at least one bright spot region of interest. Also, because the defect classifier is applied to the dark spot regions of interest prior to clustering in this example, a spot cluster is also passed by the filter step and retained if it contains a plurality of dark spot regions of interest. All other clusters are rejected as noise.

The spot cluster filter also produces training data that can be used for updating or retraining the defect classifier. The training database for classifiers can be updated using the feature vector and information associated with each spot defect region of interest along with the ultimate pass or reject decision made by the spot cluster filter.

Similarly, the scratch defect regions of interest are clustered, merged, and filtered as described in flowchart or algorithm 10014 in FIG. 107. The algorithms are similar to the spot clustering algorithms, except the area of the region of interest is not a factor in the scratch clustering process. Particularly, the flowchart or algorithm 10014 begins with an initial step 21020 in which an input is received into the image processor (e.g. processor 66) and this input is the minimum cluster distance. Step 21021 follows step 21020 and this is a direction given to the processor to iterate all scratch clusters by use of this algorithm 10014. Step 21022 follows step 21021 in which a scratch cluster is identified. Step 21023 follows step 21023 in which the nearest scratch cluster having a minimum Euclidean distance from the scratch cluster is found. Step 21024 follows step 21023 in which a cluster distance is calculated and equals the distance between the nearest scratch cluster and this scratch cluster. Step 21025 follows step 21024 in which a determination is made whether the calculate cluster distance is less than the input minimum distance. If so, then step 21025 is followed by step 21026 in which all defect regions of interest are moved from this scratch cluster to the matching scratch cluster. Alternatively, step 21025 is followed by step 21027 in which a determination is made whether all scratch clusters have been iterated. If so, then step 21027 is followed by step 21028 which represents the end of this algorithm 10014.

Alternatively, step 21027 is followed by step 21022. Step 21026 is followed by step 21029 in which this scratch cluster is removed and step 21021 follows step 21029.

Figure 7:
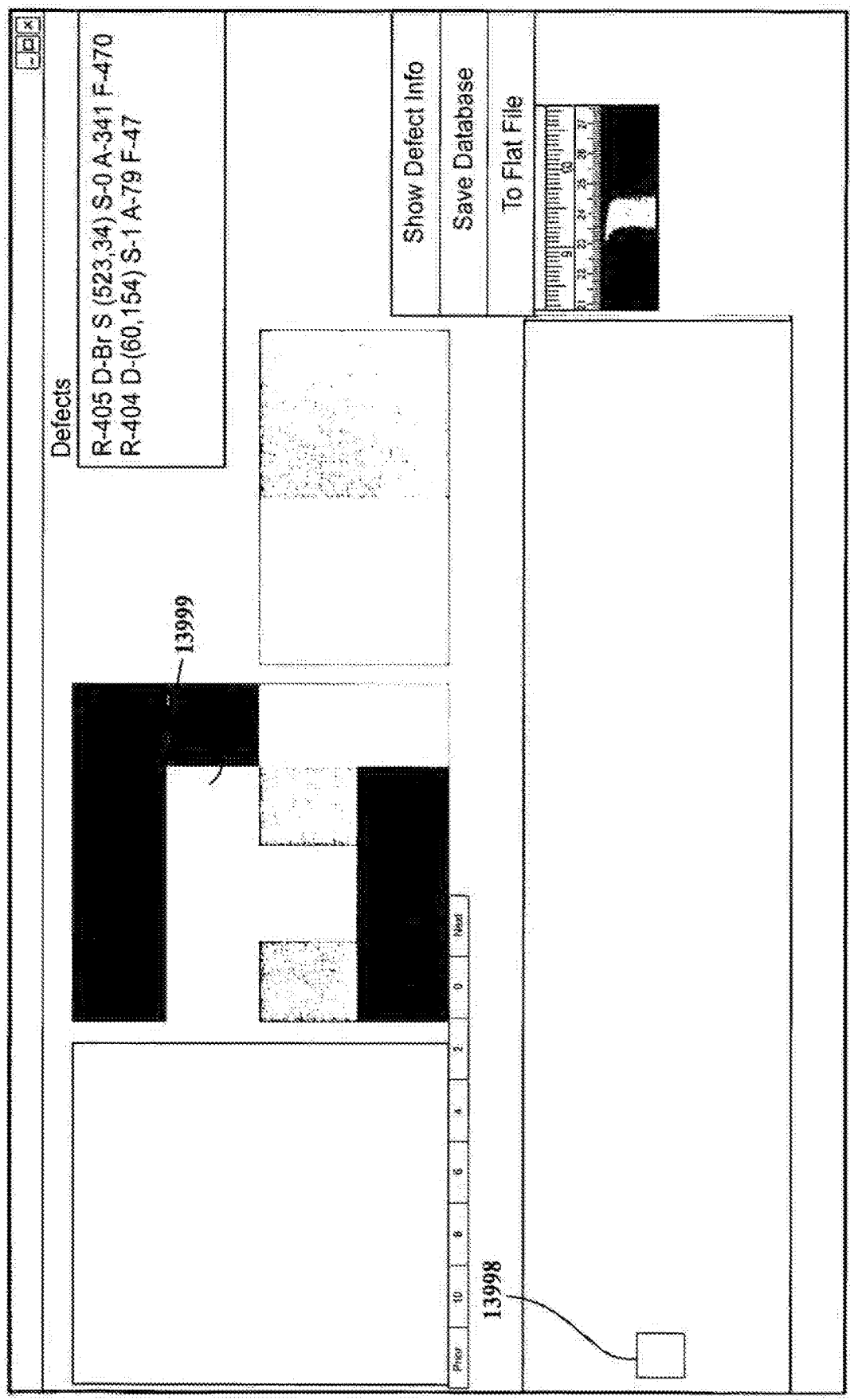
FIG. 7 is an exemplary histogram image of a dark spot region of interest which is part of a defect cluster and which was captured in frame number 470.
Figure 8:
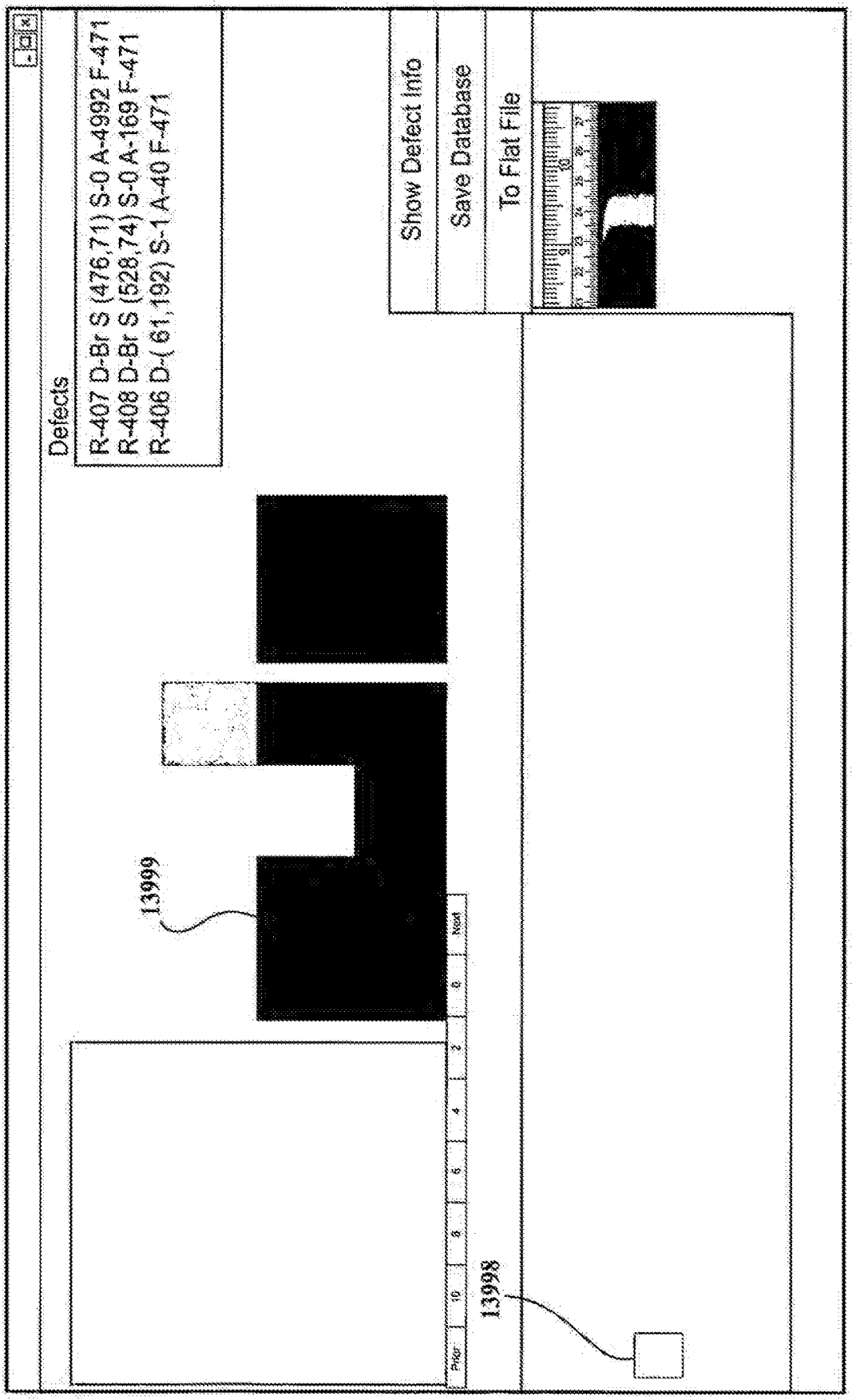
FIG. 8 is an exemplary histogram image of a dark spot region of interest which is part of a defect cluster and which was captured in frame number 471.
Figure 10:
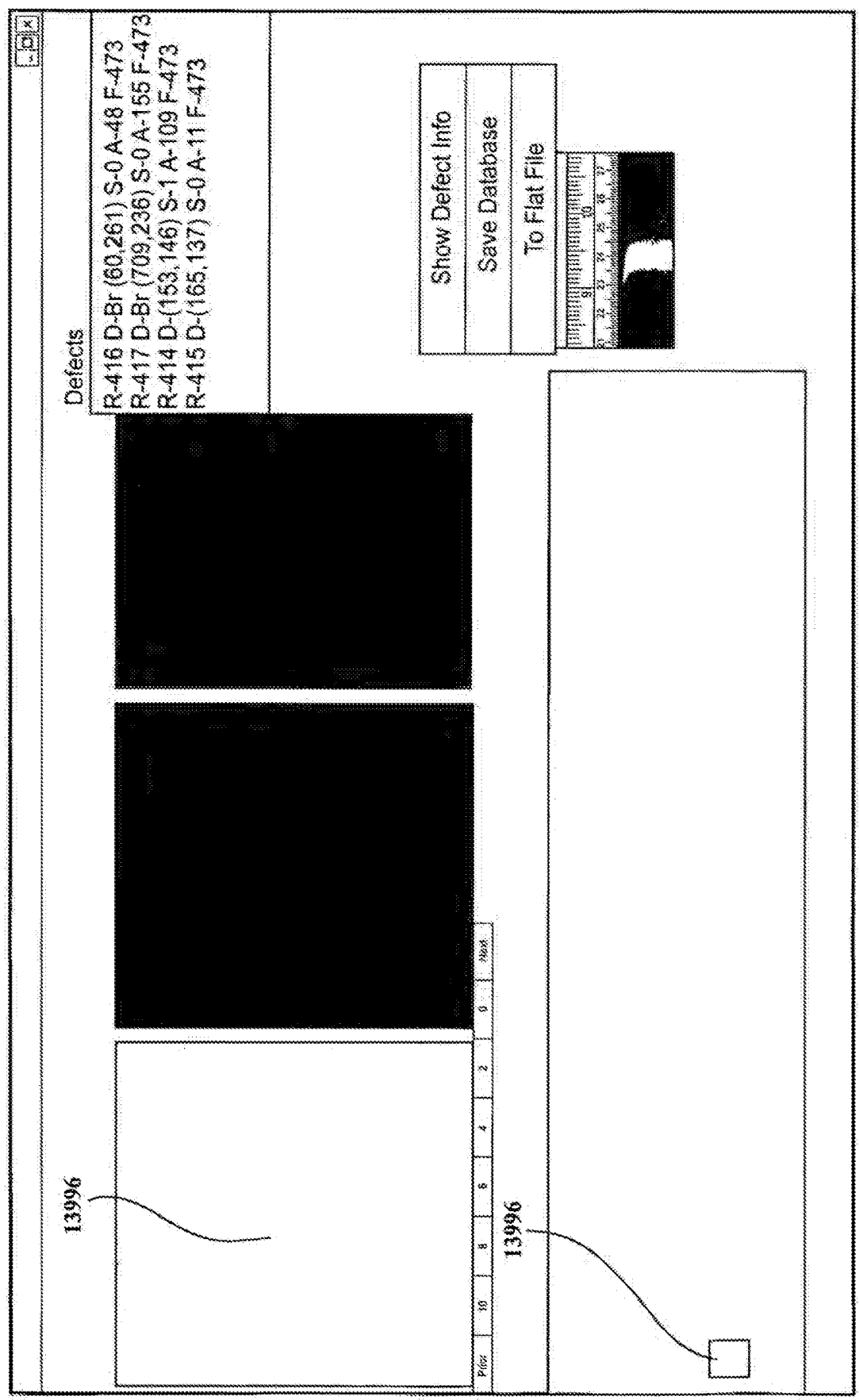
FIG. 10 is an exemplary histogram image of a dark spot region of interest which is part of a defect cluster and which was captured in frame number 473.
Figure 11:
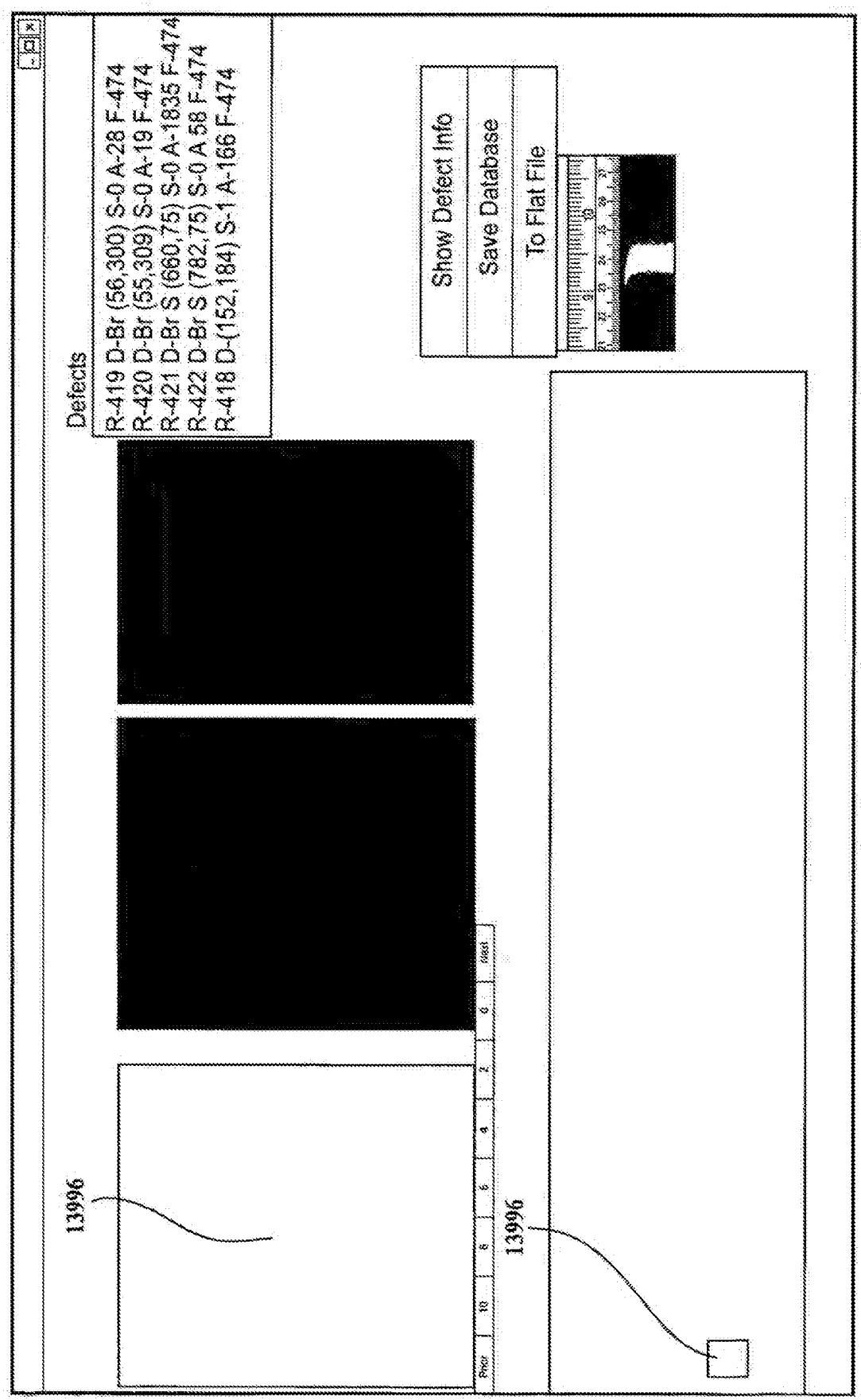
FIG. 11 is an exemplary histogram image of a dark spot region of interest which is part of a defect cluster and which was captured in frame number 474.
Figure 12:
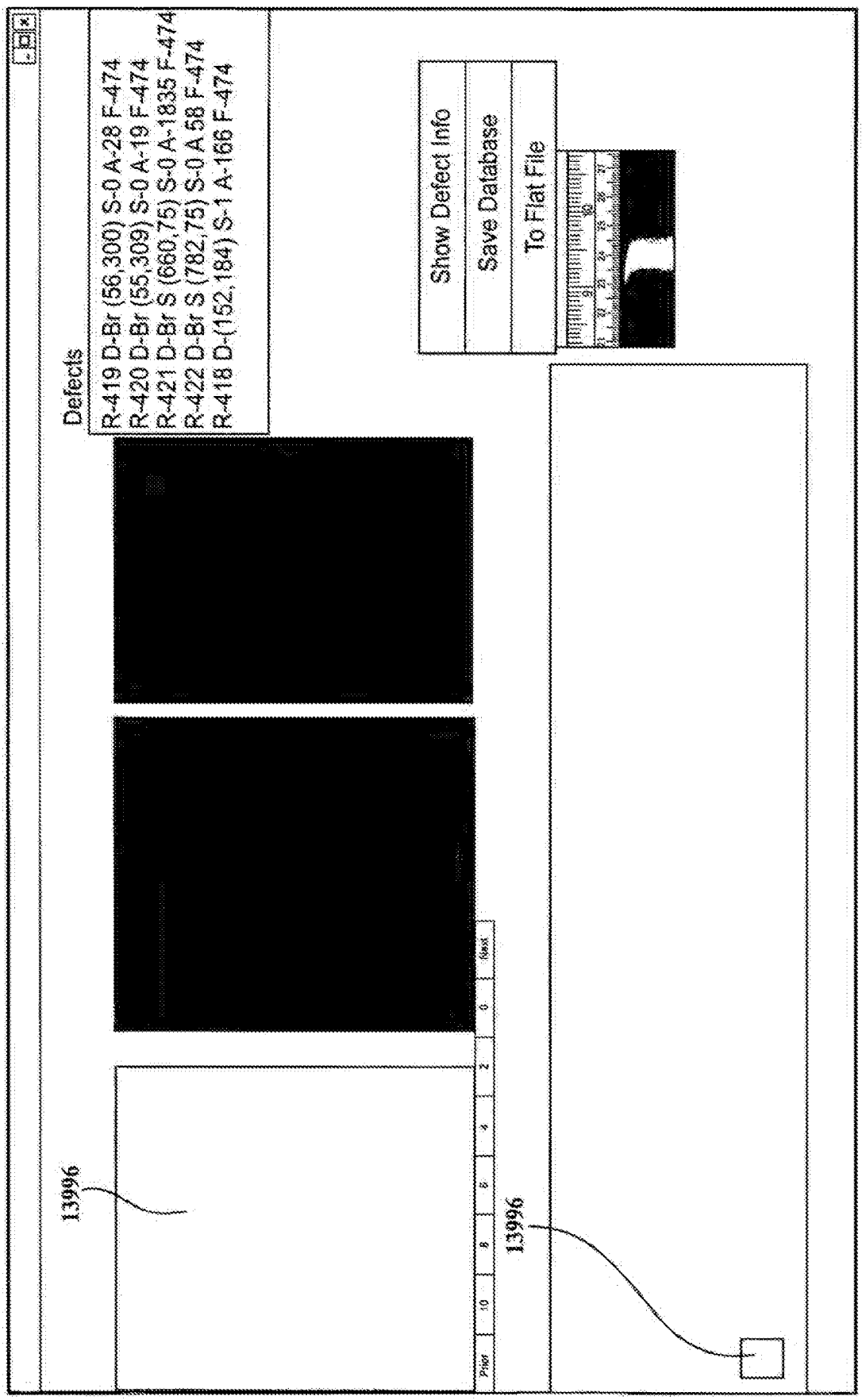
FIG. 12 is an exemplary histogram image of a dark spot region of interest which is part of a defect cluster and which was captured in frame number 474.

A dark spot defect 13998 in a spot cluster 13999 is shown for a first frame in FIG. 7 and the same defect 13998 is shown in the same cluster 13999 at a later time in FIG. 8. A bright spot defect 13996 is shown for a first frame in FIG. 10 and the same bright spot defect 13996 is shown for a second and later frame in FIGS. 11 and 12, which may be part of spot cluster 13070. An example of the defect spot cluster 13070 upon an image of an object to be inspected is shown in FIGS. 27, 28, and 29.

(XVIII) Defect Decals

Spot clusters passed by the spot cluster filter are converted to a decal mesh for viewing defect images on the inspected object mesh using simulation.

Referring now to FIGS. 46 and 47, in computer graphics (as shown in respective illustrations 11000 and 11001) the volume of space visible to a camera is approximated by a frustum, which can be defined by specifying the top left corner and bottom right corner on the near plane, the near plane depth value, and the far plane depth value along a look axis.

Thus for software modeling, one associates a frustum with the defect projection camera.

Where a defect image generated from a camera photo, it may be advantageous to map the defect image onto a 3D vehicle at the same location where the defect appeared on the physical vehicle. The defect feature is bounded by the subrectangle (l, r, b, t) on the projection window, as shown in FIG. 47. The subrectangle (l, r, b, t) along with the camera near plane and far plane defines a decal frustum in the camera view space. It is, therefore, desirable to render the defect image on the mesh surface that intersects the frustum.

Accordingly, the following inputs may be performed 1) the camera view matrix and projection matrix P approximating the physical camera properties from which the photo was taken; 2) the 2D rectangle bounds R=(l, r, b, t) of the defect image on the near plane in view space; 3) the world matrix of the 3D mesh object; 4) the 3D mesh M triangle list. These inputs may result in an output of a 3D decal mesh that contains the geometry of the intersection of the mesh and the selection frustum. The decal mesh has projective texture coordinates with respect to the decal frustum so that the defect image covers the decal mesh.

A decal frustum for a defect image is defined by the defect projection camera near plane, the defect projection camera far plane, and the top left, and bottom right bounds of the defect image on the projection camera near plane. This frustum is contained inside the defect projection camera frustum.

Once the decal frustum and inspected object mesh are in the same coordinate system, back facing triangles in the inspected object mesh are discarded, and then each front facing triangle in the inspected object mesh is clipped against the decal frustum. A clipped inspected object mesh remains after clipping, referred to as the decal mesh, which is a new mesh that represents the intersection for the decal frustum and the inspected object mesh. Clipping triangles against a frustum is a standard computer graphics algorithm; for example, see [Eberly 2001].

After clipping, one has the spatial positions for each vertex in the decal mesh, but texture coordinates are required for each vertex in the decal mesh in order to texture the decal mesh with the defect image. Texture coordinates such that the defect image stretches over the decal mesh can be generated by projective texturing, a common computer graphics algorithm; for example, see [Luna 2012].

The following references are fully and completely incorporated herein by referenced: [Eberly 2001] Eberly, D. 2001. 3D Game Engine Design: A Practical Approach to Real-Time Computer Graphics. Morgan Kaufmann Publishers, San Francisco, CA

[Luna 2012] Luna, F. 2012. Introduction to 3D Game Programming with DirectX 11. Mercury Learning & Information, Herndon, VA The last step in this process requires that the decal mesh be rendered upon the inspected object mesh. The foregoing process is set forth in flowchart or algorithm 13020 of FIG. 100.

After the decal mesh has been constructed and projective texture coordinates generated, the decal mesh is rendered using a computer graphics rendering API. In order to render the decal mesh on top of the input mesh, it is preferable to use depth bias rasterization state to prevent z-fighting artifacts. Overdraw of multiple overlapping decal meshes can be visualized using alpha blending or a graphics processing unit's stencil buffer; these two overdraw algorithms are described in [Luna 2012]. An image of a defect decal 13080 being projected on the image of object 14 is shown in FIG. 37, (XIX) Cluster Defect Record A cluster defect record stores information about a defect in a cluster defect database. The cluster defect record includes the defect decal, the defect decal centroid, defect decal surface normal at the centroid, defect decal area, and the defect region of interest information for each defect region of interest used to create the defect record. A scratch defect record stores information about each scratch defect cluster. The scratch defect record stores the information about a scratch in a defect database including the information from the scratch region of interest records such as the scratch line segment start and end points and the combined scratch length, width, and mass.

The contextual defect classification is scheduled after all defect decal records have been stored for all camera frame sequences in an inspection. The inspected object mesh is simulated and all of the defect decals are drawn in simulation on the surface of the simulated inspected object. The simulated scratches are also drawn on the simulated tracked object. This simulated tracked object covered with the defect decals and scratches is the simulated inspected object.

(XX) Contextual Defect Image

A contextual defect image is captured for each cluster defect record using a simulated camera view and the simulated inspected object. A generated contextual camera view is created to have a predefined pixel resolution. The generated contextual camera view has a contextual camera look vector that is opposite in direction to the defect decal surface normal. The contextual camera view position is centered over the defect centroid point on a line parallel to the defect decal surface normal and also passing though the defect decal centroid surface point on the inspected object. The distance of the generated contextual camera view is proportional to the defect decal area by a contextual view distance coefficient. The contextual camera up vector is selected so that the contextual camera view is consistently oriented relative to the world x and y plane. For example, the contextual camera up vector may be selected to be orthogonal to the contextual camera look vector and also so that the contextual camera up vector's unit vector has the maximum possible projection magnitude on the world "z" axis.

The contextual defect image is created using a simulated contextual camera snap taken using the contextual camera view. The contextual defect image is adjusted so that pixels that do not render a defect decal or a defect scratch are masked off, leaving just an image of the defect decals in their context on the inspected object surface. The contextual defect image is an image of the defect decal in the context of surrounding defect decals and scratches. The contextual view distance coefficient may be selected so that an average of 25% of the pixels in a contextual defect image render the associated defect decal.

The contextual defect image is stored as part of the cluster defect record in the database.

(XXI) Contextual Defect Classifier

A contextual defect training set is created from a defect database. Defect categories are defined and may include categories such as scratches, prime drips, pinholes, dust, pops, foreign matter, threads, or sags. In the contextual defect training set, each contextual defect image is associated with a defect category by a human skilled in classifying defect categories.

A contextual defect classifier is trained for classifying defect records by defect category. A contextual defect feature vector is constructed from information in the defect record, which may include the contextual defect image, the area of the defect decal, or the shape of the defect decal. the contextual defect classifier may be constructed using pattern classification techniques as described in the Pattern Classification book by Richard Duda, Peter Hart, and David Stork, or the Microsoft Cognitive toolkit may be used for the contextual defect classifier. Generally, the Resnet image classification algorithm achieves a high classification accuracy while being faster to train and maintain a smaller model size than traditional convolution networks. The Microsoft CNTK framework is useful for ease of integration and speed. It provides a .NET classification API which is easy to integrate with core software. When using multiple graphics cards or multiple servers for classification, CNTK performance exceeds similar classification frameworks such as TensorFlow and Caffe.

After training, the contextual defect classifier inputs a contextual defect feature vector and outputs a final defect category. The final classified defect category is stored in the contextual defect record.

(XXII) Quality Regions

The surface 12 of the inspected object 14 is divided into quality regions. The quality regions are defined in the inspected object mesh. The centroid of the defect record is mapped to a quality region for the purpose of automatically generating quality reports, including statistical process control charts.

Quality regions are configured with one or more quality region specification. Quality region specifications include specifications such as the minimum defect area, minimum scratch length, and maximum defects per area. Quality regions also specify maximum dust particle area.

(XXIII) Defect Action

A defect category action table specifies the default corrective action for a defect category. Example defect corrective actions include automated correction, human correction, report only, or no action.

A defect evaluator algorithm processes a contextual defect record and assigns a corrective action to the defect record. The defect evaluator compares the contextual defect record information to the quality region specifications of the associated quality region to determine the best course of action. Defects are assigned a corrective action by looking up their classified defect category in the defect category action table. Defect records that have a smaller area than specified in the associated quality region specification will be assigned no corrective action. Defect records in the dust category will be assigned no corrective action unless the defect exceeds the maximum defects per area, or unless the area of the dust exceeds the maximum dust area.

Defect categories that have a human assigned corrective action are communicated to human quality workers using means including print-outs or overhead displays. One means of communication is to display a perspective view image of the inspected object and superimposing colored shape outlines on the image. The defect size, severity, probability, and defect category can be coded into the shape, color, and shape area of the outline.

(XXIV) Automated Correction

Defect categories that have an automated corrective action assigned can be communicated to an automation system designed to repair defects. The automation system designed to repair defects includes a series of automation polishing stations. An automated polishing station includes a polishing tool for spinning a polishing disk on the surface of the inspected object, an optional polishing solution dispenser for dispensing polishing solutions onto the inspected object, and a positioning arm for placing the polishing disk on the surface of the inspected object at a specified surface location with a specified orientation vector. Typically, the polishing tool is similar to the automated sanding system tool sold by ASIS GmbH that makes use of an active contact flange and disk changing station. The positioning arm is typically an industrial robot. The polishing disk types include an abrasive sanding disks and polishing buffer disks. Multiple polishing stations may be sequenced to repair a defect. For example, a defect may be sanded at one station and then buffed at a following station.

After the inspected object's defects have been corrected, the inspected object may pass through a second inspection station, or it may be rerouted to pass through the same inspection system.

(XXV) Cycle Time

The image processing computer 66 receives camera frames from the inspection camera array 26. Typically, the inspected object 14 arrives at the inspection system 10 with a regular inspection time period interval between arrivals of inspected objects. The inspection cycle time is the minimum inspection time period interval between arrivals of inspected objects. One objective of the system is to process inspections so that inspection results can be provided with an update period less than the inspection cycle time, after a minimum processing lag. Typically, the processing lag is an integer multiple of the inspection cycle time. For example, if the inspection cycle time interval is 1 minute, the processing lag could be 10 minutes.

The image processing computers 66 may not be able to completely process an entire inspection in the inspection cycle time. Processing may be divided into processing stages, divided by processing buffers, and processing stages may be distributed across computing resources. Processing stages may be assigned to processing computers that are connected to the image processing computer and other computers by network connections. When there are more than one image processing computers, processing stages may converge into shared processing stages. For example, one stage might include acquiring a camera frame, cropping the image, and dividing the image into image processing regions. Other stages might include alignment and finding the light bar region in an image processing section. Other stages might include finding bright spots in an image processing region, clustering, classifying, evaluating, displaying, and so forth. Each processing stage is designed to complete in a time period less than the inspection cycle time, and the stages are designed so that the final processing for an inspection will complete in a time period less than or equal to the processing lag time.

(XXVI) Orange Peel Score

An orange peel score may be generated from a frame section. Orange peel is a paint texture defect that causes light reflection to appear wavy. FIG. 115 shows a light bar reflection 2000 on a truck cab where the paint is relatively free from orange peel. FIG. 109 shows a light bar reflection 2001 on a truck cab where the paint has mild orange peel. The orange peel score is a number that correlates to the severity of orange peel on the surface reflected in the frame section. The orange peel score is created by processing the edges of the light reflection bar in an inspection image frame section to create a numerical value that is correlated with the smoothness or roughness of the edge. Ideally, the orange peel score is tolerant to changes in light intensity. As the smoothness of the edge of the light bar decreases, the orange peel score should increase. This allows orange peel score tolerance ranges to be defined for each frame section for mapping an orange peel index value to orange peel categories, including no orange peel, mild orange peel, moderate orange peel, and severe orange peel.

One example algorithm 2200 for building an orange peel score is documented in FIG. 117 and includes the sequence of steps 2202, 2203, 2204, 2205, 2206, 2207, 2208, 2209, 2210, 2211, 2212, 2213, and 2214 which respectively provide the delineated algorithmic operation to generate an orange peel score in the last step of 2215. The algorithm inputs a frame section including a light bar reflection and, for this example, the light_bar_image 2001 in FIG. 109 is used to illustrate the algorithm steps. The algorithm to ExtractPercentileTable is described earlier and extracts a percentile table mapping each light_bar_image pixel intensity value to a percentile value. In this call to ExtractPercentileTable, pixel values having an intensity less than the threshold of 30 are ignored for the percentile table calculation.

The outer edge image 2003, shown in FIG. 110, is created by converting all pixels in light_bar_image having intensity values in the percentile_table less than the 10th percentile to 0, and then setting all other pixels equal to 255. Similarly, the inner_edge_image 2004, which is shown in FIG. 111, is created using the 30th percentile intensity values associated with the light bar image 2001. The dual_edge_image 2005, which is shown in FIG. 112, is created by inverting the inner_edge_image and then applying it as a mask to the outer_edge_image. The resulting pixel values are between the 10th and 30th percentiles on the edges as shown within the image 2005.

A small erosion in the vertical direction is applied to outer_edge_image 2003 to produce the dual_edges_eroded image 2007 in shown in FIG. 113 The top half of the dual_edges_eroded is cropped to produce the top_edge_image 2009 of FIG. 114, while the bottom half is cropped to produce a bottom_edge_image.

The ScoreEdge algorithm 3000 is documented in FIG. 118. and includes the sequence of steps 3001, 3002, 3003, 3004, 3005, 3006, 3007, 3008, 3009, 3010, 3011, 3012, 3013, 3014, and 3015. Particularly, the sequence of listed operations respectively occurring in steps 3002-3014 are applied upon an edge image input received in step 3001 and a final orange peel score is returned or created in the final step 3015.

As shown, this algorithm 3000 inputs an edge image (either the top_edge_image or the bottom_edge_image) and returns a score. The algorithm loops through each column in the edge image. For each column, the total number of pixels in the column having an intensity greater than 128 are counted and stored as a thickness value for the column. The column's thickness value is stored in an edge_thickness_array, which is indexed by column_index. The edge_thickness_array is then decimated by a factor of 10, so a new decimated_edge_thickness_array is created from every 10th value of the edge_thickness_array. The squared_difference_array is calculated by squaring the difference of adjacent values from the decimated edge thickness array. Finally, the top 10% greatest values in the decimated_edge_thickness_array are averaged together to produce an orange_peel_edge_score for the edge_image.

The example orange_edge_score is calculated using the ScoreEdge algorithm for both the top_edge_image and the bottom_edge_image. These two scores are averaged together to create the final orange_peel_score. In this example, the final orange peel score for the frame section 2001 shown in FIG. 109 is 19.5. The final orange peel score for the frame section 2000 shown in FIG. 115 is 7.6. Orange peel score tolerances for this example could be set so that orange peel scores below 15 are considered no defect, orange peel scores between 15 and 25 are categorized as mild orange peel, and orange peel scores above 25 could be considered severe orange peel. In this example, the light bar reflection 2000 in FIG. 115 is categorized as "no orange peel" while the light bar reflection 2001 in FIG. 109 is categorized as "mild orange peel". When orange peel is located, the information can be added to an orange peel defect record, along with the centroid point of the light bar, and this information can be used for reporting about the orange peel using methods described above for reporting spot defects. Image 15070 of FIG. 116 is a dual edges eroded image for image 2000.

Obviously, many modifications and variations of the present invention are possible in light of the above teachings and may be practiced otherwise than as specifically described. In addition, the headings and examples are merely for convenience and are not to be read in any way as limiting. Let it be understood that the present inventions are not limited to the exact construction or methodology which has been described above, but that various changes and modifications may be made without departing from the spirit and the scope of the following claims.

The following books are both fully and completely incorporated herein by referenced, word for word and paragraph for paragraph:

[Eberly 2001] Eberly, D. 2001. 3D Game Engine Design: A Practical Approach to Real-Time Computer Graphics. Morgan Kaufmann Publishers, San Francisco, CA

[Luna 2012] Luna, F. 2012. Introduction to 3D Game Programming with DirectX 11. Mercury Learning & Information, Herndon, VA

What is claimed is:

1. An inspection system for a surface of a moving object, comprising:
    a plurality of lights, each light having a fixed position;
    a plurality of cameras, each camera having a fixed position; and
    a processing assembly configured to detect a location of the moving object, selectively activate the plurality of lights and the plurality of cameras, capture a plurality of images of a plurality of surface portions of the moving object using the plurality of cameras, and utilize the captured images to detect a presence of a defect upon the plurality of surface portions of the moving object, wherein the captured images include images from different cameras, and the images from different cameras include images from camera-light pairs from the plurality of lights and the plurality of cameras, the camera-light pairs placed to overlap an inspection swath of the surface of the moving object wherein the overlapping inspection swaths are calculated by a simulator, and share computing resources from the processing assembly in producing the captured images.

2. The inspection system of claim 1, further comprising one of:
a tracking camera which provides the location of the moving object to the processing assembly; and
a laser sensor which provides the location of the moving object to the processing assembly.

3. The inspection system of claim 1, wherein the processing assembly includes an image capture server, the image capture server configured to receive the plurality of images.

4. The inspection system of claim 3, wherein the processing assembly includes an archival server in communication with the image capture server, the archival server configured to store the plurality of images.

5. The inspection system of claim 4, further comprising an output monitor in communication with the archival server.

6. The inspection system of claim 3, wherein the processing assembly includes an image processing server in communication with the image capture server, the image processing server configured to process the plurality of images to detect a presence of a defect upon the plurality of surface portions of the moving object.

7. The inspection system of claim 1, wherein the processing assembly includes a tracking server configured to detect the location of the moving object, the tracking server including a trigger table effective to the plurality of lights and the plurality of cameras to provide a predetermined activation sequence of the plurality of lights and the plurality of cameras to capture the plurality of images of the plurality of surface portions of the moving object.

8. The inspection system of claim 1, wherein the processing assembly is configured to detect the presence of the defect upon the plurality of surface portions of the moving object using a dark spot appearing within the captured images.

9. The inspection system of claim 1, wherein the processing assembly is configured to detect the presence of the defect upon the plurality of surface portions of the moving object using a bright spot appearing within the captured images.

10. The inspection system of claim 1, wherein the simulator uses an inspection object mesh, locations of the camera-light pair camera, camera orientations, light locations, light orientations and the object motion function to simulate the inspection object as it is passing through the inspection system.

11. A method for detecting the presence of a defect upon a surface of a moving object, comprising:
providing an inspection system including:
a plurality of lights, each light having a fixed position;
a plurality of cameras, each camera having a fixed position; and
a processing assembly configured to detect a location of the moving object, selectively activate the plurality of lights and the plurality of cameras, capture a plurality of images of a plurality of surface portions of the moving object using the plurality of cameras, and utilize the captured images to detect a presence of a defect upon the plurality of surface portions of the moving object, wherein the captured images include images from different cameras, and the images from different cameras include images from camera-light pairs from the plurality of lights and the plurality of cameras, the camera-light pairs placed to overlap an inspection swath of the surface of the moving object wherein the overlapping inspection swaths are calculated by a simulator, and share computing resources from the processing assembly in producing the captured images;
acquiring the plurality of images of the plurality of surface portions of the moving object; and
utilizing the captured images to detect the presence of the defect upon the plurality of surface portions of the moving object.

12. The method of claim 11, wherein utilizing the captured images to detect the presence of the defect upon the plurality of surface portions of the moving object includes locating a dark spot appearing within the captured images.

13. The method of claim 11, wherein utilizing the captured images to detect the presence of the defect upon the plurality of surface portions of the moving object includes locating a bright spot appearing within the captured images.

14. The method of claim 11, wherein utilizing the captured images to detect the presence of the defect upon the plurality of surface portions of the moving object includes forming a cluster of spots appearing within the captured images, the spots selected from a group consisting of dark spots, bright spots, and combinations thereof.

15. The method of claim 11, wherein:
the processing assembly includes a tracking server configured to detect the location of the moving object, the tracking server including a trigger table effective to the plurality of lights and the plurality of cameras to provide a predetermined activation sequence of the plurality of lights and the plurality of cameras to capture the plurality of images of the plurality of surface portions of the moving object; and
acquiring the plurality of images of the plurality of surface portions of the moving object includes using the trigger table to provide a predetermined activation sequence of the plurality of lights and the plurality of cameras to capture the plurality of images of the plurality of surface portions of the moving object.

16. A method for detecting and correcting the presence of a defect upon a surface of a moving object, comprising:
providing an inspection system including:
a plurality of lights, each light having a fixed position;
a plurality of cameras, each camera having a fixed position; and
a processing assembly configured to detect a location of the moving object, selectively activate the plurality of lights and the plurality of cameras, capture a plurality of images of a plurality of surface portions of the moving object using the plurality of cameras, and utilize the captured images to detect a presence of a defect upon the plurality of surface portions of the moving object, wherein the captured images include images from different cameras, and the images from different cameras include images from camera-light pairs from the plurality of lights and the plurality of cameras, the camera-light pairs placed to overlap an inspection swath of the surface of the moving object wherein the overlapping inspection swaths are calculated by a simulator, and share computing resources from the processing assembly in producing the captured images;

acquiring the plurality of images of the plurality of surface portions of the moving object;

utilizing the captured images to detect the presence of the defect upon the plurality of surface portions of the moving object;

communicating the presence of the defect to an automated defect correction assembly; and correcting the defect using the automated defect correction assembly.

17. The method of claim 16, wherein the automated defect correction assembly includes a robot.

18. The method of claim 16, wherein utilizing the captured images to detect the presence of the defect upon the plurality of surface portions of the moving object includes forming a cluster of spots appearing within the captured images, the spots selected from a group consisting of dark spots, bright spots, and combinations thereof.

19. The method of claim 16, wherein:

the processing assembly includes a tracking server configured to detect the location of the moving object, the tracking server including a trigger table effective to the plurality of lights and the plurality of cameras to provide a predetermined activation sequence of the plurality of lights and the plurality of cameras to capture the plurality of images of the plurality of surface portions of the moving object; and acquiring the plurality of images of the plurality of surface portions of the moving object includes using the trigger table to provide a predetermined activation sequence of the plurality of lights and the plurality of cameras to capture the plurality of images of the plurality of surface portions of the moving object.

20. The method of claim 19, further comprising:

tracking a location of the moving object; and providing the location of the moving object to the processing assembly.

\* \* \* \* \*